US012730185B2

(12) United States Patent
Markish et al.

(10) Patent No.: US 12,730,185 B2
(45) **Date of Patent: *Sep. 8, 2026**

(54) RADAR APPARATUS, SYSTEM, AND METHOD

(71) Applicant: INTEL CORPORATION, Santa Clara, CA (US)

(72) Inventors: Ofer Markish, Ra'anana (IL); Ophir Shabtay, Tsofit (IL); Thushara Hewavithana, Chandler, AZ (US); Arnaud Amadjikpe, Beaverton, OR (US); Shengbo Xu, Newark, CA (US)

(73) Assignee: INTEL CORPORATION, Santa Clara, CA (US)

( * ) Notice: Subject to any disclaimer, the term of this patent is extended or adjusted under 35 U.S.C. 154(b) by 147 days.

This patent is subject to a terminal disclaimer.

(21) Appl. No.: 18/664,048

(22) Filed: May 14, 2024

(65) Prior Publication Data

US 2024/0418825 A1 Dec. 19, 2024

Related U.S. Application Data

(63) Continuation of application No. 17/392,785, filed on Aug. 3, 2021, now Pat. No. 12,019,178, which is a (Continued)

(51) Int. Cl.
*G01S 7/35* (2006.01)
*B60W 60/00* (2020.01)
(Continued)

(52) U.S. Cl.
CPC .......... *G01S 7/352* (2013.01); *H01Q 1/3233* (2013.01); *H01Q 21/22* (2013.01); *B60W 60/001* (2020.02);
(Continued)

(58) Field of Classification Search
CPC . B60W 60/001; B60W 2420/408; G01S 7/35; G01S 7/352; G01S 7/4008;
(Continued)

(56) References Cited

U.S. PATENT DOCUMENTS

| | | | | |
|---|---|---|---|---|
| 10,403,983 | B2 * | 9/2019 | Lim | H04B 7/0417 |
| 10,446,938 | B1 * | 10/2019 | Wang | H01Q 9/0407 |

(Continued)

FOREIGN PATENT DOCUMENTS

| | | | |
|---|---|---|---|
| CN | 111326847 A * | 6/2020 | H01Q 13/206 |
| CN | 111900554 A | 11/2020 | |

(Continued)

OTHER PUBLICATIONS

Search Report issued for corresponding application KR 110133408, dated Oct. 22, 2024, 1 page (for reference purpose only).

(Continued)

*Primary Examiner* — Atul Trivedi
(74) *Attorney, Agent, or Firm* — Viering, Jentschura & Partner mbB

(57) ABSTRACT

Some demonstrative aspects include radar apparatuses, devices, systems and methods. In one example, an apparatus may include a plurality of Transmit (Tx) antennas to transmit radar Tx signals, and a plurality of Receive (Rx) antennas to receive radar Rx signals. For example, the radar Rx signals may be based on the radar Tx signals. The apparatus may be implemented, for example, as part of a radar device, for example, as part of a vehicle including the radar device. In other aspects, the apparatus may include any other additional or alternative elements and/or may be implemented as part of any other device.

21 Claims, 41 Drawing Sheets

Related U.S. Application Data continuation of application No. PCT/US2020/066997, filed on Dec. 24, 2020.

(51) Int. Cl.
*G01S 13/89* (2006.01)
*H01Q 1/32* (2006.01)
*H01Q 21/22* (2006.01)

(52) U.S. Cl.
CPC ........ *B60W 2420/408* (2024.01); *G01S 13/89* (2013.01)

(58) Field of Classification Search
CPC ...... G01S 13/42; G01S 13/582; G01S 13/584; G01S 13/881; G01S 13/89; G01S 13/931; G01S 2013/0263; H01Q 1/22; H01Q 1/3233
USPC ........................................................ 701/36
See application file for complete search history.

(56) References Cited

U.S. PATENT DOCUMENTS

| | | | | |
|---|---|---|---|---|
| 2018/0151961 | A1* | 5/2018 | Lim | H01Q 21/065 |
| 2019/0097865 | A1* | 3/2019 | Xu | A61B 5/113 |
| 2019/0327124 | A1* | 10/2019 | Lai | G01S 5/017 |
| 2020/0150221 | A1* | 5/2020 | Prados | G01S 13/931 |
| 2020/0182995 | A1* | 6/2020 | Zeng | G01S 13/003 |
| 2020/0191913 | A1* | 6/2020 | Zhang | G01S 7/412 |
| 2020/0191943 | A1* | 6/2020 | Wu | G01S 13/726 |
| 2020/0259237 | A1* | 8/2020 | Shrivastava | H01Q 1/2291 |
| 2020/0264277 | A1* | 8/2020 | Hess | G01S 13/931 |
| 2020/0284877 | A1* | 9/2020 | Ahmed | G01S 13/003 |
| 2020/0366386 | A1* | 11/2020 | Bugos | A61B 5/0022 |
| 2020/0386855 | A1* | 12/2020 | Bialer | G01S 7/2813 |
| 2020/0408875 | A1* | 12/2020 | Mai | G01S 7/006 |
| 2021/0311180 | A1* | 10/2021 | Wang | G01S 13/538 |
| 2022/0018925 | A1* | 1/2022 | Duan | G01S 5/021 |
| 2023/0379739 | A1* | 11/2023 | Kim | H04B 7/0626 |
| 2023/0388840 | A1* | 11/2023 | Au | G01S 13/88 |
| 2023/0393272 | A1* | 12/2023 | Siddiq | H01Q 21/065 |
| 2024/0045023 | A1* | 2/2024 | Falk | G01S 13/42 |
| 2024/0142557 | A1* | 5/2024 | Peng | G01S 1/08 |
| 2024/0298276 | A1* | 9/2024 | Rai | H04B 7/10 |
| 2025/0175213 | A1* | 5/2025 | Polydoros | H04B 7/024 |
| 2025/0264572 | A1* | 8/2025 | Moradi | G01S 13/42 |
| 2026/0046002 | A1* | 2/2026 | Yang | H04B 7/0691 |

FOREIGN PATENT DOCUMENTS

| | | | | |
|---|---|---|---|---|
| WO | WO-2023124885 A1 | * | 7/2023 | H01Q 1/36 |
| WO | WO-2024225038 A1 | * | 10/2024 | H01Q 1/22 |

OTHER PUBLICATIONS

Taxonomy and Definitions for Terms Related to Driving Automation Systems for On-Road Motor Vehicles, J3016, SAE International, Jun. 2018, 35 pages.

* cited by examiner 106
107
105
100
102
103
Radar frontend
101
104
Radar processor
108
Vehicle controller 200
201
202
203
204
205
206
207
208
209
210
211
212
213
214
215
Controller
Radar processor 301
300
Controlled system components
311
309
304
305
307
302
TX
DAC
306
308
303
RX
ADC
Radar frontend
Radar processor
System controller
310
312
Storage
313
Memory
314
Application processor
315
Communication processor 501
502
Radar frontend
503
504
M
1
0
K-1
0
L-1
Slow time
Fast time
FFT
505
506
506
506
506
range
speed
Radar processor θ
M
2
1
$d \sin \theta$
$d$
600

930

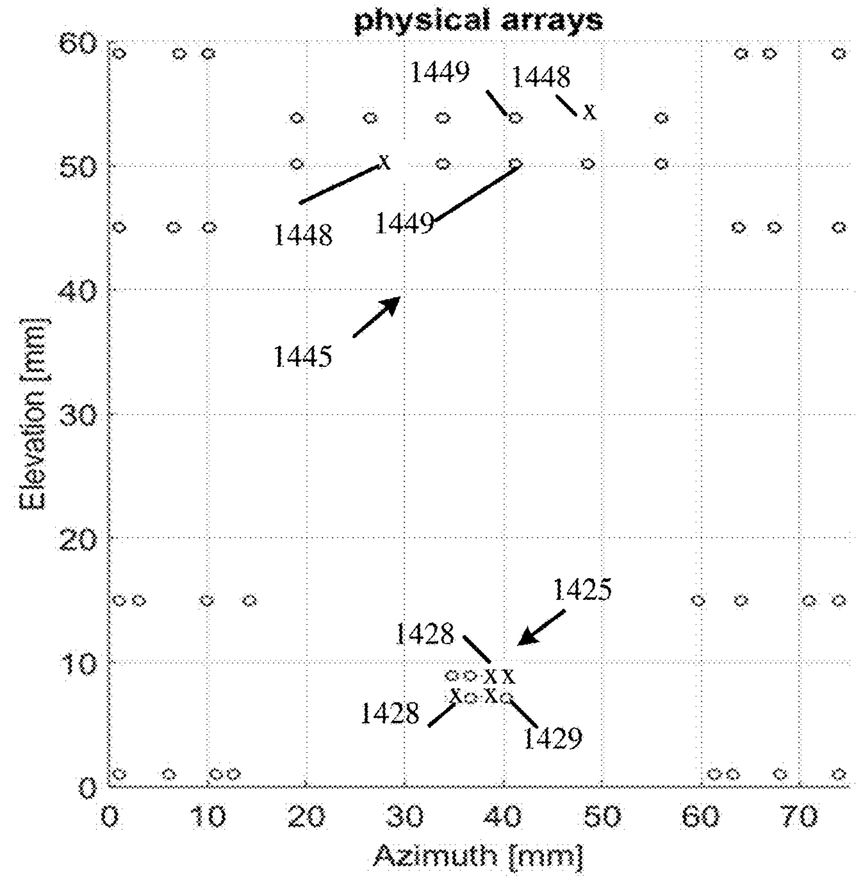
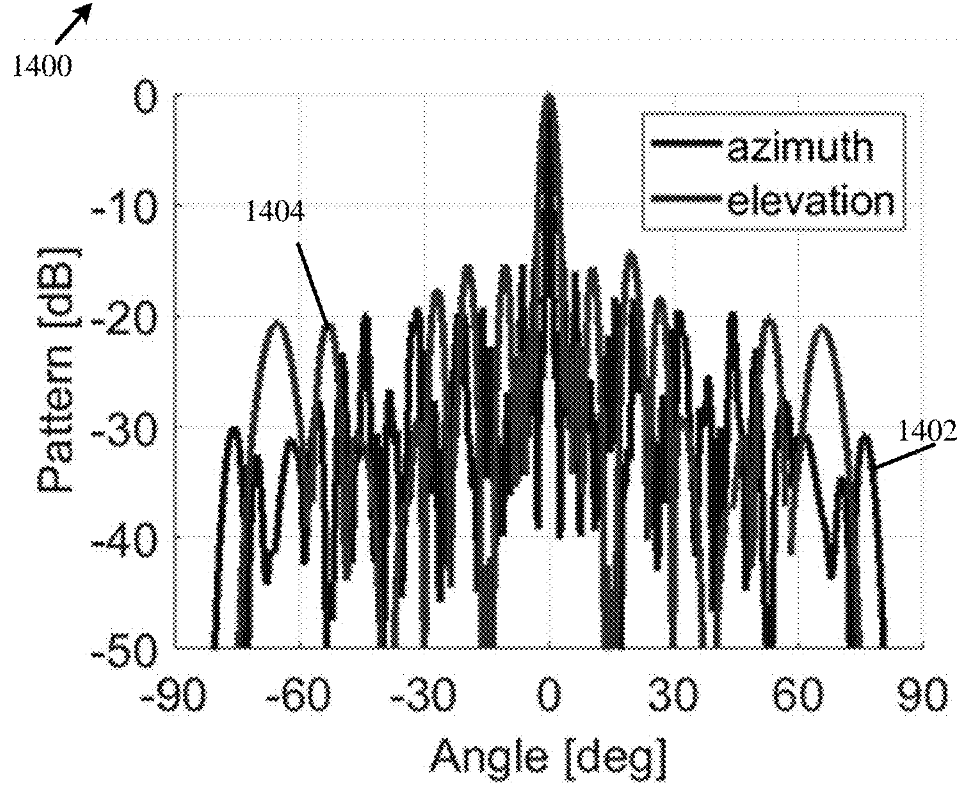
Fig. 14

1800

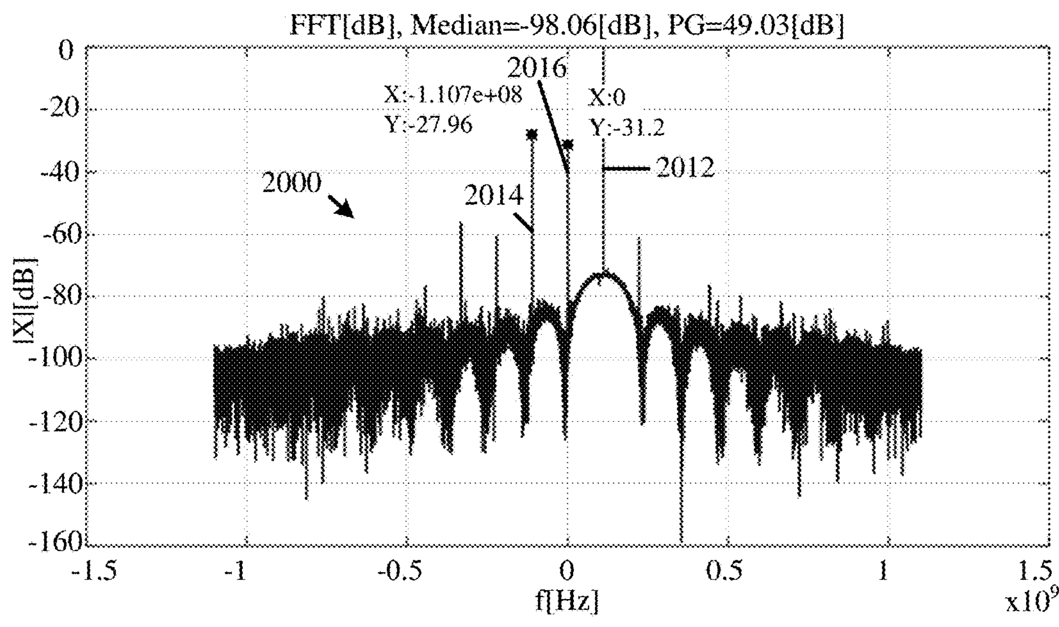
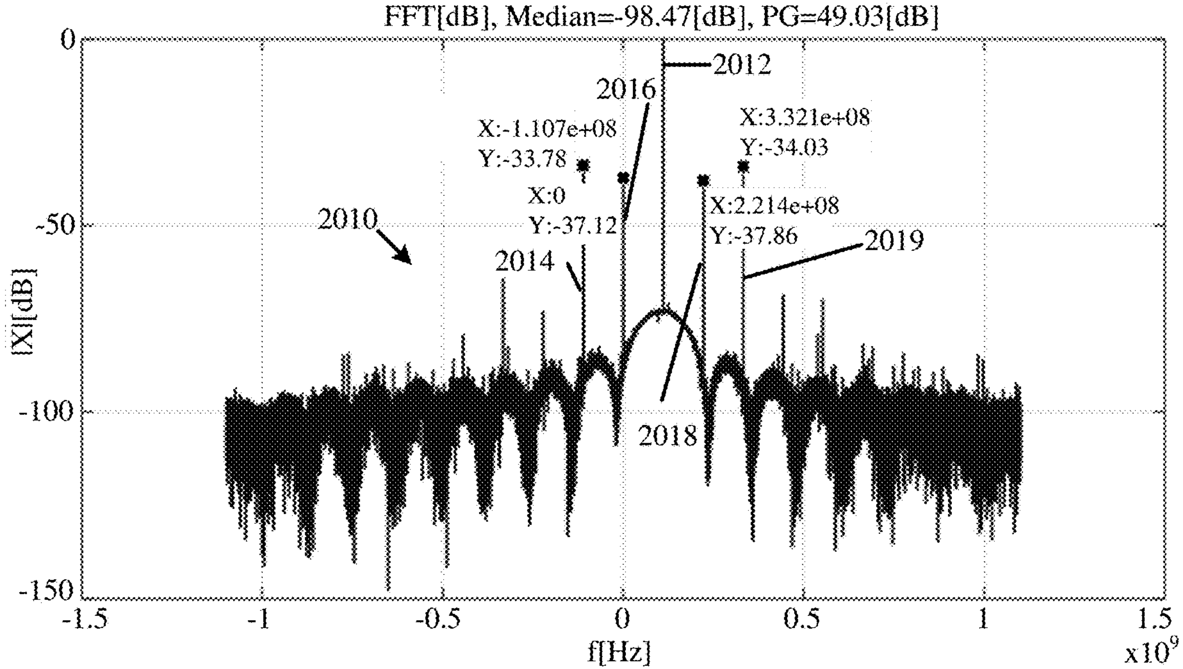
Fig. 20

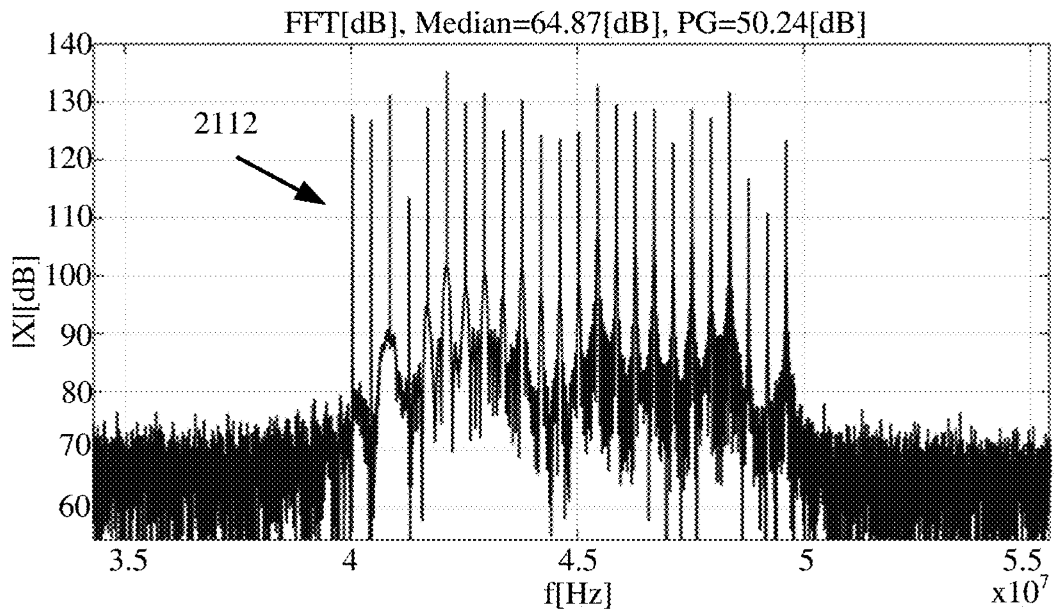
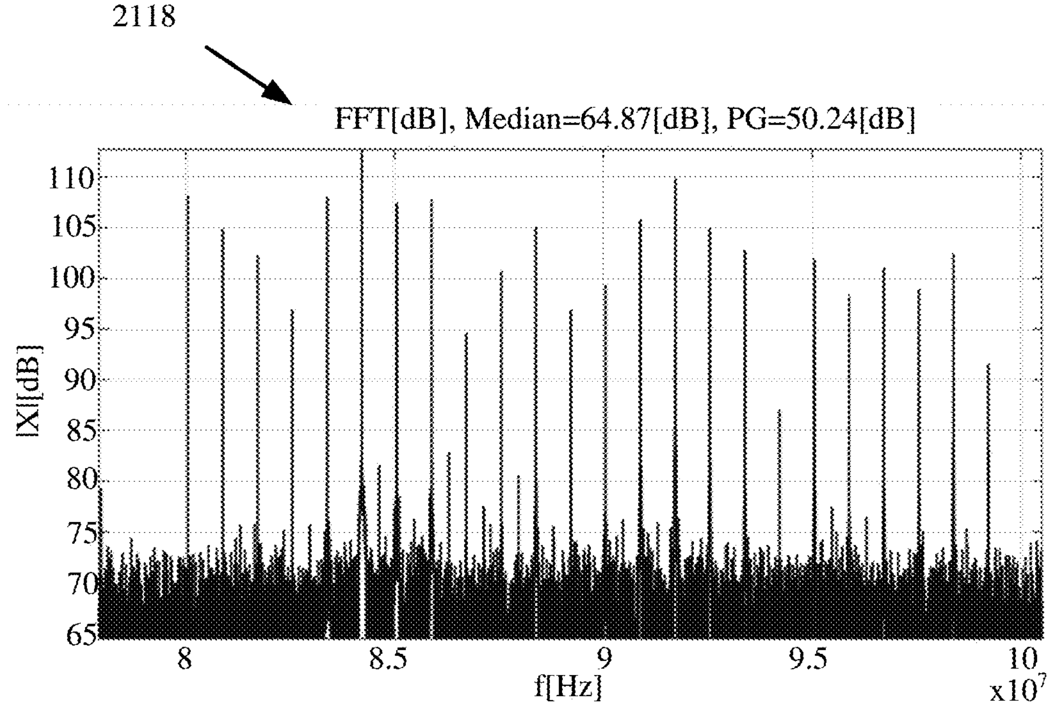
Fig. 21B

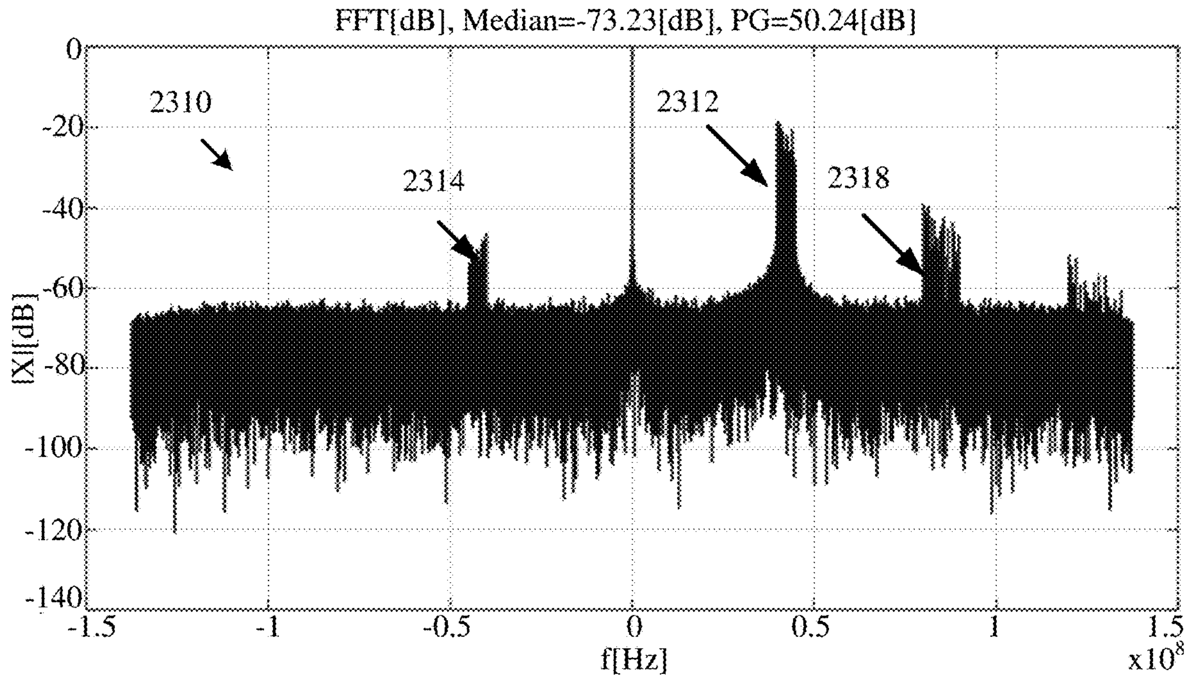
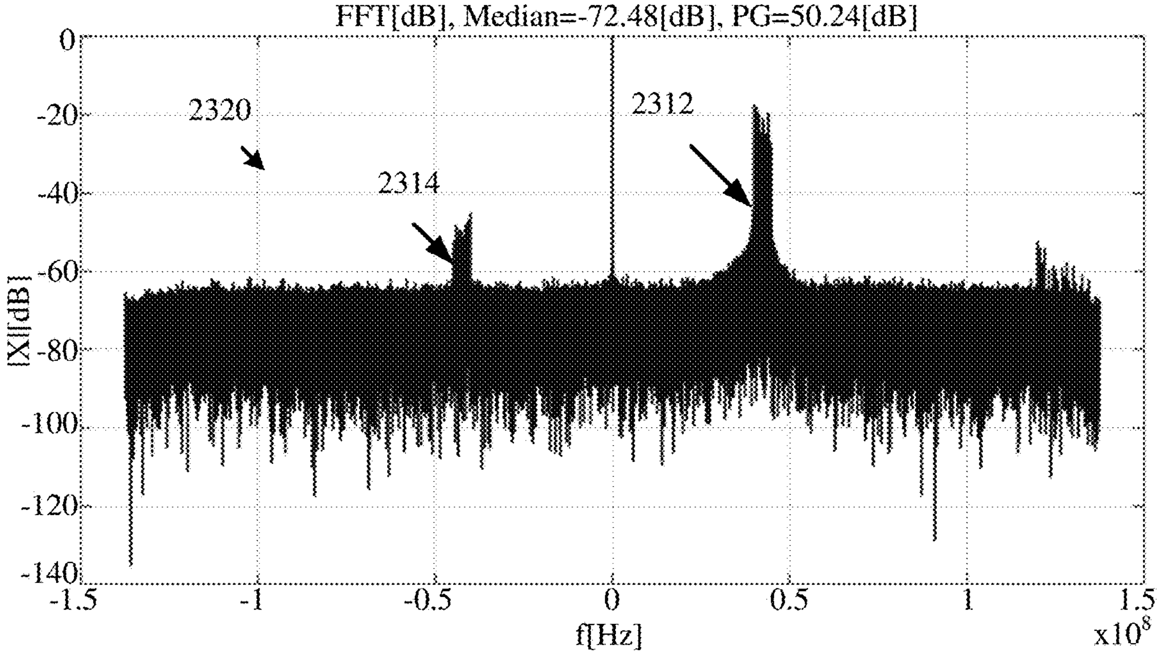
Fig. 23

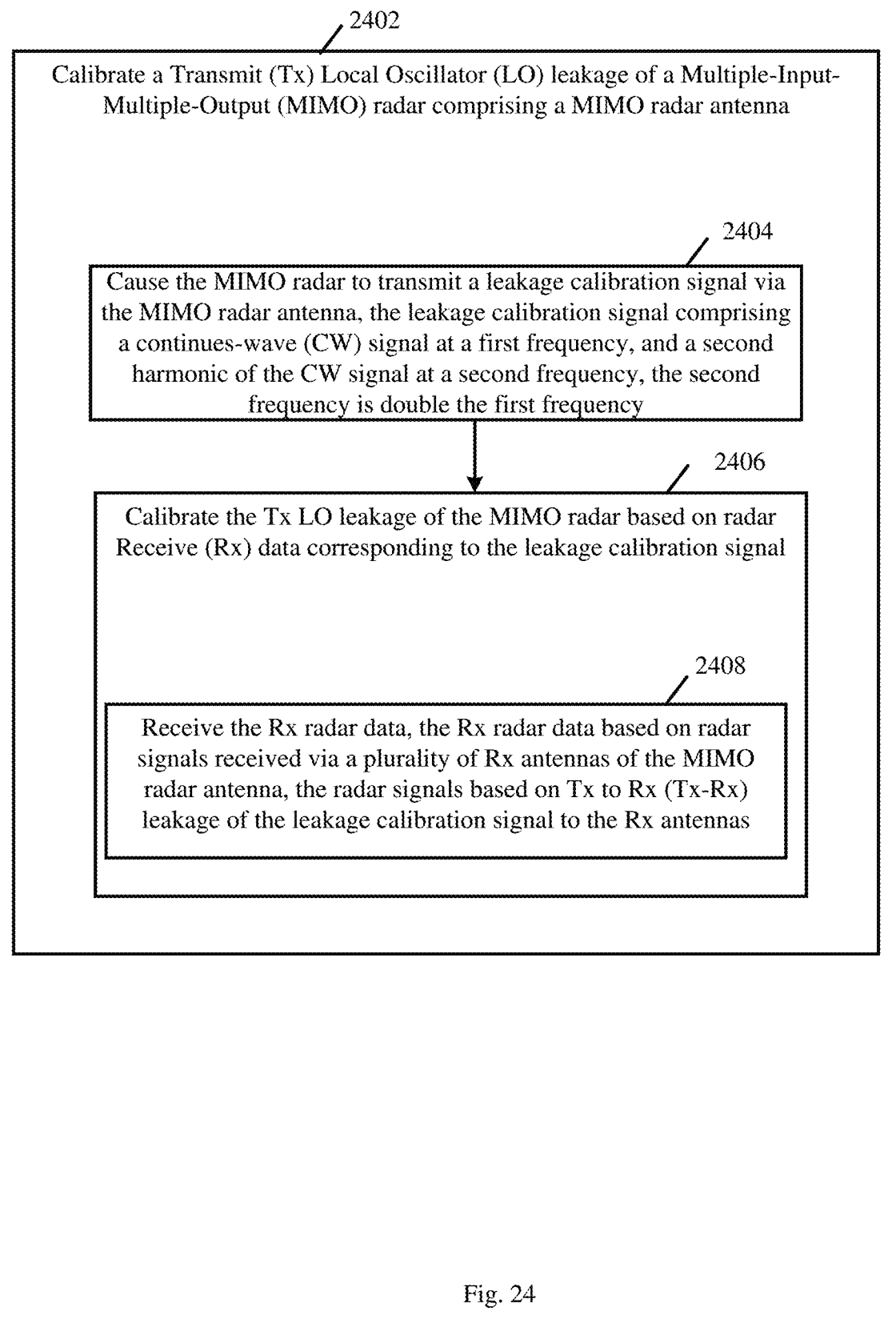

2402

Calibrate a Transmit (Tx) Local Oscillator (LO) leakage of a Multiple-Input-Multiple-Output (MIMO) radar comprising a MIMO radar antenna

2404

Cause the MIMO radar to transmit a leakage calibration signal via the MIMO radar antenna, the leakage calibration signal comprising a continues-wave (CW) signal at a first frequency, and a second harmonic of the CW signal at a second frequency, the second frequency is double the first frequency

2406

Calibrate the Tx LO leakage of the MIMO radar based on radar Receive (Rx) data corresponding to the leakage calibration signal

2408

Receive the Rx radar data, the Rx radar data based on radar signals received via a plurality of Rx antennas of the MIMO radar antenna, the radar signals based on Tx to Rx (Tx-Rx) leakage of the leakage calibration signal to the Rx antennas

Fig. 24

Convert at a high bandwidth (BW) Analog to Digital Converter (ADC) an analog Receive (Rx) chirp signal into a high BW digital Rx chirp signal having a bandwidth of at least 500 Megahertz (MHz), the analog Rx chirp signal is based on a Transmit (Tx) chirp signal

2804

Generate at a digital matched filter cross-correlated (XCORR) radar Rx data based on a correlation between the high BW digital Rx chirp signal and a template mask corresponding to the Tx chirp signal, a length of the template mask corresponds to a length of the Tx chirp signal

2806

Split the template mask into a plurality of mask segments

2808

Transform a plurality of time-domain segments of the high BW digital Rx chirp signal into a respective plurality of frequency-domain Rx chirp segments

2810

Generate a plurality of masked segments by multiplying the plurality of mask segments with the plurality of frequency-domain Rx chirp segments, respectively

2812

Generate the XCORR Rx radar data based on a combination of the plurality of masked segments

| Bank | | | | |
|---|---|---|---|---|
| Bank 0 (2 rows; 16 x 2 = 32 rows) | D0, R0, 576 x 0 | D0, R1, 576 x 1 | D0, R2, 576 x 2 | D0, R3, 576 x 3 |
| | D0, R32, 576 32 | D0, R33, 576 x RTE | D0, R34, 576 x RTE | D0, R35, 576 x RTE |
| | ..... | ..... | ..... | ..... |
| | D0, R480, 576 x RTE | D0, R481,576 x RTE | D0, R482, 576 x RTE | D0, R483, 576 x RTE |
| Bank 1 | D0, R4, 576 x 4 | D0, R5, 576 x 5 | D0, R6, 576 x 6 | D0, R7, 576 x 7 |
| | D0, R36, 576 x RTE | D0, R37, 576 x RTE | D0, R38, 576 x RTE | D0, R39, 576 x RTE |
| | ..... | ..... | ..... | ..... |
| | D0, R484, 576 x RTE | D0, R485, 576 x RTE | D0, R486, 576 x RTE | D0, R487, 576 x RTE |
| Bank 2 | D0, R8, 576 x 8 | D0, R9, 576 x 9 | D0, R10, 576 10 | D0, R11, 576 11 |
| | D0, R40, 576 x RTE | D0, R41, 576 x RTE | D0, R42, 576 x RTE | D0, R43, 576 x RTE |
| | ..... | ..... | ..... | ..... |
| | D0, R488, 576 x RTE | D0, R489, 576 x RTE | D0, R490, 576 x RTE | D0, R491, 576 x RTE |
| | ..... | | | |
| Bank 7 | D0, R28, 576 28 | D0, R29, 576 29 | D0, R30, 576 30 | D0, R31, 576 x 31 |
| | D0, R60, 576 x RTE | D0, R61, 576 x RTE | D0, R62, 576 x RTE | D0, R63, 576 x RTE |
| | ..... | ..... | ..... | ..... |
| | D0, R508, 576 x RTE | D0, R509, 576 x RTE | D0, R510, 576 x RTE | D0, R511, 576 x RTE |

Figure 31:
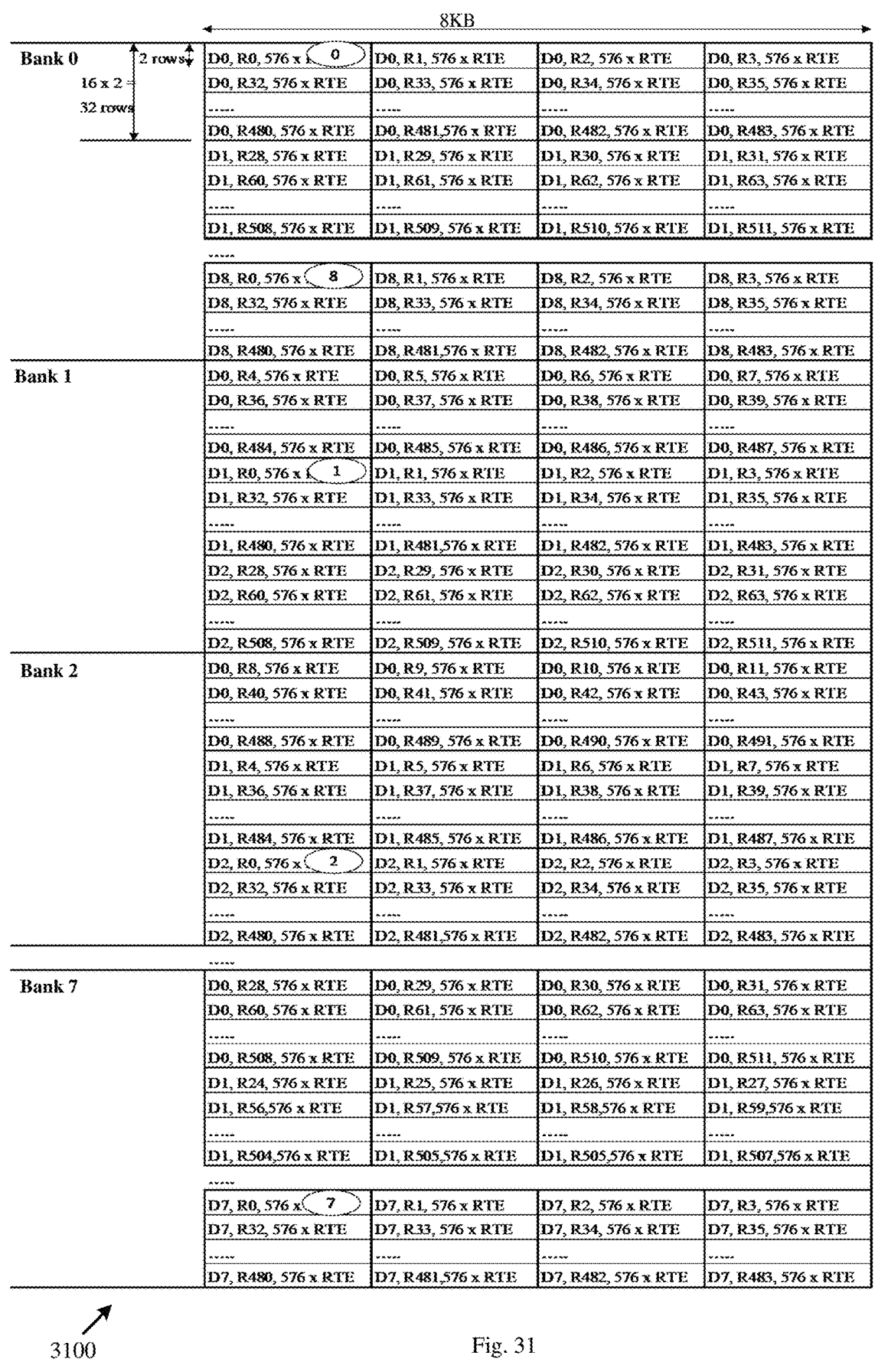

| Bank | | | | |
|---|---|---|---|---|
| Bank 0 (2 rows; 16 x 2 = 32 rows) | D0, R0, 576 x (0) | D0, R1, 576 x RTE | D0, R2, 576 x RTE | D0, R3, 576 x RTE |
| | D0, R32, 576 x RTE | D0, R33, 576 x RTE | D0, R34, 576 x RTE | D0, R35, 576 x RTE |
| | ----- | ----- | ----- | ----- |
| | D0, R480, 576 x RTE | D0, R481,576 x RTE | D0, R482, 576 x RTE | D0, R483, 576 x RTE |
| | D1, R28, 576 x RTE | D1, R29, 576 x RTE | D1, R30, 576 x RTE | D1, R31, 576 x RTE |
| | D1, R60, 576 x RTE | D1, R61, 576 x RTE | D1, R62, 576 x RTE | D1, R63, 576 x RTE |
| | ----- | ----- | ----- | ----- |
| | D1, R508, 576 x RTE | D1, R509, 576 x RTE | D1, R510, 576 x RTE | D1, R511, 576 x RTE |
| | ----- | | | |
| | D8, R0, 576 x (8) | D8, R1, 576 x RTE | D8, R2, 576 x RTE | D8, R3, 576 x RTE |
| | D8, R32, 576 x RTE | D8, R33, 576 x RTE | D8, R34, 576 x RTE | D8, R35, 576 x RTE |
| | ----- | ----- | ----- | ----- |
| | D8, R480, 576 x RTE | D8, R481,576 x RTE | D8, R482, 576 x RTE | D8, R483, 576 x RTE |
| Bank 1 | D0, R4, 576 x RTE | D0, R5, 576 x RTE | D0, R6, 576 x RTE | D0, R7, 576 x RTE |
| | D0, R36, 576 x RTE | D0, R37, 576 x RTE | D0, R38, 576 x RTE | D0, R39, 576 x RTE |
| | ----- | ----- | ----- | ----- |
| | D0, R484, 576 x RTE | D0, R485, 576 x RTE | D0, R486, 576 x RTE | D0, R487, 576 x RTE |
| | D1, R0, 576 x (1) | D1, R1, 576 x RTE | D1, R2, 576 x RTE | D1, R3, 576 x RTE |
| | D1, R32, 576 x RTE | D1, R33, 576 x RTE | D1, R34, 576 x RTE | D1, R35, 576 x RTE |
| | ----- | ----- | ----- | ----- |
| | D1, R480, 576 x RTE | D1, R481,576 x RTE | D1, R482, 576 x RTE | D1, R483, 576 x RTE |
| | D2, R28, 576 x RTE | D2, R29, 576 x RTE | D2, R30, 576 x RTE | D2, R31, 576 x RTE |
| | D2, R60, 576 x RTE | D2, R61, 576 x RTE | D2, R62, 576 x RTE | D2, R63, 576 x RTE |
| | ----- | ----- | ----- | ----- |
| | D2, R508, 576 x RTE | D2, R509, 576 x RTE | D2, R510, 576 x RTE | D2, R511, 576 x RTE |
| Bank 2 | D0, R8, 576 x RTE | D0, R9, 576 x RTE | D0, R10, 576 x RTE | D0, R11, 576 x RTE |
| | D0, R40, 576 x RTE | D0, R41, 576 x RTE | D0, R42, 576 x RTE | D0, R43, 576 x RTE |
| | ----- | ----- | ----- | ----- |
| | D0, R488, 576 x RTE | D0, R489, 576 x RTE | D0, R490, 576 x RTE | D0, R491, 576 x RTE |
| | D1, R4, 576 x RTE | D1, R5, 576 x RTE | D1, R6, 576 x RTE | D1, R7, 576 x RTE |
| | D1, R36, 576 x RTE | D1, R37, 576 x RTE | D1, R38, 576 x RTE | D1, R39, 576 x RTE |
| | ----- | ----- | ----- | ----- |
| | D1, R484, 576 x RTE | D1, R485, 576 x RTE | D1, R486, 576 x RTE | D1, R487, 576 x RTE |
| | D2, R0, 576 x (2) | D2, R1, 576 x RTE | D2, R2, 576 x RTE | D2, R3, 576 x RTE |
| | D2, R32, 576 x RTE | D2, R33, 576 x RTE | D2, R34, 576 x RTE | D2, R35, 576 x RTE |
| | ----- | ----- | ----- | ----- |
| | D2, R480, 576 x RTE | D2, R481,576 x RTE | D2, R482, 576 x RTE | D2, R483, 576 x RTE |
| | ----- | | | |
| Bank 7 | D0, R28, 576 x RTE | D0, R29, 576 x RTE | D0, R30, 576 x RTE | D0, R31, 576 x RTE |
| | D0, R60, 576 x RTE | D0, R61, 576 x RTE | D0, R62, 576 x RTE | D0, R63, 576 x RTE |
| | ----- | ----- | ----- | ----- |
| | D0, R508, 576 x RTE | D0, R509, 576 x RTE | D0, R510, 576 x RTE | D0, R511, 576 x RTE |
| | D1, R24, 576 x RTE | D1, R25, 576 x RTE | D1, R26, 576 x RTE | D1, R27, 576 x RTE |
| | D1, R56,576 x RTE | D1, R57,576 x RTE | D1, R58,576 x RTE | D1, R59,576 x RTE |
| | ----- | ----- | ----- | ----- |
| | D1, R504,576 x RTE | D1, R505,576 x RTE | D1, R505,576 x RTE | D1, R507,576 x RTE |
| | ----- | | | |
| | D7, R0, 576 x (7) | D7, R1, 576 x RTE | D7, R2, 576 x RTE | D7, R3, 576 x RTE |
| | D7, R32, 576 x RTE | D7, R33, 576 x RTE | D7, R34, 576 x RTE | D7, R35, 576 x RTE |
| | ----- | ----- | ----- | ----- |
| | D7, R480, 576 x RTE | D7, R481,576 x RTE | D7, R482, 576 x RTE | D7, R483, 576 x RTE |

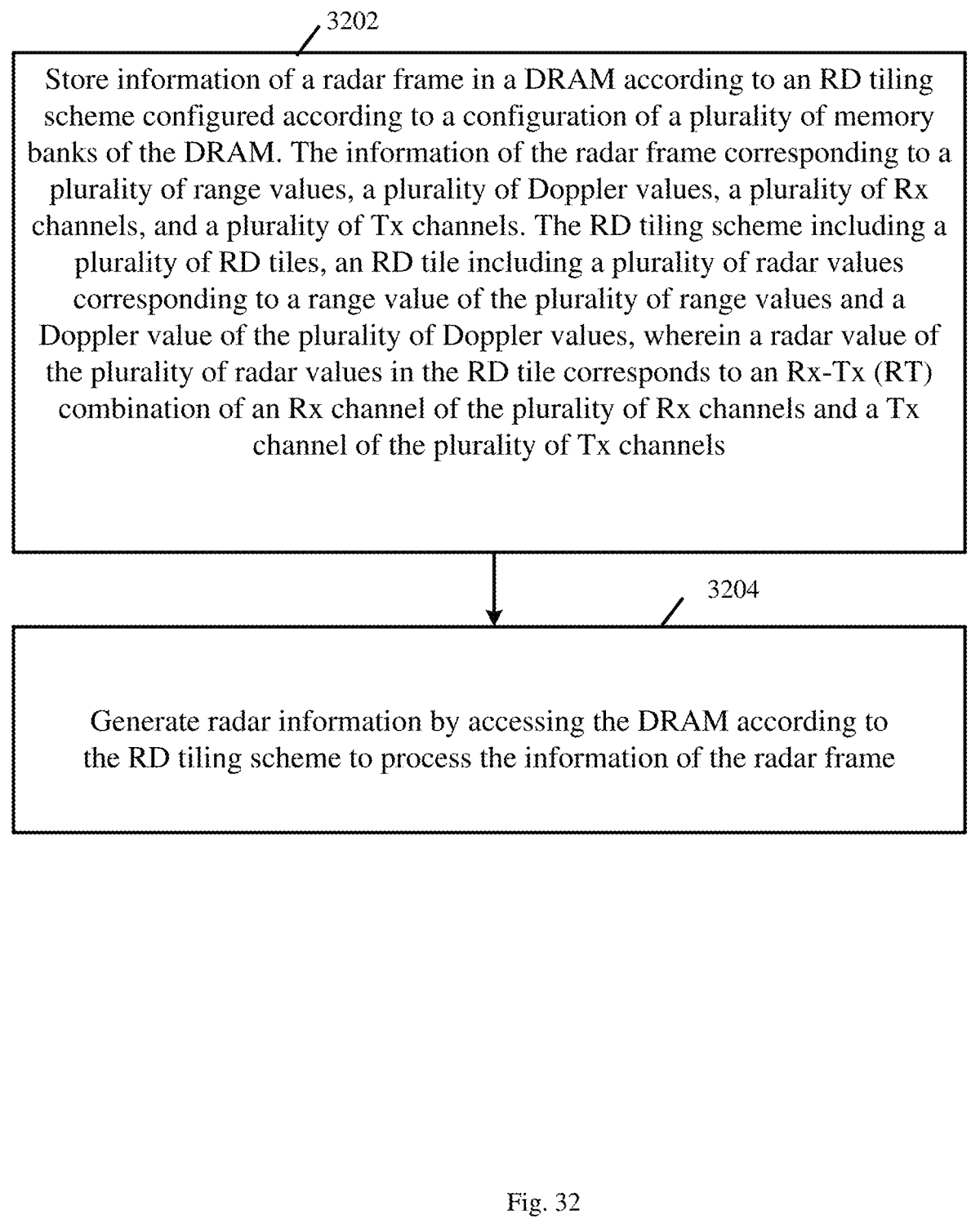

Store information of a radar frame in a DRAM according to an RD tiling scheme configured according to a configuration of a plurality of memory banks of the DRAM. The information of the radar frame corresponding to a plurality of range values, a plurality of Doppler values, a plurality of Rx channels, and a plurality of Tx channels. The RD tiling scheme including a plurality of RD tiles, an RD tile including a plurality of radar values corresponding to a range value of the plurality of range values and a Doppler value of the plurality of Doppler values, wherein a radar value of the plurality of radar values in the RD tile corresponds to an Rx-Tx (RT) combination of an Rx channel of the plurality of Rx channels and a Tx channel of the plurality of Tx channels

3204

Generate radar information by accessing the DRAM according to the RD tiling scheme to process the information of the radar frame

Fig. 32

RADAR APPARATUS, SYSTEM, AND METHOD

CROSS-REFERENCE TO RELATED APPLICATION(S)

This application is a continuation of U.S. patent application Ser. No. 17/392,785, filed on Aug. 3, 2021, which is a continuation of International Patent Application No. PCT/US2020/066997 filed on Dec. 24, 2020, the contents of each of which are incorporated fully herein by reference.

TECHNICAL FIELD

Aspects described herein generally relate to radar devices.

BACKGROUND

Various types of devices and systems, for example, autonomous and/or robotic devices, e.g., autonomous vehicles and robots, may be configured to perceive and navigate through their environment using sensor data of one or more sensor types.

Conventionally, autonomous perception relies heavily on light-based sensors, such as image sensors, e.g., cameras, and/or Light Detection and Ranging (LIDAR) sensors. Such light-based sensors may perform poorly under certain conditions, such as, conditions of poor visibility, or in certain inclement weather conditions, e.g., rain, snow, hail, or other forms of precipitation, thereby limiting their usefulness or reliability.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 14 is a schematic illustration of a tapering scheme configured for a non-uniform MIMO radar antenna, and a graph depicting an azimuth radiation pattern and an elevation radiation pattern of the non-uniform MIMO radar antenna, in accordance with some demonstrative aspects.

FIG. 20 is a schematic illustration of graphs depicting an input of a saturated Power Amplifier (PA), and an output of the saturated PA, in accordance with some demonstrative aspects.

FIG. 21B is a schematic illustration of first and second portions of the leakage calibration signal, in accordance with some demonstrative aspects.

FIG. 23 is a schematic illustration of graphs depicting a pre-calibration spectrum of a Receive (Rx) signal, and a post-calibration spectrum of the Rx signal, in accordance with some demonstrative aspects.

FIG. 24 is a flow-chart illustration of a method of calibrating Tx LO leakage, in accordance with some demonstrative aspects.

FIG. 28 is a flow-chart illustration of a method of generating cross-correlation (XCORR) radar Rx data, in accordance with some demonstrative aspects.

FIG. 30 is a schematic illustration of an RD tiling scheme, in accordance with some demonstrative aspects.

FIG. 31 is a schematic illustration of an RD tiling scheme, in accordance with some demonstrative aspects.

FIG. 32 is a flow-chart illustration of a method of processing radar information, in accordance with some demonstrative aspects.

DETAILED DESCRIPTION

Figure 1:
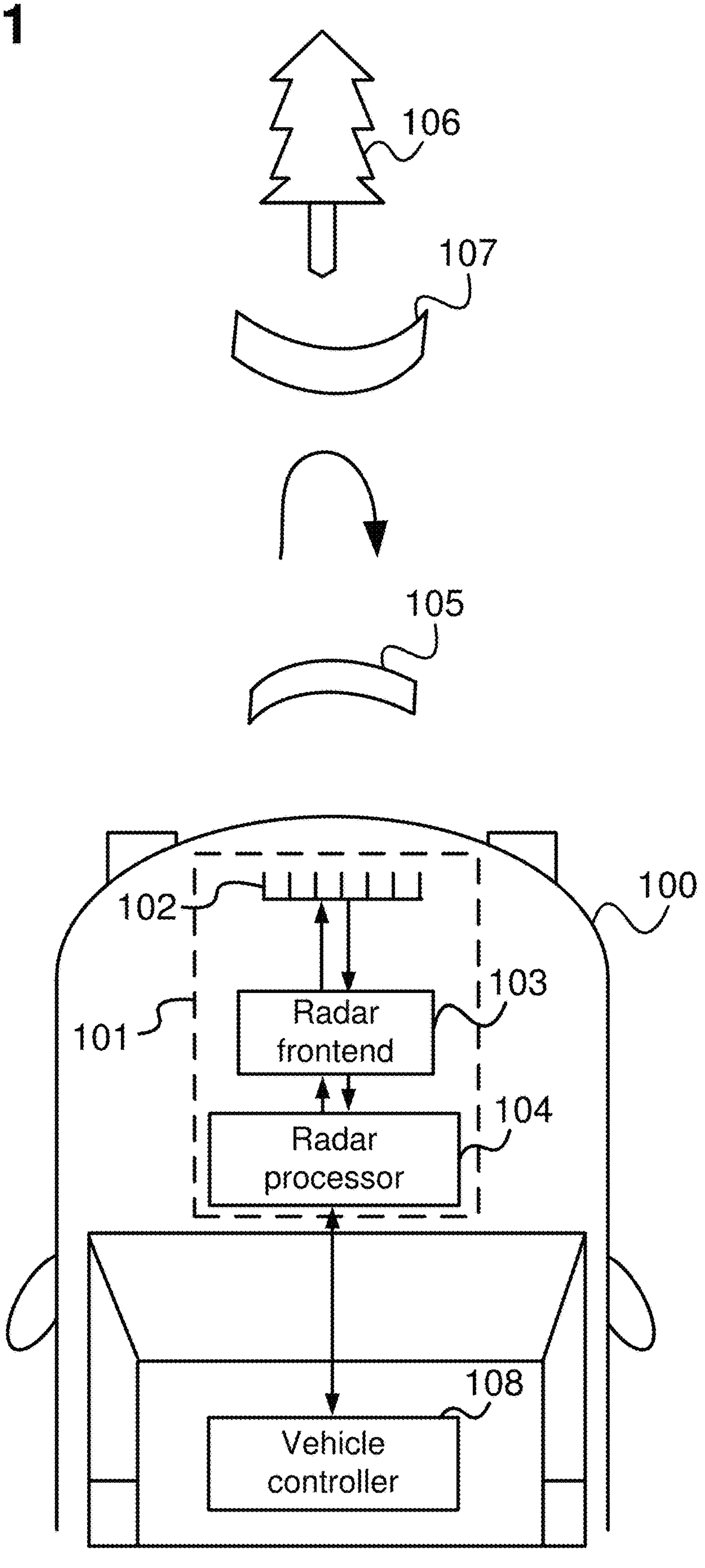
FIG. 1 is a schematic block diagram illustration of a vehicle implementing a radar, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The words "exemplary" and "demonstrative" are used herein to mean "serving as an example, instance, demonstration, or illustration". Any aspect, embodiment, or design described herein as "exemplary" or "demonstrative" is not necessarily to be construed as preferred or advantageous over other aspects, embodiments, or designs.

References to "one embodiment", "an embodiment", "demonstrative embodiment", "various embodiments" "one aspect", "an aspect", "demonstrative aspect", "various aspects" etc., indicate that the embodiment(s) and/or aspects so described may include a particular feature, structure, or characteristic, but not every embodiment or aspect necessarily includes the particular feature, structure, or characteristic. Further, repeated use of the phrase "in one embodiment" or "in one aspect" does not necessarily refer to the same embodiment or aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

A "vehicle" may be understood to include any type of driven object. By way of example, a vehicle may be a driven object with a combustion engine, an electric engine, a reaction engine, an electrically driven object, a hybrid driven object, or a combination thereof. A vehicle may be, or may include, an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, which is configured to traverse the ground, e.g., on a street, on a road, on a track, on one or more rails, off-road, or the like.

An "autonomous vehicle" may describe a vehicle capable of implementing at least one navigational change without driver input. A navigational change may describe or include a change in one or more of steering, braking, acceleration/deceleration, or any other operation relating to movement, of the vehicle. A vehicle may be described as autonomous even in case the vehicle is not fully autonomous, for example, fully operational with driver or without driver input. Autonomous vehicles may include those vehicles that can operate under driver control during certain time periods, and without driver control during other time periods. Additionally or alternatively, autonomous vehicles may include vehicles that control only some aspects of vehicle navigation, such as steering, e.g., to maintain a vehicle course between vehicle lane constraints, or some steering operations under certain circumstances, e.g., not under all circumstances, but may leave other aspects of vehicle navigation to the driver, e.g., braking or braking under certain circumstances. Additionally or alternatively, autonomous vehicles may include vehicles that share the control of one or more aspects of vehicle navigation under certain circumstances, e.g., hands-on, such as responsive to a driver input; and/or vehicles that control one or more aspects of vehicle navigation under certain circumstances, e.g., hands-off, such as independent of driver input. Additionally or alternatively, autonomous vehicles may include vehicles that control one or more aspects of vehicle navigation under certain circumstances, such as under certain environmental conditions, e.g., spatial areas, roadway conditions, or the like. In some aspects, autonomous vehicles may handle some or all aspects of braking, speed control, velocity control, steering, and/or any other additional operations, of the vehicle. An autonomous vehicle may include those vehicles that can operate without a driver. The level of autonomy of a vehicle may be described or determined by the Society of Automotive Engineers (SAE) level of the vehicle, e.g., as defined by the SAE, for example in *SAE J3016 2018: Taxonomy and definitions for terms related to driving automation systems for on road motor vehicles*, or by other relevant professional organizations. The SAE level may have a value ranging from a minimum level, e.g., level 0 (illustratively, substantially no driving automation), to a maximum level, e.g., level 5 (illustratively, full driving automation).

The phrase "vehicle operation data" may be understood to describe any type of feature related to the operation of a vehicle. By way of example, "vehicle operation data" may describe the status of the vehicle, such as, the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, or the like. More generally, "vehicle operation data" may describe or include varying features or varying vehicle operation data (illustratively, time varying features or data).

Some aspects may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

Some aspects may be used in conjunction with Radio Frequency (RF) systems, radar systems, vehicular radar systems, autonomous systems, robotic systems, detection systems, or the like.

Some demonstrative aspects may be used in conjunction with an RF frequency in a frequency band having a starting frequency above 10 Gigahertz (GHz), for example, a frequency band having a starting frequency between 10 GHz and 120 GHz. For example, some demonstrative aspects may be used in conjunction with an RF frequency having a starting frequency above 30 GHz, for example, above 45 GHz, e.g., above 60 GHz. For example, some demonstrative aspects may be used in conjunction with an automotive radar frequency band, e.g., a frequency band between 76 GHz and 81 GHz. However, other aspects may be implemented utilizing any other suitable frequency bands, for example, a frequency band above 140 GHz, a frequency band of 300 GHz, a sub Terahertz (THz) band, a THz band, an Infra Red (IR) band, and/or any other frequency band.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like. In one example, an antenna may be implemented as a separate element or an integrated element, for example, as an on-module antenna, an on-chip antenna, or according to any other antenna architecture.

Some demonstrative aspects are described herein with respect to RF radar signals. However, other aspects may be implemented with respect to, or in conjunction with, any other radar signals, wireless signals, IR signals, acoustic signals, optical signals, wireless communication signals, communication scheme, network, standard, and/or protocol. For example, some demonstrative aspects may be implemented with respect to systems, e.g., Light Detection Ranging (LiDAR) systems, and/or sonar systems, utilizing light and/or acoustic signals.

Reference is now made to FIG. 1, which schematically illustrates a block diagram of a vehicle 100 implementing a radar, in accordance with some demonstrative aspects.

In some demonstrative aspects, vehicle 100 may include a car, a truck, a motorcycle, a bus, a train, an airborne vehicle, a waterborne vehicle, a cart, a golf cart, an electric cart, a road agent, or any other vehicle.

In some demonstrative aspects, vehicle 100 may include a radar device 101, e.g., as described below. For example, radar device 101 may include a radar detecting device, a radar sensing device, a radar sensor, or the like, e.g., as described below.

In some demonstrative aspects, radar device 101 may be implemented as part of a vehicular system, for example, a system to be implemented and/or mounted in vehicle 100.

In one example, radar device 101 may be implemented as part of an autonomous vehicle system, an automated driving system, a driver assistance and/or support system, and/or the like.

For example, radar device 101 may be installed in vehicle 101 for detection of nearby objects, e.g., for autonomous driving.

In some demonstrative aspects, radar device 101 may be configured to detect targets in a vicinity of vehicle 100, e.g., in a far vicinity and/or a near vicinity, for example, using RF and analog chains, capacitor structures, large spiral transformers and/or any other electronic or electrical elements, e.g., as described below. In one example, radar device 101 may be mounted onto, placed, e.g., directly, onto, or attached to, vehicle 100.

In some demonstrative aspects, vehicle 100 may include a single radar device 101. In other aspects, vehicle 100 may include a plurality of radar devices 101, for example, at a plurality of locations, e.g., around vehicle 100.

In some demonstrative aspects, radar device 101 may be implemented as a component in a suite of sensors used for driver assistance and/or autonomous vehicles, for example, due to the ability of radar to operate in nearly all-weather conditions.

In some demonstrative aspects, radar device 101 may be configured to support autonomous vehicle usage, e.g., as described below.

In one example, radar device 101 may determine a class, a location, an orientation, a velocity, an intention, a perceptional understanding of the environment, and/or any other information corresponding to an object in the environment.

In another example, radar device 101 may be configured to determine one or more parameters and/or information for one or more operations and/or tasks, e.g., path planning, and/or any other tasks.

In some demonstrative aspects, radar device 101 may be configured to map a scene by measuring targets' echoes (reflectivity) and discriminating them, for example, mainly in range, velocity, azimuth and/or elevation, e.g., as described below.

In some demonstrative aspects, radar device 101 may be configured to detect, and/or sense, one or more objects, which are located in a vicinity, e.g., a far vicinity and/or a near vicinity, of the vehicle 100, and to provide one or more parameters, attributes, and/or information with respect to the objects.

In some demonstrative aspects, the objects may include other vehicles; pedestrians; traffic signs; traffic lights; roads, road elements, e.g., a pavement-road meeting, an edge line; a hazard, e.g., a tire, a box, a crack in the road surface; and/or the like.

In some demonstrative aspects, the one or more parameters, attributes and/or information with respect to the object may include a range of the objects from the vehicle 100, an angle of the object with respect to the vehicle 100, a location of the object with respect to the vehicle 100, a relative speed of the object with respect to vehicle 100, and/or the like.

In some demonstrative aspects, radar device 101 may include a Multiple Input Multiple Output (MIMO) radar device 101, e.g., as described below. In one example, the MIMO radar device may be configured to utilize "spatial filtering" processing, for example, beamforming and/or any other mechanism, for one or both of Transmit (Tx) signals and/or Receive (Rx) signals.

Some demonstrative aspects are described below with respect to a radar device, e.g., radar device 101, implemented as a MIMO radar. However, in other aspects, radar device 101 may be implemented as any other type of radar utilizing a plurality of antenna elements, e.g., a Single Input Multiple Output (SIMO) radar or a Multiple Input Single output (MISO) radar.

Some demonstrative aspects may be implemented with respect to a radar device, e.g., radar device 101, implemented as a MIMO radar, e.g., as described below. However, in other aspects, radar device 101 may be implemented as any other type of radar, for example, an Electronic Beam Steering radar, a Synthetic Aperture Radar (SAR), adaptive and/or cognitive radars that change their transmission according to the environment and/or ego state, a reflect array radar, or the like.

In some demonstrative aspects, radar device 101 may include an antenna arrangement 102, a radar frontend 103 configured to communicate radar signals via the antenna arrangement 102, and a radar processor 104 configured to generate radar information based on the radar signals, e.g., as described below.

In some demonstrative aspects, radar processor 104 may be configured to process radar information of radar device 101 and/or to control one or more operations of radar device 101, e.g., as described below.

In some demonstrative aspects, radar processor 104 may include, or may be implemented, partially or entirely, by circuitry and/or logic, e.g., one or more processors including circuitry and/or logic, memory circuitry and/or logic. Additionally or alternatively, one or more functionalities of radar processor 104 may be implemented by logic, which may be executed by a machine and/or one or more processors, e.g., as described below.

In one example, radar processor 104 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In other aspects, radar processor 104 may be implemented by one or more additional or alternative elements of vehicle 100.

In some demonstrative aspects, radar frontend 103 may include, for example, one or more (radar) transmitters, and a one or more (radar) receivers, e.g., as described below.

In some demonstrative aspects, antenna arrangement 102 may include a plurality of antennas to communicate the radar signals. For example, antenna arrangement 102 may include multiple transmit antennas in the form of a transmit antenna array, and multiple receive antennas in the form of a receive antenna array. In another example, antenna arrangement 102 may include one or more antennas used both as transmit and receive antennas. In the latter case, the radar frontend 103, for example, may include a duplexer, e.g., a circuit to separate transmitted signals from received signals.

In some demonstrative aspects, as shown in FIG. 1, the radar frontend 103 and the antenna arrangement 102 may be controlled, e.g., by radar processor 104, to transmit a radio transmit signal 105.

In some demonstrative aspects, as shown in FIG. 1, the radio transmit signal 105 may be reflected by an object 106, resulting in an echo 107.

In some demonstrative aspects, the radar device 101 may receive the echo 107, e.g., via antenna arrangement 102 and radar frontend 103, and radar processor 104 may generate radar information, for example, by calculating information about position, radial velocity (Doppler), and/or direction of the object 106, e.g., with respect to vehicle 100.

In some demonstrative aspects, radar processor 104 may be configured to provide the radar information to a vehicle controller 108 of the vehicle 100, e.g., for autonomous driving of the vehicle 100.

In some demonstrative aspects, at least part of the functionality of radar processor 104 may be implemented as part of vehicle controller 108. In other aspects, the functionality of radar processor 104 may be implemented as part of any other element of radar device 101 and/or vehicle 100. In other aspects, radar processor 104 may be implemented, as a separate part of, or as part of any other element of radar device 101 and/or vehicle 100.

In some demonstrative aspects, vehicle controller 108 may be configured to control one or more functionalities, modes of operation, components, devices, systems and/or elements of vehicle 100.

In some demonstrative aspects, vehicle controller 108 may be configured to control one or more vehicular systems of vehicle 100, e.g., as described below.

In some demonstrative aspects, the vehicular systems may include, for example, a steering system, a braking system, a driving system, and/or any other system of the vehicle 100.

In some demonstrative aspects, vehicle controller 108 may configured to control radar device 101, and/or to process one or parameters, attributes and/or information from radar device 101.

In some demonstrative aspects, vehicle controller 108 may be configured, for example, to control the vehicular systems of the vehicle 100, for example, based on radar information from radar device 101 and/or one or more other sensors of the vehicle 100, e.g., Light Detection and Ranging (LIDAR) sensors, camera sensors, and/or the like.

In one example, vehicle controller 108 may control the steering system, the braking system, and/or any other vehicular systems of vehicle 100, for example, based on the information from radar device 101, e.g., based on one or more objects detected by radar device 101.

In other aspects, vehicle controller 108 may be configured to control any other additional or alternative functionalities of vehicle 100.

Some demonstrative aspects are described herein with respect to a radar device 101 implemented in a vehicle, e.g., vehicle 100. In other aspects a radar device, e.g., radar device 101, may be implemented as part of any other element of a traffic system or network, for example, as part of a road infrastructure, and/or any other element of a traffic network or system. Other aspects may be implemented with respect to any other system, environment and/or apparatus, which may be implemented in any other object, environment, location, or place. For example, radar device 101 may be part of a non-vehicular device, which may be implemented, for example, in an indoor location, a stationary infrastructure outdoors, or any other location.

In some demonstrative aspects, radar device 101 may be configured to support security usage. In one example, radar device 101 may be configured to determine a nature of an operation, e.g., a human entry, an animal entry, an environmental movement, and the like, to identity a threat level of a detected event, and/or any other additional or alternative operations.

Some demonstrative aspects may be implemented with respect to any other additional or alternative devices and/or systems, for example, for a robot, e.g., as described below.

In other aspects, radar device 101 may be configured to support any other usages and/or applications.

Figure 2:
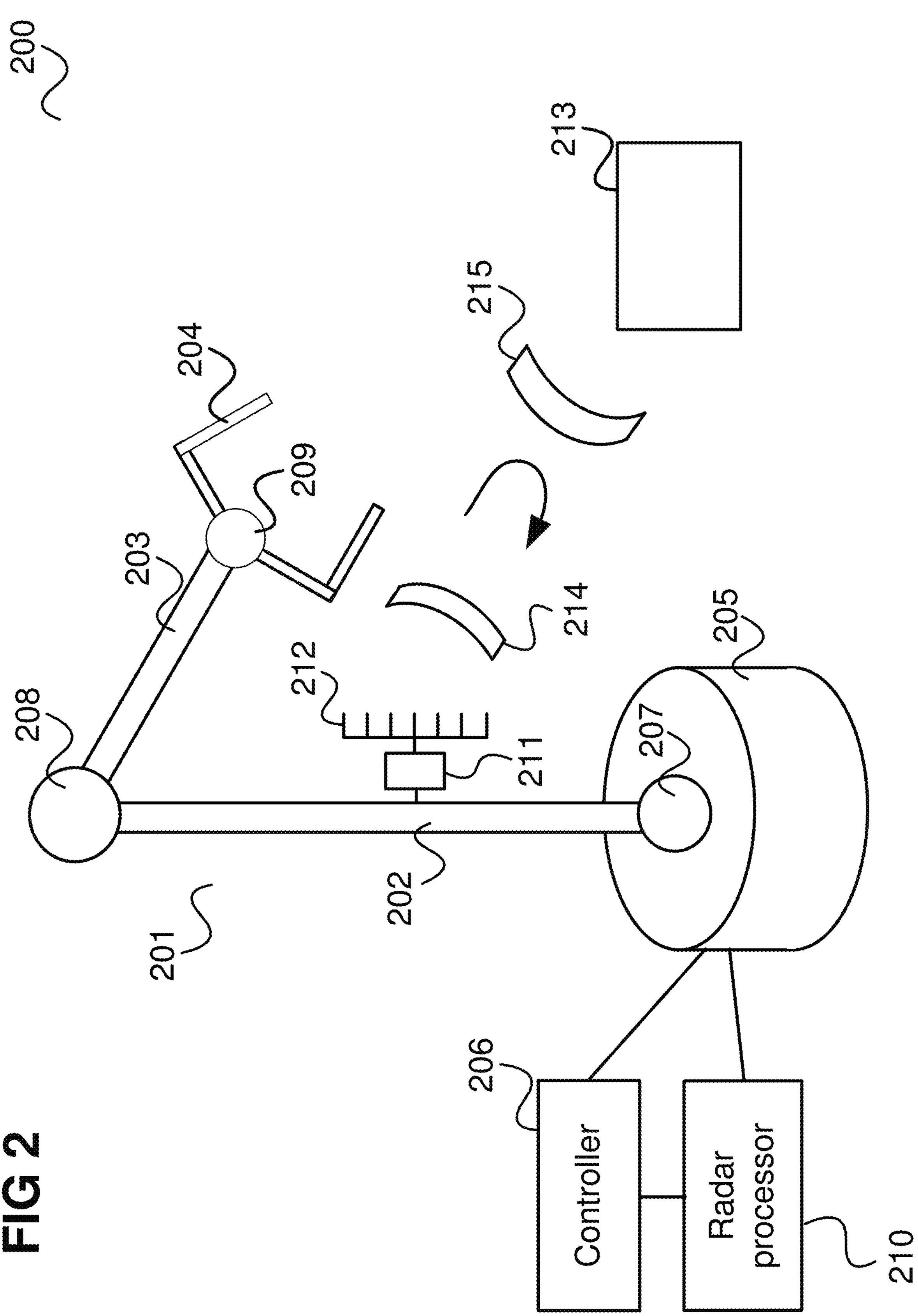
FIG. 2 is a schematic block diagram illustration of a robot implementing a radar, in accordance with some demonstrative aspects.

Reference is now made to FIG. 2, which schematically illustrates a block diagram of a robot 200 implementing a radar, in accordance with some demonstrative aspects.

In some demonstrative aspects, robot 200 may include a robot arm 201. The robot 200 may be implemented, for example, in a factory for handling an object 213, which may be, for example, a part that should be affixed to a product that is being manufactured. The robot arm 201 may include a plurality of movable members, for example, movable members 202, 203, 204, and a support 205. Moving the movable members 202, 203, and/or 204 of the robot arm 201, e.g., by actuation of associated motors, may allow physical interaction with the environment to carry out a task, e.g., handling the object 213.

In some demonstrative aspects, the robot arm 201 may include a plurality of joint elements, e.g., joint elements 207, 208, 209, which may connect, for example, the members 202, 203, and/or 204 with each other, and with the support 205. For example, a joint element 207, 208, 209 may have one or more joints, each of which may provide rotatable motion, e.g., rotational motion, and/or translatory motion, e.g., displacement, to associated members and/or motion of members relative to each other. The movement of the members 202, 203, 204 may be initiated by suitable actuators.

In some demonstrative aspects, the member furthest from the support 205, e.g., member 204, may also be referred to as the end-effector 204 and may include one or more tools, such as, a claw for gripping an object, a welding tool, or the like. Other members, e.g., members 202, 203, closer to the support 205, may be utilized to change the position of the end-effector 204, e.g., in three-dimensional space. For example, the robot arm 201 may be configured to function similarly to a human arm, e.g., possibly with a tool at its end.

In some demonstrative aspects, robot 200 may include a (robot) controller 206 configured to implement interaction with the environment, e.g., by controlling the robot arm's actuators, according to a control program, for example, in order to control the robot arm 201 according to the task to be performed.

In some demonstrative aspects, an actuator may include a component adapted to affect a mechanism or process in response to being driven. The actuator can respond to commands given by the controller 206 (the so-called activation) by performing mechanical movement. This means that an actuator, typically a motor (or electromechanical converter), may be configured to convert electrical energy into mechanical energy when it is activated (i.e. actuated).

In some demonstrative aspects, controller 206 may be in communication with a radar processor 210 of the robot 200.

In some demonstrative aspects, a radar fronted 211 and a radar antenna arrangement 212 may be coupled to the radar processor 210. In one example, radar fronted 211 and/or radar antenna arrangement 212 may be included, for example, as part of the robot arm 201.

In some demonstrative aspects, the radar frontend 211, the radar antenna arrangement 212 and the radar processor 210 may be operable as, and/or may be configured to form, a radar device. For example, antenna arrangement 212 may be configured to perform one or more functionalities of antenna arrangement 102 (FIG. 1), radar frontend 211 may be configured to perform one or more functionalities of radar frontend 103 (FIG. 1), and/or radar processor 210 may be configured to perform one or more functionalities of radar processor 104 (FIG. 1), e.g., as described above.

In some demonstrative aspects, for example, the radar frontend 211 and the antenna arrangement 212 may be controlled, e.g., by radar processor 210, to transmit a radio transmit signal 214.

In some demonstrative aspects, as shown in FIG. 2, the radio transmit signal 214 may be reflected by the object 213, resulting in an echo 215.

In some demonstrative aspects, the echo 215 may be received, e.g., via antenna arrangement 212 and radar frontend 211, and radar processor 210 may generate radar information, for example, by calculating information about position, speed (Doppler) and/or direction of the object 213, e.g., with respect to robot arm 201.

In some demonstrative aspects, radar processor 210 may be configured to provide the radar information to the robot controller 206 of the robot arm 201, e.g., to control robot arm 201. For example, robot controller 206 may be configured to control robot arm 201 based on the radar information, e.g., to grab the object 213 and/or to perform any other operation.

Figure 3:
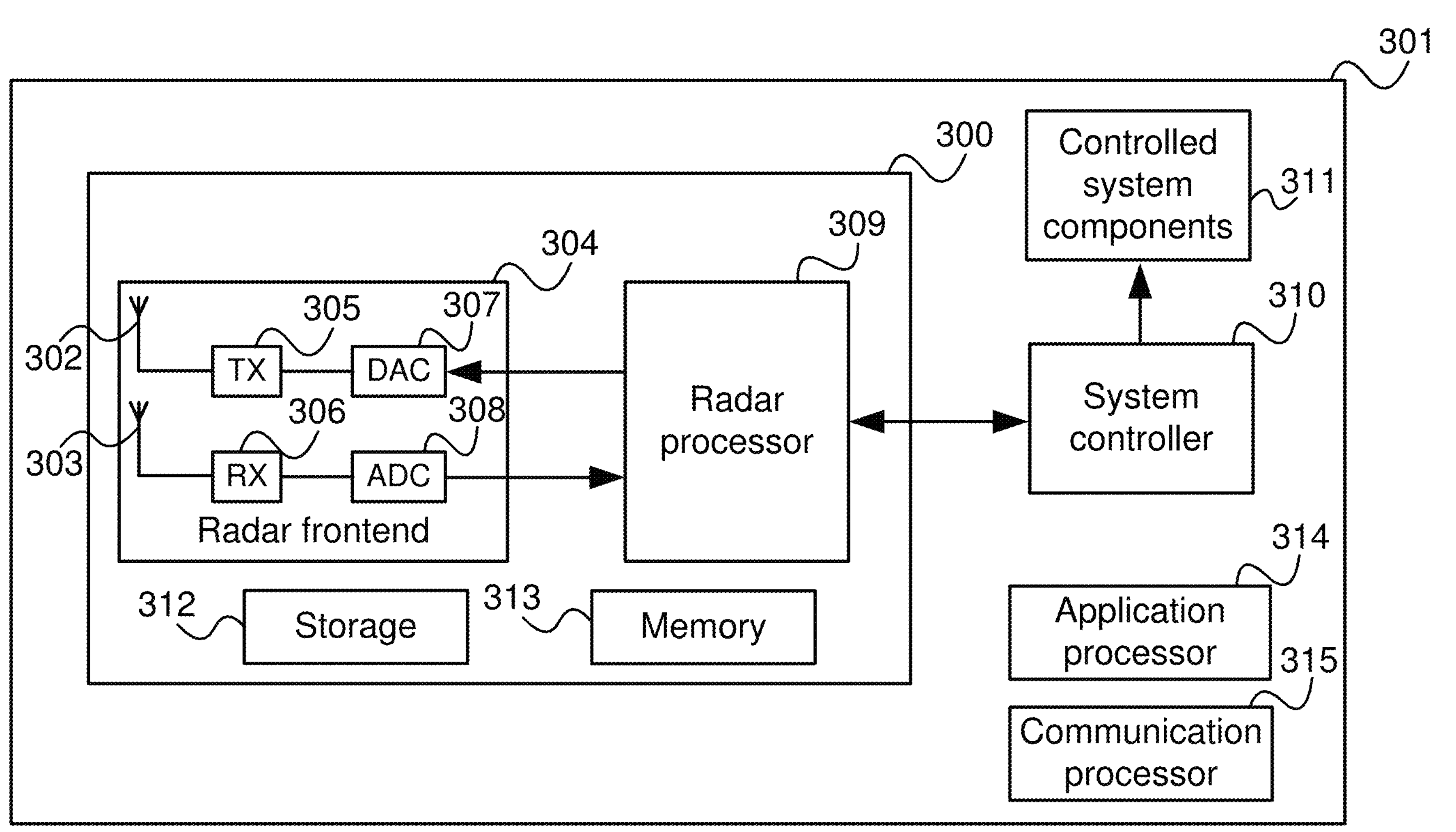
FIG. 3 is a schematic block diagram illustration of a radar apparatus, in accordance with some demonstrative aspects.

Reference is made to FIG. 3, which schematically illustrates a radar apparatus 300, in accordance with some demonstrative aspects.

In some demonstrative aspects, radar apparatus 300 may be implemented as part of a device or system 301, e.g., as described below.

For example, radar apparatus 300 may be implemented as part of, and/or may configured to perform one or more operations and/or functionalities of, the devices or systems described above with reference to FIG. 1 an/or FIG. 2. In other aspects, radar apparatus 300 may be implemented as part of any other device or system 301.

In some demonstrative aspects, radar device 300 may include an antenna arrangement, which may include one or more transmit antennas 302 and one or more receive antennas 303. In other aspects, any other antenna arrangement may be implemented.

In some demonstrative aspects, radar device 300 may include a radar frontend 304, and a radar processor 309.

In some demonstrative aspects, as shown in FIG. 3, the one or more transmit antennas 302 may be coupled with a transmitter (or transmitter arrangement) 305 of the radar frontend 304; and/or the one or more receive antennas 303 may be coupled with a receiver (or receiver arrangement) 306 of the radar frontend 304, e.g., as described below.

In some demonstrative aspects, transmitter 305 may include one or more elements, for example, an oscillator, a power amplifier and/or one or more other elements, configured to generate radio transmit signals to be transmitted by the one or more transmit antennas 302, e.g., as described below.

In some demonstrative aspects, for example, radar processor 309 may provide digital radar transmit data values to the radar frontend 304. For example, radar frontend 304 may include a Digital-to-Analog Converter (DAC) 307 to convert the digital radar transmit data values to an analog transmit signal. The transmitter 305 may convert the analog transmit signal to a radio transmit signal which is to be transmitted by transmit antennas 302.

In some demonstrative aspects, receiver 306 may include one or more elements, for example, one or more mixers, one or more filters and/or one or more other elements, configured to process, down-convert, radio signals received via the one or more receive antennas 303, e.g., as described below.

In some demonstrative aspects, for example, receiver 306 may convert a radio receive signal received via the one or more receive antennas 303 into an analog receive signal. The radar frontend 304 may include an Analog-to-Digital (ADC) Converter 308 to generate digital radar reception data values based on the analog receive signal. For example, radar frontend 304 may provide the digital radar reception data values to the radar processor 309.

In some demonstrative aspects, radar processor 309 may be configured to process the digital radar reception data values, for example, to detect one or more objects, e.g., in an environment of the device/system 301. This detection may include, for example, the determination of information including one or more of range, speed (Doppler), direction, and/or any other information, of one or more objects, e.g., with respect to the system 301.

In some demonstrative aspects, radar processor 309 may be configured to provide the determined radar information to a system controller 310 of device/system 301. For example, system controller 310 may include a vehicle controller, e.g., if device/system 301 includes a vehicular device/system, a robot controller, e.g., if device/system 301 includes a robot device/system, or any other type of controller for any other type of device/system 301.

In some demonstrative aspects, system controller 310 may be configured to control one or more controlled system components 311 of the system 301, e.g. a motor, a brake, steering, and the like, e.g. by one or more corresponding actuators.

In some demonstrative aspects, radar device 300 may include a storage 312 or a memory 313, e.g., to store information processed by radar 300, for example, digital radar reception data values being processed by the radar processor 309, radar information generated by radar processor 309, and/or any other data to be processed by radar processor 309.

In some demonstrative aspects, device/system 301 may include, for example, an application processor 314 and/or a communication processor 315, for example, to at least partially implement one or more functionalities of system controller 310 and/or to perform communication between system controller 310, radar device 300, the controlled system components 311, and/or one or more additional elements of device/system 301.

In some demonstrative aspects, radar device 300 may be configured to generate and transmit the radio transmit signal in a form, which may support determination of range, speed, and/or direction, e.g., as described below.

For example, a radio transmit signal of a radar may be configured to include a plurality of pulses. For example, a pulse transmission may include the transmission of short high-power bursts in combination with times during which the radar device listens for echoes.

For example, in order to more optimally support a highly dynamic situation, e.g., in an automotive scenario, a continuous wave (CW) may instead be used as the radio transmit signal. However, a continuous wave, e.g., with constant frequency, may support velocity determination, but may not allow range determination, e.g., due to the lack of a time mark that could allow distance calculation.

In some demonstrative aspects, radio transmit signal 105 (FIG. 1) may be transmitted according to technologies such as, for example, Frequency-Modulated continuous wave (FMCW) radar, Phase-Modulated Continuous Wave (PMCW) radar, Orthogonal Frequency Division Multiplexing (OFDM) radar, and/or any other type of radar technology, which may support determination of range, velocity, and/or direction, e.g., as described below.

Figure 4:
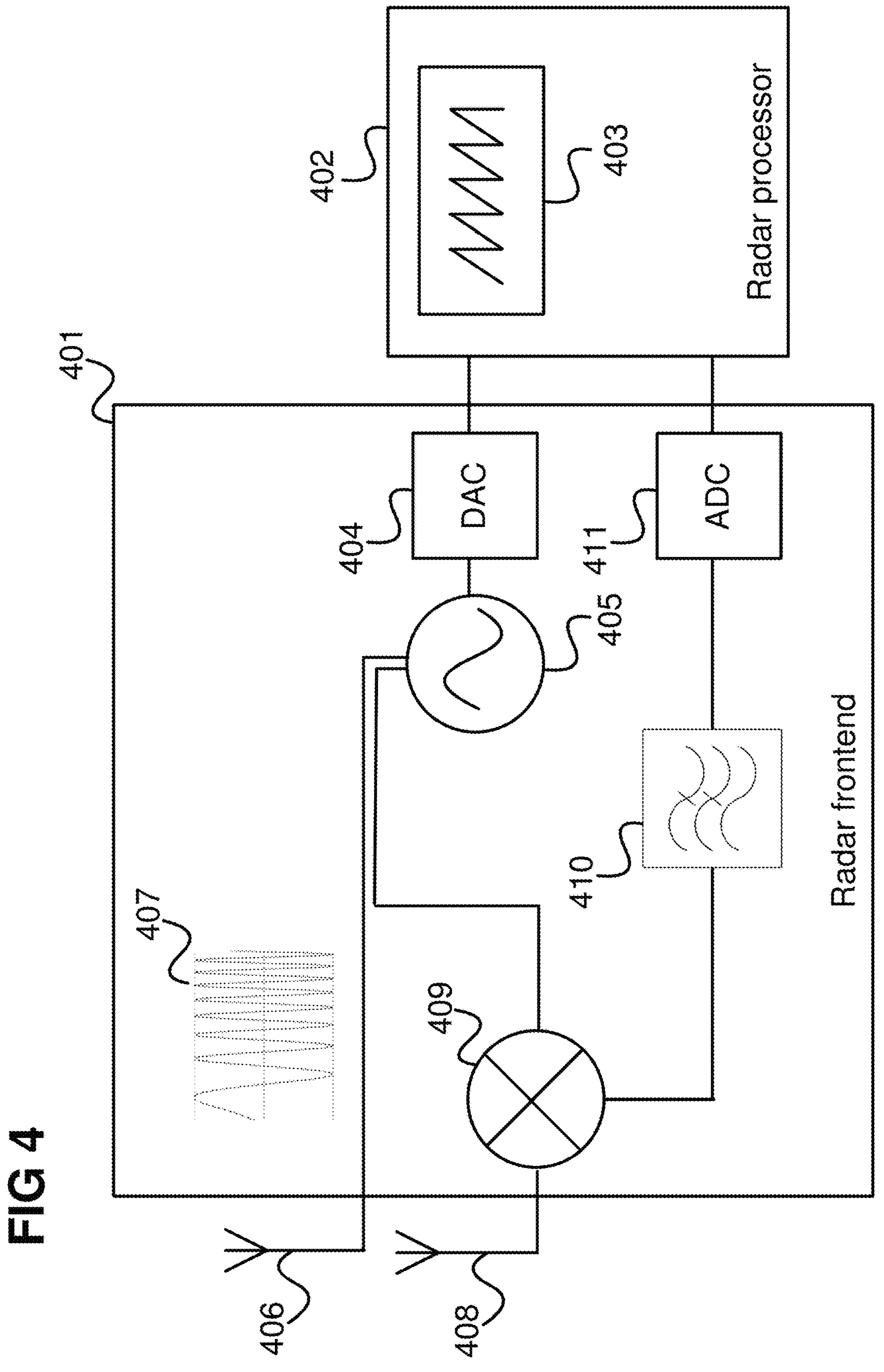
FIG. 4 is a schematic block diagram illustration of a Frequency-Modulated Continuous Wave (FMCW) radar apparatus, in accordance with some demonstrative aspects.

Reference is made to FIG. 4, which schematically illustrates a FMCW radar apparatus, in accordance with some demonstrative aspects.

In some demonstrative aspects, FMCW radar device 400 may include a radar frontend 401, and a radar processor 402. For example, radar frontend 304 (FIG. 3) may include one or more elements of, and/or may perform one or more operations and/or functionalities of, radar frontend 401; and/or radar processor 309 (FIG. 3) may include one or more elements of, and/or may perform one or more operations and/or functionalities of, radar processor 402.

In some demonstrative aspects, FMCW radar device 400 may be configured to communicate radio signals according to an FMCW radar technology, e.g., rather than sending a radio transmit signal with a constant frequency.

In some demonstrative aspects, radio frontend 401 may be configured to ramp up and reset the frequency of the transmit signal, e.g., periodically, for example, according to a saw tooth waveform 403. In other aspects, a triangle waveform, or any other suitable waveform may be used.

In some demonstrative aspects, for example, radar processor 402 may be configured to provide waveform 403 to frontend 401, for example, in digital form, e.g., as a sequence of digital values.

In some demonstrative aspects, radar frontend 401 may include a DAC 404 to convert waveform 403 into analog form, and to supply it to a voltage-controlled oscillator 405. For example, oscillator 405 may be configured to generate an output signal, which may be frequency-modulated in accordance with the waveform 403.

In some demonstrative aspects, oscillator 405 may be configured to generate the output signal including a radio transmit signal, which may be fed to and sent out by one or more transmit antennas 406.

In some demonstrative aspects, the radio transmit signal generated by the oscillator 405 may have the form of a sequence of chirps 407, which may be the result of the modulation of a sinusoid with the saw tooth waveform 403.

In one example, a chirp 407 may correspond to the sinusoid of the oscillator signal frequency-modulated by a "tooth" of the saw tooth waveform 403, e.g., from the minimum frequency to the maximum frequency.

In some demonstrative aspects, FMCW radar device 400 may include one or more receive antennas 408 to receive a radio receive signal. The radio receive signal may be based on the echo of the radio transmit signal, e.g., in addition to any noise, interference, or the like.

In some demonstrative aspects, radar frontend 401 may include a mixer 409 to mix the radio transmit signal with the radio receive signal into a mixed signal.

In some demonstrative aspects, radar frontend 401 may include a filter, e.g., a Low Pass Filter (LPF) 410, which may be configured to filter the mixed signal from the mixer 409 to provide a filtered signal. For example, radar frontend 401 may include an ADC 411 to convert the filtered signal into digital reception data values, which may be provided to radar processor 402. In another example, the filter 410 may be a digital filter, and the ADC 411 may be arranged between the mixer 409 and the filter 410.

In some demonstrative aspects, radar processor 402 may be configured to process the digital reception data values to provide radar information, for example, including range, speed (velocity/Doppler), and/or direction (AoA) information of one or more objects.

In some demonstrative aspects, radar processor 402 may be configured to perform a first Fast Fourier Transform (FFT) (also referred to as "range FFT") to extract a delay response, which may be used to extract range information, and/or a second FFT (also referred to as "Doppler FFT") to extract a Doppler shift response, which may be used to extract velocity information, from the digital reception data values.

In other aspects, any other additional or alternative methods may be utilized to extract range information. In one example, in a digital radar implementation, a correlation with the transmitted signal may be used, e.g., according to a matched filter implementation.

Figure 5:
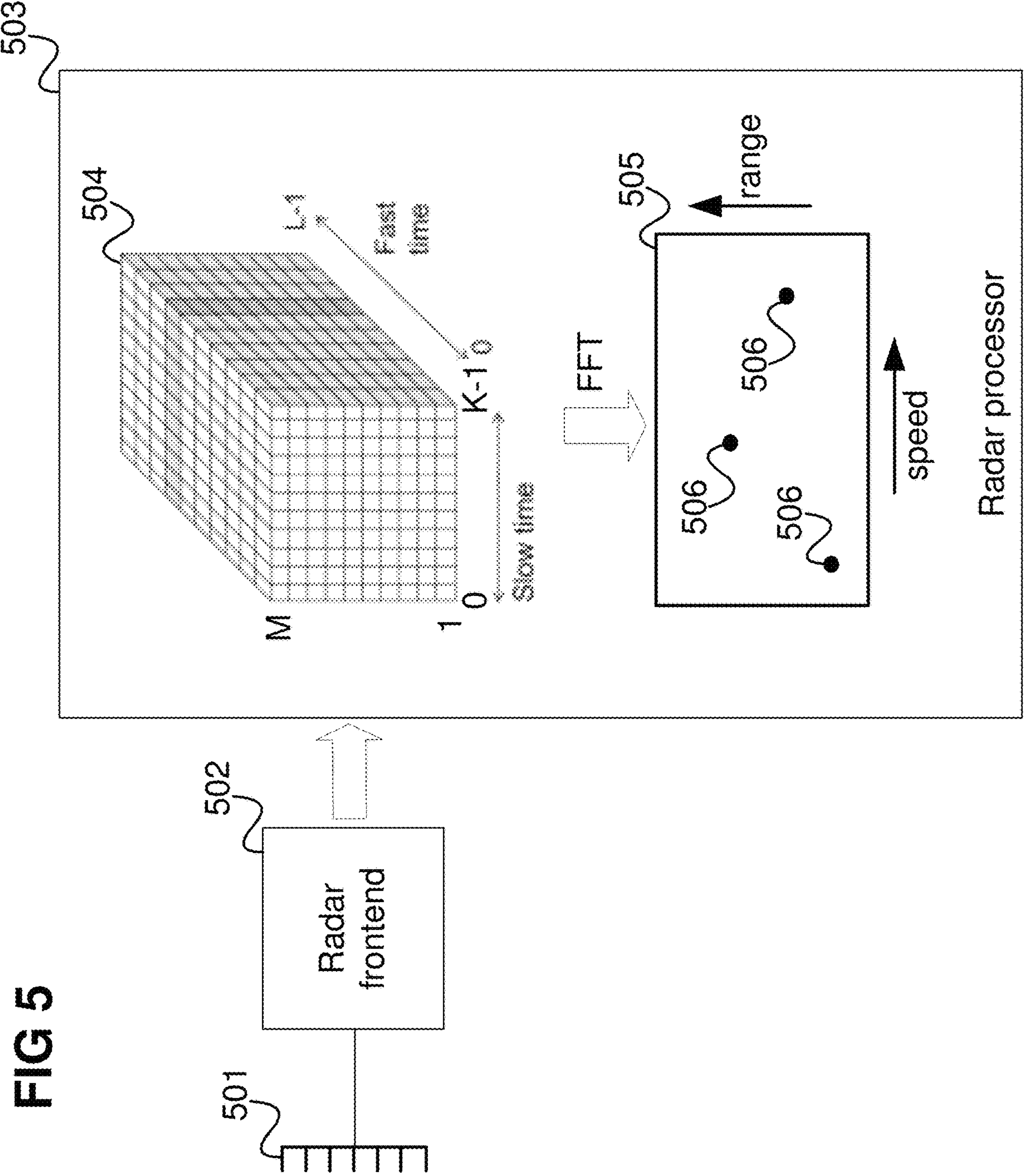
FIG. 5 is a schematic illustration of an extraction scheme, which may be implemented to extract range and speed (Doppler) estimations from digital reception radar data values, in accordance with some demonstrative aspects.

Reference is made to FIG. 5, which schematically illustrates an extraction scheme, which may be implemented to extract range and speed (Doppler) estimations from digital reception radar data values, in accordance with some demonstrative aspects. For example, radar processor 104 (FIG. 1), radar processor 210 (FIG. 2), radar processor 309 (FIG. 3), and/or radar processor 402 (FIG. 4), may be configured to extract range and/or speed (Doppler) estimations from digital reception radar data values according to one or more aspects of the extraction scheme of FIG. 5.

In some demonstrative aspects, as shown in FIG. 5, a radio receive signal, e.g., including echoes of a radio transmit signal, may be received by a receive antenna array 501. The radio receive signal may be processed by a radio radar frontend 502 to generate digital reception data values, e.g., as described above. The radio radar frontend 502 may provide the digital reception data values to a radar processor 503, which may process the digital reception data values to provide radar information, e.g., as described above.

In some demonstrative aspects, the digital reception data values may be represented in the form of a data cube 504. For example, the data cube 504 may include digitized samples of the radio receive signal, which is based on a radio signal transmitted from a transmit antenna and received by M receive antennas. In some demonstrative aspects, for example, with respect to a MIMO implementation, there may be multiple transmit antennas, and the number of samples may be multiplied accordingly.

In some demonstrative aspects, a layer of the data cube 504, for example, a horizontal layer of the data cube 504, may include samples of an antenna, e.g., a respective antenna of the M antennas.

In some demonstrative aspects, data cube 504 may include samples for K chirps. For example, as shown in FIG. 5, the samples of the chirps may be arranged in a so-called "slow time"-direction.

In some demonstrative aspects, the data cube 504 may include L samples, e.g., L=512 or any other number of samples, for a chirp, e.g., per each chirp. For example, as shown in FIG. 5, the samples per chirp may be arranged in a so-called "fast time"-direction of the data cube 504.

In some demonstrative aspects, radar processor 503 may be configured to process a plurality of samples, e.g., L samples collected for each chirp and for each antenna, by a first FFT. The first FFT may be performed, for example, for each chirp and each antenna, such that a result of the processing of the data cube 504 by the first FFT may again have three dimensions, and may have the size of the data cube 504 while including values for L range bins, e.g., instead of the values for the L sampling times.

In some demonstrative aspects, radar processor 503 may be configured to process the result of the processing of the data cube 504 by the first FFT, for example, by processing the result according to a second FFT along the chirps, e.g., for each antenna and for each range bin.

For example, the first FFT may be in the "fast time" direction, and the second FFT may be in the "slow time" direction.

In some demonstrative aspects, the result of the second FFT may provide, e.g., when aggregated over the antennas, a range/Doppler (R/D) map 505. The R/D map may have FFT peaks 506, for example, including peaks of FFT output values (in terms of absolute values) for certain range/speed combinations, e.g., for range/Doppler bins. For example, a range/Doppler bin may correspond to a range bin and a Doppler bin. For example, radar processor 503 may consider a peak as potentially corresponding to an object, e.g., of the range and speed corresponding to the peak's range bin and speed bin.

In some demonstrative aspects, the extraction scheme of FIG. 5 may be implemented for an FMCW radar, e.g., FMCW radar 400 (FIG. 4), as described above. In other aspects, the extraction scheme of FIG. 5 may be implemented for any other radar type. In one example, the radar processor 503 may be configured to determine a range/Doppler map 505 from digital reception data values of a PMCW radar, an OFDM radar, or any other radar technologies. For example, in adaptive or cognitive radar, the pulses in a frame, the waveform and/or modulation may be changed over time, e.g., according to the environment.

Referring back to FIG. 3, in some demonstrative aspects, receive antenna arrangement 303 may be implemented using a receive antenna array having a plurality of receive antennas (or receive antenna elements). For example, radar processor 309 may be configured to determine an angle of arrival of the received radio signal, e.g., echo 105 (FIG. 1) and/or echo 215 (FIG. 2). For example, radar processor 309 may be configured to determine a direction of a detected object, e.g., with respect to the device/system 301, for example, based on the angle of arrival of the received radio signal, e.g., as described below.

Figure 6:
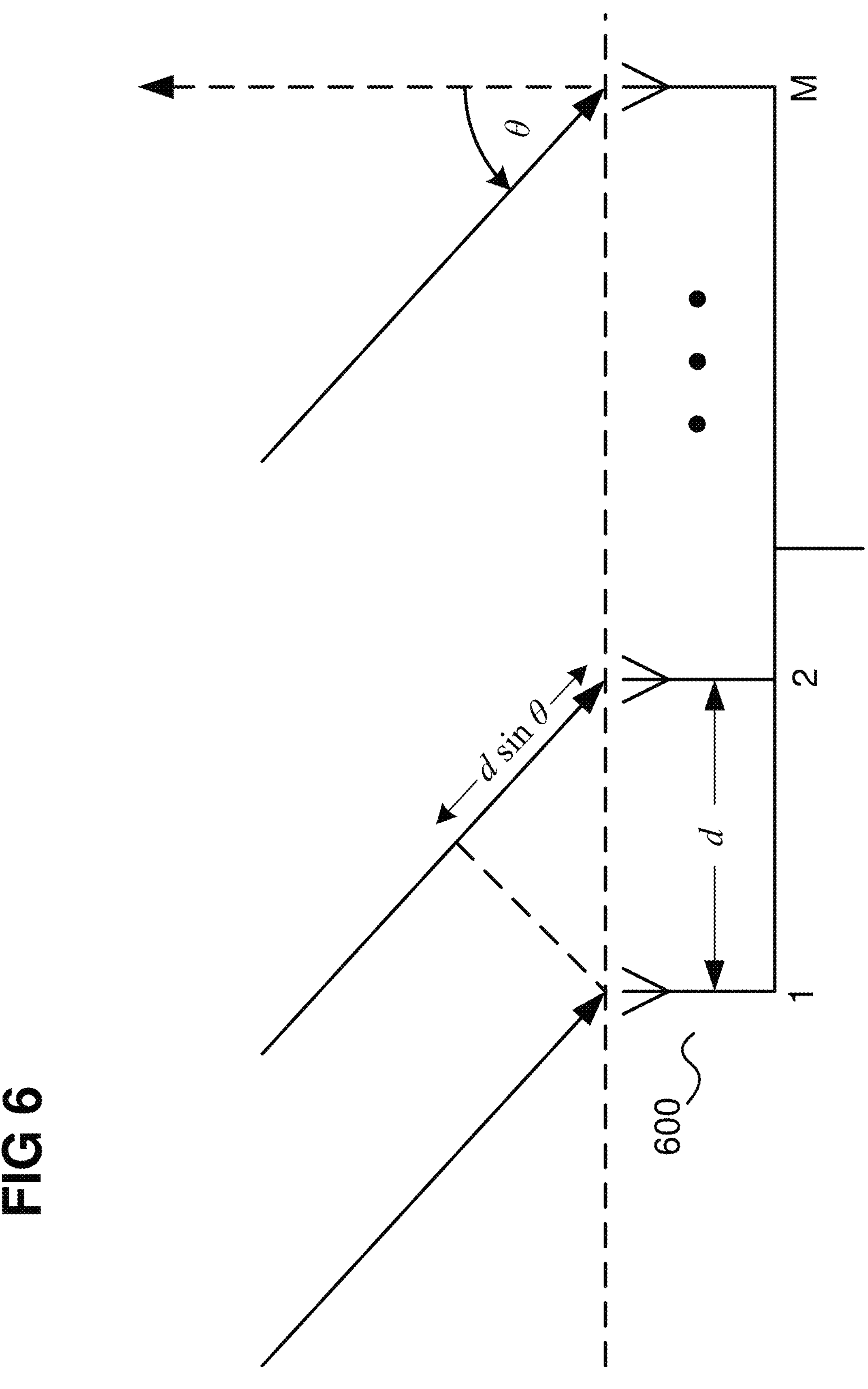
FIG. 6 is a schematic illustration of an angle-determination scheme, which may be implemented to determine Angle of Arrival (AoA) information based on an incoming radio signal received by a receive antenna array, in accordance with some demonstrative aspects.

Reference is made to FIG. 6, which schematically illustrates an angle-determination scheme, which may be implemented to determine Angle of Arrival (AoA) information based on an incoming radio signal received by a receive antenna array 600, in accordance with some demonstrative aspects.

FIG. 6 depicts an angle-determination scheme based on received signals at the receive antenna array. In some demonstrative aspects, for example, in a virtual MIMO array, the angle-determination may also be based on the signals transmitted by the array of Tx antennas.

FIG. 6 depicts a one-dimensional angle-determination scheme. Other multi-dimensional angle determination schemes, e.g., a two-dimensional scheme or a three-dimensional scheme, may be implemented.

In some demonstrative aspects, as shown in FIG. 6, the receive antenna array 600 may include M antennas (numbered, from left to right, 1 to M).

As shown by the arrows in FIG. 6, it is assumed that an echo is coming from an object located at the top left direction. Accordingly, the direction of the echo, e.g., the incoming radio signal, may be towards the bottom right. According to this example, the further to the left a receive antenna is located, the earlier it will receive a certain phase of the incoming radio signal.

For example, a phase difference, denoted $\Delta\varphi$, between two antennas of the receive antenna array 601 may be determined, e.g., as follows:

$$\Delta\varphi = \frac{2\pi}{\lambda} \cdot d \cdot \sin(\theta)$$

wherein $\lambda$ denotes a wavelength of the incoming radio signal, d denotes a distance between the two antennas, and $\theta$ denotes an angle of arrival of the incoming radio signal, e.g., with respect to a normal direction of the array.

In some demonstrative aspects, radar processor 309 (FIG. 3) may be configured to utilize this relationship between phase and angle of the incoming radio signal, for example, to determine the angle of arrival of echoes, for example by performing an FFT, e.g., a third FFT ("angular FFT") over the antennas.

In some demonstrative aspects, multiple transmit antennas, e.g., in the form of an antenna array having multiple transmit antennas, may be used, for example, to increase the spatial resolution, e.g., to provide high-resolution radar information. For example, a MIMO radar device may utilize a virtual MIMO radar antenna, which may be formed as a convolution of a plurality of transmit antennas convolved with a plurality of receive antennas.

Figure 7:
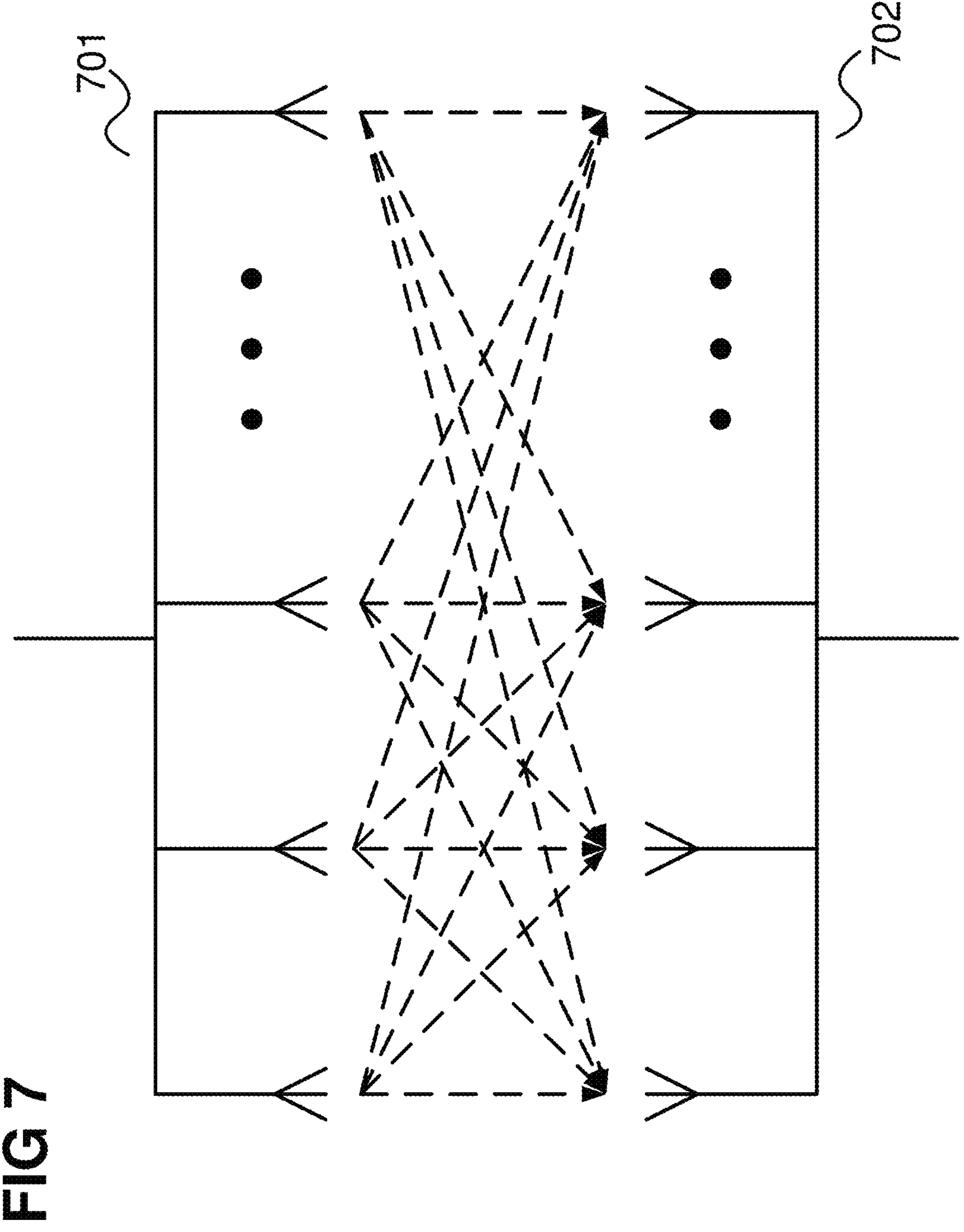
FIG. 7 is a schematic illustration of a Multiple-Input-Multiple-Output (MIMO) radar antenna scheme, which may be implemented based on a combination of Transmit (Tx) and Receive (Rx) antennas, in accordance with some demonstrative aspects.

Reference is made to FIG. 7, which schematically illustrates a MIMO radar antenna scheme, which may be implemented based on a combination of Transmit (Tx) and Receive (Rx) antennas, in accordance with some demonstrative aspects.

In some demonstrative aspects, as shown in FIG. 7, a radar MIMO arrangement may include a transmit antenna array 701 and a receive antenna array 702. For example, the one or more transmit antennas 302 (FIG. 3) may be implemented to include transmit antenna array 701, and/or the one or more receive antennas 303 (FIG. 3) may be implemented to include receive antenna array 702.

In some demonstrative aspects, antenna arrays including multiple antennas both for transmitting the radio transmit signals and for receiving echoes of the radio transmit signals, may be utilized to provide a plurality of virtual channels as illustrated by the dashed lines in FIG. 7. For example, a virtual channel may be formed as a convolution, for example, as a Kronecker product, between a transmit antenna and a receive antenna, e.g., representing a virtual steering vector of the MIMO radar.

In some demonstrative aspects, a transmit antenna, e.g., each transmit antenna, may be configured to send out an individual radio transmit signal, e.g., having a phase associated with the respective transmit antenna.

For example, an array of N transmit antennas and M receive antennas may be implemented to provide a virtual MIMO array of size N×M. For example, the virtual MIMO array may be formed according to the Kronecker product operation applied to the Tx and Rx steering vectors.

Figure 8:
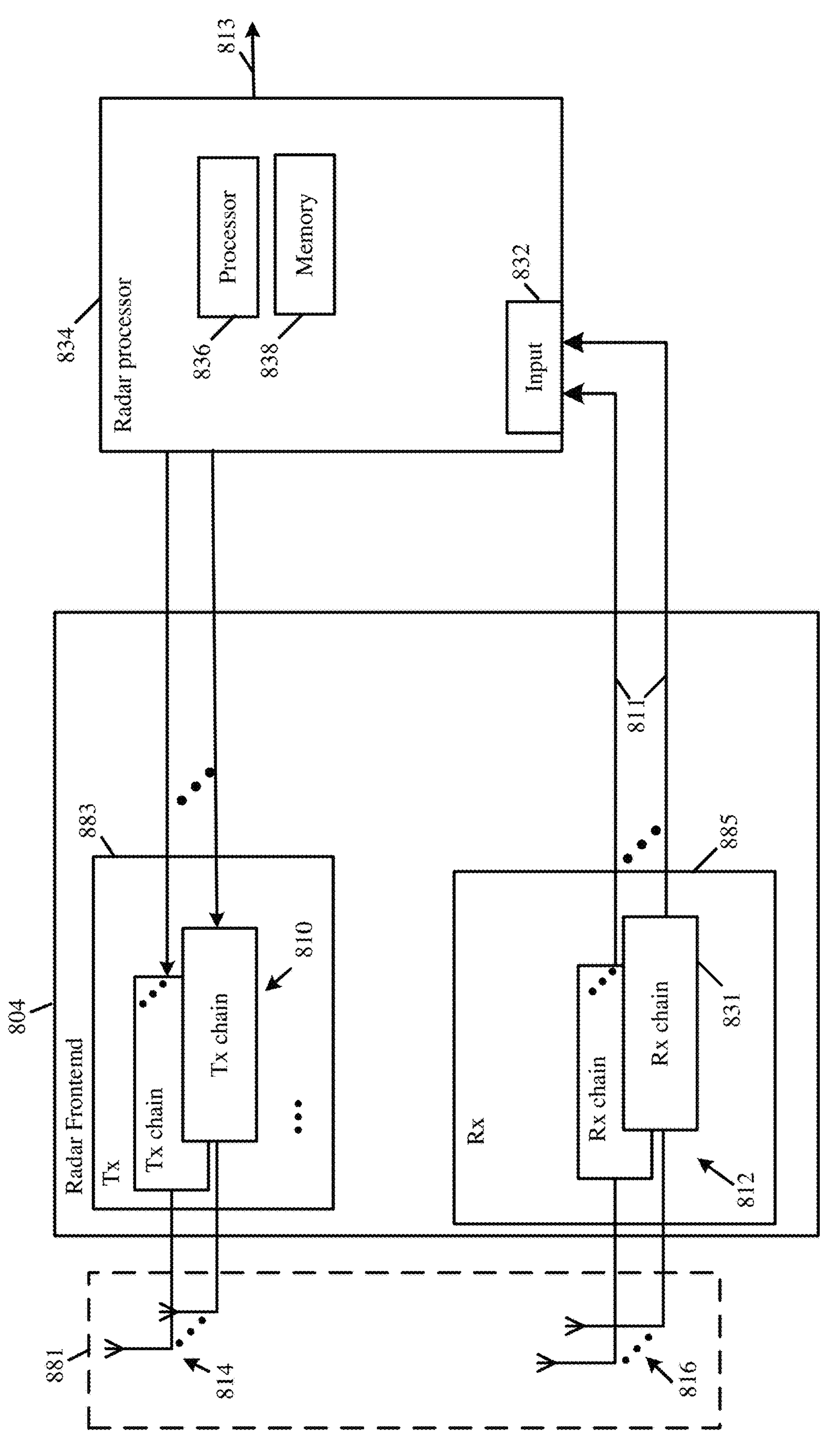
FIG. 8 is a schematic block diagram illustration of a radar frontend and a radar processor, in accordance with some demonstrative aspects.

FIG. 8 is a schematic block diagram illustration of a radar frontend 804 and a radar processor 834, in accordance with some demonstrative aspects. For example, radar frontend 103 (FIG. 1), radar frontend 211 (FIG. 1), radar frontend 304 (FIG. 3), radar frontend 401 (FIG. 4), and/or radar frontend 502 (FIG. 5), may include one or more elements of radar frontend 804, and/or may perform one or more operations and/or functionalities of radar frontend 804.

In some demonstrative aspects, radar frontend 804 may be implemented as part of a MIMO radar utilizing a MIMO radar antenna 881 including a plurality of Tx antennas 814 configured to transmit a plurality of Tx RF signals (also referred to as "Tx radar signals"); and a plurality of Rx antennas 816 configured to receive a plurality of Rx RF signals (also referred to as "Rx radar signals"), for example, based on the Tx radar signals, e.g., as described below.

In some demonstrative aspects, MIMO antenna array 881, antennas 814, and/or antennas 816 may include or may be part of any type of antennas suitable for transmitting and/or receiving radar signals. For example, MIMO antenna array 881, antennas 814, and/or antennas 816, may be implemented as part of any suitable configuration, structure, and/or arrangement of one or more antenna elements, components, units, assemblies, and/or arrays. For example, MIMO antenna array 881, antennas 814, and/or antennas 816, may be implemented as part of a phased array antenna, a multiple element antenna, a set of switched beam antennas, and/or the like. In some aspects, MIMO antenna array 881, antennas 814, and/or antennas 816, may be implemented to support transmit and receive functionalities using separate transmit and receive antenna elements. In some aspects, MIMO antenna array 881, antennas 814, and/or antennas 816, may be implemented to support transmit and receive functionalities using common and/or integrated transmit/receive elements.

In some demonstrative aspects, MIMO radar antenna 881 may include a rectangular MIMO antenna array, and/or curved array, e.g., shaped to fit a vehicle design. In other aspects, any other form, shape and/or arrangement of MIMO radar antenna 881 may be implemented.

In some demonstrative aspects, radar frontend 804 may include one or more radios configured to generate and transmit the Tx RF signals via Tx antennas 814; and/or to process the Rx RF signals received via Rx antennas 816, e.g., as described below.

In some demonstrative aspects, radar frontend 804 may include at least one transmitter (Tx) 883 including circuitry and/or logic configured to generate and/or transmit the Tx radar signals via Tx antennas 814.

In some demonstrative aspects, radar frontend 804 may include at least one receiver (Rx) 885 including circuitry and/or logic to receive and/or process the Rx radar signals received via Rx antennas 816, for example, based on the Tx radar signals.

In some demonstrative aspects, transmitter 883, and/or receiver 885 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, transmitter 883 may include a plurality of Tx chains 810 configured to generate and transmit the Tx RF signals via Tx antennas 814, e.g., respectively; and/or receiver 885 may include a plurality of Rx chains 812 configured to receive and process the Rx RF signals received via the Rx antennas 816, e.g., respectively.

In some demonstrative aspects, radar processor 834 may be configured to generate radar information 813, for example, based on the radar signals communicated by MIMO radar antenna 881, e.g., as described below. For example, radar processor 104 (FIG. 1), radar processor 210 (FIG. 1), radar processor 309 (FIG. 3), radar processor 402 (FIG. 4), and/or radar processor 503 (FIG. 5), may include one or more elements of radar processor 834, and/or may perform one or more operations and/or functionalities of radar processor 834.

In some demonstrative aspects, radar processor 834 may be configured to generate radar information 813, for example, based on Radar Rx data 811 received from the plurality of Rx chains 812. For example, radar Rx data 811 may be based on the Rx RF signals received via the Rx antennas 816.

In some demonstrative aspects, radar processor 834 may include an input 832 to receive the radar Rx data 811 from the plurality of Rx chains 812.

In some demonstrative aspects, radar processor 834 may include at least one processor 836, which may be configured, for example, to process the radar Rx data 811, and/or to perform one or more operations, methods, and/or algorithms.

In some demonstrative aspects, radar processor 834 may include at least one memory 838, e.g., coupled to the processor 836. For example, memory 838 may be configured to store data processed by radar processor 834. For example, memory 838 may store, e.g., at least temporarily, at least some of the information processed by the processor 836, and/or logic to be utilized by the processor 836.

In some demonstrative aspects, memory 838 may be configured to store at least part of the radar data, e.g., some of the radar Rx data or all of the radar Rx data, for example, for processing by processor 836, e.g., as described below.

In some demonstrative aspects, memory 838 may be configured to store processed data, which may be generated by processor 836, for example, during the process of generating the radar information 813, e.g., as described below.

In some demonstrative aspects, memory 838 may be configured to store range information and/or Doppler information, which maybe generated by processor 836, for example, based on the radar Rx data, e.g., as described below. In one example, the range information and/or Doppler information may be determined based on a Cross-Correlation (XCORR) operation, which may be applied to the radar RX data, e.g., as described below. Any other additional or alternative operation, algorithm and/or procedure may be utilized to generate the range information and/or Doppler information.

In some demonstrative aspects, memory 838 may be configured to store AoA information, which maybe generated by processor 836, for example, based on the radar Rx data, the range information and/or Doppler information, e.g., as described below. In one example, the AoA information may be determined based on an AoA estimation algorithm, e.g., as described below. Any other additional or alternative operation, algorithm and/or procedure may be utilized to generate the AoA information.

In some demonstrative aspects, radar processor 834 may be configured to generate the radar information 813 including one or more of range information, Doppler information, and/or AoA information, e.g., as described below.

In some demonstrative aspects, the radar information 813 may include Point Cloud 1 (PC1) information, for example, including raw point cloud estimations, e.g., Range, Radial Velocity, Azimuth and/or Elevation.

In some demonstrative aspects, the radar information 813 may include Point Cloud 2 (PC2) information, which may be generated, for example, based on the PC1 information. For example, the PC2 information may include clustering information, tracking information, e.g., tracking of probabilities and/or density functions, bounding box information, classification information, orientation information, and the like.

In some demonstrative aspects, radar processor 834 may be configured to generate the radar information 813 in the form of four Dimensional (4D) image information, e.g., a cube, which may represent 4D information corresponding to one or more detected targets.

In some demonstrative aspects, the 4D image information may include, for example, range values, e.g., based on the range information, velocity values, e.g., based on the Doppler information, azimuth values, e.g., based on azimuth AoA information, elevation values, e.g., based on elevation AoA information, and/or any other values.

In some demonstrative aspects, radar processor 834 may be configured to generate the radar information 813 in any other form, and/or including any other additional or alternative information.

In some demonstrative aspects, radar processor 834 may be configured to process the signals communicated via MIMO radar antenna 881 as signals of a virtual MIMO array formed by a convolution of the plurality of Rx antennas 816 and the plurality of Tx antennas 814.

In some demonstrative aspects, radar frontend 804 and/or radar processor 834 may be configured to utilize MIMO techniques, for example, to support a reduced physical array aperture, e.g., an array size, and/or utilizing a reduced number of antenna elements. For example, radar frontend 804 and/or radar processor 834 may be configured to transmit orthogonal signals via a Tx array including a plurality of N elements, e.g., Tx antennas 814, and processing received signals via an Rx array including a plurality of M elements, e.g., Rx antennas 816.

In some demonstrative aspects, utilizing the MIMO technique of transmission of the orthogonal signals from the Tx array with N elements and processing the received signals in the Rx array with M elements may be equivalent, e.g., under a far field approximation, to a radar utilizing transmission from one antenna and reception with N*M antennas. For example, radar frontend 804 and/or radar processor 834 may be configured to utilize MIMO antenna array 881 as a virtual array having an equivalent array size of N*M, which may define locations of virtual elements, for example, as a convolution of locations of physical elements, e.g., the antennas 814 and/or 816.

In some demonstrative aspects, MIMO radar antenna 881 may be configured to support generation of radar information 813 having an increased level of resolution, e.g., as described below.

In some demonstrative aspects, MIMO radar antenna 881 may be configured to support generation of radar information 813 having a reduced Side Lobe Level (SLL), e.g., as described below.

In one example, the resolution and/or the SLL may be major performance factors of the radar system, for example, for an mmWave MIMO automotive radar implementation.

In some demonstrative aspects, an ability of a radar system to distinguish and separate between two closely-spaced targets may improve, for example, as the resolution increases. For example, an increased resolution may enable the radar system to accurately detect start and/or end locations of two finite-size targets. As a result, the increased resolution may allow better distinguishing between the two closely-spaced targets.

In some demonstrative aspects, improvement of the SLL of a radar system may allow the radar to better focus energy towards a desired target direction, e.g., while reducing energy received by objects outside the target direction.

In some demonstrative aspects, there may be one or more disadvantages, inefficiencies, and/or technical problems, for example, when increasing a number of antenna elements and/or a spacing between the antenna elements of a uniform antenna (also referred to as a "periodic antenna"), for example, in order to improve the resolution and/or the SLL, e.g., as described below.

In some demonstrative aspects, the resolution may depend on a size of a virtual array, for example, which may result from a convolution of a plurality of elements in a physical Tx antenna array with a plurality of elements in a physical Rx antenna array, e.g., as described below.

In one example, a joint operation of the physical Tx and Rx arrays may be characterized, for example, by a single virtual antenna array, for example, to radiate and capture energy, for example, to detect targets. For example, a structure of the virtual antenna array may be defined, for example, by locating, in each Tx position of a Tx element, the entire elements of the Rx array.

In some demonstrative aspects, MIMO radar frontend 804 may be configured to utilize MIMO techniques, for example, to support a reduced physical array aperture. For example, MIMO radar frontend 804 may be configured to utilize MIMO antenna array 881 as a virtual array, having a number of virtual elements, denoted $N_{virt}$, e.g., $N_{virt}=N_{Tx}*N_{Rx}$, which may define locations of virtual elements, for example, as a convolution of locations of physical elements, e.g., the antennas 814 and/or 816.

In some demonstrative aspects, a size of the virtual array, denoted $L_{virt}$, may be defined as a sum of a length of the Tx array, denoted $L_{Tx}$, and a length of the Rx array, denoted $L_{Rx}$, e.g., $L_{virt}=L_{Tx}+L_{Rx}$, for example, when assuming a one directional antenna array for simplicity.

In some demonstrative aspects, the size $L_{virt}$ of a uniform virtual array (also referred to as a "periodic virtual array") including equally spaced inter elements, e.g., having a constant inter element spacing, denoted $d_{virt}$, between the antenna elements, may be defined as a product of the constant inter element spacing $d_{virt}$ by the number of virtual elements $N_{virt}$, e.g., $L_{virt}=d_{virt}*N_{virt}$.

In some demonstrative aspects, a resolution, denoted Δ, of the virtual antenna array may be defined, for example, as an angle range, in which a beam of an antenna reaches half of its maximum power. For example, the resolution of the virtual antenna array may be defined, e.g., as follows:

$$\Delta = 50/(\cos(\varphi_0)\cdot L_{virt}) = 50/\left(\cos\left(\varphi_0\right)\cdot N_{virt}\cdot d_{virt}\right) \quad (1)$$

wherein φ0 denotes an angle to which the beam is directed and/or scanned.

Figure 9A:
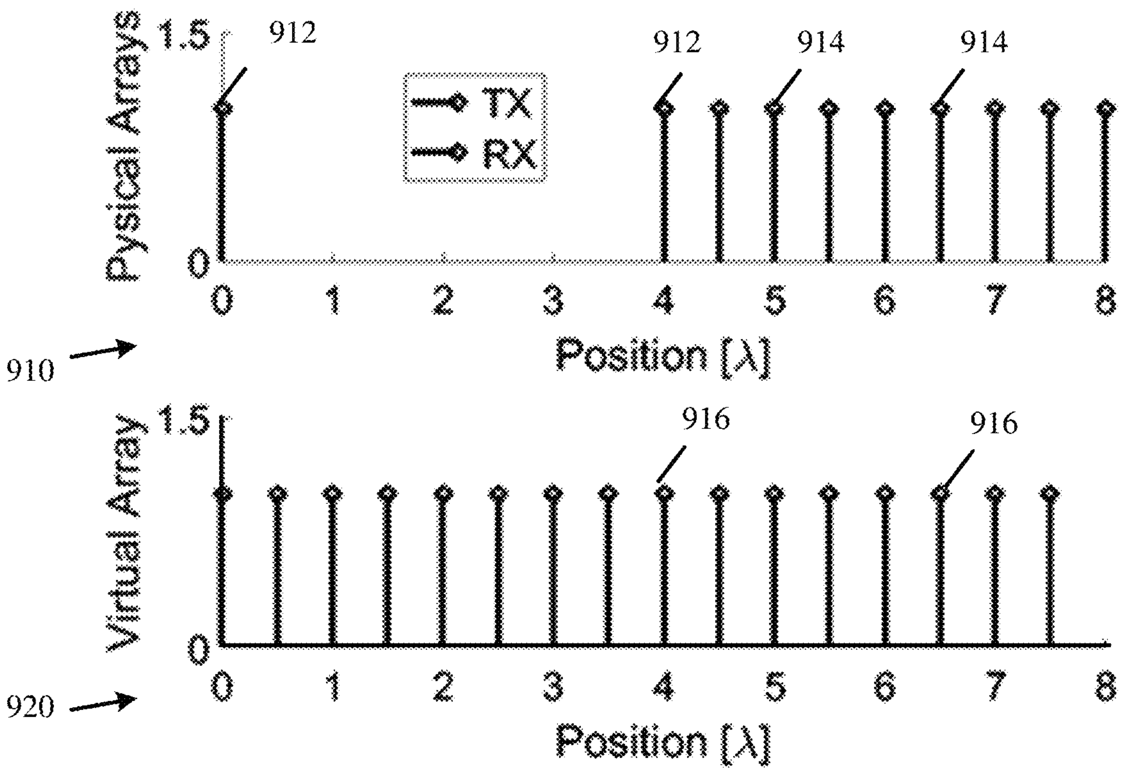
FIG. 9A is a schematic illustration of a physical antenna array and a virtual antenna array based on the physical antenna array.
Figure 9B:
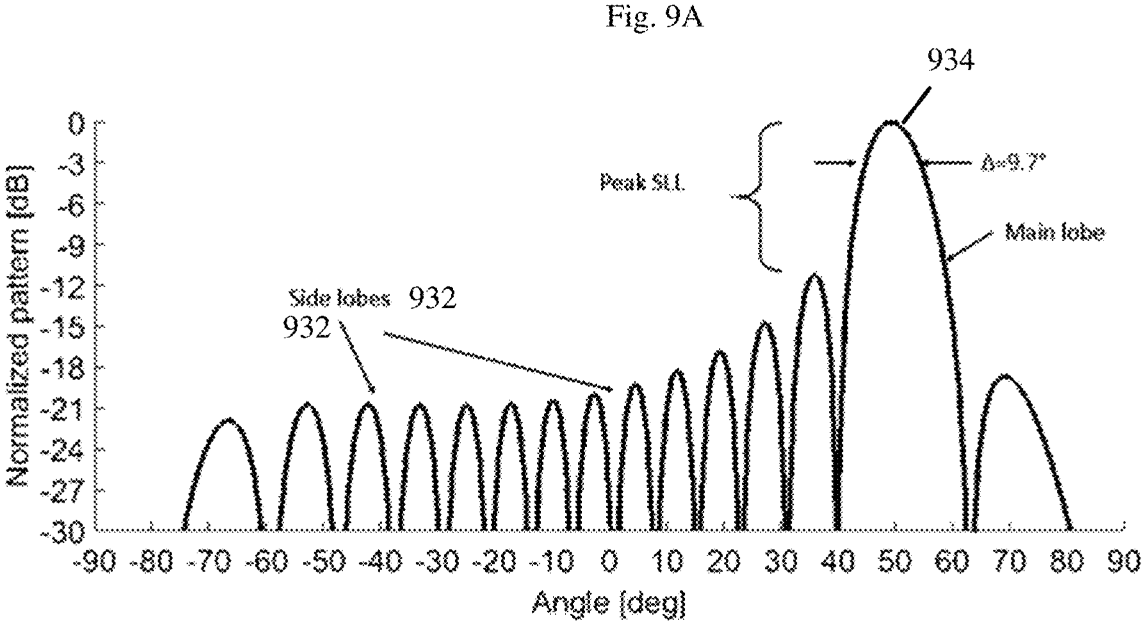
FIG. 9B is a schematic illustration of a radar pattern the antenna array of FIG. 9A, to demonstrate a technical problem, which may be addressed in accordance with some demonstrative aspects.

Reference is made to FIG. 9A, which schematically illustrates a physical antenna array 910 and a virtual antenna array 920 based on the physical antenna array 910, and to FIG. 9B, which schematically illustrates a radar pattern 930 of antenna array 910, to demonstrate a technical problem, which may be addressed in accordance with some demonstrative aspects.

As shown in FIG. 9A, physical radar array 910 may include two Tx elements 912, e.g., $N_{Tx}=2$, and eight Rx elements 914, e.g., $N_{Rx}=8$.

As shown in FIG. 9A, virtual radar array 920 may include 16 virtual elements 916, e.g., $N_{virt}=16$.

As shown in FIG. 9A, the 16 virtual elements 916 may have a constant inter element spacing, which may be half of a wavelength, denoted X, of a central frequency of radar signals emitted by the antenna array, e.g., $d_{virt}=0.5$.

As shown in FIG. 9A, a size of the virtual antenna array may be equal to 7.5 times the wavelength λ, e.g., $L_{virt}=7.5$.

In one example, radar pattern 930 may be determined, for example, when the antenna elements are patch antennas excited with equal amplitude and having phases to direct the beam to a scanning angle, denoted $\Phi_0$, of 50 degrees, e.g., $\Phi_0=0.87=50°$.

As shown in FIG. 9B, the resolution Δ of the virtual antenna array may be 9.7°, e.g., Δ=50 (cos(0.87)·2·8)=9.7°, for example, according to a shape of a main lobe 934.

As shown in FIG. 9B, the radar pattern 930 may include a plurality of side lobes 932 may have a peak level of −11 dB.

In one example, it may be advantageous, for example, to reduce the peak level of the side lobes 932 to be as low as possible, for example, in order to enable scanning of the beam to a certain target direction, e.g., the direction of main lobe 934, while avoiding collection of energy from other side lobe directions, e.g., directions of side lobes 932.

In some demonstrative aspects, there may be one or more disadvantages, inefficiencies, and/or technical problems in an implementation based on increasing a number of virtual elements $N_{virt}$ and/or a size of the inter-spacing $d_{virt}$ between the antenna elements, for example, in attempt to improve the resolution Δ, e.g., as described below.

In some demonstrative aspects, increasing the inter-spacing $d_{virt}$ between the antenna elements, for example, beyond a certain spacing value, may create Grating Lobes (GL). In one example, the GL may include additional beams, which may point to one or more directions different from the main lobe 934.

In some demonstrative aspects, a radar device may not be able to distinguish whether a target is detected in a main beam direction or in a GL direction, e.g., since properties of the GL may be identical to those of the main lobe, which may lead to ambiguities and/or false detections. For example, a radar processor, e.g., radar processor 834 (FIG. 1) may not be able to distinguish whether the target located in an angle corresponding to the main lobe or an angle corresponding to the GL.

In some demonstrative aspects, a maximum allowed inter spacing, denoted $$d_{virt}^{max},$$

e.g., to avoid GL, for example, when scanning to an angle $\Phi_0$, may be determined, e.g., as follows:

$$d_{virt}^{max} = \lambda/(1+\sin(\phi_0)) \quad (2)$$

In some demonstrative aspects, a GL maxima may appear at the following grating angle, denoted $\Phi_{GL}$, for example, when the inter spacing $d_{virt}$ is greater than the maximum inter spacing $$d_{virt}^{max}, \text{ e.g., } d_{virt} > d_{virt}^{max}:$$

$$\phi_{GL} = \sin^{-1}\left[\frac{n\lambda}{d_{virt}} + \sin(\phi_0)\right] \quad (3)$$

wherein n denotes an integer resulting in a real value.

Figure 10:
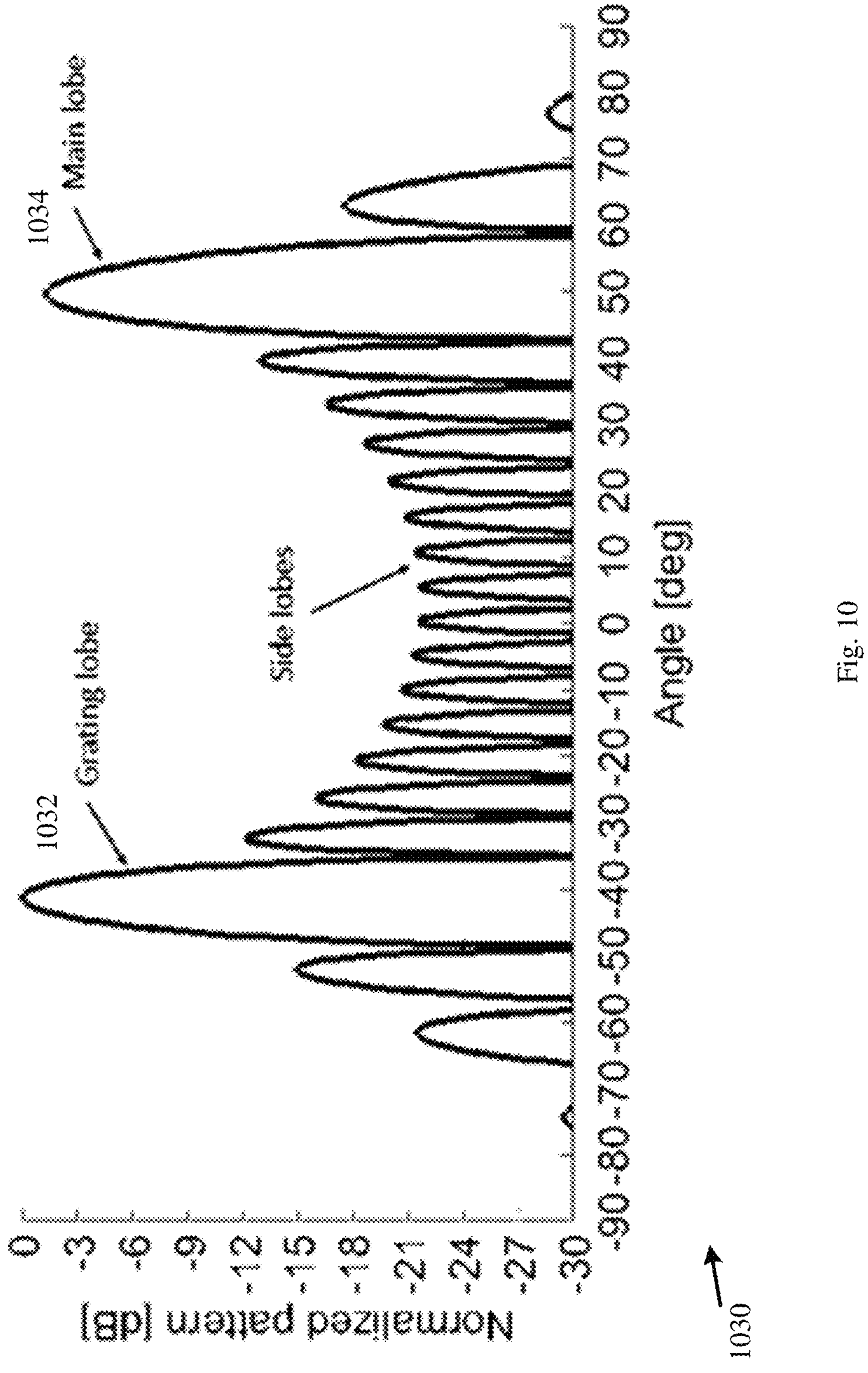
FIG. 10 is a schematic illustration of a radar pattern of a MIMO radar antenna, to demonstrate a technical problem, which may be addressed in accordance with some demonstrative aspects.

Reference is made to FIG. 10, which schematically illustrates a radar pattern 1030 of a MIMO radar antenna, to demonstrate a technical problem, which may be addressed in accordance with some demonstrative aspects.

In one example, convolution of Tx and Rx elements of the MIMO radar antenna may result in a virtual radar array having 16 virtual elements, e.g., $N_{virt}=16$, and a constant inter-element spacing between the virtual elements, e.g., similar to virtual radar array 920 (FIG. 9A). However, the constant inter-element spacing may be greater than half of the wavelength λ. For example, the constant inter-element spacing may be equal to 0.7 of the wavelength λ, e.g., $d_{virt}=0.7\lambda$, which may be greater than half of the wavelength λ. For example, a size of the virtual antenna array may be 10.5 times the wavelength λ, e.g., $L_{virt}=10.5\lambda$, for example, compared to the size of the virtual antenna array 920 (FIG. 9A), which is 7.5 times the wavelength λ.

In one example, radar pattern 1030 may be determined, for example, when the antenna elements are patch antennas excited with equal amplitude and having phases to direct the beam to a scanning angle $\Phi_0$ of 50 degrees, e.g., $\Phi_0=0.87=50°$.

As shown in FIG. 10, the resolution Δ of radar pattern 1030 may be 6.9°, e.g., Δ=6.9°, for example, which may be improved, for example, compared to the resolution Δ=9.7° of radar pattern 930 (FIG. 9B).

As shown in FIG. 10, radar pattern 1030 may include a GL 1032, which may be created due to the inter-element spacing $d_{virt}$ being greater than the maximum allowed inter spacing $$d_{virt}^{max}.$$

As shown in FIG. 10, the GL 1032 may be at an angle, denoted $\Phi_{GL}$, of about −41°:

$$\phi_{GL} = \sin^{-1}\left[\frac{-1}{0.7} + \sin(0.87)\right] = -41° \tag{4}$$

As shown in FIG. 10, the GL 1032 may be even stronger than a main lobe 1034 of radar pattern 1030. This may affect an accuracy of radar detection. For example, a radar processor may mistakenly determine a target located at the angle of about −41°, e.g., based on the GL 1032, for example, instead of detecting a real target, which is located at the angle of 50°, e.g., based on the main lobe 1034.

In some demonstrative aspects, there may be one or more disadvantages, inefficiencies, and/or technical problems, for example, in an implementation based on increasing the number of antenna elements, for example, to improve radar resolution, e.g., as described below.

In some demonstrative aspects, increasing the number of antenna elements may require adding additional RF chains, e.g., Tx and Rx chains, which may include one or more additional elements, hardware, and/or components, e.g., power amplifiers, memory, processing units and/or the like.

In some demonstrative aspects, the additional RF chains may increase power consumption and/or may increase radar complexity. Therefore, increasing the number of antenna elements may not be a practical solution in some use cases and/or implementations.

In some demonstrative aspects, there may be one or more disadvantages, inefficiencies, and/or technical problems in an implementation based on switches to switch between antenna elements and RF chains, e.g., in order to reduce the number of RF chains.

For example, the switches may increase radar loss, for example, by reducing an observation time of a certain antenna on a target, e.g., since in a specific time interval only one antenna may be connected to an RF chain. For example, a reduced observation time may reduce a link budget, e.g., as less energy may be collected by the radar receiver.

In another example, time may pass between successive antenna observations, and, accordingly, reducing the observation time may result in a reduction in a maximum detectable velocity of a target, e.g., vehicle. Therefore, reducing the observation time may result may affect the ability to detect vehicles traveling at high speed, which may be a key factor in radar detection.

In some demonstrative aspects, MIMO radar antenna 881 may include a non-uniform antenna array, which may be configured to provide improved resolution and/or SLL, e.g., as described below.

In one example, antenna elements of the non-uniformly spaced antenna array may not have a constant spacing between the antenna elements, e.g., compared to uniform/periodic antenna arrays, e.g., as described above.

In some demonstrative aspects, the non-uniformly spaced antenna array may have an average spacing, which may be larger than the maximum inter spacing $$d_{virt}^{max}$$

for example, while reducing, avoiding and/or mitigating an effect of GL.

In some demonstrative aspects, the non-uniformly spaced antenna array may support an implementation of an array with a reduced number of antenna elements, e.g., compared to a uniform array, for example, while keeping substantially a same array size and/or a same resolution.

In some demonstrative aspects, the non-uniformly spaced antenna array may support an improved resolution compared to uniform, e.g., periodic, antenna arrays, for example, having the same number of antenna elements, e.g., as described below.

In some demonstrative aspects, one or more analytical methods and/or optimization methods, may be configured to determine locations of antenna elements of a non-uniformly spaced antenna array, e.g., MIMO antenna array 881 (FIG. 8). For example, the analytical and/or optimization methods ay be configured to achieve a reduced SLL, e.g., a lowest possible SLL, and/or an increased resolution. For example, the analytical methods may include non-convex and/or generic algorithm methods, and/or the optimization methods may be convex, e.g., as described below.

Figure 11A:
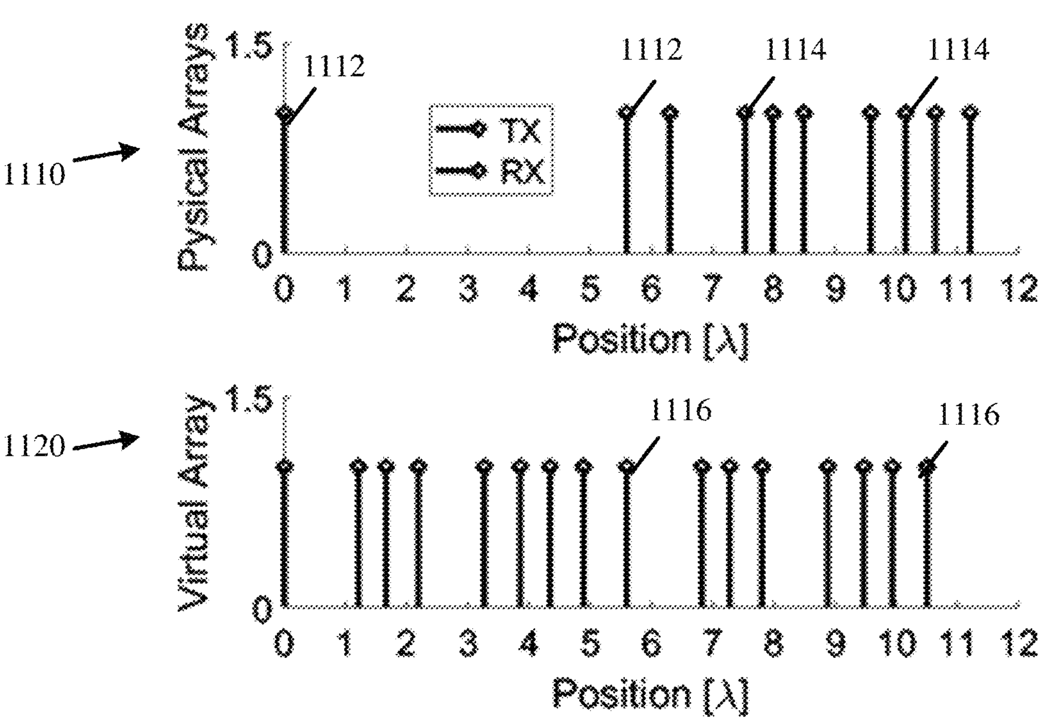
FIG. 11A is a schematic illustration of a non-uniform radar array and a virtual non-uniform radar array based on the non-uniform radar array.
Figure 11B:
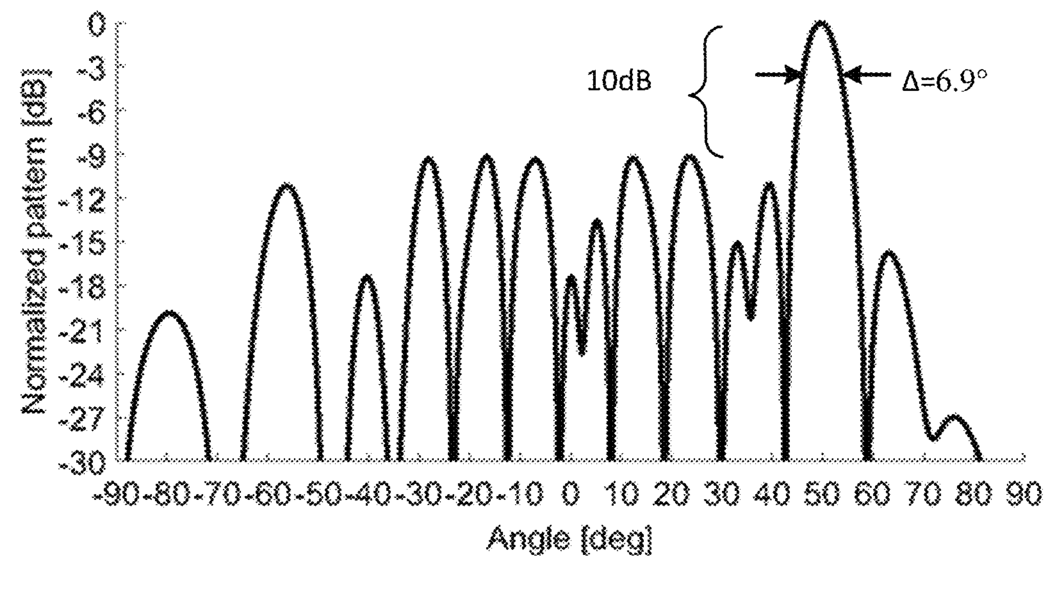
FIG. 11B is a schematic illustration of a radar pattern of the non-uniform radar array of FIG. 11A, which may be implemented in accordance with some demonstrative aspects.

Reference is made to FIG. 11A, which schematically illustrates a non-uniform radar array 1110 and a virtual non-uniform radar array 1120 based on non-uniform radar array 1110, and to FIG. 11B, which schematically illustrates a radar pattern 1130 of non-uniform radar array 1110, which may be implemented in accordance with some demonstrative aspects.

As shown in FIG. 11A, radar array 1110 may include two Tx elements 1112, e.g., $N_{Tx}=2$, and eight Rx elements 1114, e.g., $N_{Rx}=8$.

As shown in FIG. 11A, virtual radar array 1120 may include 16 virtual elements 1116, e.g., $N_{virt}=16$, which may be non-uniformly spread.

As shown in FIG. 11A, a size of the virtual antenna array 1120 may be 10.5 times of the wavelength λ of the central frequency, e.g., $L_{virt}$=10.5.

In one example, radar pattern 1130 may be determined, for example, when the antenna elements are patch antennas excited with equal amplitude, and having phases to direct the beam to a scanning angle $\Phi_0$ of 50 degrees, e.g., $\Phi_0$=0.87=50°.

As shown in FIG. 11A, the resolution Δ of the radar pattern 1130 may be 6.9°, e.g., Δ=6.9°.

As shown in FIG. 11B, the resolution Δ=6.9° of radar pattern 1130 may be improved, e.g., compared to the resolution of 9.7° of radar pattern 930 (FIG. 9), when both radar antennas, e.g., antenna arrays 910 (FIG. 2) and 1110, have a same number of elements, e.g., 10 antenna elements.

In one example, a uniform antenna array, e.g., antenna array 910 (FIG. 2), may have to use 22 elements spaced with a uniform spacing of λ/2, e.g., in order to achieve the same resolution of the non-uniform array 1110, which may 10 antenna elements and may not have GL.

As shown in FIG. 11B, antenna array 1110 may achieve a same resolution of radar pattern 1030 (FIG. 10) of antenna 1010 (FIG. 10), e.g., the resolution Δ=6.9°, for example, without having GL.

In view of the above description, implementing uniform/periodic antenna arrays may have technical disadvantages, for example, as the uniform/periodic antenna arrays may require an increased number of antenna elements, e.g., in order to achieve high resolution. The increased number of antenna elements may result in high cost and complexity, and/or may have high power consumption and/or may require a large memory. Although increasing the spacing between the antenna elements may allow reducing a required number of antenna elements in the periodic array, increasing the spacing between the antenna elements may cause GL, which may result in false detections.

In some demonstrative aspects, there may be a need to address one or more technical issues, for example, when implementing a non-uniformly spaced antenna array, as described below.

In some demonstrative aspects, when applying a window function (also referred to as "spatial tapering") to an antenna array, different excitation amplitudes may be applied to antenna elements of the antenna array. For example, the window function may include a Chebyshev window, a Hamming window, a Taylor window, and/or any other window function, for example, using closed-form analytical expressions.

In one example, periodic arrays with equal amplitude excitations may have a SLL of the order of 10 dB, e.g., as shown in FIG. 9B, which may not allow sufficiently reducing energy arriving from interferers outside the main beam direction, e.g., from the side lobes.

In some demonstrative aspects, a window function may be applied, for example, to reduce the SLL and increase a radar dynamic range, e.g., as described below.

In some demonstrative aspects, a maximum achievable SLL reduction may depend on a number of antennas. For example, the SLL may improve as more antennas and degrees of freedom may be involved. For example, for radar arrays having more than 8 antenna elements, a windowed SLL may reach 60 dB or even better.

In one example, when applying (activating) a window function, not all antenna elements may operate in a maximum available power. Therefore, a link budget and/or a resolution may degrade, e.g., since the effective array size may be reduced. However, these degradations may usually be tolerated, e.g., since low SLL may be important for accurate detection of targets.

As shown in FIG. 11B, an SLL of the non-uniform array 1110 may be around 10 dB, which is similar to an SLL of periodic arrays without window activation, e.g., as shown in FIG. 9B. However, the non-uniform array 1110 may not have an ability to reduce SLL by activating a window. For example, there may be no closed-form solution for a desired window. For example, one or more optimization methods, and/or extensions of synthesis and spectral methods developed and/or used for the periodic case, may be used for the non-uniform arrays, e.g., to apply the window function.

In one example, even when finding an optimal window function for a non-uniform array, an SLL when scanning to large angles may be worse than the level of 60 dB achievable by periodic arrays.

In another example, a resolution and link budget degradation of a non-uniform array, e.g., after applying the window function, may be larger, for example, compared to periodic arrays.

In some demonstrative aspects, there may be a need to address a technical issue of losses in transmission lines, for example, when implementing the non-uniformly spaced antenna array, as described below.

In one example, a non-uniform array may have a large distance between antenna elements, for example, to avoid creation of grating lobes. However, when implementing transmitters and receivers on a small size chip, the large distance between the antenna elements may lead to long routing to the antenna elements, and, as a result, to increased losses in the transmission lines.

In view of the above description, non-uniform arrays may achieve high resolution with a reduced number of antenna elements and/or while avoiding GL. However, this may be at an expense of high routing losses and/or low side-lobe capabilities, for example, even when optimal window functions are applied.

Referring back to FIG. 8, in some demonstrative aspects, MIMO radar antenna 881 may include a non-uniform MIMO antenna configured to provide one or more technical advantages, for example, to support an improved resolution and/or an improved SLL, for example, even with a reduced number of antenna elements and/or a reduced array area, e.g., as described below.

In some demonstrative aspects, MIMO radar antenna 881 may include a non-uniform MIMO antenna configured to provide one or more technical advantages, for example, to utilize a reduced number of antenna elements, for example, while avoiding or mitigating GL effects, e.g., as described below.

In some demonstrative aspects, MIMO radar antenna 881 may be configured to support the improved resolution and/or improved SLL, for example, while avoiding high routing losses, e.g., as described below.

Accordingly, MIMO radar antenna 881 may be implemented to provide technical advantages, for example, reduced power consumption, memory usage, and/or radar size. For example, MIMO radar antenna 881 may be implemented to provide technical advantages for systems with limited resources, e.g., automotive systems and/or any other systems.

In some demonstrative aspects, MIMO radar antenna 881 may include a plurality of antenna element clusters, which may be configured to reduce or minimize chip-to-antenna losses, e.g., as described below.

In some demonstrative aspects, the antenna element clusters of MIMO radar antenna 881 may be configured to enable maintaining low routing loss, e.g., from RF chips to the antenna elements, for example, by locating groups of antenna elements relatively close to each other, e.g., as described below.

In some demonstrative aspects, MIMO radar antenna 881 may be configured to attain high resolution with a reduced number of elements, for example, while being able to apply window functions, which may support very low SLL, e.g., as described below.

In some demonstrative aspects, MIMO radar antenna 881 may be implemented to provide technical advantages, for example, low cost, high efficiency, high resolution, and/or dynamic range, for radar systems, for example, for mmWave MIMO automotive radars, e.g., as described below.

In some demonstrative aspects, MIMO radar antenna 881 may include a non-uniform array with a uniform-core, e.g., as described below.

In some demonstrative aspects, MIMO radar antenna 881 may include a non-uniform array with uniform rows, e.g., as described below.

In some demonstrative aspects, MIMO radar antenna 881 may include a non-uniform array with a cross-like arrangement of clusters of Tx and Rx antenna elements, e.g., as described below.

Figure 12:
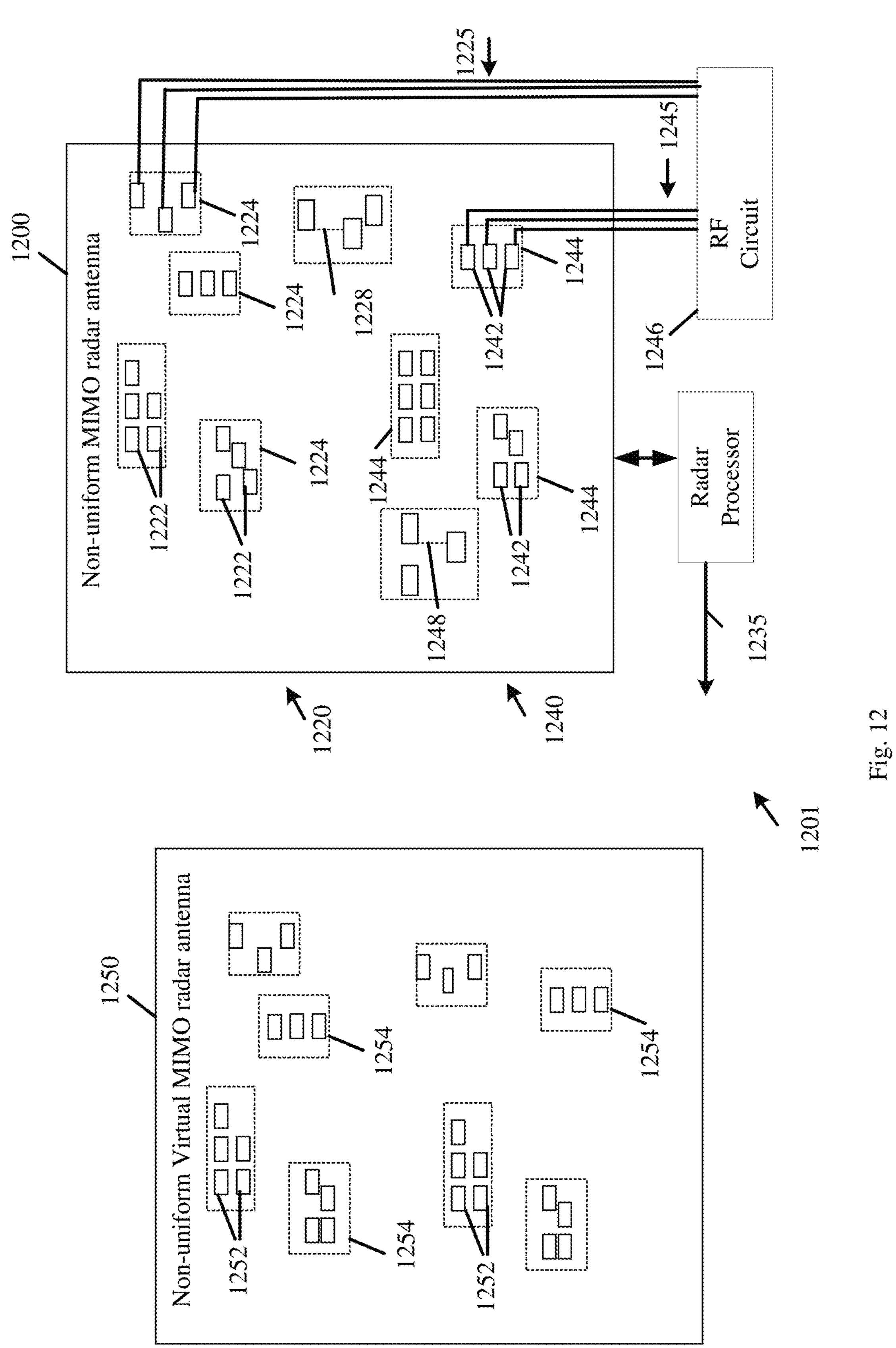
FIG. 12 is a schematic illustration of an apparatus including a non-uniform MIMO radar antenna, in accordance with some demonstrative aspects.

Reference is made to FIG. 12, which schematically illustrates an apparatus 1201 including a non-uniform MIMO radar antenna 1200, in accordance with some demonstrative aspects. For example, apparatus 1201 may include one or more elements of radar front-end 804 (FIG. 8), and/or may perform one or more operations and/or functionalities of radar front-end 804 (FIG. 8). For example, MIMO radar antenna 881 (FIG. 8) may include one or more elements of non-uniform MIMO radar antenna 1200, and/or may perform one or more operations and/or functionalities of non-uniform MIMO radar antenna 1200.

In some demonstrative aspects, as shown in FIG. 12, non-uniform MIMO radar antenna 1200 may include a Tx antenna array 1220 and an Rx antenna array 1240, e.g., as described below.

In some demonstrative aspects, as shown in FIG. 12, Tx antenna array 1220 may include a plurality of Tx antennas 1222 to transmit a plurality of Tx radar signals, e.g., as described below.

In some demonstrative aspects, as shown in FIG. 12, Tx antenna array 1220 may include a plurality of Tx clusters 1224 arranged with non-uniform spacing between the plurality of Tx clusters 1224, e.g., as described below.

In some demonstrative aspects, as shown in FIG. 12, a Tx cluster 1224 of the plurality of Tx clusters 1224 may include at least three Tx antennas 1222, e.g., as described below.

In some demonstrative aspects, as shown in FIG. 12, each of Tx clusters 1224 may include at least three Tx antennas 1222.

In other aspects, a Tx cluster 1224 may include any other number of Tx antennas 1222.

In some demonstrative aspects, as shown in FIG. 12, Rx antenna array 1240 may include a plurality of Rx antennas 1242 to receive a plurality of Rx radar signals, e.g., as described below.

In some demonstrative aspects, as shown in FIG. 12, Rx antenna array 1240 may include a plurality of Rx clusters 1244 arranged with non-uniform spacing between the plurality of Rx clusters 1244, e.g., as described below.

In some demonstrative aspects, as shown in FIG. 12, an Rx cluster 1244 of the plurality of Rx clusters 1244 may include at least three Rx antennas 1242, e.g., as described below.

In some demonstrative aspects, as shown in FIG. 12, each of Rx clusters 1244 may include at least three Rx antennas 1242.

In other aspects, an Rx cluster 1244 may include any other number of Tx antennas 1242.

In some demonstrative aspects, apparatus 1201 may include a radar processor 1234 configured to generate radar information 1235 based on the plurality of Rx radar signals. For example, radar processor 834 (FIG. 8) may include one or more elements of radar processor 1234, and/or may perform one or more operations and/or functionalities of radar processor 1234.

In some demonstrative aspects, the Tx antenna array 1220 and/or the Rx antenna array 1240 may be configured, for example, such that a convolution of the plurality of Tx antennas 1222 and the plurality of Rx antennas 1242 may represent a non-uniform virtual MIMO antenna array 1250, e.g., as described below.

In some demonstrative aspects, as shown in FIG. 12, the non-uniform virtual MIMO antenna array 1250 may include a plurality of non-uniformly spaced virtual antennas 1252, e.g., as described below.

In some demonstrative aspects, as shown in FIG. 12, the non-uniform virtual MIMO antenna array 1250 may include a plurality of virtual clusters 1254 arranged with non-uniform spacing between the plurality of virtual clusters 1254, e.g., as described below.

In some demonstrative aspects, as shown in FIG. 12, a virtual cluster 1254 of the plurality of virtual clusters 1254 may include at least three virtual antennas 1252, e.g., as described below.

In some demonstrative aspects, as shown in FIG. 12, each of the plurality of virtual clusters 1254 may include at least three virtual antennas 1252, e.g., as described below.

In other aspects, a virtual cluster 1254 may include any other number of virtual antennas 1252, e.g., as described below.

In some demonstrative aspects, as shown in FIG. 12, apparatus 1201 may include at least three traces 1245 to connect at least three Rx antennas 1242 of an Rx cluster 1244 to an RF circuit 1246, e.g., as described below.

In some demonstrative aspects, the Rx cluster 1244 may be configured such that a trace loss via each of the at least three Rx traces 1245 may be no more than 10 decibel (dB), e.g., as described below. In other aspects, any other trace loss may be implemented.

In some demonstrative aspects, as shown in FIG. 12, apparatus 1201 may include at least three traces 1225 to connect at least three Tx antennas 1222 of a Tx cluster 1224 to the RF circuit 1246, e.g., as described below.

In some demonstrative aspects, the Tx cluster 1224 may be configured such that a trace loss via each of the at least three Tx traces 1225 may be no more than 10 dB, e.g., as described below. In other aspects, any other trace loss may be implemented.

In some demonstrative aspects, as shown in FIG. 12, a distance 1228 between a first Tx antenna of the Tx cluster 1224 and a second Tx antenna of the Tx cluster 1224, which is adjacent to the first Tx antenna, may be greater than half a wavelength of the Tx radar signals to be transmitted by Tx cluster 1224, e.g., as described below.

In some demonstrative aspects, a distance between any two adjacent Tx antennas of each Tx cluster of the plurality of Tx clusters 1224 may be greater than half a wavelength of the Tx radar signals, e.g., as described below.

In some demonstrative aspects, a distance between any two Tx antennas of the Tx cluster 1224 may be no more than 50 millimeter (mm), e.g., as described below.

In some demonstrative aspects, a distance between any two Tx antennas of each Tx cluster 1224 of the plurality of Tx clusters 1224 may be no more than 50 mm, e.g., as described below.

In other aspects, any other distance may be implemented between adjacent Tx antenna elements 1222 in the Tx cluster 1224

In some demonstrative aspects, as shown in FIG. 12, a distance 1248 between a first Rx antenna of the Rx cluster 1244 and a second Rx antenna of the Rx cluster 1244, which is adjacent to the first Rx antenna, may be greater than half a wavelength of the Tx radar signals to be transmitted by Tx cluster 1224, e.g., as described below.

In some demonstrative aspects, a distance between any two adjacent Rx antennas of each Rx cluster of the plurality of Rx clusters 1244 may be greater than half a wavelength of the Tx radar signals, e.g., as described below.

In some demonstrative aspects, a distance between any two Rx antennas of the Rx cluster 1244 may be no more than 50 mm, e.g., as described below.

In some demonstrative aspects, a distance between any two Rx antennas of each Rx cluster 1244 of the plurality of Rx clusters 1244 may be no more than 50 mm, e.g., as described below.

In other aspects, any other distance may be implemented between adjacent Rx antenna elements 1242 in the Tx cluster 1244

In some demonstrative aspects, non-uniform MIMO radar antenna 1200 may include a uniform core cluster, e.g., as described below.

In some demonstrative aspects, the plurality of Tx clusters 1224 may include a uniform Tx core cluster, and/or the plurality of Rx clusters 1244 may include a uniform Rx core cluster, e.g., as described below.

Figure 13:
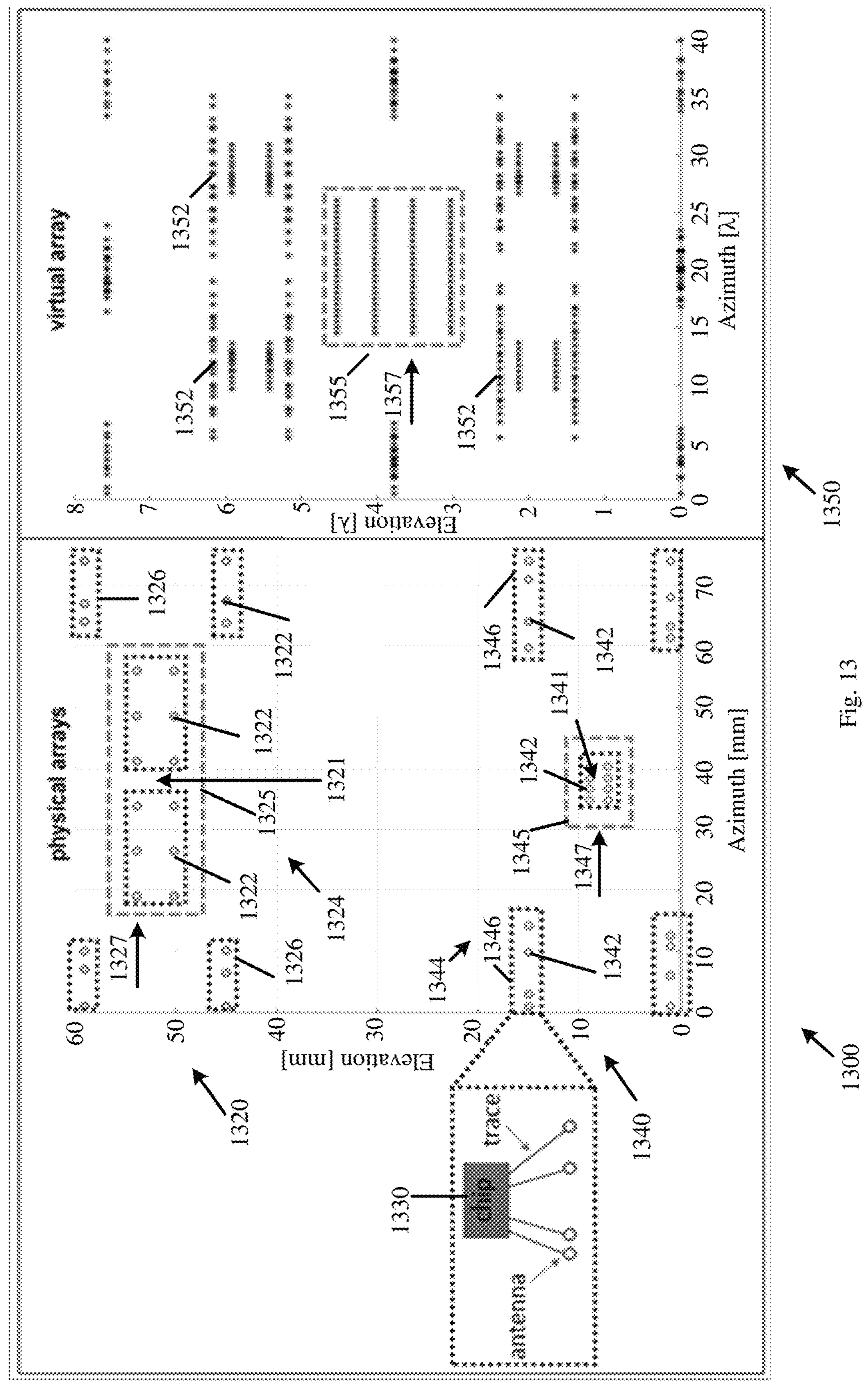
FIG. 13 is a schematic illustration of a non-uniform MIMO radar antenna, and a non-uniform virtual MIMO antenna array based on the non-uniform MIMO radar antenna, in accordance with some demonstrative aspects.

Reference is made to FIG. 13, which schematically illustrates a non-uniform MIMO radar antenna 1300, and a non-uniform virtual MIMO antenna array 1350 based on non-uniform MIMO radar antenna 1300, in accordance with some demonstrative aspects. For example, MIMO radar antenna 881 (FIG. 8) and/or MIMO radar antenna 1200 (FIG. 12) may include one or more elements of non-uniform MIMO radar antenna 1300, and/or may perform one or more operations and/or functionalities of non-uniform MIMO radar antenna 1300.

In some demonstrative aspects, as shown in FIG. 13, non-uniform MIMO radar antenna 1300 may include a Tx antenna array 1320 and an Rx antenna array 1340, e.g., as described below.

In some demonstrative aspects, as shown in FIG. 13, Tx antenna array 1320 may include a plurality of Tx antennas 1322.

In some demonstrative aspects, as shown in FIG. 13, Tx antenna array 1320 may include a plurality of Tx clusters 1324 arranged with non-uniform spacing between the plurality of Tx clusters 1324, e.g., as described below.

In some demonstrative aspects, as shown in FIG. 13, Rx antenna array 1340 may include a plurality of Rx antennas 1342.

In some demonstrative aspects, as shown in FIG. 13, Rx antenna array 1340 may include a plurality of Rx clusters 1344 arranged with non-uniform spacing between the plurality of Rx clusters 1344, e.g., as described below.

In some demonstrative aspects, as shown in FIG. 13, the plurality of Tx clusters 1324 may include a uniform Tx core cluster 1325 and a plurality of non-uniform Tx clusters 1326, e.g., as described below.

In some demonstrative aspects, as shown in FIG. 13, the uniform Tx core cluster 1325 may include a plurality of uniform Tx rows 1327 arranged with uniform spacing between the plurality of uniform Tx rows 1327.

In some demonstrative aspects, as shown in FIG. 13, a uniform Tx row 1327 of the plurality of uniform Tx rows 1327 may include a plurality of uniformly-spaced Tx antennas 1322.

In some demonstrative aspects, as shown in FIG. 13, a non-uniform Tx cluster 1326 of the plurality of non-uniform Tx clusters 1326 may include a plurality of non-uniformly spaced Tx antennas 1322.

In some demonstrative aspects, as shown in FIG. 13, the uniform Tx core cluster 1325 may surround a center 1321 of the Tx antenna array 1320.

In some demonstrative aspects, as shown in FIG. 13, the plurality of non-uniform Tx clusters 1326 may surround the uniform Tx core cluster 1325.

In some demonstrative aspects, as shown in FIG. 13, the plurality of Rx clusters 1344 may include a uniform Rx core cluster 1345 and a plurality of non-uniform Rx clusters 1346, e.g., as described below.

In some demonstrative aspects, as shown in FIG. 13, the uniform Rx core cluster 1345 may include a plurality of uniform Rx rows 1347 arranged with uniform spacing between the plurality of uniform Rx rows 1347.

In some demonstrative aspects, as shown in FIG. 13, a uniform Rx row 1347 of the plurality of uniform Rx rows 1347 may include a plurality of uniformly-spaced Rx antennas 1342.

In some demonstrative aspects, as shown in FIG. 13, a non-uniform Rx cluster 1346 of the plurality of non-uniform Rx clusters 1346 may include a plurality of non-uniformly spaced Rx antennas 1342.

In some demonstrative aspects, as shown in FIG. 13, the uniform Rx core cluster 1345 may surround a center 1341 of the Rx antenna array 1340.

In some demonstrative aspects, as shown in FIG. 13, the plurality of non-uniform Rx clusters 1346 may surround the uniform Rx core cluster 1345.

In some demonstrative aspects, as shown in FIG. 13, the Tx antenna array 1320 and the Rx antenna array 1340 may be configured such that a convolution of the plurality of Tx antennas 1322 and the plurality of Rx antennas 1342 may result with the non-uniform virtual MIMO antenna array 1350.

In some demonstrative aspects, as shown in FIG. 13, the non-uniform virtual MIMO antenna array 1350 may include a plurality of non-uniformly spaced virtual antennas 1352, e.g., as described below.

In some demonstrative aspects, as shown in FIG. 13, the non-uniform virtual MIMO antenna array 1350 may include a uniform virtual core cluster 1355.

In some demonstrative aspects, a convolution of the uniform Tx-core 1325 and the uniform Rx core 1345 may result in the uniform virtual core 1355.

In some demonstrative aspects, as shown in FIG. 13, uniform virtual core cluster 1355 may include a plurality of uniform virtual antenna rows 1357 arranged with uniform spacing between the plurality of uniform virtual antenna rows 1357, e.g., as described below.

In some demonstrative aspects, as shown in FIG. 13, a uniform core, e.g., Tx-core 1325, Rx core 1345, and/or virtual core 1355, may include a plurality of rows having a uniform, e.g., constant, spacing between rows of the uniform core, for example, where a row, e.g., every row, of the plurality of rows may include a plurality of antenna elements having a constant spacing between the plurality of antenna elements of the row.

In some demonstrative aspects, as shown in FIG. 13, non-uniform MIMO radar antenna 1300 may include 24 Tx elements 1322, e.g., $N_{Tx}$=24, and 24 Rx elements, e.g., $N_{Rx}$=24.

In some demonstrative aspects, as shown in FIG. 13, non-uniform virtual MIMO antenna array 1350 may include 576 virtual elements, e.g., $N_{virt}$=24*24=576.

In some demonstrative aspects, as shown in FIG. 13, a size of the non-uniform MIMO radar antenna 1300 may be 60 mm·75 mm.

Some demonstrative aspects are described with to some implementations of non-uniform physical array topologies with a specific array size and/or having a uniform Tx-core with a specific count of Tx antenna elements, and/or a uniform Rx-core with a specific count of Rx antenna elements, e.g., as shown in FIG. 6 and/or as described below. However, in other aspects, any other topology of a non-uniform physical array including a uniform Tx and/or Rx cores, for example, including any other number of antenna elements, and/or any other array size may be implemented.

In one example, non-uniform MIMO radar antenna 1300 may be operated to communicate signals at an operating wavelength of about 3.8 mm, e.g., corresponding to a 76-81 GHz frequency band, e.g., an automotive radar frequency band.

In another example, any other operating wavelength may be implemented.

In some demonstrative aspects, as shown in FIG. 13, peripheral Tx clusters 1326 and/or peripheral Rx clusters 1346 may include three or more antenna elements.

In some demonstrative aspects, as shown in FIG. 13, non-uniform MIMO radar antenna 1300 may be configured such that all antenna elements, e.g., Tx antennas 1322 and/or Rx antennas 1342, may be grouped in groups of three or more antenna elements. In one example, non-uniform MIMO radar antenna 1300 may be configured such that there may be no antenna element, which is located far away from its neighboring elements. This arrangement of non-uniform MIMO radar antenna 1300 may provide a technical advantage of reduced tracing loss between the antenna elements of non-uniform MIMO radar antenna 1300 and RF circuitry, e.g., of an RF chip 1330.

In some demonstrative aspects, non-uniform MIMO radar antenna 1300 may be configured such that a minimum distance between two adjacent antenna elements may be equal to or greater than half of the wavelength of the Tx signal, for example, to support efficient realization.

In some demonstrative aspects, a cluster size, e.g., of clusters 1324 and/or 1344, may be relatively small, e.g., less than 50 mm, which may support a reduced chip-to-antenna trace loss. For example, in a frequency band of about 70 GHz, e.g., in an automotive radar band of 76-81 GHz, or any other band, limiting the cluster size to about 50 mm may support limiting the chip-to-antenna trace loss to no more than about 10 dB. In other aspects, other cluster size may be utilized, for example, with respect to any other radar wavelength and/or any other trace-loss limitation.

In some demonstrative aspects, as shown in FIG. 13, a peripheral cluster, e.g., of clusters 1326 and/or clusters 1346, may be relatively far from its neighboring peripheral clusters. For example, a distance between neighboring clusters may be longer, e.g., much longer, than a distance between adjacent antenna elements in a cluster.

In one example, RF chip 1330 may include three or more RF chains, which may be positioned in proximity to the clusters, e.g., clusters 1324 and/or 1344, for example, to reduce trace losses.

In some demonstrative aspects, non-uniform MIMO radar antenna 1300 may be configured, operated and/or controlled, for example, according to a tapering ("window") scheme, e.g., as described below.

In some demonstrative aspects, a radar processor, e.g., radar processor 1234 (FIG. 12), may be configured to control the non-uniform MIMO radar antenna 1300 by applying a first power level to one or more first Tx antennas of the uniform Tx core cluster 1325, and applying a second power level to one or more second Tx antennas of the uniform Tx core cluster 1325. For example, the first power level to be applied to the first Tx antennas may be different from the second power level to be applied to the second Tx antennas.

In some demonstrative aspects, the radar processor, e.g., radar processor 1234 (FIG. 12), may be configured to control the non-uniform MIMO radar antenna 1300 by applying a first power level to one or more first Rx antennas of the uniform Rx core cluster 1345, and applying a second power level to one or more second Rx antennas of the uniform Rx core cluster 1345. For example, the first power level to be applied to the first Rx antennas may be different from the second power level to be applied to the second Rx antennas.

In some demonstrative aspects, the radar processor, e.g., radar processor 1234 (FIG. 12), may apply the first and second power levels, for example, to apply a window function, e.g., a Chebyshev window, to a uniform core cluster, e.g., uniform core clusters 1325 and/or 1345.

In one example, radar processor 1234 (FIG. 12) may be configured to apply to non-uniform MIMO radar antenna 1300 a predefined window function, for example, when operating non-uniform MIMO radar antenna 1300 at a low SLL mode.

In some demonstrative aspects, applying the window function to a uniform/periodic core, e.g., uniform Tx-core cluster 1325 and/or uniform Rx core cluster 1345, may support achieving a side lobe level of at least 60 dB, for example, with antenna array, e.g., MIMO radar antenna array 1300, e.g., even when scanning the an antenna array to large angles.

In one example, non-uniform antenna elements on edges of the antenna array, e.g., in peripheral Tx clusters 1326 and/or peripheral Rx clusters 1346, may be utilized, and a window, which is configured to maintain a low SLL and/or improved beamwidth, may be determined, e.g., using one or more optimization processes.

In one example, a low SLL, e.g., a 60 dB SLL, may be achieved, for example, when the window is applied on the uniform/periodic core alone, or on the uniform/periodic core together with one or more of the additional peripheral clusters. For example, an improved SLL may be achieved, for example, compared to an SLL achieved in non-uniform arrays, which scan to large angles with much lower windowed SLL.

In some demonstrative aspects, radar processor 1234 (FIG. 12) may be configured to apply to non-uniform MIMO radar antenna 1300 a minimum-beamwidth tapering, for example, when operating non-uniform MIMO radar antenna 1300 at a high resolution mode.

In some demonstrative aspects, a window function may be applied by controlling a plurality of antenna elements of non-uniform MIMO radar antenna 1300 to operate at a reduced power, while other antenna elements of non-uniform MIMO radar antenna 1300 may be operated at a normal power. Applying the window function may allow MIMO radar antenna 1300 to achieve a maximum resolution, for example, compared to a uniform antenna array, in which a maximum resolution may be achieved, for example, only when all antenna elements are excited with an equal amplitude without any tapering.

Reference is made to FIG. 14, which schematically illustrates a tapering scheme configured for a non-uniform MIMO radar antenna 1400, and a graph 1410 depicting an azimuth radiation pattern 1402 and an elevation radiation pattern 1404 of the non-uniform MIMO radar antenna 1400, in accordance with some demonstrative aspects. For example, radar processor 1234 (FIG. 12) may be configured to apply the tapering scheme of FIG. 14 to non-uniform MIMO radar antenna 1300 (FIG. 13).

In some demonstrative aspects, a radar processor, e.g., radar processor 1234 (FIG. 12), may be configured to control the non-uniform MIMO radar antenna 1400 by applying a first power level to one or more first Tx antennas 1428 of a uniform Tx core cluster 1425, and applying a second power level to one or more second Tx antennas 1429 of the uniform Tx core cluster 1425. For example, the first power level applied to Tx antennas 1428 may be different from the second power level applied to Tx antennas 1429.

In some demonstrative aspects, the radar processor, e.g., radar processor 1234 (FIG. 12), may be configured to control the non-uniform MIMO radar antenna 1400 by applying a first gain (power) level to one or more first Rx antennas 1448 of a uniform Rx core cluster 1445, and applying a second gain (power) level to one or more second Rx antennas 1449 of the uniform Rx core cluster 1445. For example, the first gain level applied to Rx antennas 1448 may be different from the second gain level applied to Rx antennas 1449.

In one example, the tapering scheme of FIG. 14 may be configured as a minimum-beamwidth tapering scheme.

In another example, the tapering scheme may include any other tapering scheme.

In some demonstrative aspects, the one or more Tx elements 1428 of uniform Tx-core 1425 may be operated operate at a reduced power, while other Tx elements 1429 of Tx-core 1425 may be operated at a higher power, e.g., full power.

In some demonstrative aspects, the one or more Rx elements 1448 of Rx-core 1445 may be operated at a reduced power, while other Rx elements 1449 of Tx-core 1445 may be operated at a higher power, e.g., full power.

In some demonstrative aspects, azimuth radiation pattern 1402 may be determined, for example, at a maximum resolution mode, with a radar beam scanned to boresight, e.g., zero degrees.

In some demonstrative aspects, elevation radiation pattern 1404 may be determined, for example, at a maximum resolution mode, with the radar beam scanned to boresight.

In some demonstrative aspects, an azimuth resolution of azimuth radiation pattern 1402 may be improved, e.g., by 20%, for example, compared to an azimuth resolution achievable by a uniform antenna array with a same number of elements. In one example, an elevation resolution of elevation radiation pattern 1404 may be similar to an elevation resolution achieved by the uniform array.

In some demonstrative aspects, as shown in FIG. 14, an SLL of non-uniform MIMO radar antenna 1400 may be similar to an SLL achievable by the uniform array, e.g., array 920 (FIG. 9).

In one example, the minimum-beamwidth tapering process may be suitable for non-uniform arrays. For example, since a distribution of antenna elements of non-uniform MIMO radar antenna 1400 may not be equal, when all the elements are activated, an amplitude window may be effectively created and the resolution may not necessarily be optimal, for example, compared to standard periodic arrays, in which activating some of the elements in reduced power, may not improve the resolution.

Figure 15:
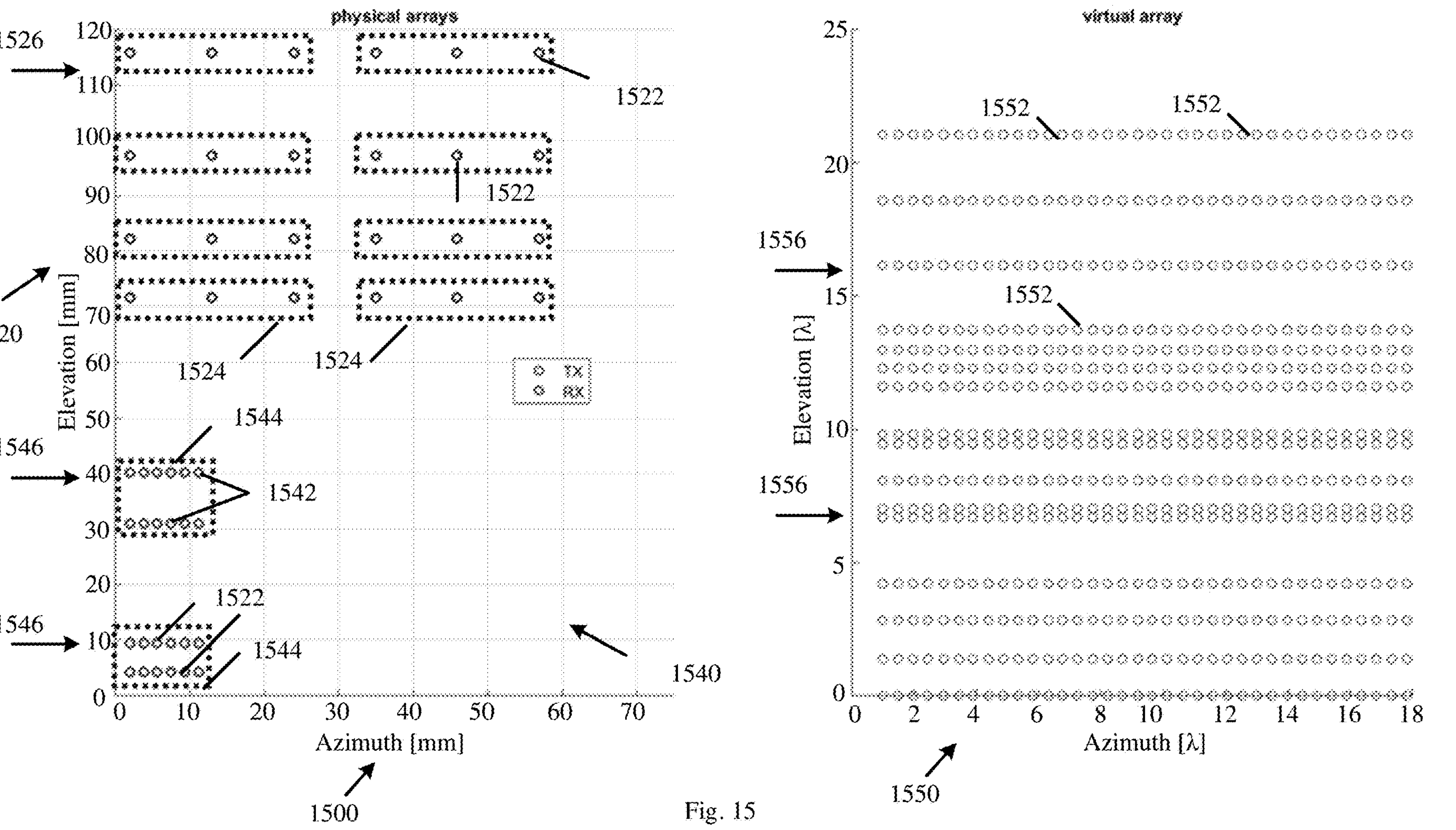
FIG. 15 is a schematic illustration of a non-uniform MIMO radar antenna, and a non-uniform virtual MIMO antenna array based on the non-uniform MIMO radar antenna, in accordance with some demonstrative aspects.

Reference is made to FIG. 15, which schematically illustrates a non-uniform MIMO radar antenna 1500, and a non-uniform virtual MIMO antenna array 1550 based on non-uniform MIMO radar antenna 1500, in accordance with some demonstrative aspects. For example, MIMO radar antenna 881 (FIG. 8) may include one or more elements of non-uniform MIMO radar antenna 1500, and/or may perform one or more operations and/or functionalities of non-uniform MIMO radar antenna 1500.

In some demonstrative aspects, as shown in FIG. 15, non-uniform MIMO radar antenna 1500 may include a Transmit (Tx) antenna array 1520 and a Receive (Rx) antenna array 1540, e.g., as described below.

In some demonstrative aspects, as shown in FIG. 15, Tx antenna array 1520 may include a plurality of Tx antennas 1522.

In some demonstrative aspects, as shown in FIG. 15, Tx antenna array 1520 may include a plurality of Tx clusters 1524 arranged with non-uniform spacing between the plurality of Tx clusters 1524, e.g., as described below.

In some demonstrative aspects, as shown in FIG. 15, Rx antenna array 1540 may include a plurality of Rx antennas 1542.

In some demonstrative aspects, as shown in FIG. 15, Rx antenna array 1540 may include a plurality of Rx clusters 1544 arranged with non-uniform spacing between the plurality of Rx clusters 1544, e.g., as described below.

In some demonstrative aspects, as shown in FIG. 15, the plurality of Tx clusters 1524 may include a plurality of uniform Tx rows 1526 arranged with non-uniform spacing between the plurality of uniform Tx rows 1526, e.g., as described below.

In some demonstrative aspects, as shown in FIG. 15, a uniform Tx row 1526 of the plurality of Tx uniform rows 1526 may include a plurality of uniformly-spaced Tx antennas 1522.

In some demonstrative aspects, as shown in FIG. 15, the plurality of Rx clusters 1544 may include a plurality of uniform Rx rows 1546 arranged with non-uniform spacing between the plurality of uniform Rx rows 1546, e.g., as described below.

In some demonstrative aspects, as shown in FIG. 15, a uniform Rx row 1546 of the plurality of Rx uniform rows 1546 may include a plurality of uniformly-spaced Rx antennas 1542.

In some demonstrative aspects, as shown in FIG. 15, non-uniform MIMO radar antenna 1500 may include 24 Tx elements 1522, e.g., $N_{Tx}$=24, and 24 Rx elements, e.g., $N_{Rx}$=24.

In some demonstrative aspects, as shown in FIG. 15, the 24 Tx elements 1522 may be arranged in 4 equal uniform rows 1526.

For example, as shown in FIG. 15, a Tx uniform antenna row, e.g., each Tx uniform antenna row 1526, may include, for example, 6 Tx antenna elements 1522.

In some demonstrative aspects, as shown in FIG. 15, the spacing between the uniform Tx rows 1526 may not be uniform.

In some demonstrative aspects, as shown in FIG. 15, the 24 Rx elements 1542 may be arranged in 4 equal uniform rows 1546.

For example, as shown in FIG. 15, an Rx uniform antenna row, e.g., each Rx uniform antenna row 1546, may include, for example, 6 Rx antenna elements 1542.

In some demonstrative aspects, as shown in FIG. 15, the spacing between the uniform Rx rows 1546 may not be uniform.

In some demonstrative aspects, the uniform rows 1546 and/or 1526 may allow to maintain reduced losses from MIMO radar antenna 1500 to an RF chip.

In some demonstrative aspects, as shown in FIG. 15, the Tx antenna array 1520 and the Rx antenna array 1540 may be configured such that a convolution of the plurality of Tx antennas 1522 and the plurality of Rx antennas 1542 may represent the non-uniform virtual MIMO antenna array 1550, e.g., as described below.

In some demonstrative aspects, as shown in FIG. 15, the non-uniform virtual MIMO antenna array 1550 may include a plurality of uniform virtual rows 1556 arranged with non-uniform spacing between the plurality of uniform virtual rows 1556, e.g., as described below.

In some demonstrative aspects, as shown in FIG. 15, a uniform virtual row 1556 of the plurality of virtual uniform rows 1556 may include a plurality of uniformly-spaced virtual antennas 1552.

In some demonstrative aspects, as shown in FIG. 15, the configuration of the antenna elements in Tx array 1520 and Rx array 1540 may result in an arrangement of 16 virtual uniform antenna rows 1556.

For example, as shown in FIG. 15, a virtual uniform antenna row, e.g., each virtual uniform antenna row 1556, may include 36 uniformly-spaced virtual antennas 1552, e.g., non-uniform virtual MIMO antenna array 1550 may include 16*36=576 antenna elements 1552.

In some demonstrative aspects, as shown in FIG. 15, spacing between the 16 uniform rows 1552 may not be uniform.

In some demonstrative aspects, a non-uniform MIMO antenna array, e.g., non-uniform MIMO antenna array 1500, may include 4 uniform Tx rows 1526, and 4 uniform Rx rows 846, e.g., as shown in FIG. 15. In other aspects, any other topology of a non-uniform array including a plurality of uniform rows may be implemented, for example, with any other number of rows, and/or any other number of antenna elements in a uniform row.

Figure 16:
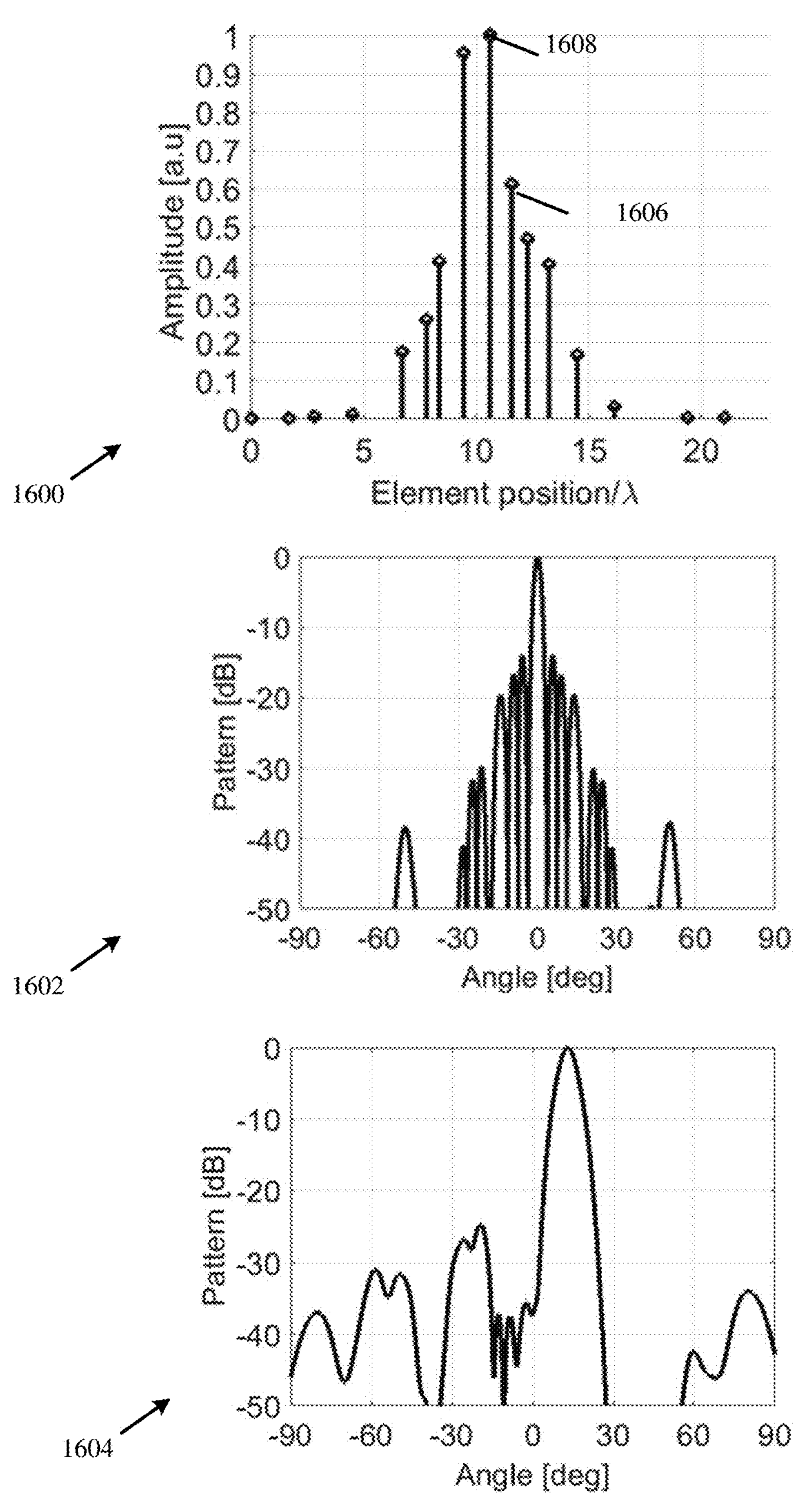
FIG. 16 is a schematic illustration of a tapering scheme configured for a non-uniform MIMO radar antenna, an azimuth radiation pattern, and an elevation radiation pattern of the non-uniform MIMO radar antenna, in accordance with some demonstrative aspects.

Reference is made to FIG. 16, which schematically illustrates a tapering scheme 1600 configured for a non-uniform MIMO radar antenna, an azimuth radiation pattern 1602, and an elevation radiation pattern 1604 of non-uniform MIMO radar antenna 1600, in accordance with some demonstrative aspects. For example, radar processor 1234 (FIG. 12) may be configured to apply the tapering scheme of FIG. 16 to non-uniform MIMO radar antenna 1500 (FIG. 15).

In some demonstrative aspects, a radar processor, e.g., radar processor 1234 (FIG. 12), may be configured to control the non-uniform MIMO radar antenna 1500 (FIG. 8) by applying a first power level 1606 to one or more first antennas of MIMO radar antenna 1500 (FIG. 15), and applying a second power level 1608 to one or more second antennas of MIMO radar antenna 1500 (FIG. 15). For example, the first power level may be different from the second power level.

In some demonstrative aspects, as shown in FIG. 16, a radar processor, e.g., radar processor 1234 (FIG. 12), may be configured to apply different power levels, e.g., according to tapering scheme 1600, to different antenna elements of the non-uniform MIMO radar antenna, which are located at different elevation positions.

In some demonstrative aspects, elevation radiation pattern 1604 depicts an elevation radiation pattern of the non-uniform MIMO radar antenna, e.g., non-uniform MIMO radar antenna 1500 (FIG. 15), at an optimal SLL mode. For example, the optimal SLL mode may be achieved when a tapering window, e.g., according to tapering scheme 1600, is applied to the non-uniform MIMO radar antenna with a radar beam of the MIMO radar antenna scanned to an elevation angle of 15°, which may be a maximum required scan angle, for example, in automotive radars.

In some demonstrative aspects, azimuth radiation pattern 1602 depicts an azimuth radiation pattern, for example, at a maximum resolution mode of the non-uniform MIMO radar antenna, e.g., non-uniform MIMO radar antenna (FIG. 1500), and with a radar beam scanned to the boresight, e.g., zero degrees.

In some demonstrative aspects, as shown in FIG. 16, elevation radiation pattern 1604 may have a reduced SLL, e.g., of about 25 dB.

In some demonstrative aspects, the reduced SLL may be maintained, for example, even when scanning to large azimuth angles, e.g., since the non-uniform MIMO radar antenna may be uniform along the azimuth, e.g., the rows are uniform, which may offer an advantage over non-uniform arrays.

In some demonstrative aspects, an azimuth resolution of azimuth radiation pattern 1602 may be improved, e.g., by 20%, for example, compared to an azimuth resolution achievable by a uniform antenna array.

In some demonstrative aspects, an azimuth resolution of azimuth radiation pattern 1602 may be improved, e.g., by about 30%, for example, compared to an azimuth resolution achievable by an antenna array with a same number of uniform rows but with uniform spacing between the uniform rows.

Figure 17A:
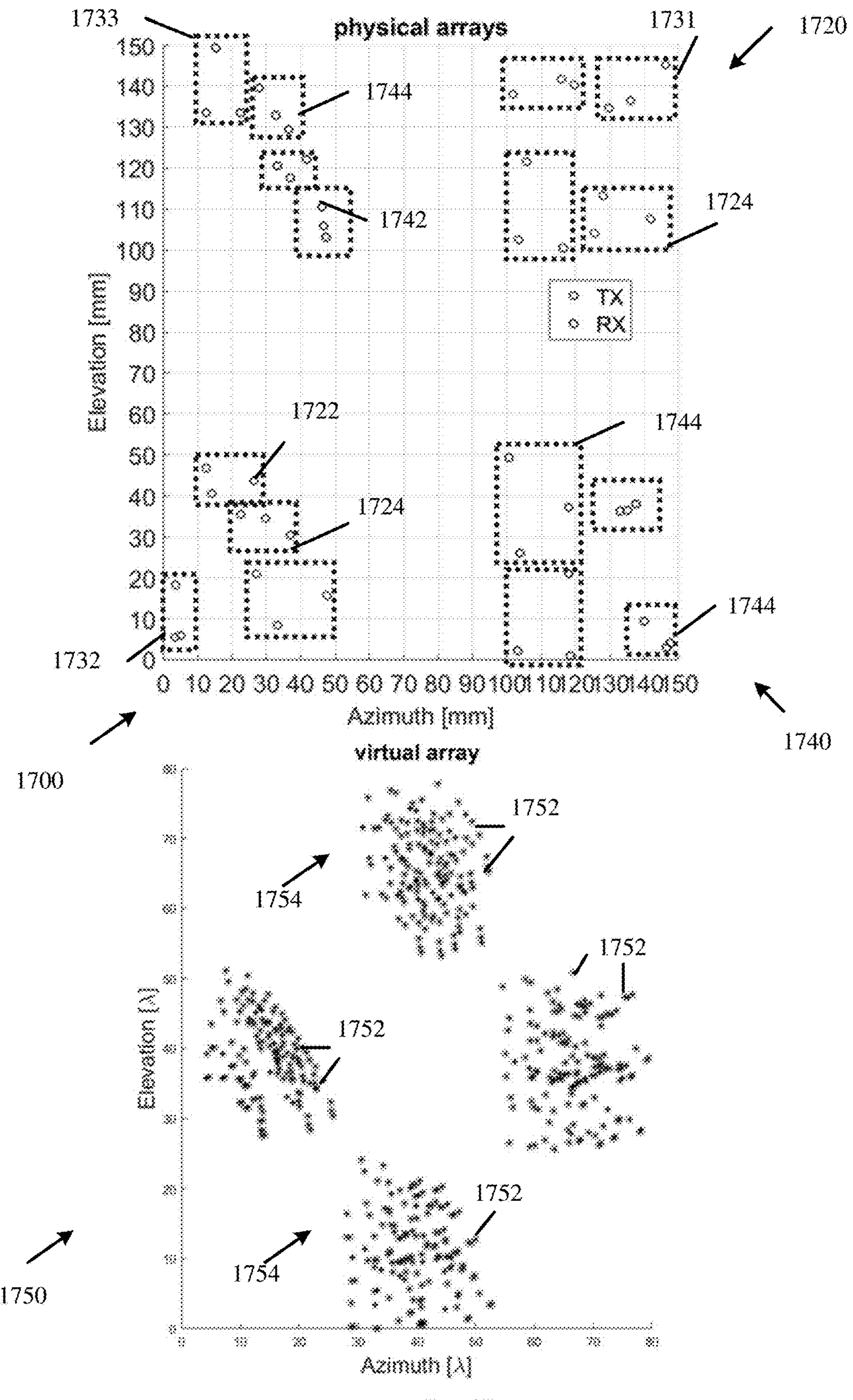
FIG. 17A is a schematic illustration of a non-uniform MIMO radar antenna, and a non-uniform virtual MIMO antenna array based on the non-uniform MIMO radar antenna, in accordance with some demonstrative aspects.
Figure 17B:
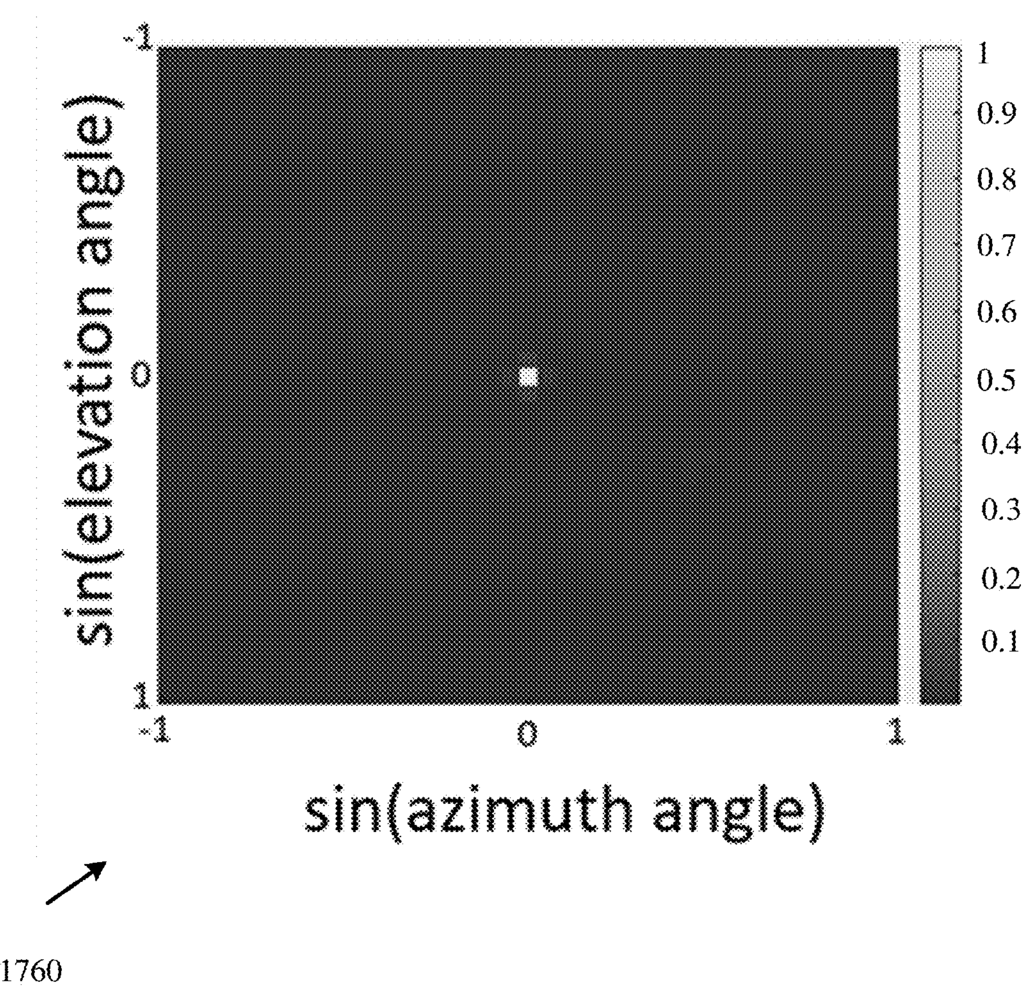
FIG. 17B is a schematic illustration of a radiation pattern of the non-uniform MIMO radar antenna of FIG. 17A, in accordance with some demonstrative aspects.

Reference is made to FIG. 17A, which schematically illustrates a non-uniform MIMO radar antenna 1700, and a non-uniform virtual MIMO antenna array 1750 based on the non-uniform MIMO radar antenna 1700, in accordance with some demonstrative aspects. Reference is also made to FIG. 17B, which schematically illustrates a radiation pattern 1760 of non-uniform MIMO radar antenna 1700, in accordance with some demonstrative aspects. For example, MIMO radar antenna 881 (FIG. 8) may include one or more elements of non-uniform MIMO radar antenna 1700, and/or may perform one or more operations and/or functionalities of non-uniform MIMO radar antenna 1700.

In some demonstrative aspects, as shown in FIG. 17A, non-uniform MIMO radar antenna 1700 may include a Tx antenna array 1720 and an Rx antenna array 1740, e.g., as described below.

In some demonstrative aspects, as shown in FIG. 17A, Tx antenna array 1720 may include a plurality of Tx antennas 1722.

In some demonstrative aspects, as shown in FIG. 17A, Tx antenna array 1720 may include a plurality of Tx clusters 1724 arranged with non-uniform spacing between the plurality of Tx clusters 1724, e.g., as described below.

In some demonstrative aspects, as shown in FIG. 17A, Rx antenna array 1740 may include a plurality of Rx antennas 1742.

In some demonstrative aspects, as shown in FIG. 17A, Rx antenna array 1740 may include a plurality of Rx clusters 1744 arranged with non-uniform spacing between the plurality of Rx clusters 1744, e.g., as described below.

In some demonstrative aspects, as shown in FIG. 17A, the plurality of Tx clusters 1724 and the plurality of Rx clusters 1744 may be arranged according to a cross-like topology, e.g., as described below.

In some demonstrative aspects, as shown in FIG. 17A, non-uniform MIMO radar antenna 1700 may include 24 Tx elements 1722, e.g., $N_{Tx}=24$, and 24 Rx elements, e.g., $N_{Rx}=24$.

In some demonstrative aspects, as shown in FIG. 17A, the 24 Tx elements may be divided into two sub-arrays, and the 24 Rx elements may be divided into two subarrays, which may be placed in cross-like configuration.

In some demonstrative aspects, as shown in FIG. 17A, the cross-like topology may include a first non-uniform Tx cluster 1031 including a first plurality of non-uniformly spaced Tx antennas 1722 at a first end of a first diagonal of a quadrilateral, a second non-uniform Tx cluster 1032 including a second plurality of non-uniformly spaced Tx antennas 1722 at a second end of the first diagonal, a first non-uniform Rx cluster 1033 including a first plurality of non-uniformly spaced Rx antennas 1742 at a first end of a second diagonal of the quadrilateral, and a second non-uniform Rx cluster 1034 including a second plurality of non-uniformly spaced Rx antennas 1742 at a second end of the second diagonal.

In some demonstrative aspects, the cross-like topology may reduce trace-loss from chip to antenna.

In some demonstrative aspects, as shown in FIG. 17A, non-uniform MIMO radar antenna 1700 may include localized groups of elements, e.g., clusters 1024 and/or 1044, which may allow to minimize the RF losses from Rx antennas 1042 and/or Tx antennas 1022 to an RF chip, for example, even though a large, e.g., optimal, area of non-uniform MIMO radar antenna 1700 may be utilized.

In some demonstrative aspects, as shown in FIG. 17A, the Tx antenna array 1720 and the Rx antenna array 1740 may be configured such that a convolution of the plurality of Tx antennas 1722 and the plurality of Rx antennas 1742 may result with non-uniform virtual MIMO antenna array 1750, e.g., as described below.

In some demonstrative aspects, as shown in FIG. 17A, the non-uniform virtual MIMO antenna array 1750 may include a plurality of non-uniform virtual clusters 1054 arranged with non-uniform spacing between the plurality of uniform virtual clusters 1054, e.g., as described below.

In some demonstrative aspects, as shown in FIG. 17A, the plurality of non-uniform virtual clusters 1054 may be arranged according to a cross-like topology.

In some demonstrative aspects, as shown in FIG. 17A, a uniform virtual cluster 1054 may include a plurality of non-uniformly-spaced virtual antennas 1752.

In some demonstrative aspects, as shown in FIG. 17A, non-uniform virtual MIMO antenna array 1750 may include 576 virtual elements, e.g., $N_{virt}=24*24=576$.

In some demonstrative aspects, a non-uniform MIMO antenna array, e.g., non-uniform MIMO antenna array 1700, may include 4 non-uniform clusters in a cross like topology, e.g., as shown in FIG. 17A. In other aspects, any other cross-like topology including non-uniform clusters including a plurality of non-uniformly spaced antennas may be implemented, for example, with any other number of non-uniform clusters, and/or any other number of antenna elements in a non-uniform cluster.

In some demonstrative aspects, non-uniform MIMO radar antenna 1700 may spread over a large area, and, therefore, may achieve a high-resolution beam, while using a reduced number of antennas, for example, compared to a number of antennas required for a uniform antenna array to achieve a similar coverage.

In some demonstrative aspects, radiation pattern 1704 depicts an azimuth-elevation radiation pattern of the non-uniform MIMO radar antenna 1700, at a maximum resolution mode, for example, with a radar beam scanned to boresight, e.g., zero degrees.

In some demonstrative aspects, as shown in FIG. 17B, radiation pattern 1704 depicts a narrow beam with a power of unity, which may be observed at the center, while a power at the rest of the space may have a low SLL, e.g., an SLL as low as 0.1 (−10 dB).

In some demonstrative aspects, non-uniform MIMO radar antenna 1700 may provide an increased azimuth resolution, compared to an azimuth resolution achievable by a uniform antenna array, while using a small number of elements, which are clustered in the cross-like topology.

Referring to FIG. 8, in some demonstrative aspects, radar processor 834 may be configured to calibrate a Transmit (Tx) Local Oscillator (LO) leakage (also referred to as "Tx Direct Current (DC) offset") of a MIMO radar including a MIMO radar antenna, e.g., as described below. For example, radar processor 834 may be configured to calibrate a Tx LO leakage of radar frontend 804 including MIMO radar antenna 881.

In some demonstrative aspects, radar processor 834 may be configured to calibrate the Tx LO leakage with respect to leakage of LO signals from an LO to an input of a saturated Power Amplifier (PA) in a Tx path of the MIMO radar. For example, the LO may be implemented, for example, as part of radar front-end 804, and/or the PA may be implemented, for example, as part of radar front-end 804, for example, as part of a Tx chain 810.

In one example, the Tx LO leakage may be created by LO signals leaking from the LO into an RF port of an I/Q modulator, e.g., of the Tx chain 810, and from the I/Q modulator into an input port of the saturated PA.

Figure 18:
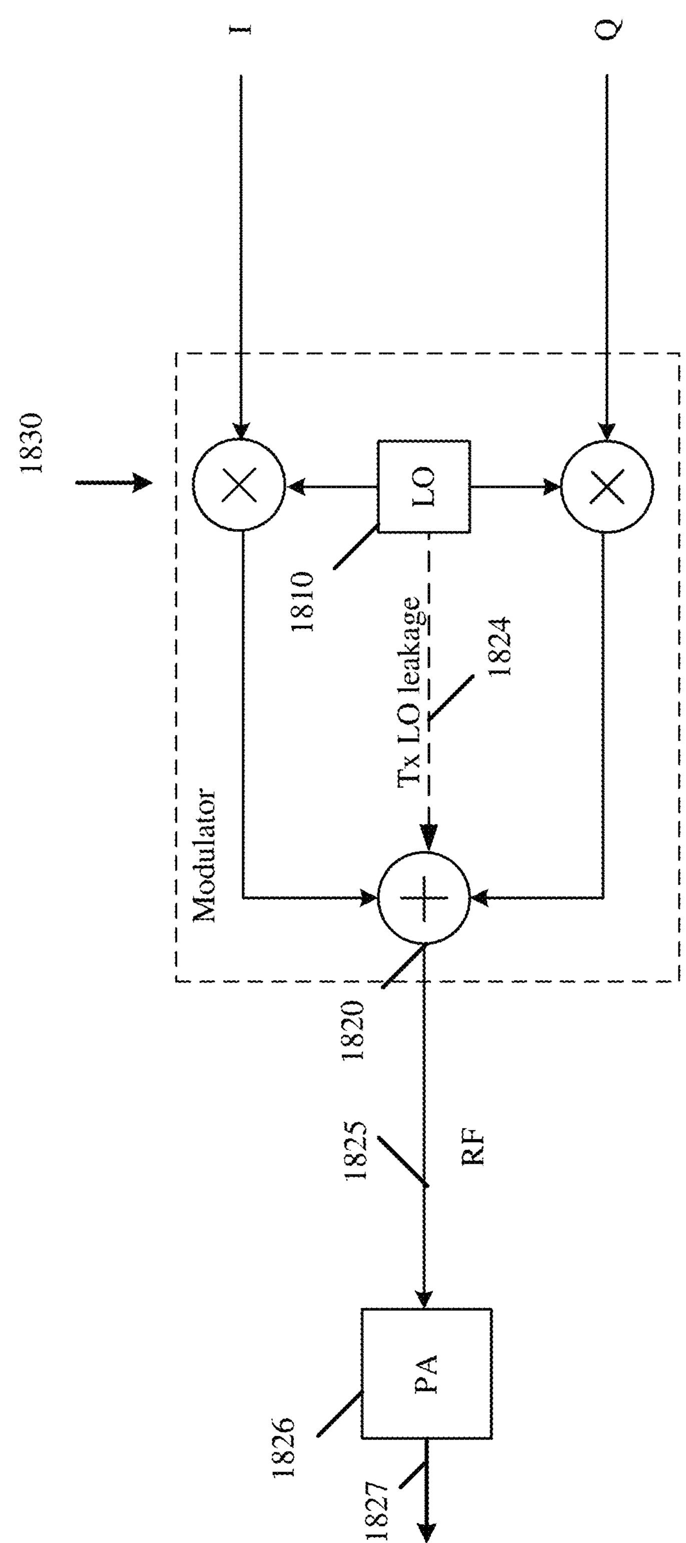
FIG. 18 is a schematic illustration of a Transmit (Tx) Local Oscillator (LO) leakage between elements of a Radio Frequency (RF) chain, to demonstrate a technical problem, which may be addressed in accordance with some demonstrative aspects.

Reference is made to FIG. 18, which schematically illustrates a Tx LO leakage 1824 between elements of an RF chain 1800, to demonstrate a technical problem, which may be addressed in accordance with some demonstrative aspects.

As shown in FIG. 18, the Tx LO leakage 1824 may be created by leakage of LO signals from an LO 1810 into an RF port 1820 of an I/Q modulator 1830.

In one example, an input to a PA 1826 may be based on an RF signal 1825 provided by the RF port 1820 of I/Q modulator 1830.

In one example, PA 1826 may be maintained at a saturated state, for example, to achieve high efficiency for MIMO radar transmission.

In one example, it may be advantageous to ensure that the input to the PA 1826 includes a constant envelope signal, for example, in order to minimize distortion from the saturation of PA 1826. However, the RF signal 1825 at the RF port 1820 may not have a constant envelope, for example, if the Tx LO leakage 1824 is not calibrated, for example, since RF signal 1825 may include a sum of a desired constant envelope signal, e.g., as should be generated by I/Q modulator 1830, and a Tx Lo impairment resulting from the Tx Lo leakage 1824.

As a result of providing to the PA 1826 a non-constant envelope signal, an output 1827 of PA 1826 may include intermodulation products, for example, due to non-linear distortion of PA 1826, e.g., when the Tx LO leakage 1824 is not calibrated.

This impairment of the output 1827 of PA 226 may result in transmission of an impaired radar Tx signal. For example, such impaired radar Tx signal may result in significant degradation of sensitivity of a received radar signal, which is based on the radar Tx signal.

In some demonstrative aspects, there may be a need to provide a technical solution to provide efficient and/or accurate Tx LO leakage calibration, for example, to mitigate an effect of the Tx LO leakage on performance of the MIMO radar.

In some demonstrative aspects, there may be a need to provide a technical solution to provide Tx LO leakage calibration, for example, in real time, e.g., to dynamically mitigate the effect of the Tx LO leakage on performance of the MIMO radar, e.g., post installation and/or maintenance of the MIMO radar.

In some demonstrative aspects, there may be one or more disadvantages, inefficiencies, and/or technical problems, for example, in an implementation relying on external Test Equipment (TE) (TE-based implementation) to calibrate the Tx LO leakage. For example, the TE-based implementation may use the external TE to measure Tx LO leakage levels, and an iterative loop may be applied to calculate Tx DC correction coefficients, for example, to minimize the Tx LO leakage.

In one example, the TE-based implementation may require the use of expensive TE, e.g., to measure the Tx LO leakage levels, and/or may be relatively slow.

In some demonstrative aspects, there may be one or more disadvantages, inefficiencies, and/or technical problems, for example, in an implementation relying on an envelope detection scheme to detect an envelope of the signal to be provided to the PA. For example, the envelope detection scheme may require an Analog to Digital Converter (ADC) to sample the envelope of the signal to be provided to the PA, and an envelope detector, e.g., an Amplitude Modulation (AM) detector, to detect the envelope of the signal. Accordingly, the envelope detection scheme may result in increased chip size and/or increased cost of production.

Referring back to FIG. 8, in some demonstrative aspects, radar processor 834 may be configured to calibrate the Tx LO leakage of one or more Tx chains 810 in radar frontend 804, for example, even without using any external TE, and/or even without an envelope detector, e.g., as described below.

In some demonstrative aspects, radar processor 834 may be configured to calibrate the Tx LO leakage of one or more Tx chains 810 in radar frontend 804 according to a calibration mechanism, which may be based, for example, on an internal Tx to Rx (Tx-Rx) leakage, for example, between Tx antennas 814 and Rx antennas 816, e.g., as described below.

In some demonstrative aspects, radar processor 834 may be configured to calibrate the Tx LO leakage of one or more Tx chains 810 in radar frontend 804, for example, according to a calibration mechanism, which may be based on one or more nonlinear properties of a saturated PA, e.g., as described below.

In some demonstrative aspects, radar processor 834 may be configured to calibrate Tx LO leakages of a plurality of Tx chains 810, e.g., simultaneously, as described below. For example, simultaneous calibration of a plurality of Tx chins may allow reducing the calibration time, e.g., significantly.

In some demonstrative aspects, radar processor 834 may be configured to calibrate the Tx LO leakage of one or more Tx chains 810 in radar frontend 804, for example, based on a leakage calibration signal, e.g., as described below.

In some demonstrative aspects, radar processor 834 may be configured to cause a MIMO radar including radar frontend 804, e.g., MIMO radar 101 (FIG. 1), to transmit a leakage calibration signal via MIMO radar antenna 881, e.g., as described below.

In some demonstrative aspects, the leakage calibration signal may include a continues-wave (CW) signal at a first frequency, and a second harmonic of the CW signal at a second frequency, e.g., as described below.

In some demonstrative aspects, the CW signal may include a constant sinus signal. In other aspects, the CW signal may include any other CW signal.

In some demonstrative aspects, the second frequency may be double the first frequency, e.g., as described below.

In some demonstrative aspects, radar processor 834 may be configured to calibrate the Tx LO leakage of the MIMO radar based on radar Rx data corresponding to the leakage calibration signal, e.g., as described below.

In some demonstrative aspects, input 832 may receive the Rx radar data, e.g., as described below.

In some demonstrative aspects, the Rx radar data may be based on radar signals received via the plurality of Rx antennas 816 of the MIMO radar antenna 881, e.g., as described below.

In some demonstrative aspects, the radar signals may be based on Tx-Rx leakage of the leakage calibration signal to the Rx antennas 816, e.g., as described below.

In some demonstrative aspects, the leakage calibration signal may include a Direct Current (DC) signal, e.g., as described below.

In some demonstrative aspects, an amplitude of the DC signal may be based, for example, on the Tx LO leakage, e.g., as described below.

In some demonstrative aspects, the leakage calibration signal may include a third harmonic of the CW signal at a third frequency, e.g., as described below.

In some demonstrative aspects, the third frequency may be three times the first frequency, e.g., as described below.

In some demonstrative aspects, the leakage calibration signal may include an image signal of the CW signal at a fourth frequency, e.g., as described below.

In some demonstrative aspects, the fourth frequency may be equal to the first frequency with sign-inversion, e.g., as described below.

In other aspects, the leakage calibration signal may include any other additional or alternative signals at any other additional or alternative frequencies.

In some demonstrative aspects, radar processor 834 may be configured to determine a complex phasor of the second harmonic in the radar Rx data, e.g., as described below.

In some demonstrative aspects, radar processor 834 may be configured to calibrate the Tx LO leakage of the MIMO radar, for example, based on the complex phasor of the second harmonic, e.g., as described below.

In some demonstrative aspects, radar processor 834 may be configured to cause the MIMO radar to transmit a plurality of leakage calibration signals including the CW signal at the first frequency, e.g., as described below.

In some demonstrative aspects, radar processor 834 may be configured to process Rx data based on the plurality of leakage calibration signals, for example, to determine a plurality of complex phasors of second harmonics corresponding to the CW signal at the first frequency, e.g., as described below.

In some demonstrative aspects, radar processor 834 may be configured to calibrate the Tx LO leakage of the MIMO radar based on the plurality of complex phasors, e.g., as described below.

In some demonstrative aspects, radar processor 834 may be configured to calibrate the Tx LO leakage of the MIMO radar, for example, based on a plurality of differences between different pairs of complex phasors from the plurality of complex phasors, e.g., as described below.

In some demonstrative aspects, the plurality of differences between different pairs of complex phasors may be utilized to solve a system of equations, for example, to determine one or more correction values to calibrate the Tx LO leakage, e.g., as described below.

In some demonstrative aspects, radar processor 834 may be configured to cause a Tx path of the MIMO radar, e.g., a TX chain 810, to transmit the CW signal at the first frequency via a Tx antenna 814 of the MIMO radar antenna 881, e.g., as described below.

In some demonstrative aspects, radar processor 834 may be configured to calibrate the Tx LO leakage with respect to leakage of LO signals from an LO, e.g., LO 1810 (FIG. 18), to an input of a saturated PA, e.g., PA 1826 (FIG. 18), in the Tx path, e.g., as described below.

In some demonstrative aspects, radar processor 834 may be configured to determine a plurality of complex phasors of second harmonics in the Rx data, e.g., as described below.

In some demonstrative aspects, a complex phasor of the plurality of complex phasors may correspond to a Tx-Rx path including the Tx antenna 814, which corresponds to the Tx chain 810, and an Rx antenna 816 of the plurality of Rx antennas 816, e.g., as described below.

In some demonstrative aspects, radar processor 834 may be configured to calibrate the Tx LO leakage of the Tx path, which corresponds to the Tx chain 810, for example, based on the plurality of complex phasors, e.g., as described below.

In some demonstrative aspects, radar processor 834 may be configured to calibrate the Tx LO leakage of the Tx path, which corresponds to the Tx chain 810, for example, based on an average of the plurality of complex phasors, e.g., as described below.

In some demonstrative aspects, the leakage calibration signal may be generated to include a plurality of CW signals at a plurality of first frequencies, respectively, and a plurality of second harmonics of the CW signals at a plurality of second frequencies, respectively, e.g., as described below.

In some demonstrative aspects, a frequency of the plurality of second frequencies may be double a respective frequency of the plurality of first frequencies, e.g., as described below.

In some demonstrative aspects, radar processor 834 may be configured to cause a plurality of Tx paths of the MIMO radar antenna 881, e.g., corresponding to a plurality of Tx chains 810, to transmit the plurality of CW signals, respectively, e.g., as described below.

In some demonstrative aspects, the plurality of CW signals may be transmitted via the plurality of Tx antennas 814 of the MIMO antenna 881, respectively, e.g., as described below.

In some demonstrative aspects, radar processor 834 may be configured to calibrate the Tx LO leakage of the plurality of Tx paths, for example, by processing Rx data, which is based on the leakage calibration signal including the plurality of CW signals, e.g., as described below.

In some demonstrative aspects, radar processor 834 may be configured to determine a plurality of complex phasors of second harmonics in the Rx data, e.g., as described below.

In some demonstrative aspects, a complex phasor of the plurality of complex phasors may correspond to a Tx path of the plurality of Tx paths, for example, a Tx chain 810, e.g., as described below.

In some demonstrative aspects, radar processor 834 may be configured to calibrate the Tx LO leakage of the plurality of Tx paths based on the plurality of complex phasors, e.g., as described below.

Figure 19:
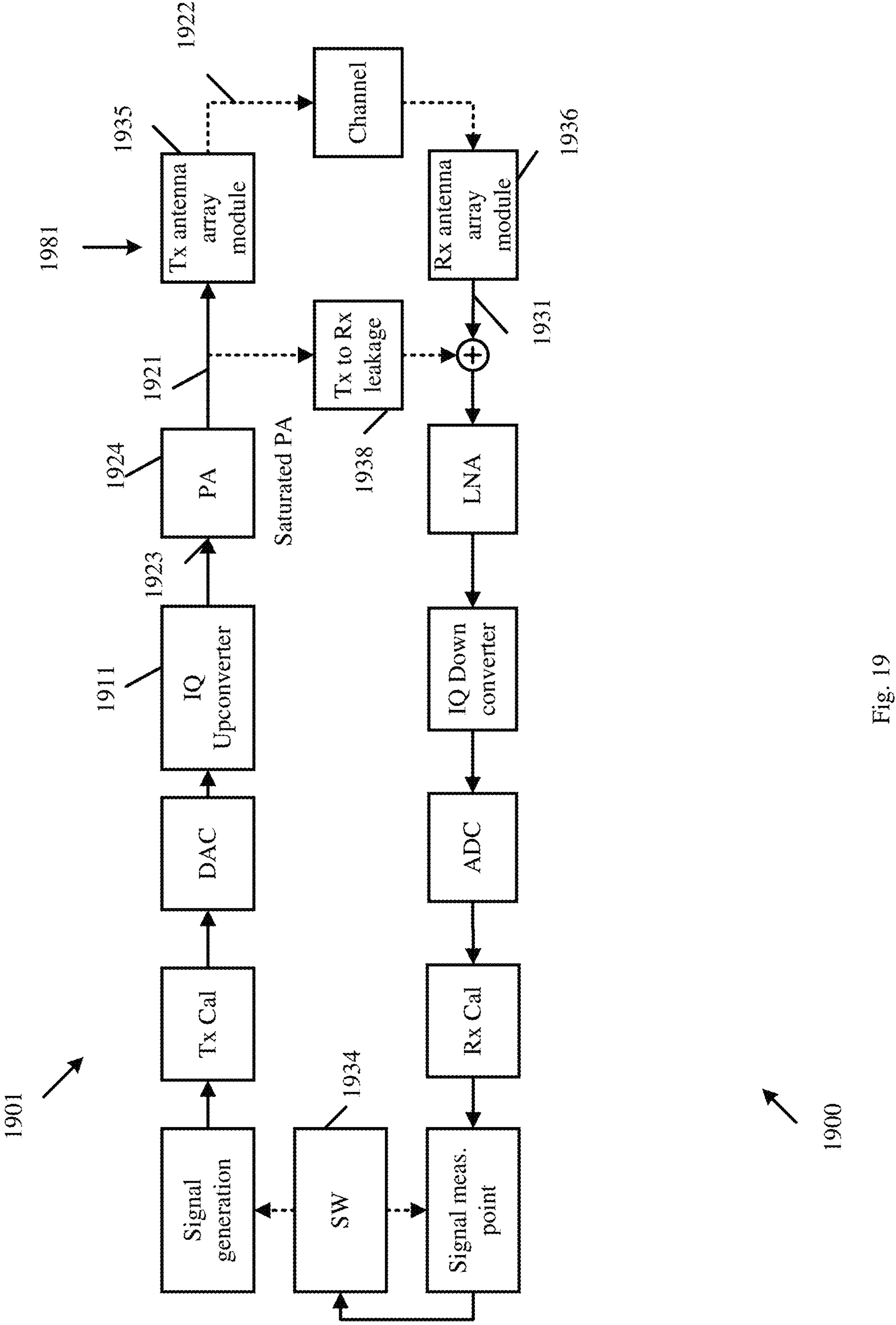
FIG. 19 is a schematic illustration of a calibration scheme to calibrate a Tx LO leakage of a MIMO radar, in accordance with some demonstrative aspects.

Reference is made to FIG. 19, which schematically illustrates a calibration scheme 1900 to calibrate a Tx LO leakage of a MIMO radar, in accordance with some demonstrative aspects.

In some demonstrative aspects, a processor 1934 may be configured to cause the MIMO radar to transmit a leakage calibration signal 1922 via a MIMO radar antenna 1981. For example, radar processor 834 (FIG. 8) may include one or more elements of processor 1934, and/or may perform one or more operations of, and/or one or more functionalities of, processor 1934.

In some demonstrative aspects, processor 1934 may be configured to calibrate the Tx LO leakage of the MIMO radar based on radar Rx data, which may be based on radar signals 1931 received via a plurality of Rx antennas 1936 of the MIMO radar antenna 1981.

In some demonstrative aspects, as shown in FIG. 19, the radar signals 1931 may include a component of Tx-Rx leakage 1938 to the Rx antennas 1936.

In some demonstrative aspects, processor 1934 may be configured to cause a Tx path 1901 of the MIMO radar to transmit the leakage calibration signal 1922 including a CW signal via a Tx antenna of a plurality of Tx antennas 1935 of the MIMO radar antenna 1981.

In some demonstrative aspects, processor 1934 may be configured to calibrate the Tx LO leakage with respect to leakage of LO signals from an LO in an IQ modulator, e.g., LO 1810 (FIG. 18), to an input 1923 of a saturated PA 1924 in the Tx path 1901.

In some demonstrative aspects, processor 1934 may be configured to cause a plurality of Tx paths of the MIMO radar to transmit the leakage calibration signal 1922 including a plurality of CW signals to be transmitted via the plurality of Tx antennas 1935 of the MIMO antenna 1981, respectively.

Reference is made to FIG. 20, which schematically illustrates graphs depicting an input 2000 of a saturated PA, and an output 2010 of the saturated PA, in accordance with some demonstrative aspects.

In one example, input 2000 may represent the leakage calibration signal 1922 (FIG. 19) at input 1923 (FIG. 19) of saturated PA 1924 (FIG. 19); and output 2010 may represent the leakage calibration signal 1922 (FIG. 19) at an output 1921 (FIG. 19) of saturated PA 1924 (FIG. 19).

In some demonstrative aspects, as shown in FIG. 20, the input 2000 of the saturated PA may include a CW signal 2012 at a first frequency. For example, leakage calibration signal 1922 (FIG. 19) at input 1923 (FIG. 19) of saturated PA 1924 (FIG. 19) may include the CW signal 2012 at a frequency of about 110 MHz.

In some demonstrative aspects, as shown in FIG. 20, the input 2000 of the saturated PA may include an image signal 2014 of the CW signal 2012 at a frequency, which may be equal to the first frequency with sign-inversion. For example, leakage calibration signal 1922 (FIG. 19) at input 1923 (FIG. 19) of saturated PA 1924 (FIG. 19) may include the image signal 2014 at a frequency of about (−110) MHz.

In some demonstrative aspects, as shown in FIG. 20, the input 2000 of the saturated PA may include a DC signal 2016, e.g., at a zero frequency. For example, leakage calibration signal 1922 (FIG. 19) at input 1923 (FIG. 19) of saturated PA 1924 (FIG. 19) may include the DC signal 2016 at the zero frequency.

In some demonstrative aspects, as shown in FIG. 20, the output 2010 of the saturated PA may include, for example, the CW signal 2012, the image signal 2014 and the DC signal 2016. For example, leakage calibration signal 1922 (FIG. 19) at output 1921 (FIG. 19) of saturated PA 1924 (FIG. 19) may include the CW signal 2012, the image signal 2014 and the DC signal 2016.

In some demonstrative aspects, as shown in FIG. 20, the output 2010 of the saturated PA may include a second harmonic 2018 of the CW signal 2012 at a second frequency. For example, the second frequency may be double the first frequency of CW signal 2012. For example, leakage calibration signal 1922 (FIG. 19) at output 1921 (FIG. 19) of saturated PA 1924 (FIG. 19) may include the second harmonic 2018 at a frequency of about 220 MHz.

In some demonstrative aspects, as shown in FIG. 20, the output 2010 of the saturated PA may include a third harmonic 2019 of the CW signal 2012 at a third frequency. For example, the third frequency may be three times the first frequency of CW signal 2012. For example, leakage calibration signal 1922 (FIG. 19) at output 1921 (FIG. 19) of saturated PA 1924 (FIG. 19) may include the third harmonic 2019 at a frequency of about 330 MHz.

In one example, the representation of the leakage calibration signal at the output of the saturated PA as shown in FIG. 20, may be based on an assumption that the PA is working in a deep saturated point, and that a Tx IQ imbalance, e.g., of an I/Q modulator in the Tx path prior to the PA, may not be calibrated. For example, the Tx IQ imbalance may be with an uncalibrated value of about −30 dBc.

In some demonstrative aspects, as shown in FIG. 20, the output 2010 of the saturated PA may include strong intermodulation products, e.g., the second harmonic 2018 and/or the third harmonic 2019. These may be, for example, the result of a nonlinearity of the saturated PA, e.g., saturated PA 1924 (FIG. 19).

In some demonstrative aspects, radar processor 834 (FIG. 8) may be configured to use the second harmonic 2018 as a proxy to calibrate the Tx LO leakage, e.g., as described below.

Figure 21A:
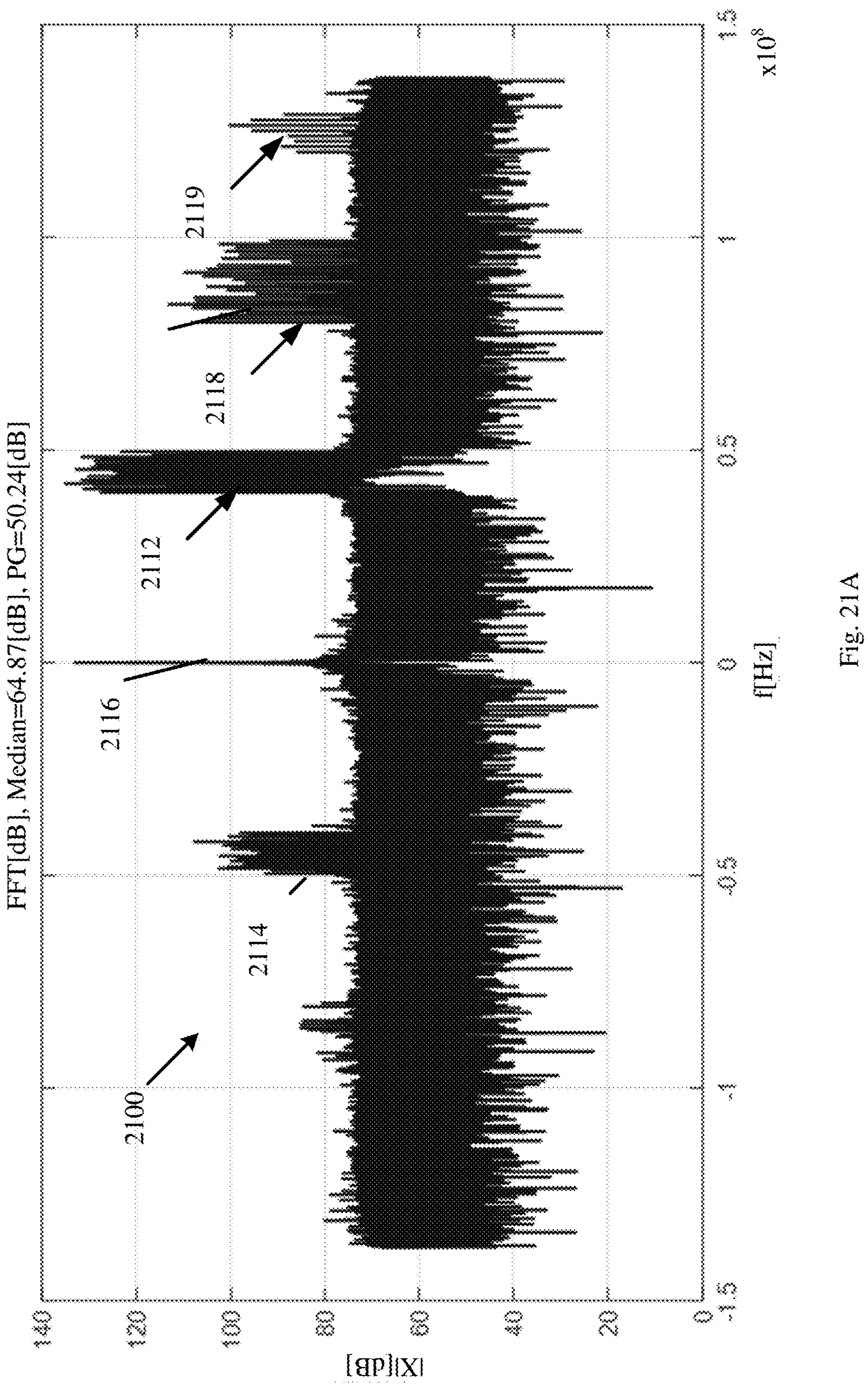
FIG. 21A is a schematic illustration of a leakage calibration signal at an output of a saturated PA.

Reference is made to FIG. 21A, which schematically illustrates a leakage calibration signal 2100 at an output of a saturated PA, and to FIG. 21B, which schematically illustrates first and second portions of the leakage calibration signal 2100, in accordance with some demonstrative aspects.

In one example, leakage calibration signal 2100 may represent the leakage calibration signal 1922 (FIG. 19) at the output 1921 (FIG. 19) of saturated PA 1924 (FIG. 19).

In some demonstrative aspects, as shown in FIGS. 21A and 21B, the leakage calibration signal 2100 may include a plurality of CW signals 2112 at a respective plurality of first frequencies, e.g., in a frequency range between 40-50 MHz. For example, the leakage calibration signal 1922 (FIG. 19) at the output 1921 (FIG. 19) of saturated PA 1924 (FIG. 19) may include the plurality of CW signals 2112 at frequencies in the frequency range between 40-50 MHz.

In some demonstrative aspects, as shown in FIGS. 21A and 21B, the leakage calibration signal 2100 may include a plurality of second harmonics 2118 of the plurality of CW signals 2112 at a plurality of second frequencies, e.g., in a frequency range between 80-100 MHz.

In some demonstrative aspects, a frequency of the plurality of second frequencies may be double a respective frequency of the plurality of first frequencies. For example, the leakage calibration signal 1922 (FIG. 19) at the output 1921 (FIG. 19) of saturated PA 1924 (FIG. 19) may include the plurality of second harmonics 2118 at frequencies in the frequency range between 80-100 MHz. In one example, a CW signal 2112 at a frequency of about 45 MHz may have a corresponding second harmonic 2118 at a frequency of about 90 MHz.

In some demonstrative aspects, as shown in FIG. 21A, the leakage calibration signal 2100 may include a plurality of third harmonics 2119 of the plurality of CW signals 2112 at a plurality of third frequencies, e.g., in a frequency range between 120-150 MHz.

In some demonstrative aspects, a frequency of the plurality of third frequencies may be three times a respective frequency of the plurality of first frequencies. For example, the leakage calibration signal 1922 (FIG. 19) at the output 1921 (FIG. 19) of saturated PA 1924 (FIG. 19) may include the plurality of third harmonics 2119, e.g., in a frequency range between 120-150 MHz. In one example, a CW signal 2112 at a frequency of about 45 MHz may have a corresponding third harmonic 2119 at a frequency of about 135 MHz.

In some demonstrative aspects, as shown in FIG. 21A, the leakage calibration signal 2100 may include a plurality of image signals 2114 of the plurality of CW signal at a plurality of fourth frequencies, e.g., in a frequency range between (−50) MHZ and (−40) MHz.

In some demonstrative aspects, a frequency of the plurality of fourth frequencies may be equal to a respective first frequency with sign-inversion. For example, the leakage calibration signal 1922 (FIG. 19) at the output 1921 (FIG. 19) of saturated PA 1924 (FIG. 19) may include the plurality of image signals 2114 at frequencies in the frequency range between (−50) MHZ and (−40) MHz.

In some demonstrative aspects, as shown in FIG. 21A, the leakage calibration signal 2100 may include a DC signal 2116, e.g., at a zero frequency. For example, the leakage calibration signal 1922 (FIG. 19) at the output 1921 (FIG. 19) of saturated PA 1924 (FIG. 19) may include the DC signal 2116 at the frequency 0 MHz.

In some demonstrative aspects, the leakage calibration signal 2100 may be configured to allow calibrating a plurality of Tx paths of the MIMO radar, e.g., simultaneously, by using the same leakage calibration signal 2100.

In one example, as shown in FIG. 5B, the plurality of second harmonics 2118 of the plurality of CW signals 2112 may be orthogonal to each other. Accordingly, radar processor 834 (FIG. 8) may use the leakage calibration signal 2100 to calibrate a plurality of Tx paths, e.g., simultaneously.

In some demonstrative aspects, radar processor 834 (FIG. 8) may be configured to use the plurality of second harmonics 2118 as a proxy for the Tx LO leakage for the plurality of Tx chains 810 (FIG. 1).

In one example, as shown in FIG. 5B, radar processor 834 (FIG. 8) may configure the plurality of CW signals 2112 to include 24 CW signals, for example, to support calibration of 24 respective Tx path chains 810 (FIG. 8).

Figure 22:
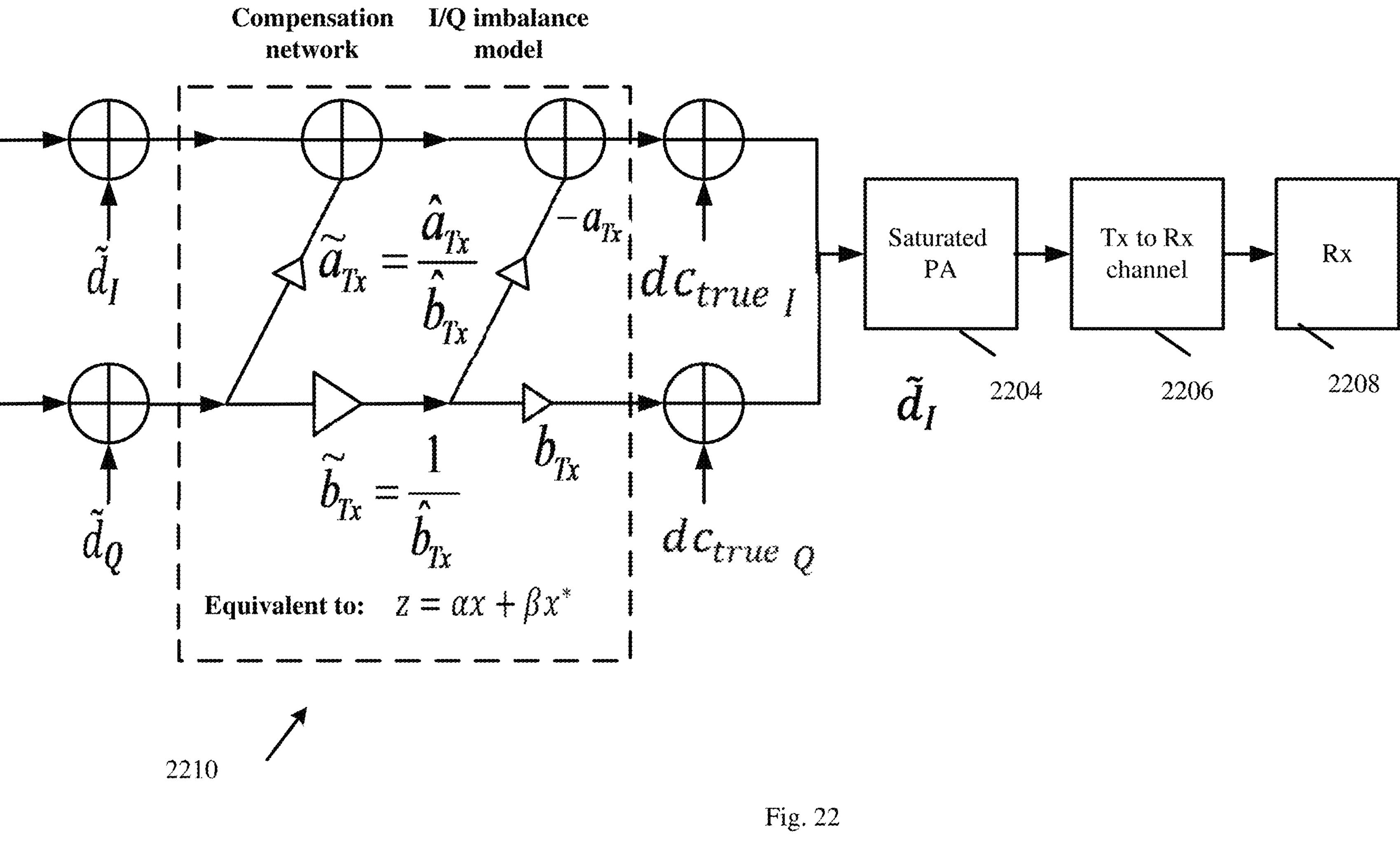
FIG. 22 is s schematic illustration of a Tx LO leakage calibration model, in accordance with some demonstrative aspects.

Reference is made to FIG. 22, which schematically illustrates a Tx LO leakage calibration model 2200, in accordance with some demonstrative aspects.

In one example, radar processor 834 (FIG. 8) may calibrate the Tx LO leakage of radar frontend 804 (FIG. 8), for example, based on the Tx LO leakage calibration model 2200.

In one example, the Tx LO leakage calibration model 2200 may not assume Tx IQ imbalance correction.

In some demonstrative aspects, a Tx IQ imbalance model 2210 may be defined, e.g., as follows:

$$z = ax + \beta x^* \quad (5)$$

wherein a denotes a parameter related to a gain/phase of a Tx path R denotes a parameter relating to a gain/phase imbalance, and x denotes a transmitted signal.

In some demonstrative aspects, the Tx imbalance model (5) may be re-written, for example, with respect to a signal, denoted z, including a Tx LO leakage, e.g., an unknown Tx LO leakage, denoted $dc_{true}$, e.g., as follows:

$$z = \alpha(s + \tilde{d}) + \beta(s^* + \tilde{d}^*) + dc_{true} = \alpha s + \beta s^* + (\alpha\tilde{d} + \beta\tilde{d}^* + dc_{true}) \quad (6)$$

wherein s denotes a transmitted signal, and $\tilde{d}$ denotes a Tx LO leakage correction, e.g., to correct the Tx LO leakage.

In some demonstrative aspects, an effective Tx DC value, denoted d, may be defined, e.g., as follows:

$$d \triangleq \alpha\tilde{d} + \beta\tilde{d}^* + dc_{true} \quad (7)$$

In some demonstrative aspects, Equation 6 may be rewritten based on the definition of the effective Tx DC value in Equation 7, e.g., as follows:

$$z = \alpha s + \beta s^* + d \quad (8)$$

In some demonstrative aspects, a PA model, denoted y(t), of a statured PA 2204, e.g., a standard baseband memoryless PA, may be defined, e.g., as follows:

$$y(t) = \sum_{k=1, k\ odd}^{M} c_k z|z|^{k-1} \quad (9)$$

wherein $c_k$ denotes an unknown complex factor.

In some demonstrative aspects, a model, denoted F, of the leakage calibration signal via the saturated PA 2204 may be defined, for example, based on one or more terms, e.g., the first two terms, of Equation 9. For example, the first two terms of Equation 9 may be sufficient to provide a very good approximation for the leakage calibration signal via the saturated PA 2204. For example, the model F may be defined, e.g., as follows:

$$F = c_1 z + c_2 z|z|^2 \quad (10)$$

wherein $c_1$ denotes an unknown complex factor with respect to a CW signal in the leakage calibration signal, and $c_2$ denotes an unknown complex factor with respect to a Third Intermodulation Product (IM3) in the leakage calibration signal, for example, as may be represented by the second harmonic of the CW signal.

In some demonstrative aspects, the second harmonic of the CW signal, denoted $|z|^2z$, may be determined, e.g., as follows:

$$|z|^2 z = z^2 z^*: \quad (11)$$

$$z^* = \alpha^* s^* + \beta^* s + d^*$$

$$z^2 = (\alpha s + \beta s^* + d)(\alpha s + \beta s^* + d) = \alpha^2 s^2 + \ldots + 2\alpha sd + (d^2 + 2\alpha sd)$$

$$z^2 z^* = s(d^2\beta^* + 2\alpha|d|^2) + s^2(\alpha^2 d^* + 2\alpha\beta^* d)$$

In some demonstrative aspects, an Rx signal 2208 may be based on Tx-Rx leakage of the signal z via a Tx-Rx leakage channel 2206, denoted h.

In some demonstrative aspects, the Rx signal 2208 may be determined based on the Tx-Rx leakage of the signal z, e.g., as follows:

$$F = h(c_1 z + c_2 z^2 z^*) = hc_1(\alpha s + \beta s^* + d) + hc_2(s(d^2\beta^* + 2\alpha|d|^2) + s^2(\alpha^2 d^* + 2\alpha\beta^* d)) \quad (12)$$

In some demonstrative aspects, a first complex phasor, e.g., a fundamental harmonic phasor, denoted $F_1$, of the CW signal in the Rx signal 2208 may be determined, e.g., as follows:

$$F_1 = h(\alpha c_1 + c_2(d^2\beta^* + 2\alpha|d|^2)) \quad (13)$$

In some demonstrative aspects, a second complex phasor, e.g., a second harmonic phasor, denoted $F_2$, of the second harmonic of the CW signal in the Rx signal 2208 may be determined, e.g., as follows:

$$F_2 = hc_2(\alpha^2 d^* + 2\alpha\beta^* d) \quad (14)$$

In some demonstrative aspects, Equation 14 may be rewritten by substituting the effective Tx DC value d according to Equation 7, e.g., as follows:

$$F_2 = \alpha^2(\alpha\tilde{d} + \beta\tilde{d}^* + dc_{true})^* + 2\alpha\beta^*(\alpha\tilde{d} + \beta\tilde{d}^* + dc_{true}) = \gamma_1\tilde{d} + \gamma_2\tilde{d}^* + \widetilde{dc} \quad (15)$$

wherein $$\gamma_1 \triangleq \alpha|a|^2 + 2\alpha^2\beta^*$$

$$\gamma_2 \triangleq \alpha^2\beta^* + 2\alpha|\beta|^2$$

$$\widetilde{dc} \triangleq \alpha^2 dc_{true}^* + 2\alpha\beta^* dc_{true}$$

In some demonstrative aspects, a leakage calibration model may be defined based on Equation 15, e.g., as follows:

$$\begin{vmatrix} y_I^k \\ y_Q^k \end{vmatrix} = \begin{bmatrix} M_{11} & M_{12} \\ M_{21} & M_{22} \end{bmatrix} \begin{bmatrix} m_I \\ m_Q \end{bmatrix} + \begin{bmatrix} dc_I \\ dc_Q \end{bmatrix} \tag{16}$$

wherein $M_{11}$, $M_{12}$, $_{181}$, and 18$_2$, denote four respective unknown channel matrix coefficients of the Tx-Rx leakage channel 2206, e.g., assuming Tx IQ imbalance, wherein $dc_1$ and $dc_q$ denote unknown DC parameters, and $m_1$ and $m_Q$ denote correction factors to calibrate the Tx LO leakage.

In some demonstrative aspects, the model of Equation 16 may include 6 unknown parameters, which may require a system of at least 6 equations, for example, to determine the correction factors $m_1$ and $m_Q$ by solving Equation 16.

In some demonstrative aspects, radar processor 834 (FIG. 8) may be configured to determine three complex phasors, for example, based on three complex phasor measurements. For example, a complex phasor measurement, e.g., each complex phasor measurement, may provide two equations, e.g., as follows:

$$\begin{vmatrix} y_I^1 \\ y_Q^1 \end{vmatrix} = \begin{bmatrix} M_{11} & M_{12} \\ M_{21} & M_{22} \end{bmatrix} \begin{vmatrix} m_I^1 \\ m_Q^1 \end{vmatrix} + \begin{bmatrix} dc_I \\ dc_Q \end{bmatrix} \tag{17}$$

$$\begin{vmatrix} y_I^2 \\ y_Q^2 \end{vmatrix} = \begin{bmatrix} M_{11} & M_{12} \\ M_{21} & M_{22} \end{bmatrix} \begin{vmatrix} m_I^2 \\ m_Q^2 \end{vmatrix} + \begin{bmatrix} dc_I \\ dc_Q \end{bmatrix}$$

$$\begin{vmatrix} y_I^3 \\ y_Q^3 \end{vmatrix} = \begin{bmatrix} M_{11} & M_{12} \\ M_{21} & M_{22} \end{bmatrix} \begin{vmatrix} m_I^3 \\ m_Q^3 \end{vmatrix} + \begin{bmatrix} dc_I \\ dc_Q \end{bmatrix}$$

$$\text{wherein} \left\{ \begin{bmatrix} m_I^1 \\ m_Q^1 \end{bmatrix}, \begin{bmatrix} m_I^2 \\ m_Q^1 \end{bmatrix}, \begin{bmatrix} m_I^3 \\ m_Q^1 \end{bmatrix} \right\}:$$

denote 3 sets of Tx Decision Feedback Equalization (DFE) DC corrections, e.g., to calibrate the Tx LO leakage.

In some demonstrative aspects, a set of three differences between three different pairs of complex phasors may be defined, e.g., as follows:

$$\Delta y_I^1 \triangleq y_I^1 - y_I^3 \tag{18}$$

$$\Delta y_Q^1 \triangleq y_Q^1 - y_Q^3$$

$$\Delta y_I^2 \triangleq y_I^2 - y_I^3$$

$$\Delta y_Q^2 \triangleq y_Q^2 - y_Q^3$$

In some demonstrative aspects, the four unknown channel matrix coefficients of the Tx-Rx leakage channel 2206 may be defined, for example, based on the set of differences in Equation 18, e.g., as follows:

$$\begin{vmatrix} \Delta y_I^1 & \Delta y_I^2 \\ \Delta y_Q^1 & \Delta y_Q^2 \end{vmatrix} = \begin{bmatrix} M_{11} & M_{12} \\ M_{21} & M_{22} \end{bmatrix} \begin{bmatrix} \Delta m_I^1 & \Delta m_I^2 \\ \Delta m_Q^1 & \Delta m_Q^2 \end{bmatrix} \tag{19}$$

$$\begin{bmatrix} M_{11} & M_{12} \\ M_{21} & M_{22} \end{bmatrix} = \begin{vmatrix} \Delta y_I^1 & \Delta y_I^2 \\ \Delta y_Q^1 & \Delta y_Q^2 \end{vmatrix} \cdot \begin{bmatrix} \Delta m_I^1 & \Delta m_I^2 \\ \Delta m_Q^1 & \Delta m_Q^2 \end{bmatrix}^{-1}$$

In some demonstrative aspects, a DC estimation of the Tx LO Leakage may be defined, for example, based on the four unknown channel matrix coefficients of the Tx-Rx leakage channel 2206, e.g., as follows:

$$\begin{bmatrix} \hat{dc}_I \\ \hat{dc}_Q \end{bmatrix} = \frac{1}{3}\left(\begin{bmatrix} y_I^3 \\ y_Q^3 \end{bmatrix} - \begin{bmatrix} M_{11} & M_{12} \\ M_{21} & M_{22} \end{bmatrix}\begin{bmatrix} m_I^3 \\ m_Q^3 \end{bmatrix}\right) + \tag{20}$$

$$\frac{1}{3}\left(\begin{bmatrix} y_I^2 \\ y_Q^2 \end{bmatrix} - \begin{bmatrix} M_{11} & M_{12} \\ M_{21} & M_{22} \end{bmatrix}\begin{bmatrix} m_I^2 \\ m_Q^2 \end{bmatrix}\right) + \frac{1}{3}\left(\begin{bmatrix} y_I^1 \\ y_Q^1 \end{bmatrix} - \begin{bmatrix} M_{11} & M_{12} \\ M_{21} & M_{22} \end{bmatrix}\begin{bmatrix} m_I^1 \\ m_Q^1 \end{bmatrix}\right)$$

In some demonstrative aspects, radar processor 834 (FIG. 8) may determine Tx DC correction values to correct the Tx LO leakage, e.g., as follows:

$$\begin{bmatrix} 0 \\ 0 \end{bmatrix} = \begin{bmatrix} M_{11} & M_{12} \\ M_{21} & M_{22} \end{bmatrix}\begin{bmatrix} \hat{m}_1 \\ \hat{m}_Q \end{bmatrix} + \begin{bmatrix} \hat{dc}_I \\ \hat{dc}_Q \end{bmatrix} \tag{21}$$

$$\begin{bmatrix} \hat{m}_I \\ \hat{m}_Q \end{bmatrix} = -\begin{bmatrix} M_{11} & M_{12} \\ M_{21} & M_{22} \end{bmatrix}^{-1}\begin{bmatrix} \hat{dc}_I \\ \hat{dc}_Q \end{bmatrix}$$

In some demonstrative aspects, the DC estimation of the Tx LO leakage may be determined, for example, assuming $$\begin{bmatrix} m_5 \\ m_6 \end{bmatrix}$$

equals zero, for example, as a reference point, e.g., as follows:

$$\begin{bmatrix} \hat{dc}_I \\ \hat{dc}_Q \end{bmatrix} = \begin{vmatrix} y_I^3 \\ y_Q^3 \end{vmatrix} \tag{22}$$

In some demonstrative aspects, a Tx DC correction value may be determined, for example, by setting Equation 21 to zero, e.g., as follows:

$$\begin{bmatrix} 0 \\ 0 \end{bmatrix} = \begin{bmatrix} M_{11} & M_{12} \\ M_{21} & M_{22} \end{bmatrix}\begin{bmatrix} \hat{m}_I \\ \hat{m}_Q \end{bmatrix} + \begin{bmatrix} y_I^3 \\ y_Q^3 \end{bmatrix} \tag{23}$$

$$\begin{bmatrix} \hat{m}_1 \\ \hat{m}_Q \end{bmatrix} = -\begin{bmatrix} M_{11} & M_{12} \\ M_{21} & M_{22} \end{bmatrix}^{-1}\begin{bmatrix} y_I^3 \\ y_Q^3 \end{bmatrix}$$

In some demonstrative aspects, radar processor 834 (FIG. 8) may determine a Tx DC correction value, for example, based on an average of a plurality of Tx DC correction values corresponding to a plurality of Rx antennas of the MIMO radar, e.g., as follows:

$$\hat{m}_i = \frac{1}{nRx}\sum_{j=1}^{nRx}\hat{m}_{i,j} \tag{24}$$

Referring back to FIG. 8, in one example, radar processor 834 may calibrate the Tx LO leakage of the radar frontend 804, for example, according to one or more of the following operations:

Cause a plurality of Tx paths of radar frontend 804 to transmit a plurality of CW signals via a plurality of Tx antennas/

Determine three complex phasor harmonic measurements of three respective second harmonics, for example, by performing one or more of the following operations, e.g., for each complex phasor measurement:

Set a Tx digital correction to a relatively small correction value, for example, $[0,0]^T$, $[0, \Delta]^T$ and $[\Delta, 0]^T$ with $\Delta$~0.1, e.g., a full scale of correction values.

Determine a second harmonic level, denoted $$y_{i,j}^{k}$$

of a Tx-Rx path, wherein i denotes a Tx index, j denotes an Rx index, and k denotes a measurement index. For example, the second harmonic level may be determined by extracting the complex phasor, for example, using FFT and a Numerically Controlled Oscillator (NCO).

Estimate a TX DC correction, for example, by performing one or more of the following operations:

For each Tx-Rx path, estimate a Tx DC correction, for example, using a solution of a simple 2×2 system of equations, e.g., the Equation system 23.

Average a Tx DC correction for a Tx path, for example, based on an average of TX DC corrections of a plurality of Rx paths.

Set Tx DC correction values in a digital Tx calibration.

In other example, radar processor 834 may calibrate the Tx LO leakage, for example, according to any other additional or alternative operation and or method.

In some demonstrative aspects, calibration of the Tx LO leakage of frontend 804 based on the leakage calibration signal, e.g., as described above, may provide a technical solution, which may be robust to a Tx IQ imbalance and/or an Rx DC, for example, as the calibration of the Tx LO leakage may be performed based on the second harmonic.

Some demonstrative aspects may be configured to determine the Tx LO leakage calibration according to a Gauss-Newton-based algorithm, for example, by estimating a Jacobian matrix, e.g., as described above. However, in other aspects, one or more other optimization techniques may be implemented, for example, a gradient descend algorithm and/or a Levenberg-Marquardt algorithm.

In some demonstrative aspects, calibration of the Tx LO leakage of the MIMO radar 101 (FIG. 1) may be implemented with respect to any MIMO system that uses a constant envelope signal with a saturated PA.

Reference is made to FIG. 23, which schematically illustrates graphs depicting a pre-calibration spectrum 2310 of an Rx signal, and a post-calibration spectrum 2320 of the Rx signal, in accordance with some demonstrative aspects.

For example, post-calibration spectrum 2320 may represent simulation results of an Rx signal based on a Tx signal transmitted via a plurality of Tx paths, which may be calibrated, for example, using to calibration signal 2100 (FIG. 21).

In some demonstrative aspects, as shown in FIG. 23, pre-calibration spectrum 2310 may include a plurality of CW signals 2312, a plurality of image signals 2314 of the plurality of CW signals 2312, and a plurality of second harmonics 2318 of the plurality of CW signals 2312.

In one example, the plurality of CW signals 2312 may include 24 signals, the plurality of image signals 2314 may include 24 signals, and the plurality of second harmonics 2318 may include 24 signals.

In some demonstrative aspects, as shown in FIG. 23, post-calibration spectrum 2320 may include the plurality of CW signals 2312, and the plurality of image signals 2314 of the plurality of CW signals 2312.

In some demonstrative aspects, as shown in FIG. 23, the plurality of second harmonics 2318 of the plurality of CW signals 2312 may be under a noise level of post-calibration spectrum 2320.

Reference is made to FIG. 24, which schematically illustrates a method of calibrating Tx LO leakage, in accordance with some demonstrative aspects. For example, one or more of the operations of the method of FIG. 24 may be performed by a radar processor, e.g., radar processor 834 (FIG. 8).

As indicated at block 2402, the method may include calibrating Tx LO leakage of a MIMO radar including a MIMO radar antenna. For example, radar processor 834 (FIG. 8) may calibrate the Tx LO leakage of the MIMO radar including the MIMO radar antenna 881 (FIG. 8), e.g., as described above.

As indicated at block 2404, calibrating the Tx LO leakage may include causing the MIMO radar to transmit a leakage calibration signal via the MIMO radar antenna, the leakage calibration signal including a continues-wave (CW) signal at a first frequency, and a second harmonic of the CW signal at a second frequency, the second frequency is double the first frequency. For example, radar processor 834 (FIG. 8) may cause radar frontend 804 (FIG. 8) to transmit the leakage calibration signal 2100 (FIG. 21) via the MIMO radar antenna 881 (FIG. 8), e.g., as described above.

As indicated at block 2406, calibrating the Tx LO leakage may include calibrating the Tx LO leakage of the MIMO radar based on radar Rx data corresponding to the leakage calibration signal. For example, radar processor 834 (FIG. 8) may calibrate the Tx LO leakage of radar frontend 804 (FIG. 8) based on the radar Rx data corresponding to the leakage calibration signal, e.g., as described above.

As indicated at block 2408, calibrating the Tx LO leakage based on the radar Rx data may include receiving the Rx radar data, the Rx radar data based on radar signals received via a plurality of Rx antennas of the MIMO radar antenna, the radar signals based on Tx-Rx leakage of the leakage calibration signal to the Rx antennas.

For example, input 832 (FIG. 8) may receive the Rx radar data based on radar signals received via the plurality of Rx antennas 816 (FIG. 8), e.g., as described above.

Referring to FIG. 8, in some demonstrative aspects, radar processor 834 may be configured to process high bandwidth (BW) digital radar Rx data, for example, in a digital-domain, e.g., as described below.

In some demonstrative aspects, input 832 may be configured to receive the Rx radar data 811 including the high BW digital radar Rx data.

In some demonstrative aspects, the high BW digital radar Rx data may have a bandwidth of at least 500 Megahertz (MHz), e.g., as described below.

In one example, the high BW digital radar Rx data may have a bandwidth of at least 1 Gigahertz (GHz).

In one example, the high BW digital radar Rx data may have a bandwidth of at least 2 GHz.

In other aspects, the high BW digital radar Rx data may be configured according to any other BW.

In some demonstrative aspects, the high BW digital radar Rx data may have a dynamic range with an Effective Number Of Bits (ENOB) of at least 8, e.g., as described below. In other aspects, the high BW digital radar Rx data may have any other dynamic range and/or ENOB.

In some demonstrative aspects, the high BW digital radar Rx data may include a high BW digital Rx chirp signal, e.g., as described below.

In some demonstrative aspects, the high BW digital Rx chirp signal may be based on an analog Rx chirp signal, which may be transmitted from Tx antennas 814 and received by Rx antennas 816, e.g., as described below.

In some demonstrative aspects, the plurality of Rx antennas 816 may receive a plurality of Rx chirp signals, respectively. For example, the plurality of Rx chains 812 may be configured to generate a plurality of analog Rx chirp signals, for example, based on the Rx chirp signals received via antennas 816.

In some demonstrative aspects, an Rx chain 812 may generate an analog Rx chirp signal, for example, based on a Tx chirp signal, e.g., transmitted by one or more of Tx antennas 814.

In some demonstrative aspects, radar frontend 804 may be configured to convert the analog Rx chirp signal into the high BW digital Rx chirp signal, e.g., as described below.

In some demonstrative aspects, radar frontend 804 may include a high BW Analog to Digital Converter (ADC), e.g., high BW ADC 2520 as described below with reference to FIG. 25, to convert the analog Rx chirp signal into the high BW digital Rx chirp signal, e.g., as described below.

In some demonstrative aspects, the high BW ADC may be included and/or implemented, for example, as part of the plurality of Rx chains 812, e.g., as described below. In one example, the plurality of Rx chains 812 may include, for example, a plurality of respective high BW ADCs.

In some demonstrative aspects, radar processor 834 may be configured to process the high BW digital Rx chirp signal provided by the high BW ADC, e.g., as described below.

In some demonstrative aspects, implementing the high BW ADC to convert the analog chirp signal into the high BW digital Rx chirp signal may support a technical solution for processing the Rx chirp signal in the digital domain, e.g., as described below.

In some demonstrative aspects, implementing the high BW ADC to convert the analog chirp signal into the high BW digital Rx chirp signal may support a technical solution for processing the Rx chirp signal, for example, while utilizing information of the Rx chirp signal in a wide BE, for example, even substantially the entire BW of the Rx chirp signal, e.g., as described below.

In some demonstrative aspects, radar processor 834 may be configured to determine cross-correlated (XCORR) radar Rx data, for example, based on the high BW digital Rx chirp signal.

In some demonstrative aspects, radar processor 834 may be configured to generate the radar information 813, for example, based on the XCORR radar Rx data.

In some demonstrative aspects, implementing the high BW ADC to convert the analog Rx chirp signal into the high BW digital Rx chirp signal may support a technical solution for determining the XCORR radar Rx data in the digital domain, for example, while avoiding an operation of a de-chirp on the analog Rx chirp signal in the analog domain.

For example, applying the de-chirp method on the analog Rx radar signal in the analog domain may allow using an ADC with a low BW to generate a low BW digital signal for processing in the digital domain. For example, the low BW digital signal may be processed with a relatively small Fast Fourier Transform (FFT) in the digital-domain. However, there may be several technical issues and/or disadvantages in utilizing the de-chirp method and/or the low BW ADC. For example, the de-chirp method and/or the low BW ADC may result in loss of information carried by the Rx chirp signal. For example, the digital signal after the low BW ADC may carry only part of the information from the Rx chirp signal.

In some demonstrative aspects, configuring radar front end 804 to convert the analog Rx chirp signal into the high BW digital Rx chirp signal, and/or configuring radar processor 834 to determine the XCORR radar Rx data based on the high BW digital Rx chirp signal, may provide one or more technical advantages, e.g., as described below.

In some demonstrative aspects, configuring frontend 804 to provide the high BW digital Rx chirp signal to radar processor 834 may provide a technical solution capable of supporting one or more Tx coding and/or modulation schemes, which may be applied to the Tx chirp signal. These Tx coding and/or modulation schemes may not be supported, for example, by the analog de-chirp method and/or the low BW ADC.

For example, configuring frontend 804 to provide the high BW digital Rx chirp signal to radar processor 834 may provide a technical solution capable of supporting coding of the Tx chirp signal according to one or more coding schemes, for example, a phase coding scheme, a frequency coding scheme, a magnitude coding scheme, and/or any coding scheme. At least some of these coding schemes may not be supported by implementations utilizing the analog de-chirp method and/or the low BW ADC.

In some demonstrative aspects, in some use cases, scenarios, and/or implementations, there may be a need to address one or more technical issues, for example, when processing the high BW digital Rx chirp signal in the digital domain, e.g., as described below.

In some demonstrative aspects, radar processor 834 may be configured to determine the XCORR radar Rx data, for example, based on a correlation between the high BW digital Rx chirp signal and a template mask in the digital domain, e.g., as described below.

In some demonstrative aspects, radar processor 834 may be configured to determine the XCORR radar Rx data, for example, by converting the high BW digital Rx chirp signal into a frequency domain, and applying the template mask to the high BW digital Rx chirp signal in the frequency domain, e.g., as described below.

In some demonstrative aspects, the template mask may correspond to a Tx chirp signal, e.g., the Tx chirp signal based on which the Rx chirp signal was received, as described above.

In some demonstrative aspects, a length of the template mask may correspond to a length of the Tx chirp signal. Accordingly, in some use cases, implementations and/or scenarios, the template mask may be relatively long, for example, when the Tx chirp signal is relatively long and/or when the Rx chirp signal is generated with a relatively high sampling rate.

In some demonstrative aspects, radar frontend 804 may be configured to support relatively long Tx chirp signals and/or generating the high BW digital Rx chirp signal according to a high sampling rate, e.g., as described below.

In some demonstrative aspects, utilizing long Tx chirp signals, and/or generating the high BW digital Rx chirp signal according to a high sampling rate may provide one or more technical advantages, for example, a high Signal to Noise Ratio (SNR), and/or a better integration time.

In some demonstrative aspects, a digital filter, for example, a digital matched filter, may be utilized to apply the template mask to the high BW digital Rx chirp signal in the time domain.

In some demonstrative aspects, one or more technical aspects of the digital filter, for example, a computational complexity, a hardware size, a cost, and/or power consumption, may be based on the length of the template mask to be applied to the high BW digital Rx chirp signal in the time domain. For example, configuring a digital filter for a relatively long template mask may result in a digital filter having a high computational complexity, a large hardware size, a high cost, and/or high power consumption.

In one example, an increase in a BW of a digital Rx chirp signal may result in an increase, e.g., a linear increase, in the length of the template mask.

For example, a Tx chirp having a length of 50 microseconds (us), which is sampled at a sampling rate of 250 MHz may result in a corresponding template mask length of 12500 samples, e.g., 50 us×250 Mhz=12500 samples. A digital masked filter configured for this template mask length may utilize an FFT size of about 32K samples. Such an FFT size may result in a hardware size of about 4 square millimeters (mm^2). For example, increasing the sampling rate to 500 MHZ may result in a template mask length of 25000 samples, e.g., 50 us×500 Mhz=25000 samples. A digital masked filter configured for this template mask length may utilize an FFT size of about 64K samples.

In some demonstrative aspects, radar processor 834 may be configured to process the high BW digital Rx chirp signal, for example, according to a processing scheme, which may provide a technical solution to support a reduced computation complexity, a reduced hardware area, a reduced cost, and/or a reduced power consumption, e.g., as described below.

In some demonstrative aspects, radar processor 834 may be configured to split the template mask into a plurality of mask segments, e.g., as described below.

In some demonstrative aspects, radar processor 834 may be configured to transform a plurality of time-domain segments of the high BW digital Rx chirp signal into a respective plurality of frequency-domain Rx chirp segments, e.g., as described below.

In some demonstrative aspects, radar processor 834 may be configured to generate a plurality of masked segments, for example, by multiplying the plurality of mask segments with the plurality of frequency-domain Rx chirp segments, respectively, e.g., as described below.

In some demonstrative aspects, radar processor 834 may be configured to generate the XCORR Rx radar data based on a combination of the plurality of masked segments, e.g., as described below.

Figure 25:
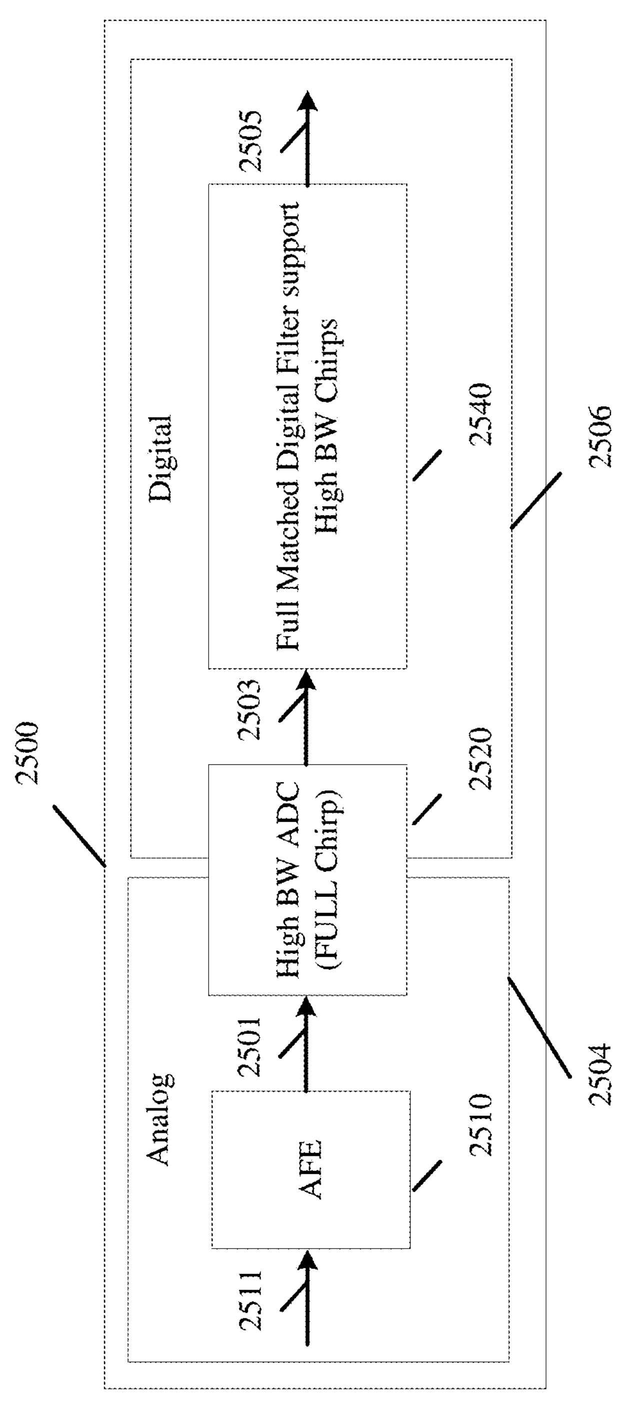
FIG. 25 is a schematic illustration of an apparatus configured to process an Rx chirp signal, in accordance with some demonstrative aspects.

Reference is made to FIG. 25, which schematically illustrates an apparatus 2500 configured to process an Rx chirp signal, in accordance with some demonstrative aspects.

In some demonstrative aspects, as shown in FIG. 25, apparatus 2500 may include a high BW ADC 2520 configured to convert an analog Rx chirp signal 2501 from an analog domain 2504 into a digital-domain 2506, e.g., as described below.

In some demonstrative aspects, high BW ADC 2520 may be configured to convert analog Rx chirp signal 2501 into a high BW digital Rx chirp signal 2503, e.g., as described below. For example, radar front-end 804 (FIG. 1), may include high BW ADC 2520, and/or may perform one or more operations and/or functionalities of high BW ADC 2520.

In some demonstrative aspects, the high BW digital Rx chirp signal 2503 may have a bandwidth of at least 500 MHz, e.g., as described below.

In some demonstrative aspects, the high BW digital Rx chirp signal 2503 may have a bandwidth of at least 1 GHz, e.g., as described below.

In some demonstrative aspects, the high BW digital Rx chirp signal 2503 may have a bandwidth of at least 2 GHz, e.g., as described below.

In other aspects, the high BW digital Rx chirp signal 2503 may have any other BW.

In some demonstrative aspects, high BW ADC 2520 may be configured to generate the high BW digital Rx chirp signal 2503 having a dynamic range with an ENOB of at least 8, e.g., as described below.

In some demonstrative aspects, high BW ADC 2520 may be configured to generate the high BW digital Rx chirp signal 2503 having any other dynamic range and/or ENOB.

In some demonstrative aspects, the analog Rx chirp signal 2501 may be based on a Tx chirp signal. For example, the analog Rx chirp signal 2501 may be based on a Tx chirp signal from Tx antennas 814 (FIG. 8), e.g., as described above.

In some demonstrative aspects, the Tx chirp signal may include a coded Tx chirp signal. For example, radar frontend 804 (FIG. 8) may be configured to encode the Tx chirp signal according to a phase coding scheme, a frequency coding scheme, a magnitude coding scheme, and/or any other coding scheme, e.g., as described above.

In some demonstrative aspects, as shown in FIG. 25, apparatus 2500 may include an Analog Front End (AFE) 210 configured to provide the analog Rx chirp signal 2501, for example, based on a signal 2511 from an Rx antenna, e.g., an Rx antenna 816 (FIG. 1). For example, AFE 210 may be configured to perform one or more analog processing operations to the analog Rx chirp signal. For example, AFE 210 may be configured to generate analog Rx chirp signal 2501 by down-converting a frequency of the signal 2511, applying suitable gain and/or anti-aliasing filtering, and/or any other operation. For example, radar front-end 804 (FIG. 1), may include one or more elements of AFE 210, and/or may perform one or more operations and/or functionalities of AFE 210.

In one example, at least one Rx path 812 (FIG. 8), e.g., each Rx path 812 (FIG. 8), may include AFE 210 to provide analog Rx chirp signal 2501, e.g., based on a signal from a respective Rx antenna 816 (FIG. 8); and/or high BW ADC 2520 to convert the analog Rx chirp signal 2501 into a corresponding high BW digital Rx chirp signal 2503.

In some demonstrative aspects, high BW ADC 2520 may be configured to convert substantially a full BW of the analog Rx chirp signal 2501 into the high BW digital Rx chirp signal 2503, e.g., as described below.

In some demonstrative aspects, as shown in FIG. 25, apparatus 2500 may include a digital matched filter 2540 configured to generate XCORR radar Rx data 2505 based on a correlation between the high BW digital Rx chirp signal 2503 and a template mask corresponding to the Tx chirp signal. For example, radar processor 834 (FIG. 1), may include one or more elements of digital matched filter 2540, and/or may perform one or more operations and/or functionalities of digital matched filter 2540.

In some demonstrative aspects, a length of the template mask may correspond to a length of the Tx chirp signal, e.g., as described above.

In some demonstrative aspects, the length of the template mask may be, for example, at least 20000 samples.

In some demonstrative aspects, the length of the template mask may be, for example, at least 25000 samples.

In some demonstrative aspects, the length of the template mask may be, for example, at least 50000 samples.

In some demonstrative aspects, the length of the template mask may be, for example, at least 70000 samples.

In other aspects, the template mask may have any other length.

In some demonstrative aspects, digital matched filter 2540 may be configured to split the template mask into a plurality of mask segments, e.g., as described below.

In some demonstrative aspects, the plurality of mask segments may include 2 mask segments, e.g., as described below.

In some demonstrative aspects, the plurality of mask segments may include at least 4 mask segments.

In some demonstrative aspects, the plurality of mask segments may include at least 6 mask segments.

In some demonstrative aspects, the plurality of mask segments may include at least 8 mask segments.

In other aspects, digital matched filter 2540 may split the template mask into any other number of mask segments.

In some demonstrative aspects, digital matched filter 2540 may be configured to transform a plurality of time-domain segments of the high BW digital Rx chirp signal 2503 into a respective plurality of frequency-domain Rx chirp segments, e.g., as described below.

In some demonstrative aspects, digital matched filter 2540 may be configured to apply an FFT to transform the plurality of time-domain segments of the high BW digital Rx chirp signal 2503 into the respective plurality of frequency-domain Rx chirp segments, e.g., as described below.

In other aspects, any other transformation and/or operation may be implemented to transform one or more of the time-domain segments of the high BW digital Rx chirp signal 2503 into one or more respective frequency-domain Rx chirp segments.

In some demonstrative aspects, digital matched filter 2540 may be configured to transform a time-domain segment of the high BW digital Rx chirp signal 2503 into a frequency-domain Rx chirp segment, for example, by applying to the time-domain segment of the high BW digital Rx chirp signal 2503 an FFT having an FFT size, which may be based on a length of a mask segment to be multiplied by the frequency-domain Rx chirp segment, e.g., as described below.

In some demonstrative aspects, the FFT size may be no more than 64000 samples.

In some demonstrative aspects, the FFT size may be no more than 32000 samples.

In other aspects, the FFT may have any other size.

In some demonstrative aspects, digital matched filter 2540 may be configured to generate a plurality of masked segments by multiplying the plurality of mask segments with the plurality of frequency-domain Rx chirp segments, respectively, e.g., as described below.

In some demonstrative aspects, digital matched filter 2540 may be configured to generate the XCORR Rx radar data 2505, for example, based on a combination of the plurality of masked segments, e.g., as described below.

In some demonstrative aspects, radar processor 834 (FIG. 8) may be configured to generate radar information 813 (FIG. 8), for example, based on the XCORR radar Rx data 2505.

In some demonstrative aspects, digital matched filter 2540 may be configured to process the high BW digital Rx chirp signal 2503, for example, according to an overlap and save procedure.

In one example, an overlap and save procedure may include applying an FFT to a signal, multiplying the signal with a mask template, applying an IFFT to the results, and discarding samples of the mask template, e.g., a cyclic convolution.

For example, the overlap and save procedure may be defined, e.g., as follows:

$$M = \text{length}(h);$$

$$L = M;$$

$$\text{C\_full} = \text{xcorr\_overlap\_and\_save}(x, h, L);$$

wherein M denotes a length of a template mask, denoted h; x denotes a signal to which the mask h is to be applied, e.g., the high BW digital Rx chirp signal 2503; L denotes a segment length for the overlap and save procedure, and C_full denotes a full result of the overlap and save procedure, which may be based on the template mask h, the signal x and the segment length L.

In some demonstrative aspects, digital matched filter 2540 may be configured to perform an overlap and save procedure, for example, with a plurality of mask segments of template mask h, e.g., with two mask segments denoted h1 and h2. In one example, the plurality of mask segments may be determined by splitting the template mask into a plurality of equal parts. For example, mask segments h1 and h2 may be determined by splitting the mask h into two equal segments, e.g., h1=h(1:M/2); h2=h(M/2+1:end).

In other aspects, the template mask h may be split, for example, into any other number of segments of any other size and/or configuration.

In some demonstrative aspects, digital matched filter 2540 may repeat the overlap and save procedure with respect to the plurality of mask segments, e.g., once for the mask segment h1 and once for the mask segment h2, e.g., as described below.

In some demonstrative aspects, digital matched filter 2540 may combine results of the overlap and save procedure applied to the plurality of mask segments. For example, digital matched filter 2540 may combine a first result, denoted "c1", of the overlap and save procedure for the mask segment h1, with a second result, denoted "c2", of the overlap and save procedure for the mask segment h2, for example to determine a combined masked result, denoted c3.

In some demonstrative aspects, digital matched filter 2540 may combine results of the overlap and save procedure applied to the plurality of mask segments, for example, by shifting the result c2, e.g., using zeros, and concatenating the shifted result c2 with the result c1.

In some demonstrative aspects, combined masked result c3 may be equal to a result of applying the overlap and save procedure for the full mask h.

In one example, digital matched filter 2540 may be configured to reconstruct, e.g., exactly reconstruct, a full filtered signal based on the full mask h, e.g., the full result C_full, for example, by performing the overlap and save procedure with respect to the mask segments h1 and h2, e.g., as follows:

$$h1 = h(1{:}M/2);$$

$$h2 = h(M/2+1{:}\text{end});$$

$$c1 = \text{xcorr\_overlap\_and\_save}\ (x, h1, L);$$

$$c2 = \text{xcorr\_overlap\_and\_save}\ (x, h2, L);$$

-continued $$c2 = c2(M/2+1:\text{end}); \text{zeros}(M/2, 1)];$$

$$c2 = c2(1:\text{length}(c1));$$

$$c3 = c1 + c2;$$

In some demonstrative aspects, it may be shown that C_full==c3.

In one example, the size M of the template mask, may impact an FFT size of an FFT operation of the overlap and save procedure. For example, an FFT size greater than two times the size of the template mask M may be needed, for example, to provide utilization greater than 50%.

In some demonstrative aspects, performing the overlap and save procedure based on the mask segments, e.g., instead of on the full mask size M, may provide a technical solution to reduce the size of the FFT engines, e.g., which may be based on the size of the mask segments, h1 and h2, e.g., a size of M/2 for two mask segments, for example, instead of the size M of the full mask h.

Figure 26:
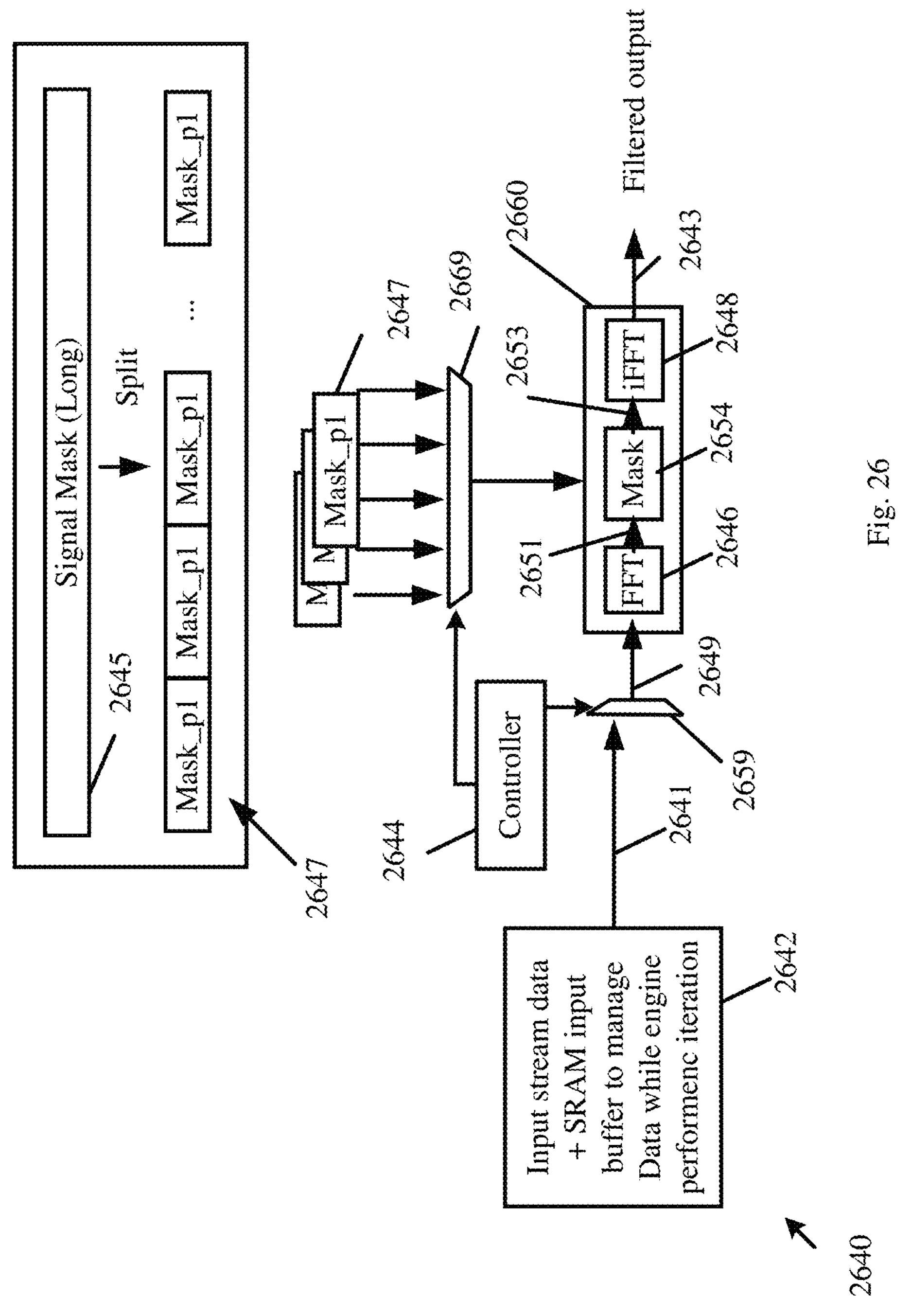
FIG. 26 is a schematic illustration of a digital matched filter, in accordance with some demonstrative aspects.

Reference is made to FIG. 26, which schematically illustrates a digital matched filter 2640, in accordance with some demonstrative aspects. For example, digital matched filter 2540 (FIG. 25), may include one or more elements of digital matched filter 2640, and/or may perform one or more operations and/or functionalities of digital matched filter 2640.

In some demonstrative aspects, as shown in FIG. 26, digital matched filter 2640 may be configured to generate XCORR radar Rx data 2643, for example, based on a correlation between a high BW digital Rx chirp signal 2641 and a template mask 2645 corresponding to a Tx chirp signal.

In some demonstrative aspects, as shown in FIG. 26, digital matched filter 2640 may include a memory 2642 to store one or more incoming streams, for example, including stream of a high BW digital Rx chirp signal, e.g., high BW digital Rx chirp signal 2503 (FIG. 25). In one example, memory 838 (FIG. 8) may include memory 2642.

In one example, memory 2642 may store data pending for processing by digital matched filter 2640, for example, until calculation and/or processing of a current stream is finished.

In some demonstrative aspects, as shown in FIG. 26, digital matched filter 2640 may include a controller 2644, which may be configured to split the template mask 2645 into a plurality of mask segments 2647. For example, radar processor 834 (FIG. 8) and/or digital matched filter 2540 (FIG. 25) may include one or more elements of controller 2644, and/or may perform one or more operations and/or functionalities of controller 2644.

In some demonstrative aspects, controller 2644 may be configured to determine, for example, a suitable mask split for splitting template mask 2645 into mask segments 2647. For example, controller 2644 may be configured to determine count and/or a length of mask segments 2647.

In some demonstrative aspects, controller 2644 may be configured to dynamically update the mask split, for example, at any given time.

In some demonstrative aspects, controller 2644 may be configured to manage the storage of input streams in memory 2642. For example, controller 2644 may be configured to store the high BW digital Rx chirp signal 2641 in memory 2642, and/or to selectively retrieve from memory 2642 segments of the high BW digital Rx chirp signal 2641 for processing, e.g., as described below.

In some demonstrative aspects, controller 2644 may be configured to control a multiplexer 2659, for example, to selectively provide a plurality of time-domain segments 2649 of the digital Rx chirp signal 2641.

In some demonstrative aspects, controller 2644 may be configured to control multiplexer 2659, for example, to provide plurality of time-domain segments 2649 configured for correlation with the mask segments 2647. In one example, a count of the time-domain segments 2649 may be based on the count of mask segments 2647. In another example, a length of the time-domain segments 2649 may be based on the length of mask segments 2647.

In some demonstrative aspects, as shown in FIG. 26, digital matched filter 2640 may include a masking block ("mask applier") 2660 configured to apply the plurality of mask segments 2647 to the plurality of time-domain segments 2649, e.g., as described below.

In some demonstrative aspects, controller 2644 may be configured to control a multiplexer 2669, for example, to selectively provide the plurality of mask segments 2647 to the mask applier 2660. For example, controller 2644 may be configured to control multiplexer 2659 and multiplexer 2669, for example, such that multiplexer 2659 is to provide to mask applier 2660 a time-domain segment 2649, while multiplexer 2669 is to provide to mask applier 2660 a mask segment 2647 to be applied to the time-domain segment 2649.

In some demonstrative aspects, as shown in FIG. 26, digital matched filter 2640 may be configured to transform the plurality of time-domain segments 2649 of the digital Rx chirp signal 2641 into a respective plurality of frequency-domain Rx chirp segments 2651.

In some demonstrative aspects, as shown in FIG. 26, mask applier 2660 may be configured to transform a time-domain segment 2649 of the high BW digital Rx chirp signal 2641 into a frequency-domain Rx chirp segment 2651, for example, by applying to the time-domain segment 2649 an FFT 2646.

In some demonstrative aspects, the FFT 2646 may be configured to have an FFT size, which may be based on the length of a mask segment 2647 to be multiplied by the frequency-domain Rx chirp segment 2651, e.g., as described below.

In some demonstrative aspects, digital matched filter 2640 may be configured to generate a plurality of masked segments 2653, for example, by multiplying the plurality of mask segments 2647 with the plurality of frequency-domain Rx chirp segments 2651, respectively, e.g., as described below.

In some demonstrative aspects, as shown in FIG. 26, mask applier 2660 may include a mask multiplier 2654 to generate a masked segment 2653 corresponding to the frequency-domain Rx chirp segment 2651, for example, by multiplying the mask segment 2647 with the frequency-domain Rx chirp segment 2651.

In some demonstrative aspects, as shown in FIG. 26, mask applier 2660 may be configured to transform the frequency-domain Rx chirp segments 2651 into the frequency-domain, for example, by applying an inverse FFT (IFFT) 2648 to the plurality of masked segments 2653, e.g., as described below.

In some demonstrative aspects, digital matched filter 2640 may be configured to generate the XCORR Rx radar data 2643, for example, based on a combination of the plurality of masked segments 2653, e.g., as described below.

In some demonstrative aspects, configuring digital matched filter 2640 to split the template mask 2645 into smaller mask parts, e.g., the plurality of mask segments 2647, may provide a technical solution to support implementation of small-size FFT engines 2646 and/or IFFT engines 2648.

In one example, FFT engines 2646 and/or IFFT engines 2648 may be configured to operate at high speed, for example, to accommodate processing the time-domain segments 2649 and/or the masked segments 2653, for example, according to an arrival rate of the high BW digital Rx chirp signal 2641.

In some demonstrative aspects, the ability to implement small-sized FFT engines, e.g., FFT engines 2646 and/or IFFT engines 2648, may provide a technical solution for applying the template mask 2645 to the high BW digital Rx chirp signal 2641, for example, with reduced complexity, reduced power consumption, reduced hardware area, and/or reduced cost.

In some demonstrative aspects, the ability to implement small-sized FFT engines, e.g., FFT engines 2646 and/or IFFT engines 2648, may provide a technical solution, which may support a simplified radar system configuration, may optimize radar system performance, and/or may support scalability of the radar system to radar Rx Data with higher BW.

In one example, template mask 2645 may have a length of 25000 samples, for example, to support a Tx chirp with a length of 50 us sampled at a sampling rate of 500 MHz, e.g., as described above. For example, digital matched filter 2640 may be configured to split the template mask 2645 into at least two mask segments 2647. For example, when splitting the template mask 2645 into two mask segments 2647, an FFT engine 2646 having an FFT size of 32K samples may be used, e.g., instead of an FFT with a size of 64K samples, which me be required for a full template mask length of 25000 samples. For example, splitting the template mask 2645 into at least two mask segments 2647 may support a reduced size of memory 2642 to store data for FFT processing by the FFT engine 2646. For example, the reduced memory size of memory 2642 may provide a technical solution, e.g., to reduced power consumption, size, cost, and/or complexity of a radar system.

Figure 27:
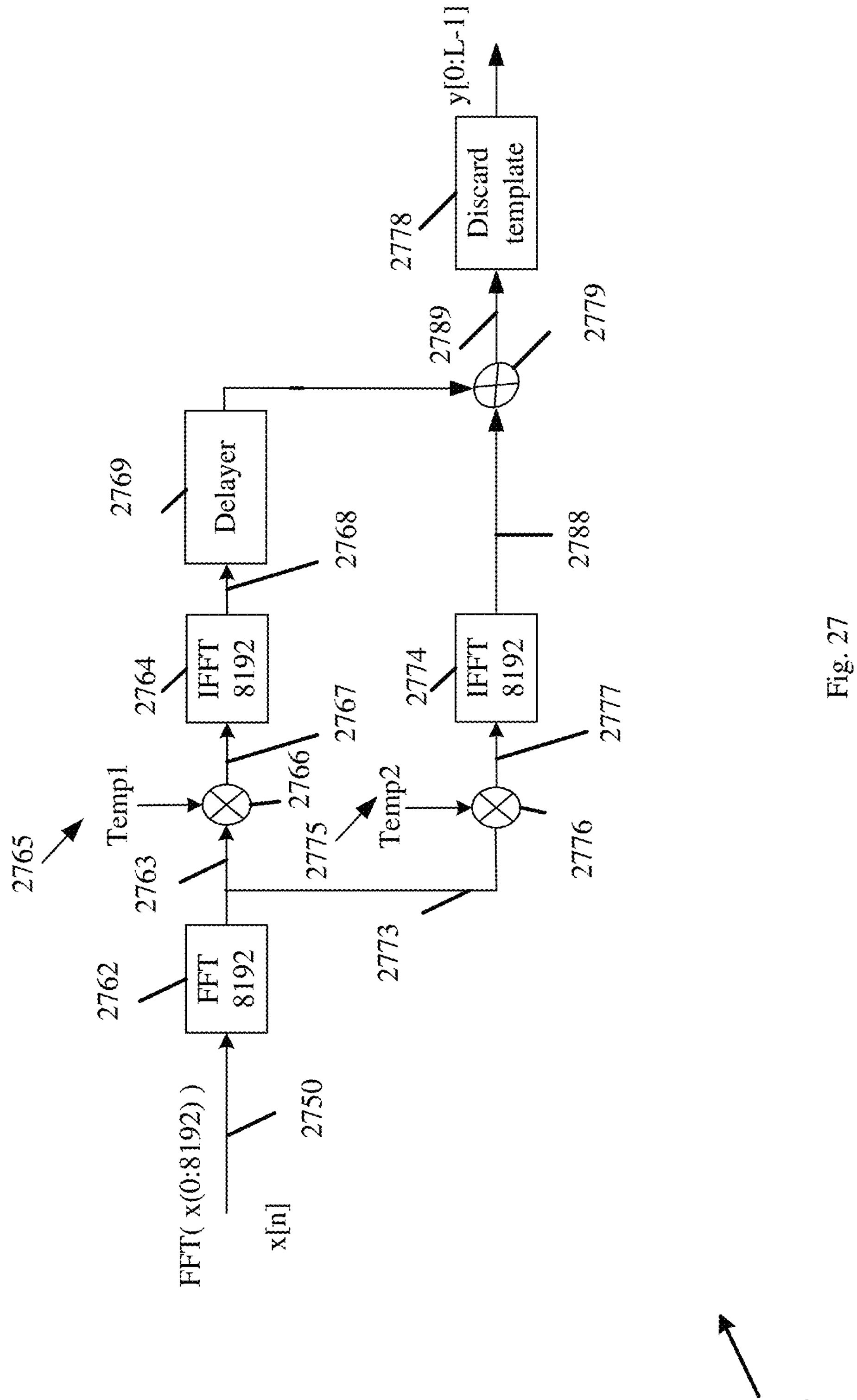
FIG. 27 is a schematic illustration of a masking scheme, in accordance with some demonstrative aspects.

Reference is made to FIG. 27, which schematically illustrates a masking scheme 2760, in accordance with some demonstrative aspects. For example, mask applier 2660 (FIG. 26) may include one or more elements of masking scheme 2760, and/or may perform one or more operations and/or functionalities of masking scheme 2760.

In some demonstrative aspects, a digital matched filter, e.g., digital matched filter 2640 (FIG. 26), may be configured to process a high BW digital Rx chirp signal 2750, for example, according to masking scheme 2760.

In some demonstrative aspects, as shown in FIG. 27, masking scheme 2760 may include an FFT engine 2762 configured to transform the high BW digital Rx chirp signal 2750 into a frequency domain.

In some demonstrative aspects, FFT engine 2762 may have an FFT size of 8K samples. In other aspects, any other FFT size may be implemented.

In some demonstrative aspects, for example, the digital matched filter, e.g., digital matched filter 2640 (FIG. 26), may be configured to correlate between the high BW digital Rx chirp signal 2750 and a template mask having a length of 16K samples, for example, using the FFT engine 2762 having the FFT size of 8K samples.

In some demonstrative aspects, as shown in FIG. 27, the digital matched filter, e.g., digital matched filter 2640 (FIG. 26), may be configured to utilize FFT engine 2762, for example, to sequentially apply the FFT first and second segments of high BW digital Rx chirp signal 2750. For example, utilize FFT engine 2762 may be configured to sequentially transform a first segment of high BW digital Rx chirp signal 2750 into a first frequency-domain Rx chirp segment 2763, and a second segment of high BW digital Rx chirp signal 2750 into a second frequency-domain Rx chirp segment 2773.

In some demonstrative aspects, the digital matched filter, e.g., digital matched filter 2640 (FIG. 26), may be configured to split the template mask into a first mask segment 2765, e.g., having a length of 8K samples, and a second mask segment 2775, e.g., having a length of 8K samples.

In some demonstrative aspects, the first mask segment 2765 may be applied to the first frequency-domain Rx chirp segment 2763 of the high BW digital Rx chirp signal 2750, and/or the second mask segment 2775 may be applied to the second frequency-domain Rx chirp segment 2773 of the high BW digital Rx chirp signal 2750.

In some demonstrative aspects, as shown in FIG. 27, masking scheme 2760 may include a first multiplier 2766 to multiply the first frequency-domain Rx chirp segment 2763 by the first mask segment 2765, for example, to generate a first masked segment 2767.

In some demonstrative aspects, as shown in FIG. 27, masking scheme 2760 may include a first IFFT engine 2764 to apply an IFFT to the first masked segment 2767, e.g., to transform the first masked segment 2767 into a first masked-segment in the time domain 2768. For example, the first IFFT engine 2764 may be configured to apply an IFFT of a size of 8K samples.

In some demonstrative aspects, as shown in FIG. 27, masking scheme 2760 may include a delayer 2769 to delay the first masked-segment in the time domain 2768, for example, according to a time delay between the first mask segment 2765 and the second mask segment 2775.

In some demonstrative aspects, as shown in FIG. 27, masking scheme 2760 may include a second multiplier 2776 to multiply the second frequency-domain Rx chirp segment 2773 by the second mask segment 2775, for example, to generate a second masked segment 2777.

In some demonstrative aspects, as shown in FIG. 27, masking scheme 2760 may include a second IFFT engine 2764 to apply an IFFT to the second masked segment 2777, e.g., to transform the second masked segment 2777 into a second masked-segment in the time domain 2788. For example, the second IFFT engine 2774 may be configured to apply an IFFT of a size of 8K samples.

In some demonstrative aspects, as shown in FIG. 27, masking scheme 2760 may include combiner, e.g., an adder, 2779 to generate a combined masked output 2789, for example, by combining, e.g., summing, the delayed first masked-segment in the time domain 2768 and the second masked-segment in the time domain 2788.

In some demonstrative aspects, as shown in FIG. 27, masking scheme 2760 may include a mask discarder 2778 to discard the mask template from the combined masked output 2789.

Reference is made to FIG. 28, which schematically illustrates a method of generating XCORR radar Rx data, in accordance with some demonstrative aspects. For example, one or more of the operations of the method of FIG. 28 may be performed by a radar processor, e.g., radar processor 834 (FIG. 8), a radar front-end, e.g., radar front-end 804, a high BW ADC, e.g., ADC 2520 (FIG. 25), and/or a digital matched filter, e.g., digital matched filter 2540 (FIG. 25).

In some demonstrative aspects, as indicated at block 2802, the method may include converting, at a high BW ADC, an analog Rx chirp signal, which is based on a Tx chirp signal, into a high BW digital Rx chirp signal, e.g., having a bandwidth of at least 500 MHz. For example, high BW ADC 2520 (FIG. 25) may convert analog Rx chirp signal 2501 (FIG. 25) into high BW digital Rx chirp signal 2502 (FIG. 25), e.g., as described above.

In some demonstrative aspects, as indicated at block 2804, the method may include generating, at a digital matched filter, XCORR radar Rx data based on a correlation between the high BW digital Rx chirp signal and a template mask corresponding to the Tx chirp signal. For example, a length of the template mask may correspond to a length of the Tx chirp signal. For example, digital matched filter 2540 (FIG. 25) may generate the XCORR radar Rx data 2505 (FIG. 25) based on a correlation between the high BW digital Rx chirp signal 2503 (FIG. 25) and the template mask corresponding to the Tx chirp signal, e.g., as described above.

In some demonstrative aspects, as indicated at block 2806, generating the XCORR radar Rx data may include splitting the template mask into a plurality of mask segments. For example, digital matched filter 2540 (FIG. 25) may split the template mask into the plurality of mask segments, e.g., as described above.

In some demonstrative aspects, as indicated at block 2808, generating the XCORR radar Rx data may include transforming a plurality of time-domain segments of the high BW digital Rx chirp signal into a respective plurality of frequency-domain Rx chirp segments. For example, digital matched filter 2540 (FIG. 25) may transform the plurality of time-domain segments of the high BW digital Rx chirp signal 2503 (FIG. 25) into the respective plurality of frequency-domain Rx chirp segments, e.g., as described above.

In some demonstrative aspects, as indicated at block 2810, generating the XCORR radar Rx data may include generating a plurality of masked segments by multiplying the plurality of mask segments with the plurality of frequency-domain Rx chirp segments, respectively. For example, digital matched filter 2540 (FIG. 25) may generate the plurality of masked segments by multiplying the plurality of mask segments with the plurality of frequency-domain Rx chirp segments, respectively, e.g., as described above.

In some demonstrative aspects, as indicated at block 2812, generating the XCORR radar Rx data may include generating the XCORR Rx radar data based on a combination of the plurality of masked segments. For example, digital matched filter 2540 (FIG. 25) may generate the XCORR Rx radar data 2505 (FIG. 25) based on the combination of the plurality of masked segments, e.g., as described above.

Referring to FIG. 8, in some demonstrative aspects, radar processor 834 may be configured to generate the radar information 813 including range-Doppler information and AoA information, for example, based on radar Rx data 811, e.g., as described below.

In some demonstrative aspects, the radar information 813 may be configured to provide information of one or more targets, for example, in the form of a list of targets, in four dimensions, e.g., including some or all of the range, Doppler (velocity), elevation, and/or azimuth dimensions.

In some demonstrative aspects, the radar Rx data 811 may be provided in the form of a raw radar frame. For example, the radar frame may include a 4D-matrix including radar Rx samples corresponding to the four dimensions.

In some demonstrative aspects, a frame size of the raw radar frame may depend on one or more parameters. For example, the frame size may depend on one or more of the number of Tx antennas, e.g., the count of Tx antennas 814; the number of Rx antennas, e.g., the count of Rx antennas 816; a receive/transmit duration, e.g., a duration of the radar Tx signals and/or a duration of receiving the radar Rx signals; and/or a sampling bandwidth (BW), e.g., a sampling rate and/or a sample data size, and/or one or more other parameters.

In some demonstrative aspects, in some use cases, scenarios and/or implementations, for example, in automotive radar implementations, a requirement for high-resolution in multiple factors, e.g., range, velocity, elevation and/or azimuth, may result in a large radar frame size, e.g., in the order of 4 Giga byte (Gb), or any other size.

In some demonstrative aspects, radar processor 834 may perform one or more processing stages and/or operations, which may be based on processing information of the radar frame, e.g., of part of the radar frame or of the entire radar frame, on the fly. For example, radar processor 834 may perform one or more processing stages and/or operations on the fly, for example, by processing the samples of the radar Rx data 811 on the fly, e.g., without storing or buffering the samples of the radar Rx data 811. In one example, radar processor 834 may perform an XCORR operation, e.g., partially or entirely, on the fly, for example, by processing the samples of the radar Rx data 811 on the fly, e.g., without storing or buffering the samples of the radar Rx data 811.

In some demonstrative aspects, radar processor 834 may perform one or more processing stages and/or operations, which may be based on processing information of the radar frame, e.g., part of the radar frame or the entire radar frame, which may be stored or buffered in memory 838.

In one example, one or more processing stages, e.g., Doppler processing, and/or AoA processing, may utilize information of the entire radar frame, for example, information from all chirps and/or all Rx/Tx elements, e.g., as described below. Accordingly, for these stages there may be a requirement that the information of the entire radar frame is to be stored/buffered and available before beginning these processing stages.

In some demonstrative aspects, memory 838 may be configured to store radar Rx data 811 corresponding to the radar frame, e.g., as described below.

In some demonstrative aspects, memory 838 may include a Dynamic Random-Access Memory (DRAM), e.g., as described below. For example, memory 838 may be accessible, e.g., by processor 836, according to a plurality of memory banks, wherein a memory bank may include a plurality of memory rows, e.g., as described below.

In some demonstrative aspects, memory 838 may include a Synchronous DRAM (SDRAM), e.g., as described below.

In one example, it may be advantageous to implement memory 838 in the form of an SDRAM to store the radar frame, for example, instead of utilizing an on-chip SRAM, for example, due to area and/or power considerations.

In some demonstrative aspects, memory 838 may include a Double Data Rate Synchronous DRAM (DDR SDRAM), e.g., as described below.

In other aspects, memory 838 may include any other type of memory.

In some demonstrative aspects, the SDRAM may provide large storage capacity and high BW, while SDRAM access may be subject to performance penalties, for example, due to row activation and/or pre-charge latencies, and/or small and non-burst aligned accesses.

For example, some random access applications, e.g., CPU memory management systems, may optimize the SDRAM accesses by aggregating transactions into bursts, e.g. cache lines, and/or by using sophisticated memory controllers that re-order the transactions to reduce performance penalties. In solutions that involve long and sequential SDRAM access, these penalties may be less observed. For example, some applications that use SDRAM, e.g., streaming applications, may perform long and sequential SDRAM access and, therefore, may not suffer much from SDRAM penalties.

However, in some cases, there may be a need to provide a technical solution for mitigating, avoiding and/or reducing, the performance penalties of the SDRAM access.

In one example, when processing radar Rx data, e.g., radar Rx data 811, the frame may be a four-dimensional matrix, processing stages may be applied to different dimensions, and/or the sample size may be significantly smaller than the SDRAM burst size. In this case, the SDRAM penalties may very large and, in some cases, un-acceptable.

In some demonstrative aspects, processor 836 may be configured to access memory 838, e.g., to write data to memory 838 and/or to read data from memory 838, according to a frame storage arrangement, which may be configured to achieve high SDRAM efficiency, for example, based on SDRAM characteristics, and/processing-pipe access patterns, e.g., as described below.

In some demonstrative aspects, processor 836 may be configured to access memory 838, e.g., to write data to memory 838 and/or to read data from memory 838, according to a frame storage arrangement, which may be configured for processing a four-dimensional radar frame, e.g., as described below.

In some demonstrative aspects, processor 836 may be configured to access memory 838, e.g., to write data to memory 838 and/or to read data from memory 838, according to a memory-access scheme, which may be configured to provide efficient memory access to memory 838, e.g., as described below.

In some demonstrative aspects, the memory-access scheme may be configured to group together samples belonging to the same range and Doppler values, for example, from all Tx/Rx elements, e.g., as described below.

In some demonstrative aspects, grouping together the samples belonging to the same range and Doppler values may provide a technical advantage to allow efficient access, for example, for AoA processing, which may be applied on the elevation and/or azimuth dimensions.

In some demonstrative aspects, the memory-access scheme may be configured to circulate between banks of memory 838, for example, when writing data belonging to consecutive ranges, for example, after the cross-correlation operation, e.g., as described below.

In some demonstrative aspects, the memory-access scheme may be configured to write samples of a chirp/Doppler, for example, each chirp/Doppler, by starting to write the samples in a bank following the bank on which a previous chip/Doppler was written, e.g., as described below. For example, this configuration may provide a technical solution to allow circulating between the banks during a Doppler calculation operation.

In some demonstrative aspects, the memory-access scheme may be configured to provide a technical solution, which may provide improved, e.g., even maximal, SDRAM access efficiency, and therefore improved, or even best, performance.

In some demonstrative aspects, the memory-access scheme may be configured to provide a technical solution, which may support on-the-fly processing, for example, with reasonable on-chip SRAM between Doppler and AoA stages, which may further reduce a required SDRAM BW.

In some demonstrative aspects, the memory-access scheme may be configured to provide a technical solution, which may significantly reduce the number of SDRAM devices required for storing the radar data, for example, even without requiring alternative huge on-chip SRAMs. Accordingly, the memory-access scheme may be configured to provide a technical solution with reduced cost, area and/or power.

In some demonstrative aspects, processor 836 may be configured to store information of a radar frame in the DRAM, e.g., memory 838, according to a range-Doppler (RD) tiling scheme configured according to a configuration of the plurality of memory banks of the DRAM, e.g., as described below.

In some demonstrative aspects, the information of the radar frame may correspond to a plurality of range values, a plurality of Doppler values, a plurality of Rx channels, and a plurality of Tx channels, e.g., as described below.

In some demonstrative aspects, the plurality of range values may include a plurality of range bins, which may be configured based on a setting and/or implementation of the radar device.

In some demonstrative aspects, the plurality of Doppler values may include a plurality of Doppler bins (Chirps), which may be configured based on a setting and/or implementation of the radar device.

In some demonstrative aspects, the plurality of Rx channels may correspond to the plurality of Rx antennas 816 and/or Rx chains 831.

In some demonstrative aspects, the plurality of Tx channels may correspond to the plurality of Tx antennas 814 and/or Tx chains 810.

In some demonstrative aspects, the radar frame may correspond to 512 range bins, 64 Doppler bins, e.g., corresponding to 64 chirps, 24 Tx channels, and/or 24 Rx channels, e.g., as described below. For example, the radar Rx data 811 may be sampled at a sample size of 2*16=32 bits, e.g., for In-Phase (I) and Quadrature (Q) components.

In other aspects, any other radar frame, range values, Doppler values, Tx channels, Rx channels and/or sampling configuration may be utilized.

In some demonstrative aspects, the RD tiling scheme may include a plurality of RD tiles, e.g., as described below.

In some demonstrative aspects, an RD tile may include a plurality of radar values corresponding to a range value of the plurality of range values and a Doppler value of the plurality of Doppler values, e.g., as described below.

In some demonstrative aspects, a radar value of the plurality of radar values in the RD tile may correspond to an Rx-Tx (RT) combination of an Rx channel of the plurality of Rx channels and a Tx channel of the plurality of Tx channels, e.g., as described below.

In some demonstrative aspects, the RD tile corresponding to the range value and the Doppler value may be configured to store radar values for each of all RT combinations of the plurality of Rx channels and the plurality of Tx channels, e.g., as described below. In other aspects, the RD tile may be configured to store the radar values for part of the RT combinations, for example, if the radar values for all RT combinations of the plurality of Rx channels and the plurality of Tx channels may be distributed between two or more RD tiles.

In some demonstrative aspects, the RD tile may include, or may be formed of, one or more tile rows in one or more memory rows of a memory bank and one or more tile columns in one or more memory columns of the DRAM memory, e.g., memory 838, as described below.

In some demonstrative aspects, a tile area of the RD tile may be based on a count of the plurality of Tx channels and a count of the plurality of Rx channels, e.g., as described below.

In some demonstrative aspects, a count of the tile columns of the RD tile may be based on the tile area of the RD tile, and a count of RD tiles per memory row, e.g., as described below.

In other aspects, the RD tile may be configured to have any other configuration, shape tile area, tile columns and/or tile rows.

In some demonstrative aspects, the RD tiling scheme may include a plurality of RD tiles along a memory row of the memory bank, e.g., as described below.

In some demonstrative aspects, the plurality of RD tiles along the memory row may share a same Doppler value, and the plurality of RD tiles may correspond to a sequence of range values, respectively, e.g., as described below.

In some demonstrative aspects, the plurality of RD tiles along the memory row may share a same Range value, and the plurality of RD tiles may correspond to a sequence of Doppler values, respectively, e.g., as described below.

In other aspects, the RD tile may be arranged in memory 838 according to any other arrangement, e.g., including multiple RD tiles per row, or even one RD tile per row.

In some demonstrative aspects, the RD tiling scheme may be configured to include one or more first RD tiles corresponding to a same Doppler value in a first memory bank of the DRAM, e.g. memory 838; and one or more second RD tiles corresponding to the same Doppler value in a second memory bank of the DRAM, e.g., as described below.

In some demonstrative aspects, the one or more first RD tiles may correspond to one or more first consecutive range values, respectively, and/or the one or more second RD tiles may correspond to one or more second consecutive range values, respectively, e.g., as described below.

In some demonstrative aspects, the one or more second consecutive range values may be immediately successive to the one or more first consecutive range values, e.g., as described below In some demonstrative aspects, the one or more first RD tiles may be in one or more first rows of the first memory bank, and the RD tiling scheme may include one or more third RD tiles corresponding to the same Doppler value in one or more second rows of the first memory bank, e.g., as described below.

In some demonstrative aspects, the one or more third RD tiles may correspond to one or more third consecutive range values, respectively, e.g., as described below.

In some demonstrative aspects, the one or more second rows may be after the one or more first rows, and the one or more third consecutive range values may be after the one or more second range values, e.g., as described below.

In some demonstrative aspects, processor 836 may be configured to determine a plurality of cross-correlation (XCORR) values of the radar frame based on the Rx radar samples, and to write the plurality of XCORR values to the DRAM, e.g., memory 838, according to the RD tiling scheme, e.g., as described below.

In some demonstrative aspects, processor 836 may be configured to write to the DRAM, e.g., memory 838, a plurality of sets of XCORR values. For example, a set of XCORR values may include XCORR values corresponding to a same RT combination and the same Doppler value, e.g., as described below.

In some demonstrative aspects, processor 836 may be configured to write one or more first XCORR values of the set of XCORR values to the one or more first RD tiles in the first memory bank, and/or to write one or more second XCORR values of the set of XCORR values to the one or more second RD tiles in the second memory bank, e.g., as described below.

In some demonstrative aspects, the RD tiling scheme may be configured such that a first RD tile corresponding to a first Doppler value and to a first-in-order range value of the plurality of range values is in a first memory bank, and a second RD tile corresponding to a second Doppler value and to the first-in-order range value is in a second memory bank different from the first memory bank, e.g., as described below.

In some demonstrative aspects, the second Doppler value may be immediately successive to the first Doppler value, e.g., as described below.

In some demonstrative aspects, processor 836 may be configured to read from the DRAM, e.g., memory 838, a plurality of radar values for Doppler processing, and to store one or more results of the Doppler processing in the DRAM, e.g., as described below.

In some demonstrative aspects, the plurality of radar values for Doppler processing may include radar values corresponding to a same combination of a particular range value and a particular RT combination, e.g., as described below.

In some demonstrative aspects, processor 836 may be configured to read from the RD tile a plurality of radar values for Angle-of Arrival (AoA) processing for a range-Doppler bin corresponding to the range value and the Doppler value, e.g., as described below.

In some demonstrative aspects, processor 836 may be configured to associate a sample, e.g., each sample, of the radar RX input 811 with a specific combination of a range value, a Doppler value, an Rx channel, and a Tx channel, for example, after cross-correlation.

In some demonstrative aspects, an index ("RTE" index) may be utilized to represent a combination of a pair of Rx channel and Tx channel by a single index. This RTE indexing may provide a technical advantage by reducing one dimension for frame arrangement. This RTE indexing may be suitable for the radar frame as this indexing may not add complexity to the processing pipe, since anyway the AoA processing may not be concerned with the Rx channel and Tx channel, but rather with azimuth and/or elevation which, are derived from the Rx channel and Tx channel, e.g., based on an array geometry of MIMO array 881.

In some demonstrative aspects, processor 836 may be configured to group samples of a radar from of radar Rx data 811 into RD-tiles, e.g., as described below.

In some demonstrative aspects, processor 836 may group the samples of the Rx radar data 811 into the RT tiles, for example, such that an RT tile corresponding to a range-Doppler pair is to include all the RTEs belonging to that Range-Doppler pair.

Figure 29:
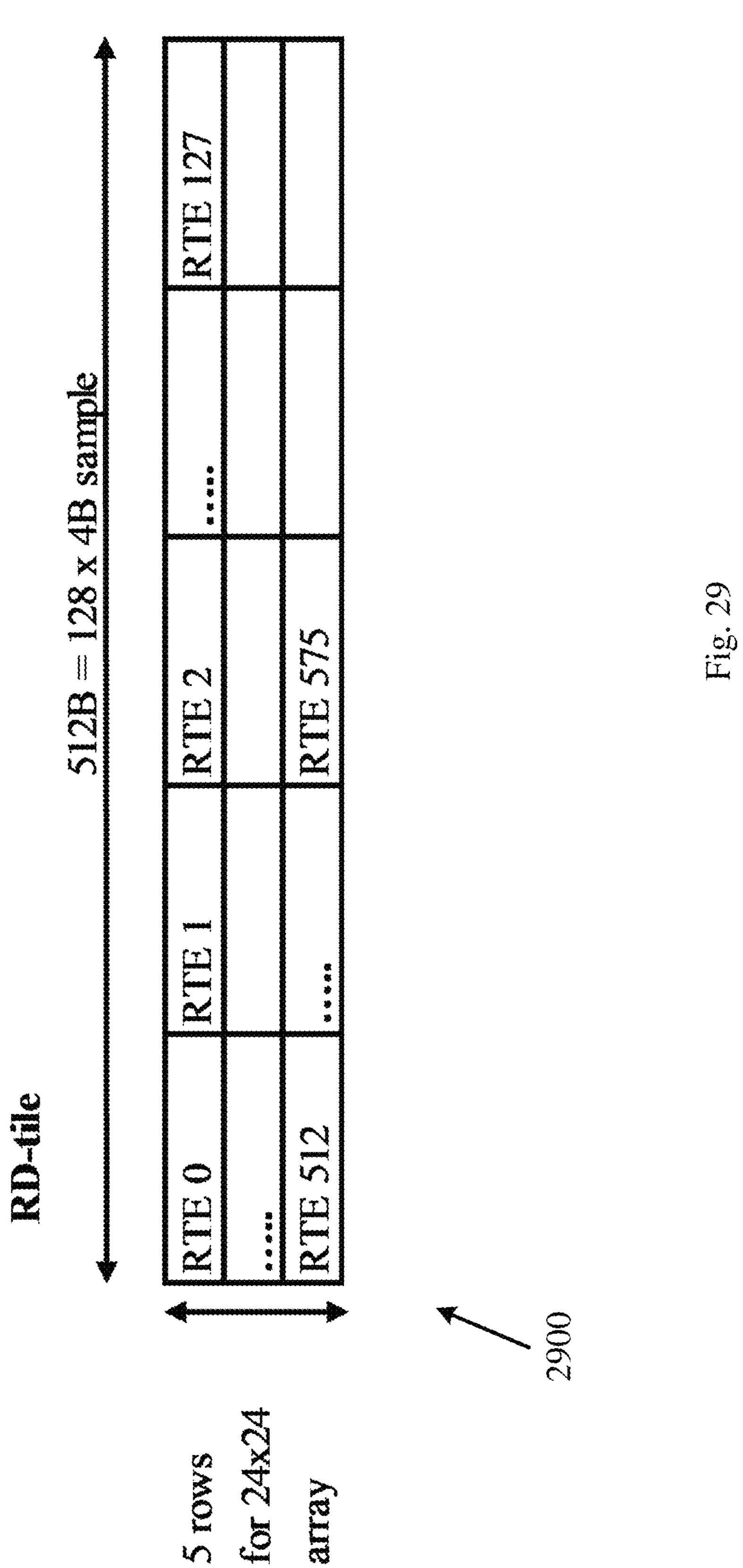
FIG. 29 is a schematic illustration of a configuration of an range-Doppler (RD) tile, in accordance with some demonstrative aspects.

Reference is made to FIG. 29, which schematically illustrates a configuration of an RD tile 2900, in accordance with some demonstrative aspects. For example, processor 836 (FIG. 8) may be configured to store RTE values, which are based on Rx radar data 811 (FIG. 8), in memory 838 (FIG. 8) according to the configuration of RD tile 2900.

In some demonstrative aspects, an RD-tile area of the RD tile 2900 may be determined by an array size, e.g., of the MIMO antenna array, e.g., MIMO antenna array 881 (FIG. 8).

In some demonstrative aspects, for example, the RD tile 2900 may be configured with respect to a radar frame including 576 RTEs representing 576 respective different combinations of Rx channels and Tx channels. In one example, the 576 RTEs may correspond to 576 respective different combinations of 24 Tx channels and 24 Rx channels, e.g., 24*24=576. In other aspects, an RD tile configuration may be based on any other count of RTEs, Rx channels and/or Tx channels.

In some demonstrative aspects, an RD-tile width of RD tile 2900 may be determined based on the number of tiles to fit into an SDRAM row, e.g., as described below.

In some demonstrative aspects, a number of tile rows in RD tile 2900 may be derived, for example, from the area and the width of the RD tile 2900.

In some demonstrative aspects, as shown in FIG. 29, the RD tile 2900 may be configured to include 5 rows. For example, the 5 rows of RD tile 2900 may be stored in five respective rows of a bank of memory 838.

In some demonstrative aspects, as shown in FIG. 29, the RD tile 2900 may be configured to store radar values corresponding to the 576 different RTEs. For example, an RTE “0” may be configured to store radar data of an RTE sample “0” corresponding to a first combination of Rx and Tx channels, an RTE “1” may be configured to store radar data of an RTE sample “1” corresponding to a second combination of Rx and Tx channels, and so on.

In some demonstrative aspects, as shown in FIG. 29, the width of the RD tile 2900 may be about 512 Bytes (B), for example, if the RD tile 2900 includes 128 RTEs in a row, and a sample data size of 2*16 bits(b)=4 bytes is utilized per RTE sample.

In some demonstrative aspects, RTE samples within the RD tile 2900 may be grouped in DDRAM bursts, e.g., SDRAM bursts for an SDRAM implementation.

In one example, the DRAM burst may be configured with respect to LPDDR4 devices, which be represented as a single LPDDR4. For example, the single LPDDR4 may have a DQ bus width of 64b, e.g., corresponding to a row size of 8 KB.

In one example, eight memory banks, e.g., of memory 838, may be utilized for frame arrangement.

In other aspects, any other memory configuration, SDRAM technology, and/or arrangement may be utilized.

In one example, a burst size of 128B may be implemented with two LPDDR4s. For example, the SDRAM burst may include 32 samples with the same Range-Doppler but different RTEs, e.g., 32 RTEs from the RD tile 2900.

In some demonstrative aspects, when defining the configuration the RD tile 2900, there may be a need to take into consideration a trade-off between a requirement for an RD-tile width of RD tile 2900 to support AoA processing, and a requirement for the RD-tile width of RD tile 2900 to support range and/or Doppler processing.

For example, for AoA processing, it may be advantageous to configure the RD-tile width to be as large as possible, for example, in order to reduce or minimize transitions between rows when performing AoA processing on the RTEs of the RD tile 2900.

For example, for Range and/or Doppler processing, it may be advantageous to configure the RD-tile width to be as narrow as possible, for example, in order to support a larger number of RD tiles 2900 in a row, e.g., as described below.

Referring back to FIG. 8, in some demonstrative aspects, when processing the Range and/or Doppler dimensions, the radar processor, e.g., processor 836, may process the range and/or Doppler values, e.g., all Range values and/or all Doppler values, belonging to the same RTE. Accordingly, this may allow retrieving even a single sample from each RD-tile at a time. In some cases, for example, when access is performed in a burst granularity, a plurality of samples, e.g., 32 samples or any other number of samples, may be read from the RD-tile at a time. In these cases, suitable intermediate buffers may be utilized to accommodate the data until being processed.

In some demonstrative aspects, after reading a sample of a range/Doppler value from a specific RD-tile, it may be advantageous to have an RD-tile of a consecutive Range/Doppler value in the same row or in another bank, for example, in order to avoid a same-bank row-to-row penalty, which may be caused by switching between activation of rows in the same bank of a DRAM.

In some demonstrative aspects, it may be advantageous to configure processor 836 to read/write (R/W) at least a predefined of radar data from the same row of memory 838, for example, before circulating to a next bank of memory 838, e.g., as described below.

In one example, an LPDDR4 may have a same-bank row-to-row activation latency of at least 60 nanoseconds (nsec).

In one example, a R/W operation to R/W 128B to two LPDDR4s, e.g., with a 2133 Megahertz (MHz) DDR clock, may take 3.75 nsec.

In one example, circulating between banks of the DRAM, e.g., every sample, may take 8×3.75 nsec=30 msec.

According to these examples, it may be advantageous to configure processor 836 to R/W at least 2×128B, or even at least 4×128B, e.g., to accommodate non-ideal situations, from the same row of memory 838, for example, before circulating to a next bank of memory 838.

In some demonstrative aspects, processor 836 may be configured to implement a first RD tiling scheme, which may allow processor 836 to read 4×128B from the same RD-tile. For example, processor 836 may be configured to R/W 4×32 samples from different RTEs for a particular Range/Doppler. Accordingly, intermediate buffers may be utilized to buffer this data.

In some demonstrative aspects, processor 836 may be configured to implement a second RD tiling scheme, which may allow processor 836 to store sixteen RD-tiles per-row, e.g., RD tiles belonging to four consecutive Ranges multiplied by four consecutive Dopplers. For example, processor 836 may be configured to R/W and process single 128B burst at a time. For example, processor 836 may be configured to R/W and process a next burst with a different Range/Doppler from the same row, e.g., up to four bursts in a row, for example, before switching to a next bank.

In some demonstrative aspects, processor 836 may be configured to implement a hybrid RD tiling scheme, which may be configured in one way for Range and in another way for Doppler.

In some demonstrative aspects, a selection between implementing the first RD tiling scheme, the second RD tiling scheme or the hybrid RD tiling scheme may be based, for example, on the tradeoff between AoA access efficiency, which may prefer less RD-tiles per-row, and the number of intermediate buffers when doing Range/Doppler processing, which may prefer more RD-tiles per-row.

Reference is made to FIG. 30, which schematically illustrates an RD tiling scheme 3000, in accordance with some demonstrative aspects. For example, processor 826 (FIG. 8) may be configured to store in memory 838 (FIG. 8) information of a radar frame, e.g., based on radar RX data 811 (FIG. 8), according to RD tiling scheme 3000.

For example, as shown in FIG. 30, a cell, e.g., each cell, may represent an RD-tile. For simplicity, only the tiles of a single Doppler value are shown.

In some demonstrative aspects, the RD tiling scheme 3000 may be configured as a hybrid RD tiling scheme, which may include one or more, e.g., four, RD tiles belonging to consecutive Range values and a same single Doppler value in a same row.

For example, as shown in FIG. 30, the RD tiling scheme 3000 may be configured to include in one or more first rows, e.g., two rows, of a first bank (Bank 0) four RD tiles corresponding to the same Doppler value, e.g., the Doppler value D0.

For example, as shown in FIG. 30, the four RD tiles in the two first rows of the Bank 0 may correspond to a sequence of four range values, respectively. For example, the four RD tiles in the two first rows of the Bank 0 may include an RD tile (D0, R0) corresponding to the Doppler value D0 and the Range value R0, an RD tile (D0, R1) corresponding to the Doppler value D0 and the Range value R1, an RD tile (D0, R2) corresponding to the Doppler value D0 and the Range value R2, and an RD tile (D0, R3) corresponding to the Doppler value D0 and the Range value R3.

In some demonstrative aspects, the RD tiling scheme 3000 may include one or more first RD tiles corresponding to a same Doppler value in a first memory bank, wherein the one or more first RD tiles correspond to one or more first consecutive range values, respectively.

For example, as shown in FIG. 30, the RD tiling scheme 3000 may include in the two first rows of the Bank 0 the four RD tiles (D0, R0), (D0, R1), (D0, R2), and (D0, R3), which correspond to the same Doppler value D0, and to the four respective consecutive range values R0, R1, R2, and R3.

In some demonstrative aspects, as shown in FIG. 30, the RD tiling scheme 3000 may include one or more second RD tiles corresponding to the same Doppler value in a second memory bank, wherein the one or more second RD tiles correspond to one or more second consecutive range values, respectively, wherein the one or more second consecutive range values are immediately successive to the one or more first consecutive range values.

For example, as shown in FIG. 30, the RD tiling scheme 3000 may include in the two first rows of a second Bank (Bank 1) the four RD tiles (D0, R4), (D0, R5), (DO, R6), and (D0, R7), which correspond to the same Doppler value D0, and to the four respective consecutive range values R4, R5, R6 and R7, which are immediately successive to the range values R0, R1, R2, and R3.

In some demonstrative aspects, the RD tiling scheme 3000 may include one or more third RD tiles corresponding to the same Doppler value D0 in one or more second rows, e.g., two second rows, of the first memory bank. For example, the one or more third RD tiles may correspond to one or more third consecutive range values, respectively, wherein the one or more second rows are after the one or more first rows, and the one or more third consecutive range values are after the one or more second range values.

For example, as shown in FIG. 30, the RD tiling scheme 3000 may include in two second rows of the first bank, Bank 0, four RD tiles (D0, R32), (D0, R33), (DO, R34), and (D0, R35), which correspond to the same Doppler value D0, and to the four respective consecutive range values R32, R33, R34 and R35, which are after the range values R1-R31.

For example, as shown in FIG. 30, the RD tiling scheme 3000 may include in two second rows of the second bank, Bank 1, four RD tiles (D0, R36), (D0, R37), (DO, R38), and (D0, R39), which correspond to the same Doppler value D0, and to the four respective consecutive range values R36, R37, R38 and R39, which are after the range values R1-R31.

In some demonstrative aspects, a processor, e.g., processor 836 (FIG. 8), may be configured to write Range values and/or Doppler values to a memory, e.g., memory 836 (FIG. 8), according to the RD tiling scheme 3000.

In some demonstrative aspects, a processor, e.g., processor 836 (FIG. 8) may be configured to access the RD tiles of RD tiling scheme 3000, for example, for a write operation to store radar data in a memory, e.g., memory 838 (FIG. 8), or for a read operation to read radar data from the memory.

For example, processor 836 (FIG. 8) may be configured to determine a plurality of XCORR values of the radar frame based on the Rx radar samples of radar RX data 811, and to write the plurality of XCORR values to memory 838 (FIG. 8) according to the RD tiling scheme 3000, for example, by writing one or more XCORR values to the RD tile (D0, R0), which may be followed by writing one or more XCORR values to the RD tile (D0, R1), which may be followed by writing one or more XCORR values to the RD tile (D0, R2), which may be followed by writing one or more XCORR values to the RD tile (D0, R3).

In some demonstrative aspects, processor 836 (FIG. 8) may be configured to access the RD tiling scheme 3000 to read or write range values according to an access order represented by the sequence of numbers in the circles in FIG. 30.

In some demonstrative aspects, processor 836 (FIG. 8) may be configured to access range values in memory 838 (FIG. 8), e.g., for writing range information to the memory 838 (FIG. 8) or for reading range information from the memory 838 (FIG. 8), by sequentially accessing the RD tiles (D0, R0), (D0, R1), (D0, R2), and (D0, R3) in the first two rows of Bank 0; which may be followed by sequentially accessing the RD tiles (D0, R4), (D0, R5), (D0, R6), and (D0, R6) in the first two rows of Bank 1; which may be followed by sequentially accessing the RD tiles (D0, R8), (D0, R9), (D0, R10), and (D0, R11) in the first two rows of a next Bank 2, and so on, for example, until reaching the RD tile (D0, R31) at the end of the first two rows of a seventh bank (Bank 7).

In some demonstrative aspects, processor 836 (FIG. 8) may be configured to circulate back to the first bank, Bank 0, for example, for accessing further RD tiles corresponding to the same Doppler value D0.

For example, processor 836 (FIG. 8) may be configured to circulate back to the first bank, Bank 0, to sequentially access the four RD tiles (D0, R32), (D0, R33), (DO, R34), and (D0, R35), which may be followed by sequentially accessing the RD tiles (D0, R36), (D0, R37), (D0, R38), and (D0, R39) in the next Bank 1, and so on.

In some demonstrative aspects, the RD tiling scheme described above, e.g., RD tiling scheme 3000, may provide a technical advantage by supporting efficient access for Range processing. For example, the RD tiling scheme described above may allow circulating the read/write accesses between the memory banks, for example, when reading/writing consecutive Ranges.

In some demonstrative aspects, the RD tiling scheme may be configured to support a circular access pattern between the memory banks, for example, for reading/writing Doppler values, e.g., as described below.

In some demonstrative aspects, the RD tiling scheme may be configured such that the RD tiles of a Doppler value, e.g., each Doppler value, may "start" in a different memory bank, e.g., as described below.

In some demonstrative aspects, the RD tiling scheme may be configured such that a first RD tile corresponding to a first Doppler value and to a first-in-order range value of the plurality of range values is in a first memory bank, and a second RD tile corresponding to a second Doppler value and to the first-in-order range value is in a second memory bank different from the first memory bank. For example, the second Doppler value may be immediately successive to the first Doppler value, e.g., as described below.

Reference is made to FIG. 31, which schematically illustrates an RD tiling scheme 3100, in accordance with some demonstrative aspects. For example, processor 826 (FIG. 8) may be configured to store in memory 838 (FIG. 8) information of a radar frame, e.g., based on radar Rx data 811 (FIG. 8), according to RD tiling scheme 3100. For example, as shown in FIG. 31, a cell, e.g., each cell, may represent an RD-tile.

In some demonstrative aspects, as shown in FIG. 31, RD tiling scheme 3100 may be configured such that the RD tiles of the Doppler value D0 start at the RD tile (D0, R0) at the first memory bank, Bank 0; the RD tiles of the Doppler value D1 start at the RD tile (D1, R0) at the second memory bank, Bank 1; the RD tiles of the Doppler value D2 start at the RD tile (D2, R0) at the third memory bank, Bank 2, and so on, e.g., until the RD tiles of the Doppler value D7 start at the RD tile (D7, R0) at the eighth memory bank, Bank 7.

In some demonstrative aspects, as shown in FIG. 31, RD tiling scheme 3100 may be configured to circulate back to the first bank, Bank 0, for additional RD tiles. For example, the RD tiles of the Doppler value D8 start at the RD tile (D8, R0) at the first memory bank, Bank 0, e.g., in the next two rows of the Bank 0; the RD tiles of the Doppler value D9 start at the RD tile (D9, R0) at the second memory bank, Bank 1, e.g., in the next two rows of the Bank 1; the RD tiles of the Doppler value D10 start at the RD tile (D10, R0) at the third memory bank, Bank 2, e.g., in the next two rows of the Bank 2, and so on, e.g., until the RD tiles of the Doppler value D15 start at the RD tile (D15, R0) at the eighth memory bank, Bank 7. For example, RD tiling scheme 3100 may be configured to wrap back to the first bank, for example, until reaching the last Doppler, e.g., according to the number of chirps.

In some demonstrative aspects, a processor, e.g., processor 836 (FIG. 8), may be configured to write Range values and/or Doppler values to a memory, e.g., memory 836 (FIG. 8), according to the RD tiling scheme 3100.

In some demonstrative aspects, a processor, e.g., processor 836 (FIG. 8) may be configured to access the RD tiles of RD tiling scheme 3100, for example, for a write operation to store radar data in a memory, e.g., memory 838 (FIG. 8), or for a read operation to read radar data from the memory.

In some demonstrative aspects, processor 836 (FIG. 8) may be configured to read from the memory 838 (FIG. 8) a plurality of radar values for Doppler processing, and to store one or more results of the Doppler processing in the memory 838 (FIG. 8), e.g., according to RD tiling scheme 3100. For example, the plurality of radar values for Doppler processing may include radar values corresponding to a same combination of a particular range value and a particular RT combination, e.g., and to different Doppler values.

In some demonstrative aspects, processor 836 (FIG. 8) may be configured to perform R/W operations on consecutive Doppler values according to the RD tiling scheme 3100. The memory access according to the RD tiling scheme 3100 may allow circulating the R/W operations of the Doppler values between the memory banks as well.

In some demonstrative aspects, the RD tiling schemes described above, e.g., the RD tiling schemes 3000 (FIG. 30), 3100 (FIG. 31) and/or RD tiling schemes according to the features described above, may be implemented to provide a technical solution to support efficient memory access, e.g., to memory 838 (FIG. 8), for radar processing operations, e.g., for processing radar Rx data, e.g., radar Rx data 811 (FIG. 8), and/or for generating radar information, radar information 813 (FIG. 8).

In some demonstrative aspects, for example, the RD tiling schemes described above, e.g., the RD tiling schemes 3000 (FIG. 30), 3100 (FIG. 31) and/or RD tiling schemes according to the features described above, may be implemented to provide a technical solution to support memory access of processor 836 (FIG. 8) with high R/W efficiency, for example, for cross-correlation operations, which may write to memory 838 (FIG. 8) samples of the radar Rx data 811 (FIG. 8), e.g., in consecutive Ranges.

In some demonstrative aspects, for example, the RD tiling schemes described above, e.g., the RD tiling schemes 3000 (FIG. 30), 3100 (FIG. 31) and/or RD tiling schemes according to the features described above, may be implemented to provide a technical solution to support memory access of processor 836 (FIG. 8) with high R/W efficiency, for example, for Doppler processing, which may read from, and/or write to, memory 838 (FIG. 8), radar data in consecutive Dopplers.

In some demonstrative aspects, for example, the RD tiling schemes described above, e.g., the RD tiling schemes 3000 (FIG. 30), 3100 (FIG. 31) and/or RD tiling schemes according to the features described above, may be implemented to provide a technical solution to support memory access of processor 836 (FIG. 8) with high R/W efficiency, for example, for AoA processing, which may read the entire RD-tile.

In some demonstrative aspects, for example, the RD tiling schemes described above, e.g., the RD tiling schemes 3000 (FIG. 30), 3100 (FIG. 31) and/or RD tiling schemes according to the features described above, may be implemented to provide a technical solution to support memory access of processor 836 (FIG. 8) with high R/W efficiency, for example, while avoiding many, or even all, SDRAM performance penalties. This technical solution may be achieved with reasonable on-chip intermediate buffers, and even without increasing SDRAM density.

Reference is made to FIG. 32, which schematically illustrates a method of processing radar information, in accordance with some demonstrative aspects. For example, one or more operations of the method of FIG. 32 may be performed by a processor, e.g., radar processor 834 (FIG. 8) and/or processor 836 (FIG. 8).

As indicated at block 3202, the method may include storing information of a radar frame in a DRAM according to an RD tiling scheme configured according to a configuration of a plurality of memory banks of the DRAM.

For example, as indicated at block 3202, the information of the radar frame may correspond to a plurality of range values, a plurality of Doppler values, a plurality of Rx channels, and a plurality of Tx channels.

For example, as indicated at block 3202, the RD tiling scheme may include a plurality of RD tiles, an RD tile including a plurality of radar values corresponding to a range value of the plurality of range values and a Doppler value of the plurality of Doppler values, wherein a radar value of the plurality of radar values in the RD tile corresponds to an Rx-Tx (RT) combination of an Rx channel of the plurality of Rx channels and a Tx channel of the plurality of Tx channels.

For example, processor 836 (FIG. 8) may be configured to store the information of the radar frame, e.g., based on radar Rx data 811 (FIG. 8) in memory 838 (FIG. 8) according to the RD tiling scheme, e.g., as described above.

As indicated at block 3204, the method may include generating radar information by accessing the DRAM according to the RD tiling scheme to process the information of the radar frame. For example, processor 836 (FIG. 8) may be configured to generate radar information 813 (FIG. 8) by accessing memory 838 (FIG. 8) according to the RD tiling scheme to process the information of the radar frame, e.g., as described above.

Referring to FIG. 8, radar processor 834 may include a radar processor 836 configured to generate radar information 813 corresponding to a plurality of radar dimensions, for example, based on radar Rx data 811, e.g., as described below.

In some demonstrative aspects, the radar information 813 may include four-dimensional (4D) radar information, for example, a cube data box/structure, e.g., as described below.

In some demonstrative aspects, the four-dimensional (4D) radar information may include data of four radar dimensions including, for example, a range dimension, a Doppler dimension, an azimuth dimension, and an elevation dimension.

In some demonstrative aspects, the radar information 813 may include the 4D radar information including, for example, range values in the range dimension, Doppler values in the Doppler dimension, azimuth values in the azimuth dimension, and elevation values in the elevation dimension, e.g., as described below.

In some demonstrative aspects, the 4D radar information may include a large amount of data. For example, radar front-end 804 may be configured to capture incoming reflections of radar signals, in a high BW, and/or to process the incoming signals using high compute power, for example, in order to improve performance and/or to use advanced coded signals.

In one example, radar processor 836 may be configured to process radar Rx data according to a processing scheme, which may include, for example:

- A MIMO radar antenna including a large number of antenna elements, e.g., 576 antenna elements, for example, according to a virtual array formation of 24 Rx antennas and 24 Tx antennas, and/or any other number of antennas elements and/or according to any other arrangement;
- A large chirp size, e.g., a chirp size (bandwidth) of hundreds of MHz or more, e.g., a 320 MHz bandwidth.
- A range of 250 m, e.g., 1.6 microseconds (us), and/or any other range;
- A large number of chirps, e.g., 64 chirps, or any other number of chirps; and
- A large sample size, e.g., an ADC output including 16 bits per I/Q complex value, or any other sample size.

According to this example, a 4D cube data structure may have a data size of about 1 Gb. For example, this data size may relate to a 4D cube structure without addition of a processing gain along the chain. Considering the processing gain may add up to ~64 bits per sample, resulting with an increase of about 100% in the data size of the 4D cube data structure.

In some demonstrative aspects, radar processor 836 may generate the radar information 813 according to a plurality of computation processes corresponding to the plurality of radar dimensions of radar information 813, e.g., as described below.

In some demonstrative aspects, there may be a need to provide a technical solution to support efficient storing of radar information between computation processes In some demonstrative aspects, radar processor 836 may generate radar information of a radar dimension, for example, according to a computation process corresponding to the radar dimension, e.g., as described below.

In some demonstrative aspects, radar processor 836 may be configured to compress the radar information generated according to the computation process corresponding to the radar dimension, for example, to be stored in a memory 838, for example, for further processing by another computation process, e.g., as described below.

In some demonstrative aspects, radar processor 836 may be configured to compress the radar information generated according to the computation process corresponding to the radar dimension, for example, in an efficient manner, e.g., as described below.

In some demonstrative aspects, it may be advantageous to compress the radar information of the radar dimension, for example, to simplify a processing system and/or to save one or more system resources, which may be used for processing the radar information of the radar dimension. For example, compressing the radar information of the radar dimension may support a technical advantage of reducing area, power resources, and/or memory resources, e.g., a Double Data Rate (DDR) size and/or BW, Synchronous Dynamic Random-Access Memory (SRAM) memories, and/or the like.

For example, compressing the radar information of the radar dimension may provide a technical advantage of storing the radar information of the radar dimension with reduced and/or efficient memory space, for example, before processing the radar information with a subsequent computation process.

In some demonstrative aspects, there may be a need to address one or more technical issues, for example, to efficiently compress the radar information of the radar dimension, e.g., as described below.

In some demonstrative aspects, radar processor 836 may be configured to compress the radar information of the radar dimension, for example, based on statistical compression mechanism, e.g., as described below.

In some demonstrative aspects, compressing the radar information according the statistical compression mechanism may provide one or more technical advantages, for example, compared to other compression schemes.

In one example, compressing the radar information according the statistical compression mechanism may provide one or more technical advantages, for example, compared to a Most Significant Bit (MSB) chop compression method. For example, the MSB chop compression method may only achieve a partial compression, and may not be suitable for compressing data, which may required use of varying data size and/or accuracy. In one example, it may be possible to represent some of the radar data may with a relatively small number of bits, while for other radar data there may be a need to use a relatively larger number of bits. In one example, a large number of bits may be required in order to represent a close range bin, for example, to enable sufficient and/or accurate representation of close strong data. In contrast, for far range bins accuracy may not be critical. However, most of the close range bins may usually not have target information. According to this example, statistical compression may be implemented to efficiently compress the radar data, for example, by maintaining the possibility to use a larger data-size when compressing some types of data, e.g., data of the close range bins.

In some demonstrative aspects, the statistical compression scheme may be implemented to provide a technical solution to optimize memory structures of a radar system efficiently and/or aggressively, for example, as statistical compression may be lossless and relatively predictable.

In some demonstrative aspects, the statistical compression scheme may be implemented to provide a technical solution to compress the radar information of the radar dimension, for example, using simple computation methods, e.g., even without dimension conversions.

In some demonstrative aspects, the statistical compression scheme may be implemented to provide a technical solution to compress the radar information of the radar dimension, for example, while using simple hardware, e.g., standard Analog to Digital (ADC) quantizes, e.g., with no complexity on a quantization dimension.

In some demonstrative aspects, radar processor 836 may be configured to store in a memory, e.g., memory 838, compressed radar data, for example, between computation processes, which are applied to radar Rx data 811 in the process of generating radar data 813, e.g., as described below.

In some demonstrative aspects, radar processor 836 may be configured to determine radar values corresponding to a first radar dimension according to a first computation process corresponding to the first radar dimension, e.g., as described below.

In some demonstrative aspects, radar processor 836 may be configured to store in a memory, e.g., memory 838, compressed radar information of the first computation process, e.g., as described below.

In some demonstrative aspects, memory 838 may include a Synchronous Dynamic Random-Access Memory (SDRAM).

In some demonstrative aspects, memory 838 may include a Double Data Rate Synchronous Dynamic Random-Access Memory (DDR SDRAM).

In other aspects, memory 838 may include any other type of memory.

In some demonstrative aspects, the compressed radar information of the first computation process may include statistical coding of the radar values corresponding to the first radar dimension, e.g., as described below.

In some demonstrative aspects, the statistical coding of the radar values corresponding to the first radar dimension may include a Huffman coding.

In other aspects, the statistical coding of the radar values corresponding to the first radar dimension may include any other type of statistical coding.

In some demonstrative aspects, radar processor 836 may be configured to retrieve from the memory 838 the compressed radar information of the first computation process, and to decompress the compressed radar information of the first computation process into the radar values corresponding to the first radar dimension, e.g., as described below.

In some demonstrative aspects, radar processor 836 may be configured to perform a second computation process corresponding to a second radar dimension based on the radar values corresponding to the first radar dimension, e.g., as described below.

In some demonstrative aspects, radar processor 836 may be configured to determine radar values corresponding to the second radar dimension according to the second computation process, e.g., as described below.

In some demonstrative aspects, radar 836 may be configured to store in the memory 838 compressed radar information of the second computation process, e.g., as described below.

In some demonstrative aspects, the compressed radar information of the second computation process may include statistical coding of the radar values corresponding to the second radar dimension, e.g., as described below.

In some demonstrative aspects, radar processor 836 may be configured to retrieve from the memory 838 the compressed radar information of the second computation process, and to decompress the compressed radar information of the second computation process into the radar values corresponding to the second radar dimension, e.g., as described below.

In some demonstrative aspects, radar processor 836 may be configured to perform a third computation process corresponding to a third radar dimension based on the radar values corresponding to the second radar dimension, e.g., as described below.

In some demonstrative aspects, the first computation process corresponding to the first radar dimension may include a cross correlation computation process. For example, the radar values corresponding to the first radar dimension may include, for example, radar range values determined according to the cross correlation computation process.

In some demonstrative aspects, the second computation process corresponding to the second radar dimension may include a Doppler computation process corresponding to the Doppler dimension. For example, the radar values corresponding to the second radar dimension may include, for example, Doppler range values determined according to the Doppler computation process.

In some demonstrative aspects, the third computation process corresponding to the third radar dimension may include an angle of Arrival (AoA) computation process corresponding to the azimuth dimension and/or the elevation dimension. For example, the radar values corresponding to the third radar dimension may include, for example, azimuth and/or elevation AOA values determined according to the AoA computation process.

In some demonstrative aspects, radar processor 836 may be configured to generate the compressed radar information corresponding to a computation process with a compression level of at least 30%, e.g., as described below.

In some demonstrative aspects, radar processor 836 may be configured to generate the compressed radar information corresponding to a computation process with a compression level of at least 50%, e.g., as described below.

In other aspects, radar processor 836 may be configured to generate the compressed radar information with any other compression level.

In some demonstrative aspects, a data size of the compressed radar information of the first computation process may be at least 30% less than a data size of the radar values corresponding to the first radar dimension; and/or a data size of the compressed radar information of the second computation process may be at least 30% less than the data size of the radar values corresponding to the second radar dimension.

In some demonstrative aspects, the data size of the compressed radar information of the first computation process may be at least 50% less than the data size of the radar values corresponding to the first radar dimension; and/or the data size of the compressed radar information of the second computation process may be at least 50% less than the data size of the radar values corresponding to the second radar dimension.

In some demonstrative aspects, radar processor 836 may be configured to compress the radar information generated according to a computation process, for example, by generating compressed data representing one or more types of radar values using a bit-size which is greater than a bit size for representing one or more other types of radar values, e.g., as described below.

In some demonstrative aspects, radar processor 836 may be configured to compress the radar information generated according to a computation process, for example, by generating compressed data representing peak radar values using a bit-size which is greater than a bit size for representing other, e.g., non-peak, radar values, e.g., as described below.

In some demonstrative aspects, the radar values corresponding to the first radar dimension may include one or more peak values, e.g., as described below.

In some demonstrative aspects, radar processor 836 may be configured to generate the compressed radar information of the first computation process to represent the one or more peak values with a first data bit-size, and to represent other radar values corresponding to the first radar dimension with a second data bit-size, e.g., as described below.

In some demonstrative aspects, the first data bit-size may be greater than the second data bit-size, e.g., as described below.

In some demonstrative aspects, radar processor 836 may be configured to generate the compressed radar information of the second computation process to represent the one or more peak values with a third data bit-size, and to represent other radar values corresponding to the second radar dimension with a fourth data bit-size, e.g., as described below.

In some demonstrative aspects, the third data bit-size may be greater than the fourth data bit-size, e.g., as described below.

In some demonstrative aspects, the first data bit-size may be equal to the third data bit-size, and/or the second data bit-size may be equal to the fourth data bit-size. In other aspects, different data bit-sizes may be implemented for compression of the radar values corresponding to the various computation processes.

In some demonstrative aspects, radar processor 836 may be configured to compress the radar information of one or more of the computation processes, for example, by applying a compression mechanism, which may be configured, for example, to exploit a nature of the 4D radar cube data for statistical compression of changes between the compute pipe line stages, e.g., as described below.

In some demonstrative aspects, radar processor 836 may be configured to compress radar information generated by a computation process ("stage"), for example, based on an expected data distribution at an output of the radar computation process, e.g., as described below.

In some demonstrative aspects, a processing stage, e.g., each processing stage, may have particular, e.g., different "natural" compression in a particular, e.g., different dimension, for example, based on characteristics of data of the processing stage. For example, these characteristics of data of the processing stages may be specific to imaging radar systems. Accordingly, the radar characteristics of a particular processing stage may be utilized to achieve, for example, an improved compression ratio for compressing the radar data generated by the particular processing stage.

In some demonstrative aspects, data of an output of a radar computation process, each stage of radar processing, may be focused on bins having real information of real targets, e.g., as described below.

In some demonstrative aspects, a statistical compression or coding, e.g., such as a Huffman coding or any other statistical coding, may be implemented to efficiently map coding levels at an output of the processing stage and, therefore, may provide a technical solution to efficiently save a large amount of data, e.g., in a lossless manner and with a high level of compression.

Figure 33:
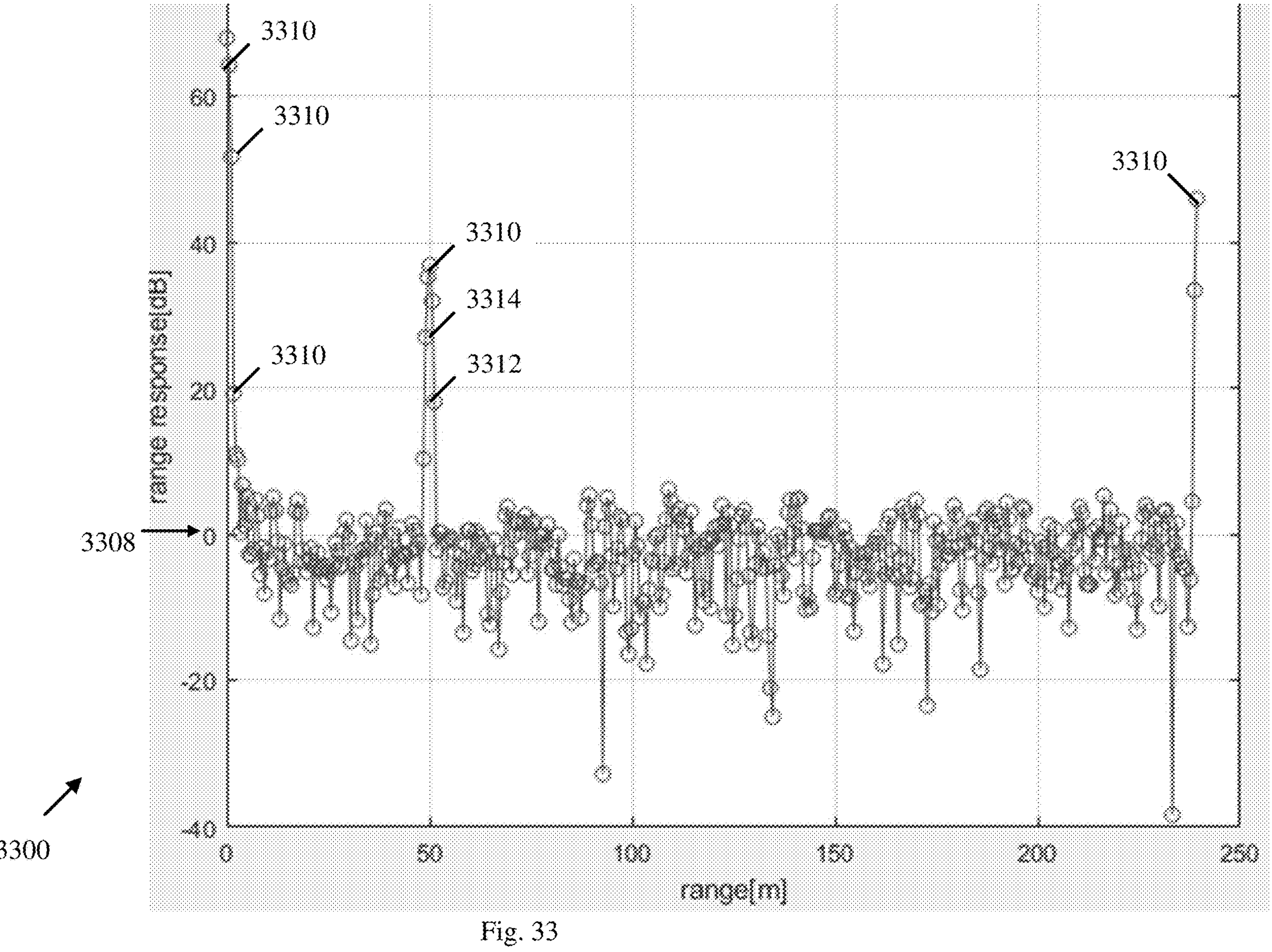
FIG. 33 is a schematic illustration of a graph depicting range values at an output of a range computation stage, in accordance with some demonstrative aspects.

Reference is made to FIG. 33, which schematically illustrates a graph 3300 depicting range values at an output of a range computation stage, in accordance with some demonstrative aspects.

In one example, the range values of graph 3300 may be generated, for example, as part of an output of a cross correlator of a cross correlation computation.

In some demonstrative aspects, as shown in FIG. 33 a large amount of range values 3308 may be in a noise level, and may not represent any radar targets.

In some demonstrative aspects, as shown in FIG. 33, one or more range values, for example, peak range values 3310, which may be above the noise level, may represent radar targets.

In some demonstrative aspects, as shown in FIG. 33, a count of range values above the noise level mat be relatively small, for example, compared to a count of values in the noise level.

In one example, as shown in FIG. 33, energy may fold into areas where there may be targets, e.g., range values 3310. Accordingly, statistical coding may be implemented to efficiently compress the radar data of graph 3300.

In some demonstrative aspects, radar processor 836 (FIG. 8) may be configured to compress the radar range data of graph 3300 according to a statistical coding, which may be configured to represent the one or more peak values 3310 with a first data bit-size, and to represent the other range values 3308 with a second data bit-size. For example, the data bit-size of compressed range values corresponding to the range values 3310 may be greater than the data bit-size of compressed values corresponding to the other range values 3308.

In one example, the first data bit-size may be sufficient to represent two relatively close range values, e.g., a first range value 3312 and a second range value 3314, in a way, which may allow distinguishing between the first range value 3312 and the second range value 3314.

In some demonstrative aspects, simulations have shown that for real case scenarios, a 50% compression level may be reached, for example, using the statistical compression based on the natural compression of the different processing stages.

Figure 34:
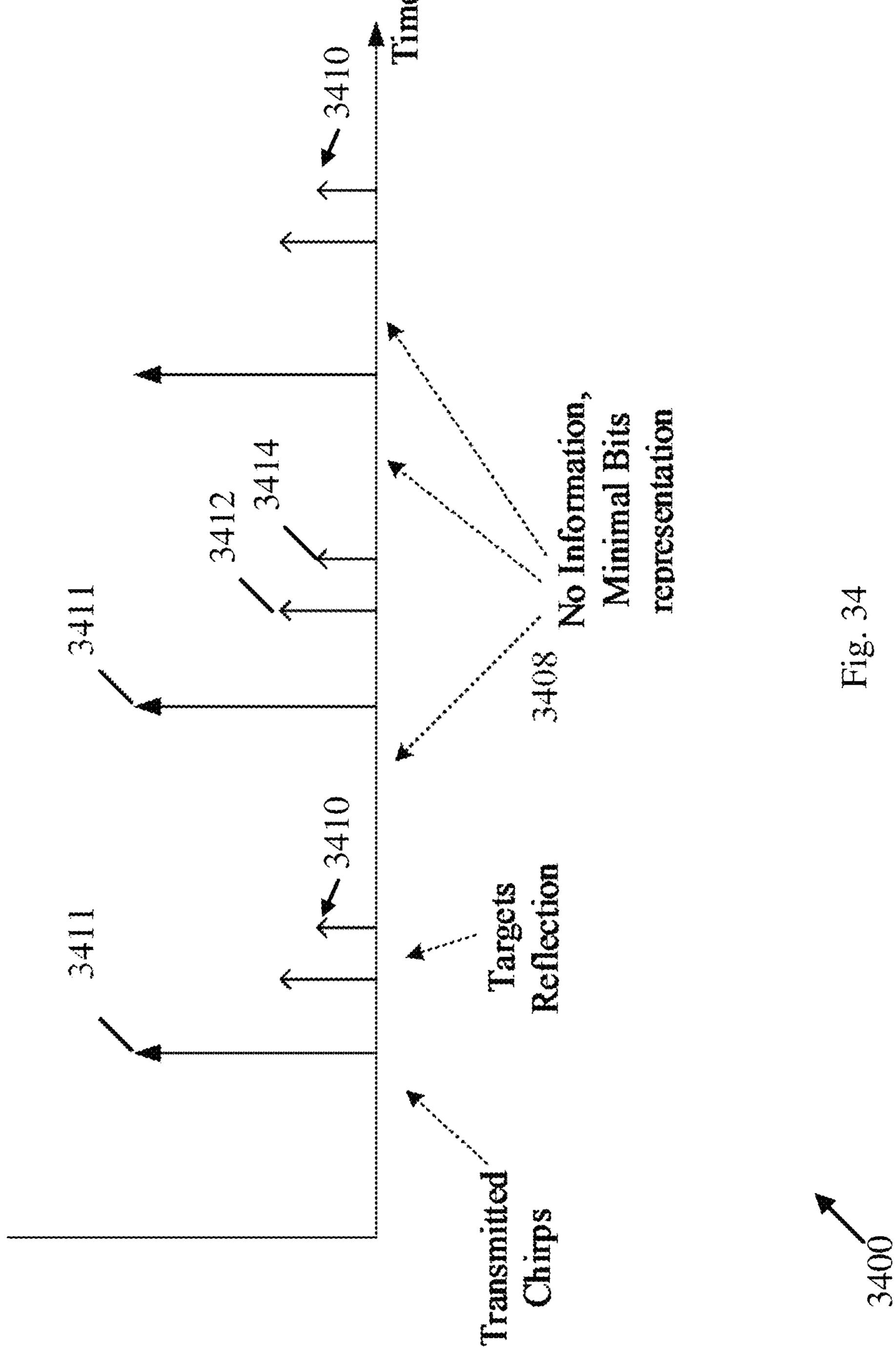
FIG. 34 is a schematic illustration of output data of a cross correlator, in accordance with some demonstrative aspects.

Reference is made to FIG. 34, which schematically illustrates output data 3400 of a cross correlator, in accordance with some demonstrative aspects.

In one example, the cross correlator may be configured to perform a cross correlation (XCORR) computation, e.g., corresponding to the range dimension.

In some demonstrative aspects, as shown in FIG. 34, most of the space, except for target reflections 3410 and/or TX self-leakage of transmitted chirps 3411, may be with very small amount of information. Based on this characteristic of the XCORR output, it may be possible to compress the XCORR output data D300 by represented most of the data values using a minimal number of data bits. For example, the output 3400 of the cross correlator may be compressed by statistical coding.

In some demonstrative aspects, a very high compress ratio may be achieved, for example, by applying a suitable bit representation for each range bin of the data output 3400, for example, using distance and location.

In some demonstrative aspects, for example, the range bins 3410 may be identified to include range values above a predefined range threshold. For example, a first data bit size may be applied for representing compressed values corresponding to the range values 3410. For example, the first data bit-size may be greater, e.g., significantly greater, than a second data bit-size, which may be applied for representing compressed values corresponding to the other range values, e.g., range values 3408.

In one example, radar processor 836 (FIG. 8) may be configured to compress the output data 3400 by representing one or more peak values 3410 with an increased data bit-size, for example, which may enable to distinguish between a first range value 3412 and a second range value 3414; and by representing the other range values 3408 with a reduced data bit-size. For example, the data bit-size for representing the peak values 3410 may be significantly higher than the data bit-size for representing the other values 3408.

In some demonstrative aspects, using a natural compress characteristic may be applicable with respect to the output of other radar computation processes, for example, the Doppler computation process and/or the AoA computation process, e.g., as described below.

Figure 35:
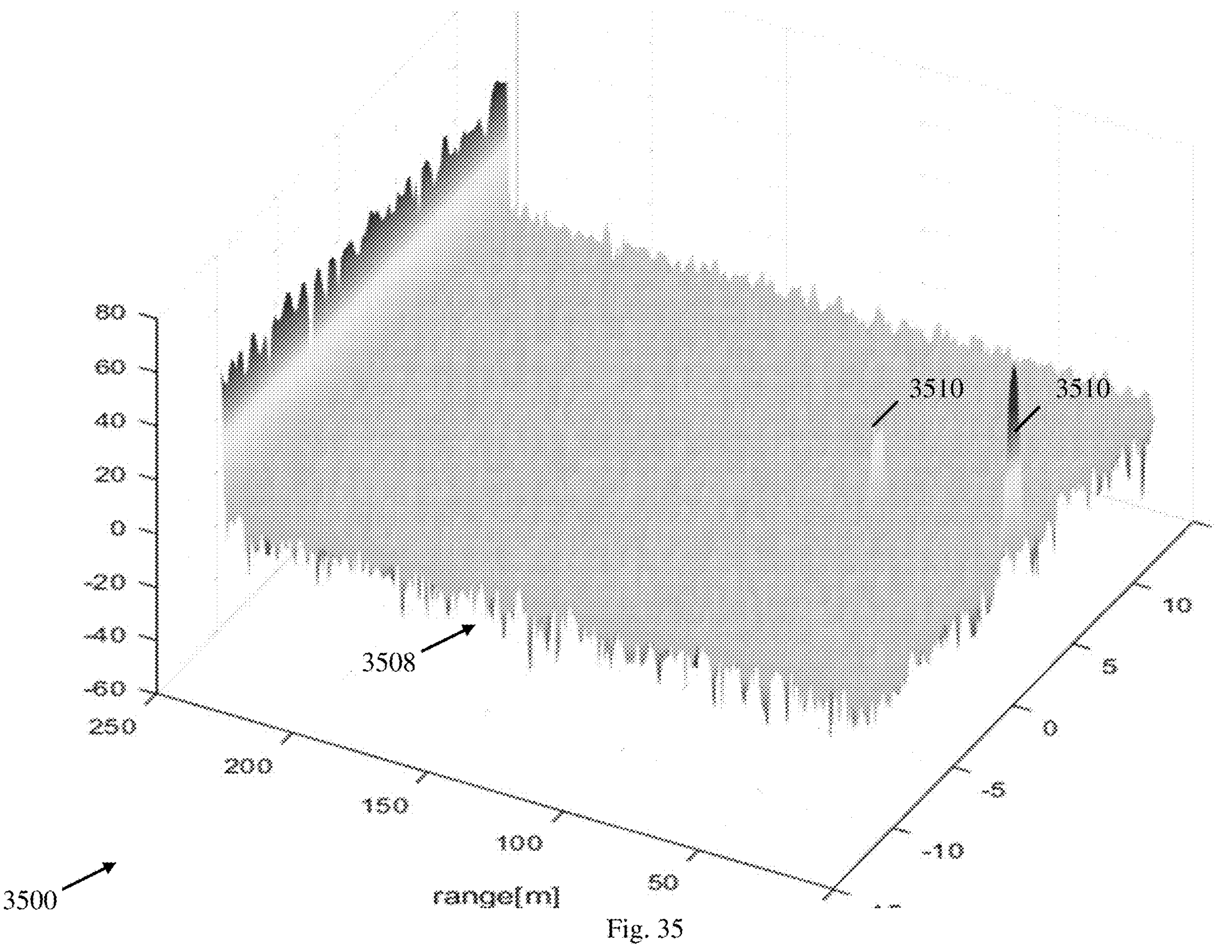
FIG. 35 is a schematic illustration of a range-Doppler response, implemented in accordance with some demonstrative aspects.

Reference is made to FIG. 35, which schematically illustrates a range-Doppler response 3500, implemented in accordance with some demonstrative aspects.

In one example, values of range-Doppler response 3500 may be generated, for example, after the cross correlation computation, e.g., corresponding to the range dimension, and after the Doppler computation, e.g., corresponding to the Doppler dimension.

In some demonstrative aspects, as shown in FIG. 35, range-Doppler response 3500 may show be characterized by a "natural compression" of range-Doppler values.

For example, as shown in FIG. 35, there may be a large number, e.g., a majority, of range-Doppler values 3508, which may include a very low amount of information. Accordingly, these low values 3508 may be represented by compressed values of a small data bit-size.

For example, as shown in FIG. 35, there may be a small number of range-Doppler values 3510, which may include target information. For example, the range-Doppler values 3510 may correspond to peaks in the range-Doppler response 3500. Accordingly, the range-Doppler values 3510 may be represented by compressed values of a grater data bit-size In one example, radar processor 836 (FIG. 8) may be configured to represent the one or more range-Doppler values 3510 with compressed values having a first bit-size, which may be higher, e.g., significantly higher, than a second data bit-size of compressed values to represent range-Doppler values 3508.

Figure 36:
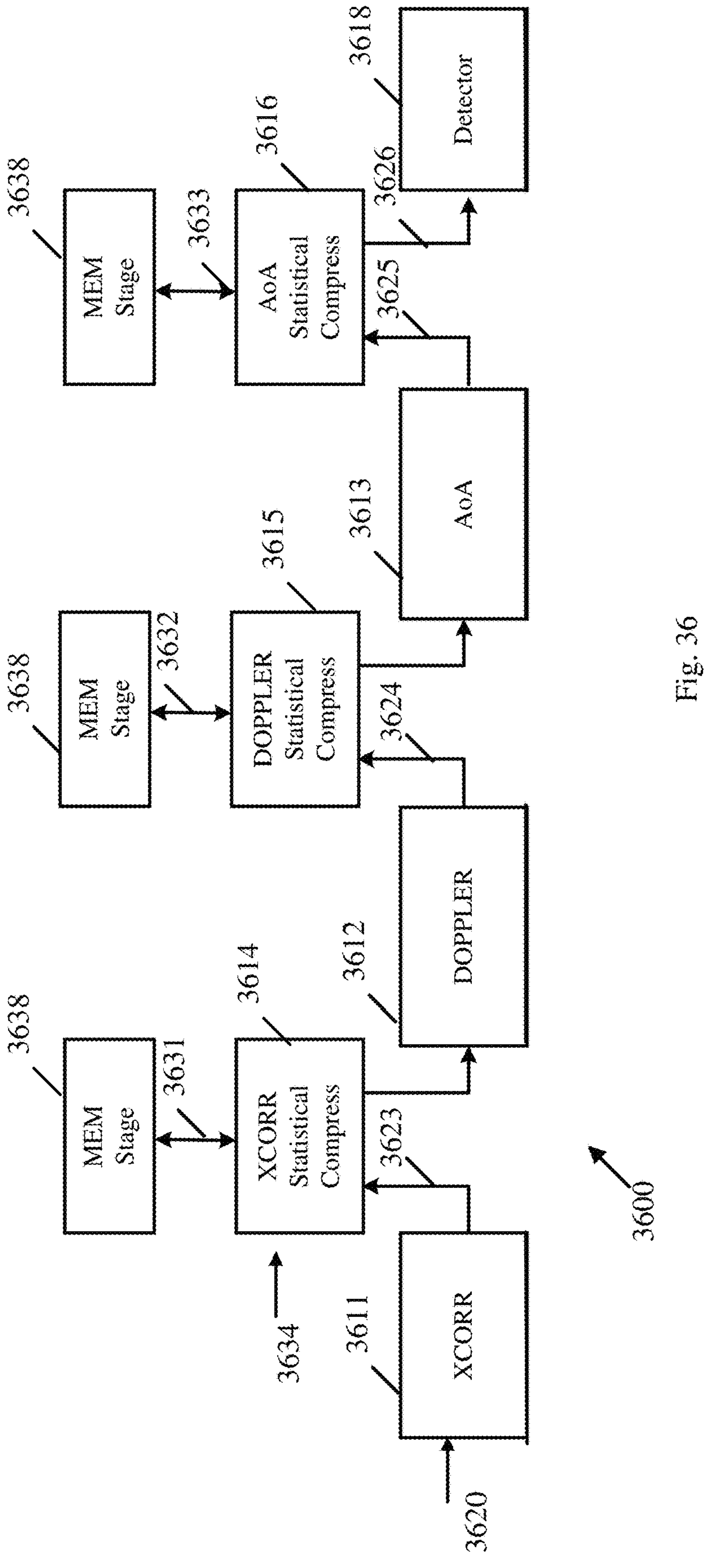
FIG. 36 is a schematic illustration of a radar-processing scheme, in accordance with some demonstrative aspects.

Reference is made to FIG. 36, which schematically illustrates a radar processing scheme 3600, in accordance with some demonstrative aspects.

In one example, radar processor 836 (FIG. 8) may be configured to generate the radar information 813 (FIG. 8), for example, by processing radar Rx data 811 (FIG. 1) according to one or more computation processes of radar processing scheme 3600.

In some demonstrative aspects, as shown in FIG. 36, radar-processing scheme 3600 may include a plurality of computation processes 3620 corresponding to the plurality of radar dimensions.

In some demonstrative aspects, as shown in FIG. 36, radar processing scheme 3600 may include a cross correlation (XCORR) computation process 3611 corresponding to the range dimension; a Doppler computation process 3612 corresponding to the Doppler dimension; and/or an AoA computation process 3613 corresponding the azimuth dimension and/or the elevation dimension, e.g., as described below.

In some demonstrative aspects, as shown in FIG. 36, data at an output of a computation process may be compressed into compressed data, for example, according to a statistical coding scheme, e.g., as described above.

In some demonstrative aspects, the compressed data may be stored in a memory 3638, for example, for use by a subsequent computation process. For example, the compressed data may be retrieved from the memory 3638 and decompressed, e.g., according to the statistical coding scheme to provide decompressed data for processing by the subsequent computation process. For example, as shown in FIG. 36, a compress/decompress procedure 3634 may be performed based on the output of a computation process. For example, memory 838 (FIG. 8) may include one or more elements of memory 3638

In one aspect, as shown in FIG. 36, the compress/decompress procedure 3634 may be applied to each computation process, e.g., to range data at an output of the XCORR computation process 3611, to Doppler data at an output of the Doppler computation process 3612, and/or to AoA data at an output of the AoA computation process 3613. In other aspects, the compress/decompress procedure 3634 may be applied to the output of only some of the computation processes 3620.

In some demonstrative aspects, the compress/decompress procedure 3634 may be implemented by at least one a compress/decompress engine. For example, radar processor 836 (FIG. 8) may be configured to perform one or more functionalities of the compress/decompress engine to perform the compress/decompress procedure 3634.

In some demonstrative aspects, radar processor 836 (FIG. 8) may be configured to determine range values 3623 corresponding to the range dimension, for example, by processing radar Rx data 811 (FIG. 8), according to the cross correlation computation process 3611.

In some demonstrative aspects, radar processor 836 (FIG. 8) may be configured to store in memory 3638, compressed radar information 3631 of the cross correlation computation process 3611.

In some demonstrative aspects, the compressed radar information 3631 may include statistical coding of range values 3623, for example, according to a range-based statistical coding 3614, e.g., as described above.

In some demonstrative aspects, radar processor 836 may be configured to retrieve from the memory 3638 the compressed radar information 3631 and to decompress the compressed radar information 3631 to provide decompressed radar information corresponding to the output of the cross correlation computation process 3611.

In some demonstrative aspects, radar processor 836 (FIG. 8) may be configured to apply the Doppler computation process 3612 to the decompressed radar information corresponding to the output of the cross correlation computation process 3611.

In some demonstrative aspects, radar processor 836 (FIG. 8) may be configured to determine Doppler values 3624 corresponding to the Doppler dimension, for example, according to the Doppler computation process 3612.

In some demonstrative aspects, radar processor 836 (FIG. 8) may be configured to store in the memory 3638 compressed radar information 3632 of the Doppler computation process 3612.

In some demonstrative aspects, the compressed radar information 3632 may include statistical coding of Doppler values 3624, for example, according to a Doppler-based statistical coding 3615, e.g., as described above.

In some demonstrative aspects, radar processor 836 may be configured to retrieve from the memory 3638 the compressed radar information 3632, and to decompress the compressed radar information 3632 to provide decompressed radar information corresponding to the output of the Doppler computation process 3612.

In some demonstrative aspects, radar processor 836 (FIG. 8) may be configured to apply the AoA computation process 3613 to the decompressed radar information corresponding to the output of the Doppler computation process 3612.

In one example, radar processor 836 (FIG. 8) may be configured to determine AoA values 3625 corresponding to the azimuth dimension and/or the elevation dimension, for example, according to the AoA computation process 3613.

In some demonstrative aspects, radar processor 836 (FIG. 8) may be configured to store in memory 3638, compressed radar information 3633 of the AoA computation process 3613.

In some demonstrative aspects, the compressed radar information 3633 may include statistical coding of AoA values 3625, for example, according to an AoA-based statistical coding 3616.

In some demonstrative aspects, radar processor 836 may be configured to retrieve from the memory 3638 the compressed radar information 3633, and to decompress the compressed radar information 3633 to provide decompressed radar information 3626 corresponding to the output of the AoA computation process 3613.

In some demonstrative aspects, radar processor 834 (FIG. 8) and/or processor 836 (FIG. 8) may be configured to perform a detection computation process 3618, for example, to detect one or more targets, for example, based on the decompressed radar information 3626.

Figure 37:
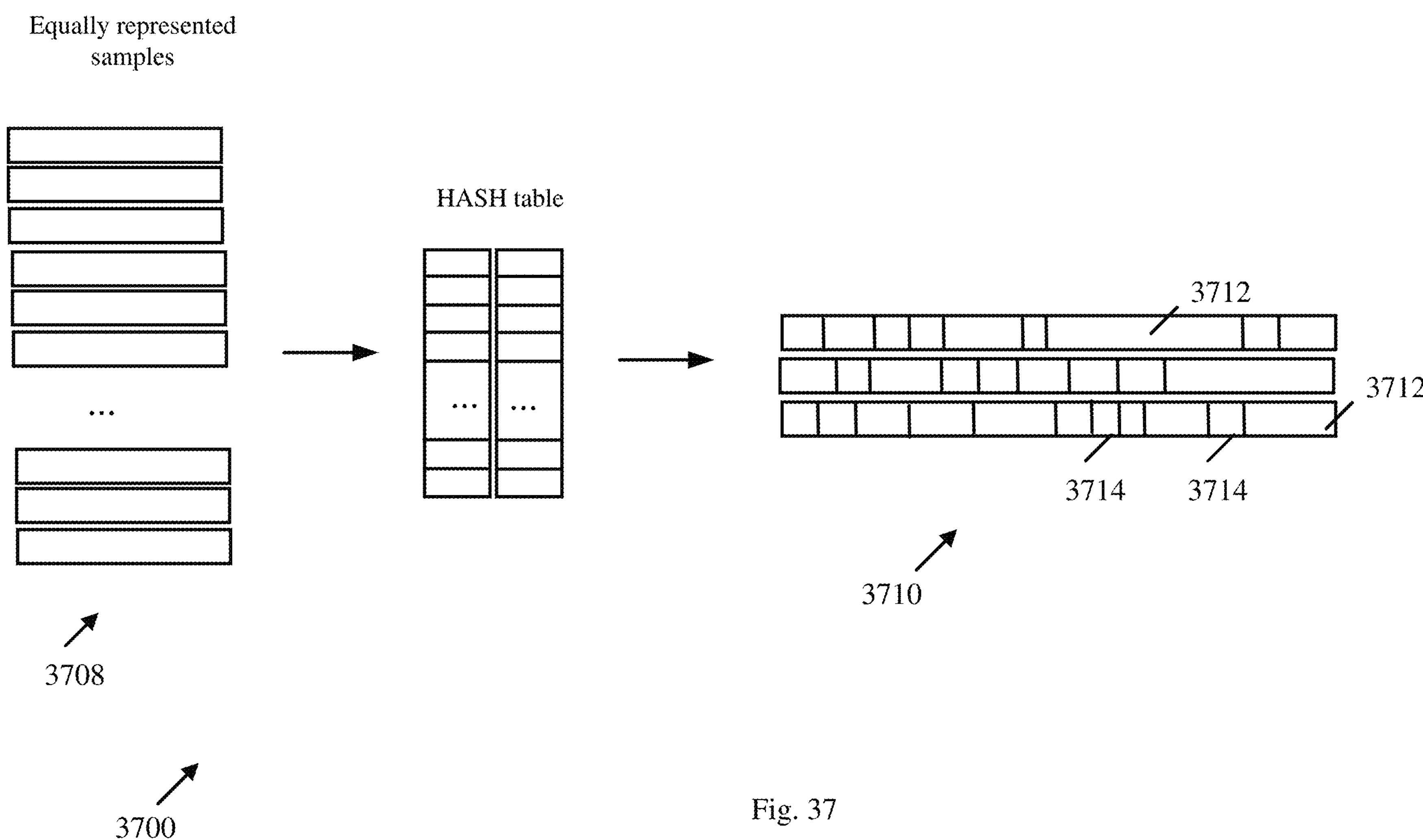
FIG. 37 is a schematic illustration of a compression scheme, in accordance with some demonstrative aspects.

Reference is made to FIG. 37, which schematically illustrates a compression scheme 3700, in accordance with some demonstrative aspects.

In one example, radar processor 836 (FIG. 8) may be configured to compress and/or decompress radar values based on compression scheme 3700, for example, between computation processes for generating radar information 813 (FIG. 8).

In some demonstrative aspects, as shown in FIG. 37, compression scheme 3700 may be configured to compress radar values 3708, for example, at an output of a computation process, e.g., the radar values 3623, 3624 and/or 3625.

In some demonstrative aspects, as shown in FIG. 37, radar values 3708 may have a same data bit-size, e.g., each of the radar values 3708 may be represented by a same number of bits.

In some demonstrative aspects, as shown in FIG. 37, the radar values 3708 may be compressed into compressed radar values 3710, e.g., according to a statistical coding.

In some demonstrative aspects, as shown in FIG. 37 compressed radar values 3710 may be represented using two or more different data bit-sizes.

In one example, radar processor 836 (FIG. 8) may be configured to represent one or more compressed radar values 3712 with a first data bit size, and to represent one or more other compressed radar values 3714 with a second data bit-size. For example, the first data bit-size may be significantly greater than the second data bit-size, e.g., as described above.

In some demonstrative aspects, compressed radar values 3712 may represent peak values of the radar values 3708, and/or radar values 3708 corresponding to potential radar targets.

In some demonstrative aspects, compresses radar values 3714 may represent radar values 3708, which do not include any target information, e.g., radar values 3708 corresponding to noise.

In some demonstrative aspects, compression scheme 3700 may provide an efficient compression of radar values 3708, for example, when the number of radar values 3714 is significantly greater than the number of radar values 3712.

In one example, in a situation where most of radar values 3708 do not include potential target information, most of the range vales of compressed radar values 3710 may be represented by the reduced data bit-size. For example, there may be some compressed range value 3710 having an increased data bit-size. According to this example, an overall capacity of compressed radar values 3710 may be reduced, for example, compared to an overall capacity of the radar values 3708, which may be all represented by the same number of bits.

In one example, the compression scheme 3700 may be very suitable for compressing radar data, for example, since most of the Range-Doppler map information may be buried with noise, e.g., at most of the range-Doppler bins. Accordingly, it maybe disadvantageous to use at this processing stage an equal bit-size representation, which may not be able to efficiently use the data bits for most of the bins.

Figure 38:
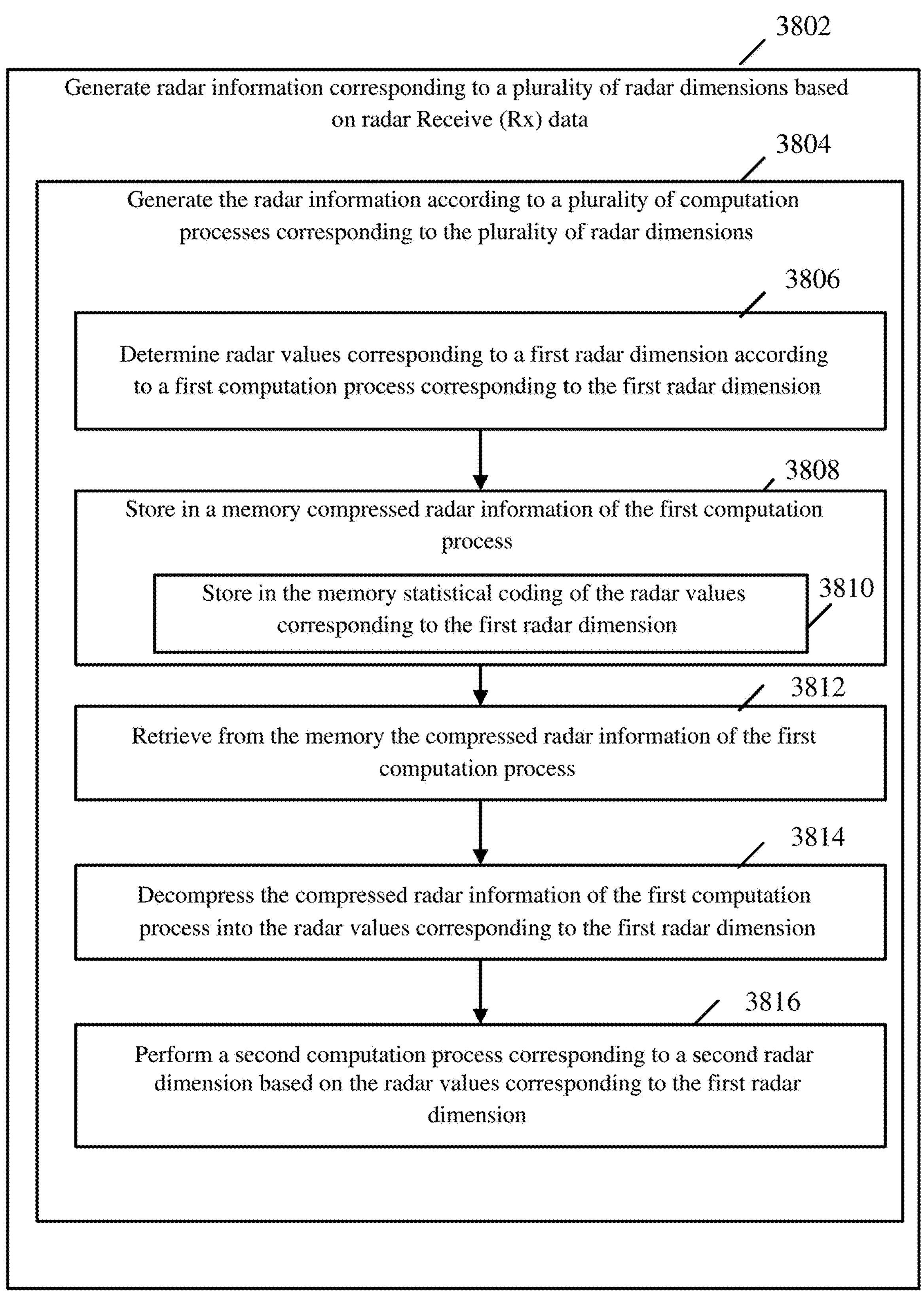
FIG. 38 is a flow-chart illustration of a method of generating radar information according to a plurality of computation processes corresponding to a plurality of radar dimensions, in accordance with some demonstrative aspects.

Reference is made to FIG. 38, which schematically illustrates a method of generating radar information according to a plurality of computation processes corresponding to a plurality of radar dimensions, in accordance with some demonstrative aspects. For example, one or more of the operations of the method of FIG. 38 may be performed by a radar processor, e.g., radar processor 836 (FIG. 8).

As indicated at block 3802, the method may include generating radar information corresponding to a plurality of radar dimensions based on radar Rx data.

For example, radar processor 836 (FIG. 8) may be configured to generate radar information 813 (FIG. 8) corresponding to the plurality of radar dimensions based on radar Rx data 811 (FIG. 8), e.g., as described above.

As indicated at block 3804, generating the radar information corresponding to the plurality of radar dimensions may include generating the radar information according to a plurality of computation processes corresponding to the plurality of radar dimensions. For example, processor 836 (FIG. 8) may generate the radar information 813 (FIG. 8) according to the plurality of computation processes 3620 (FIG. 36), e.g., as described above.

As indicated at block 3806, generating the radar information according to the plurality of computation processes may include determining radar values corresponding to a first radar dimension according to a first computation process corresponding to the first radar dimension. For example, processor 836 (FIG. 8) may determine the radar values corresponding to the first radar dimension according to the first computation process corresponding to the first radar dimension, e.g., as described above.

As indicated at block 3808, generating the radar information according to the plurality of computation processes may include storing in a memory compressed radar information of the first computation process. For example, processor 836 (FIG. 8) may store in memory 838 (FIG. 8) the compressed radar information of the first computation process, e.g., as described above.

As indicated at block 3810, storing in the memory the compressed radar information may include storing statistical coding of the radar values corresponding to the first radar dimension. For example, processor 836 (FIG. 8) may store in memory 838 (FIG. 8) statistical coding of the radar values corresponding to the first radar dimension, e.g., as described above.

As indicated at block 3812, generating the radar information according to the plurality of computation processes may include retrieving from the memory the compressed radar information of the first computation process. For example, processor 836 (FIG. 8) may retrieve from the memory 838 (FIG. 8) the compressed radar information of the first computation process, e.g., as described above.

As indicated at block 3814, generating the radar information according to the plurality of computation processes may include decompressing the compressed radar information of the first computation process into the radar values corresponding to the first radar dimension. For example, processor 836 (FIG. 8) may decompress the compressed radar information of the first computation process into the radar values corresponding to the first radar dimension, e.g., as described above.

As indicated at block 3816, generating the radar information according to the plurality of computation processes may include performing a second computation process corresponding to a second radar dimension based on the radar values corresponding to the first radar dimension. For example, processor 836 (FIG. 8) may perform the second computation process corresponding to the second radar dimension based on the radar values corresponding to the first radar dimension, e.g., as described above.

Figure 39:
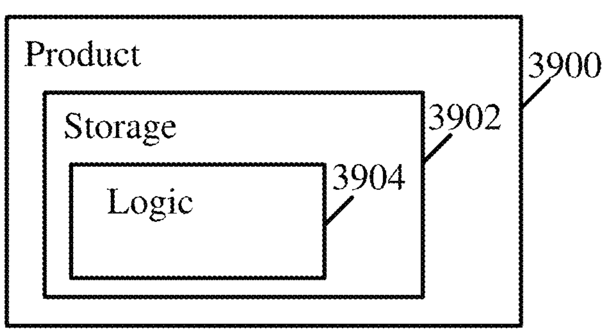
FIG. 39 is a schematic illustration of a product of manufacture, in accordance with some demonstrative aspects.

Reference is made to FIG. 39, which schematically illustrates a product of manufacture 3900, in accordance with some demonstrative aspects. Product 3900 may include one or more tangible computer-readable ("machine-readable") non-transitory storage media 3902, which may include computer-executable instructions, e.g., implemented by logic 3904, operable to, when executed by at least one computer processor, enable the at least one computer processor to implement one or more operations and/or functionalities described with reference to the FIGS. 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, and/or 38, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 3900 and/or storage media 3902 may include one or more types of computer-readable storage media capable of storing data, including volatile memory, non-volatile memory, removable or non-removable memory, erasable or non-erasable memory, writeable or re-writeable memory, and the like. For example, storage media 3902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 3904 may include instructions, data, and/or code, which, if executed by a machine, may cause the machine to perform a method, process, and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 3904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner, or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further aspects.

Example 1 includes an apparatus comprising a non-uniform radar, e.g., a non-uniform Multiple-Input-Multiple-Output (MIMO) radar antenna, the non-uniform radar antenna comprising a Transmit (Tx) antenna array comprising a plurality of Tx antennas to transmit a plurality of Tx radar signals, the Tx antenna array comprising a plurality of Tx clusters arranged with non-uniform spacing between the plurality of Tx clusters, a Tx cluster of the plurality of Tx clusters comprising at least three Tx antennas; and a Receive (Rx) antenna array comprising a plurality of Rx antennas to receive a plurality of Rx radar signals, the Rx antenna array comprising a plurality of Rx clusters arranged with non-uniform spacing between the plurality of Rx clusters, an Rx cluster of the plurality of Rx clusters comprising at least three Rx antennas, wherein the Tx antenna array and the Rx antenna array are configured such that a convolution of the plurality of Tx antennas and the plurality of Rx antennas represents a non-uniform virtual antenna array, e.g., a non-uniform virtual MIMO antenna array, comprising a plurality of non-uniformly spaced virtual antennas, wherein the non-uniform virtual antenna array comprises a plurality of virtual clusters arranged with non-uniform spacing between the plurality of virtual clusters, and wherein a virtual cluster of the plurality of virtual clusters comprises at least three virtual antennas.

Example 2 includes the subject matter of Example 1, and optionally, wherein the Rx cluster comprises at least three Rx traces to connect the at least three Rx antennas to a Radio Frequency (RF) circuit, and wherein the Rx cluster is configured such that a trace loss via each of the at least three Rx traces is no more than 10 decibel (dB).

Example 3 includes the subject matter of Example 1 or 2, and optionally, wherein the Tx cluster comprises at least three Tx traces to connect the at least three Tx antennas to a Radio Frequency (RF) circuit, and wherein the Tx cluster is configured such that a trace loss via each of the at least three Tx traces is no more than 10 decibel (dB).

Example 4 includes the subject matter of any one of Examples 1-3, and optionally, wherein a distance between a first Tx antenna of the Tx cluster and a second Tx antenna of the Tx cluster, which is adjacent to the first Tx antenna, is greater than half a wavelength of the Tx radar signals.

Example 5 includes the subject matter of any one of Examples 1-4, and optionally, wherein a distance between a first Rx antenna of the Rx cluster and a second Rx antenna of the Rx cluster, which is adjacent to the first Rx antenna, is greater than half a wavelength of the Tx radar signals.

Example 6 includes the subject matter of any one of Examples 1-5, and optionally, wherein a distance between any two Tx antennas of the Tx cluster is no more than 50 millimeter (mm).

Example 7 includes the subject matter of any one of Examples 1-6, and optionally, wherein a distance between any two Rx antennas of the Rx cluster is no more than 50 millimeter (mm).

Example 8 includes the subject matter of any one of Examples 1-7, and optionally, wherein the plurality of Tx clusters comprises a uniform Tx core cluster and a plurality of non-uniform Tx clusters, the uniform Tx core cluster comprising a plurality of uniform Tx rows arranged with uniform spacing between the plurality of uniform Tx rows, wherein a uniform Tx row of the plurality of uniform Tx rows comprises a plurality of uniformly-spaced Tx antennas, and wherein a non-uniform Tx cluster of the plurality of non-uniform Tx clusters comprises a plurality of non-uniformly spaced Tx antennas.

Example 9 includes the subject matter of Example 8, and optionally, wherein the uniform Tx core cluster surrounds a center of the Tx antenna array, and wherein the plurality of non-uniform Tx clusters surround the uniform Tx core cluster.

Example 10 includes the subject matter of Example 8 or 9, and optionally, comprising a radar processor configured to control the non-uniform radar antenna to transmit the plurality of Tx radar signals by applying a first power level to one or more first Tx antennas of the uniform Tx core cluster, and applying a second power level to one or more second Tx antennas of the uniform Tx core cluster, the first power level is different from the second power level.

Example 11 includes the subject matter of any one of Examples 1-10, and optionally, wherein the plurality of Rx clusters comprises a uniform Rx core cluster and a plurality of non-uniform Rx clusters, the uniform Rx core cluster comprising a plurality of uniform Rx rows arranged with uniform spacing between the plurality of uniform Rx rows, wherein a uniform Rx row of the plurality of uniform Rx rows comprises a plurality of uniformly-spaced Rx antennas, and wherein a non-uniform Rx cluster of the plurality of non-uniform Rx clusters comprises a plurality of non-uniformly spaced Rx antennas.

Example 12 includes the subject matter of Example 11, and optionally, wherein the uniform Rx core cluster surrounds a center of the Rx antenna array, and wherein the plurality of non-uniform Rx clusters surrounds the uniform Rx core cluster.

Example 13 includes the subject matter of Example 11 or 12, and optionally, comprising a radar processor configured to control the non-uniform radar antenna by applying a first power level to one or more first Rx antennas of the uniform Rx core cluster, and applying a second power level to one or more second Rx antennas of the uniform Rx core cluster, the first power level is different from the second power level.

Example 14 includes the subject matter of any one of Examples 8-13, and optionally, wherein the non-uniform virtual antenna array comprises a uniform virtual core cluster comprising a plurality of uniform virtual rows arranged with uniform spacing between the plurality of uniform virtual rows, wherein a uniform virtual row of the plurality of uniform virtual rows comprises a plurality of uniformly-spaced virtual antennas.

Example 15 includes the subject matter of any one of Examples 1-14, and optionally, wherein the plurality of Tx clusters comprises a plurality of uniform Tx rows arranged with non-uniform spacing between the plurality of uniform Tx rows, a uniform Tx row of the plurality of Tx uniform rows comprising a plurality of uniformly-spaced Tx antennas.

Example 16 includes the subject matter of any one of Example 1-15, and optionally, wherein the plurality of Rx clusters comprises a plurality of uniform Rx rows arranged with non-uniform spacing between the plurality of uniform Rx rows, a uniform Rx row of the plurality of uniform Rx rows comprising a plurality of uniformly-spaced Rx antennas.

Example 17 includes the subject matter of any one of Examples 1-16, and optionally, wherein the plurality of Tx clusters and the plurality of Rx clusters are arranged according to a cross-like topology comprising a first non-uniform Tx cluster comprising a first plurality of non-uniformly spaced Tx antennas at a first end of a first diagonal of a quadrilateral, a second non-uniform Tx cluster comprising a second plurality of non-uniformly spaced Tx antennas at a second end of the first diagonal, a first non-uniform Rx cluster comprising a first plurality of non-uniformly spaced Rx antennas at a first end of a second diagonal of the quadrilateral, and a second non-uniform Rx cluster comprising a second plurality of non-uniformly spaced Rx antennas at a second end of the second diagonal.

Example 18 includes the subject matter of any one of Examples 1-17, and optionally, comprising a radar processor configured to generate radar information based on the plurality of Rx radar signals.

Example 19 includes the subject matter of Example 18, and optionally, comprising a vehicle, the vehicle comprising a system controller to control one or more systems of the vehicle based on the radar information.

Example 20 includes an apparatus comprising a processor to calibrate a Transmit (Tx) Local Oscillator (LO) leakage of a Multiple-Input-Multiple-Output (MIMO) radar comprising a MIMO radar antenna, the processor configured to cause the MIMO radar to transmit a leakage calibration signal via the MIMO radar antenna, the leakage calibration signal comprising a continues-wave (CW) signal at a first frequency, and a second harmonic of the CW signal at a second frequency, the second frequency is double the first frequency, wherein the processor is configured to calibrate the Tx LO leakage of the MIMO radar based on radar Receive (Rx) data corresponding to the leakage calibration signal; and an input to receive the Rx radar data, the Rx radar data based on radar signals received via a plurality of Rx antennas of the MIMO radar antenna, the radar signals based on Tx to Rx (Tx-Rx) leakage of the leakage calibration signal to the Rx antennas.

In one example, the apparatus of Example 20 may include, for example, one or more additional elements, and/or may perform one or more additional operations and/or functionalities, for example, as described with respect to Examples 1, 37, 53 and/or 69.

Example 21 includes the subject matter of Example 20, and optionally, wherein the processor is configured to determine a complex phasor of the second harmonic in the radar Rx data, and to calibrate the Tx LO leakage of the MIMO radar based on the complex phasor of the second harmonic.

Example 22 includes the subject matter of Example 20 or 21, and optionally, wherein the processor is configured to cause the MIMO radar to transmit a plurality of leakage calibration signals comprising the CW signal at the first frequency, the processor configured to process Rx data based on the plurality of leakage calibration signals to determine a plurality of complex phasors of second harmonics corresponding to the CW signal at the first frequency, and to calibrate the Tx LO leakage of the MIMO radar based on the plurality of complex phasors.

Example 23 includes the subject matter of Example 22, and optionally, wherein the processor is configured to calibrate the Tx LO leakage of the MIMO radar based on a plurality of differences between different pairs of complex phasors from the plurality of complex phasors.

Example 24 includes the subject matter of any one of Examples 20-23, and optionally, wherein the processor is configured to cause a Tx path of the MIMO radar to transmit the CW signal at the first frequency via a Tx antenna of the MIMO radar antenna.

Example 25 includes the subject matter of Example 24, and optionally, wherein the processor is configured to calibrate the Tx LO leakage with respect to leakage of LO signals from an LO to an input of a saturated Power Amplifier (PA) in the Tx path.

Example 26 includes the subject matter of Example 24 or 25, and optionally, wherein the processor is configured to determine a plurality of complex phasors of second harmonics in the Rx data, a complex phasor of the plurality of complex phasors corresponding to a Tx-Rx path comprising the Tx antenna and an Rx antenna of the plurality of Rx antennas, the processor configured to calibrate the Tx LO leakage of the Tx path based on the plurality of complex phasors.

Example 27 includes the subject matter of Example 26, and optionally, wherein the processor is configured to calibrate the Tx LO leakage of the Tx path based on an average of the plurality of complex phasors.

Example 28 includes the subject matter of any one of Examples 20-27, and optionally, wherein the leakage calibration signal comprises a plurality of CW signals at a plurality of first frequencies, respectively, and a plurality of second harmonics of the CW signals at a plurality of second frequencies, respectively, a frequency of the plurality of second frequencies is double a respective frequency of the plurality of first frequencies.

Example 29 includes the subject matter of Example 28, and optionally, wherein the processor is configured to cause a plurality of Tx paths of the MIMO radar to transmit the plurality of CW signals, respectively, the plurality of CW signals to be transmitted via a plurality of Tx antennas of the MIMO antenna, respectively, wherein the processor is configured to calibrate the Tx LO leakage of the plurality of Tx paths by processing Rx data, which is based on the leakage calibration signal comprising the plurality of CW signals.

Example 30 includes the subject matter of Example 29, and optionally, wherein the processor is configured to determine a plurality of complex phasors of second harmonics in the Rx data, a complex phasor of the plurality of complex phasors corresponding to a Tx path of the plurality of Tx paths, the processor configured to calibrate the Tx LO leakage of the plurality of Tx paths based on the plurality of complex phasors.

Example 31 includes the subject matter of any one of Examples 20-30, and optionally, wherein the leakage calibration signal comprises a third harmonic of the CW signal at a third frequency, the third frequency is three times the first frequency.

Example 32 includes the subject matter of any one of Examples 20-31, and optionally, wherein the leakage calibration signal comprises an image signal of the CW signal at a fourth frequency, the fourth frequency is equal to the first frequency with sign-inversion.

Example 33 includes the subject matter of any one of Examples 20-32, and optionally, wherein the leakage calibration signal comprises a Direct Current (DC) signal, an amplitude of the DC signal based on the Tx LO leakage.

Example 34 includes the subject matter of any one of Examples 20-33, and optionally, wherein the CW signal comprises a constant sinus signal.

Example 35 includes the subject matter of any one of Examples 20-34, and optionally, comprising the MIMO radar antenna comprising the plurality of Rx antennas and a plurality of Transmit (Tx) antennas, and a plurality of Rx chains to generate the radar Rx data based on the radar signals received via the plurality of Rx antennas, wherein the processor is configured to generate radar information based on radar signals communicated by the MIMO radar.

Example 36 includes the subject matter of Example 35, and optionally, comprising a vehicle, the vehicle comprising a system controller to control one or more systems of the vehicle based on the radar information.

Example 37 includes an apparatus comprising a high bandwidth (BW) Analog to Digital Converter (ADC) configured to convert an analog Receive (Rx) chirp signal into a high BW digital Rx chirp signal having a bandwidth of at least 500 Megahertz (MHz), the analog Rx chirp signal is based on a Transmit (Tx) chirp signal; and a digital matched filter configured to generate cross-correlated (XCORR) radar Rx data based on a correlation between the high BW digital Rx chirp signal and a template mask corresponding to the Tx chirp signal, a length of the template mask corresponds to a length of the Tx chirp signal, wherein the digital matched filter is configured to split the template mask into a plurality of mask segments, to transform a plurality of time-domain segments of the high BW digital Rx chirp signal into a respective plurality of frequency-domain Rx chirp segments, to generate a plurality of masked segments by multiplying the plurality of mask segments with the plurality of frequency-domain Rx chirp segments, respectively, and to generate the XCORR Rx radar data based on a combination of the plurality of masked segments.

In one example, the apparatus of Example 37 may include, for example, one or more additional elements, and/or may perform one or more additional operations and/or functionalities, for example, as described with respect to Examples 1, 20, 53 and/or 69.

Example 38 includes the subject matter of Example 37, and optionally, wherein the digital matched filter is configured to transform a time-domain segment of the high BW digital Rx chirp signal into a frequency-domain Rx chirp segment by applying to the time-domain segment of the high BW digital Rx chirp signal a Fast Fourier Transform (FFT) having an FFT size, which is based on a length of a mask segment to be multiplied by the frequency-domain Rx chirp segment.

Example 39 includes the subject matter of any one of Example 38, and optionally, wherein the FFT size is less than or equal to, e.g., no more than, about 64000 samples.

Example 40 includes the subject matter of any one of Example 38 or 39, and optionally, wherein the FFT size is less than or equal to, e.g., no more than, about 32000 samples.

Example 41 includes the subject matter of any one of any one of Examples 37-40, and optionally, wherein the high BW ADC is configured to convert a full BW of the analog Rx chirp signal into the high BW digital Rx chirp signal.

Example 42 includes the subject matter of any one of Examples 37-41, and optionally, wherein the plurality of mask segments comprises at least 4 mask segments.

Example 43 includes the subject matter of any one of Examples 37-42, and optionally, wherein the plurality of mask segments comprises at least 6 mask segments.

Example 44 includes the subject matter of any one of Examples 37-43, and optionally, wherein the Tx chirp signal comprises a coded Tx chirp encoded with at least one of phase coding, frequency coding or magnitude coding.

Example 45 includes the subject matter of any one of Examples 37-44, and optionally, wherein the high BW digital Rx chirp signal has a bandwidth of at least 1 Gigahertz (GHz)

Example 46 includes the subject matter of any one of Examples 37-45, and optionally, wherein the high BW digital Rx chirp signal has a bandwidth of at least 2 Gigahertz (GHz).

Example 47 includes the subject matter of any one of Examples 37-46, and optionally, wherein the length of the template mask is at least about 20000 samples.

Example 48 includes the subject matter of any one of Examples 37-47, and optionally, wherein the length of the template mask is at least about 50000 samples.

Example 49 includes the subject matter of any one of Examples 37-48, and optionally, wherein the high BW ADC is configured to generate the high BW digital Rx chirp signal having a dynamic range with an Effective Number Of Bits (ENOB) of at least 8.

Example 50 includes the subject matter of any one of Examples 37-49, and optionally, comprising a Multiple-Input-Multiple-Output (MIMO) radar antenna comprising a plurality of Tx antennas to transmit a plurality of Tx chirp signals, respectively, and a plurality of Rx antennas to receive a plurality of Rx chirp signals, respectively, based on the plurality of Tx chirp signals, wherein the high BW ADC is to receive the analog Rx chirp signal from an Rx antenna of the plurality of Rx antennas.

Example 51 includes the subject matter of any one of Examples 37-50, and optionally, comprising a radar processor to generate radar information based on the XCORR radar Rx data.

Example 52 includes the subject matter of Example 51, and optionally, comprising a vehicle, the vehicle comprising a system controller to control one or more systems of the vehicle based on the radar information.

Example 53 includes an apparatus comprising a Dynamic Random-Access Memory (DRAM) accessible according to a plurality of memory banks, a memory bank comprising a plurality of memory rows; and a processor configured to generate radar information based on Receive (Rx) radar samples, the processor configured to store information of a radar frame in the DRAM according to a range-Doppler (RD) tiling scheme configured according to a configuration of the plurality of memory banks, wherein the information of the radar frame corresponds to a plurality of range values, a plurality of Doppler values, a plurality of Receive (Rx) channels, and a plurality of Transmit (Tx) channels, wherein the RD tiling scheme comprises a plurality of RD tiles, an RD tile comprising a plurality of radar values corresponding to a range value of the plurality of range values and a Doppler value of the plurality of Doppler values, wherein a radar value of the plurality of radar values in the RD tile corresponds to an Rx-Tx (RT) combination of an Rx channel of the plurality of Rx channels and a Tx channel of the plurality of Tx channels.

In one example, the apparatus of Example 53 may include, for example, one or more additional elements, and/or may perform one or more additional operations and/or functionalities, for example, as described with respect to Examples 1, 20, 37 and/or 69.

Example 54 includes the subject matter of Example 53, and optionally, wherein the RD tiling scheme comprises one or more first RD tiles corresponding to a same Doppler value in a first memory bank of the DRAM, and one or more second RD tiles corresponding to the same Doppler value in a second memory bank of the DRAM, the one or more first RD tiles corresponding to one or more first consecutive range values, respectively, the one or more second RD tiles corresponding to one or more second consecutive range values, respectively, wherein the one or more second consecutive range values are immediately successive to the one or more first consecutive range values.

Example 55 includes the subject matter of Example 54, and optionally, wherein the one or more first RD tiles are in one or more first rows of the first memory bank, the RD tiling scheme comprising one or more third RD tiles corresponding to the same Doppler value in one or more second rows of the first memory bank, the one or more third RD tiles corresponding to one or more third consecutive range values, respectively, wherein the one or more second rows are after the one or more first rows, and the one or more third consecutive range values are after the one or more second range values.

Example 56 includes the subject matter of Example 54 or 55, and optionally, wherein the processor is configured to determine a plurality of cross-correlation (XCORR) values of the radar frame based on the Rx radar samples, and to write the plurality of XCORR values to the DRAM according to the RD tiling scheme.

Example 57 includes the subject matter of Example 56, and optionally, wherein the processor is configured to write to the DRAM a plurality of sets of XCORR values, a set of XCORR values comprises XCORR values corresponding to a same RT combination and the same Doppler value, the processor configured to write one or more first XCORR values of the set of XCORR values to the one or more first RD tiles in the first memory bank, and to write one or more second XCORR values of the set of XCORR values to the one or more second RD tiles in the second memory bank.

Example 58 includes the subject matter of any one of Examples 53-57, and optionally, wherein the RD tiling scheme is configured such that a first RD tile corresponding to a first Doppler value and to a first-in-order range value of the plurality of range values is in a first memory bank, and a second RD tile corresponding to a second Doppler value and to the first-in-order range value is in a second memory bank different from the first memory bank, the second Doppler value is immediately successive to the first Doppler value.

Example 59 includes the subject matter of any one of Examples 53-58, and optionally, wherein the processor is configured to read from the DRAM a plurality of radar values for Doppler processing, and to store one or more results of the Doppler processing in the DRAM, the plurality of radar values for Doppler processing comprising radar values corresponding to a same combination of a particular range value and a particular RT combination.

Example 60 includes the subject matter of any one of Examples 53-59, and optionally, wherein the processor is configured to read from the RD tile a plurality of radar values for Angle-of Arrival (AoA) processing for a range-Doppler bin corresponding to the range value and the Doppler value.

Example 61 includes the subject matter of any one of Examples 53-60, and optionally, wherein the RD tile comprises one or more tile rows in one or more memory rows of a memory bank and one or more tile columns in one or more memory columns of the DRAM memory, a tile area of the RD tile is based on a count of the plurality of Tx channels and a count of the plurality of Rx channels, and a count of the tile columns of the RD tile is based on the tile area of the RD tile, and a count of RD tiles per memory row.

Example 62 includes the subject matter of any one of Examples 53-61, and optionally, wherein the RD tiling scheme comprises a plurality of RD tiles along a memory row of the memory bank, the plurality of RD tiles sharing a same Doppler value, the plurality of RD tiles corresponding to a sequence of range values, respectively.

Example 63 includes the subject matter of any one of Examples 53-62, and optionally, wherein the RD tiling scheme comprises a plurality of RD tiles along a memory row of the memory bank, the plurality of RD tiles sharing a same Range value, the plurality of RD tiles corresponding to a sequence of Doppler values, respectively.

Example 64 includes the subject matter of any one of Examples 53-63, and optionally, wherein the RD tile corresponding to the range value and the Doppler value is configured to store radar values for each of all RT combinations of the plurality of Rx channels and the plurality of Tx channels.

Example 65 includes the subject matter of any one of Examples 53-64, and optionally, wherein the DRAM comprises a Synchronous DRAM (SDRAM).

Example 66 includes the subject matter of any one of Examples 53-65, and optionally, wherein the DRAM comprises a Double Data Rate Synchronous DRAM (DDR SDRAM).

Example 67 includes the subject matter of any one of Examples 53-66, and optionally, comprising a Multiple-Input-Multiple-Output (MIMO) radar antenna comprising a plurality of Rx antennas and a plurality of Transmit (Tx) antennas, and a plurality of Rx chains to generate the radar Rx samples based on radar signals transmitted via the plurality of Tx antennas and received via the plurality of Rx antennas.

Example 68 includes the subject matter of any one of Examples 53-67, and optionally, comprising a vehicle, the vehicle comprising a system controller to control one or more systems of the vehicle based on the radar information.

Example 69 includes an apparatus comprising a radar processor configured to generate radar information corresponding to a plurality of radar dimensions based on radar Receive (Rx) data, the radar processor comprising a memory; and a processor configured to generate the radar information according to a plurality of computation processes corresponding to the plurality of radar dimensions, the processor configured to determine radar values corresponding to a first radar dimension according to a first computation process corresponding to the first radar dimension, and to store in the memory compressed radar information of the first computation process, the compressed radar information of the first computation process comprising statistical coding of the radar values corresponding to the first radar dimension, the processor configured to retrieve from the memory the compressed radar information of the first computation process, to decompress the compressed radar information of the first computation process into the radar values corresponding to the first radar dimension, and to perform a second computation process corresponding to a second radar dimension based on the radar values corresponding to the first radar dimension.

In one example, the apparatus of Example 69 may include, for example, one or more additional elements, and/or may perform one or more additional operations and/or functionalities, for example, as described with respect to Examples 1, 20, 37 and/or 53.

Example 70 includes the subject matter of Example 69, and optionally, wherein the radar values corresponding to the first radar dimension comprise one or more peak values, the compressed radar information of the first computation process configured to represent the one or more peak values with a first data bit-size, and representing other radar values corresponding to the first radar dimension with a second data bit-size, the first data bit-size is greater than the second data bit-size.

Example 71 includes the subject matter of Example 69 or 70, and optionally, wherein the processor is configured to determine radar values corresponding to the second radar dimension according to the second computation process, and to store in the memory compressed radar information of the second computation process, the compressed radar information of the second computation process comprising statistical coding of the radar values corresponding to the second radar dimension, the processor configured to retrieve from the memory the compressed radar information of the second computation process, to decompress the compressed radar information of the second computation process into the radar values corresponding to the second radar dimension, and to perform a third computation process corresponding to a third radar dimension based on the radar values corresponding to the second radar dimension.

Example 72 includes the subject matter of any one of Examples 69-71, and optionally, wherein the radar information comprises four-dimensional (4D) radar information comprising range values in a range dimension, Doppler values in a Doppler dimension, azimuth values in an azimuth dimension, and elevation values in an elevation dimension.

Example 73 includes the subject matter of any one of Examples 69-72, and optionally, wherein data size of the compressed radar information of the first computation process is at least 30% less than a data size of the radar values corresponding to the first radar dimension.

Example 74 includes the subject matter of any one of Examples 69-73, and optionally, wherein data size of the compressed radar information of the first computation process is at least 50% less than a data size of the radar values corresponding to the first radar dimension.

Example 75 includes the subject matter of any one of Examples 69-74, and optionally, wherein the statistical coding comprises a Huffman coding.

Example 76 includes the subject matter of any one of Examples 69-75, and optionally, wherein the memory comprises a Synchronous Dynamic Random-Access Memory (SDRAM).

Example 77 includes the subject matter of any one of Examples 69-76, and optionally, wherein the memory comprises a Double Data Rate Synchronous Dynamic Random-Access Memory (DDR SDRAM).

Example 78 includes the subject matter of any one of Examples 69-77, and optionally, comprising a Multiple-Input-Multiple-Output (MIMO) radar antenna comprising a plurality of Rx antennas and a plurality of Transmit (Tx) antennas, and a plurality of Rx chains to generate the radar Rx data based on radar signals received via the plurality of Rx antennas.

Example 79 includes the subject matter of any one of Examples 69-78, and optionally, comprising a vehicle, the vehicle comprising a system controller to control one or more systems of the vehicle based on the radar information.

Example 80 includes an apparatus comprising means for executing any of the described operations of Examples 1-79.

Example 81 includes a machine-readable medium that stores instructions for execution by a processor to perform any of the described operations of Examples 1-79.

Example 82 includes an apparatus comprising a memory; and processing circuitry configured to perform any of the described operations of Examples 1-79.

Example 83 includes a method including any of the described operations of Examples 1-79.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:

a Transmit (Tx) antenna array comprising a plurality of Tx antennas, the Tx antenna array comprising a plurality of Tx clusters, a Tx cluster of the plurality of Tx clusters comprising at least three Tx antennas of the plurality of Tx antennas, wherein the plurality of Tx clusters comprises a first Tx cluster, a second Tx cluster, a third Tx cluster, and a fourth Tx cluster, wherein a first Tx-cluster spacing between the first Tx cluster and the second Tx cluster is different from a second Tx-cluster spacing between the second Tx cluster and the third Tx cluster, wherein a third Tx-cluster spacing between the second Tx cluster and the fourth Tx cluster is the same as the first Tx-cluster spacing, and wherein a fourth Tx-cluster spacing between the third Tx cluster and the fourth Tx cluster is different from first Tx-cluster spacing and the third Tx-cluster spacing; and a Receive (Rx) antenna array comprising a plurality of Rx antennas, the Rx antenna array comprising a plurality of Rx clusters, an Rx cluster of the plurality of Rx clusters comprising at least three Rx antennas of the plurality of Rx antennas, wherein the plurality of Rx clusters comprises a first Rx cluster, a second Rx cluster, and a third Rx cluster, wherein a first Rx-cluster spacing between the first Rx cluster and the second Rx cluster is different from a second Rx-cluster spacing between the second Rx cluster and the third Rx cluster.

2. The apparatus of claim 1, wherein Tx antennas of at least one Tx cluster of the plurality of Tx clusters are arranged in a two-dimensional (2D) array, and wherein Tx antennas of at least one other Tx cluster of the plurality of Tx clusters are arranged in a one-dimensional (1D) array.

3. The apparatus of claim 2, wherein the at least one other Tx cluster comprises a plurality of other Tx clusters.

4. The apparatus of claim 1, wherein Rx antennas of at least one Rx cluster of the plurality of Rx clusters are arranged in a two-dimensional (2D) array.

5. The apparatus of claim 1, wherein Rx antennas of each Rx cluster of the plurality of Rx clusters are arranged in a two-dimensional (2D) array.

6. The apparatus of claim 1, wherein an arrangement of Tx antennas in the first Tx cluster is different from an arrangement of Tx antennas in the second Tx cluster.

7. The apparatus of claim 6, wherein an arrangement of Tx antennas in the third Tx cluster is different from the arrangement of Tx antennas in the second Tx cluster.

8. The apparatus of claim 1, wherein an arrangement of Rx antennas in the first Rx cluster is different from an arrangement of Rx antennas in the second Rx cluster.

9. The apparatus of claim 8, wherein an arrangement of Rx antennas in the third Rx cluster is different from the arrangement of Rx antennas in the second Rx cluster.

10. The apparatus of claim 8, wherein an arrangement of Rx antennas in the third Rx cluster is identical to the arrangement of Rx antennas in the first Rx cluster.

11. The apparatus of claim 1, wherein the fourth Tx-cluster spacing is same as the second Tx-cluster spacing.

12. The apparatus of claim 1, wherein the plurality of Tx clusters comprises a uniform Tx cluster comprising a uniform spacing between adjacent Tx antennas of the uniform Tx cluster.

13. The apparatus of claim 1, wherein the plurality of Rx clusters comprises a uniform Rx cluster comprising a uniform spacing between adjacent Rx antennas of the uniform Rx cluster.

14. The apparatus of claim 1, wherein the first Rx cluster is adjacent to the second Rx cluster, wherein the second Rx cluster is adjacent to the third Rx cluster.

15. The apparatus of claim 1, wherein the first Tx cluster is adjacent to the second Tx cluster, wherein the second Tx cluster is adjacent to the third Tx cluster.

16. The apparatus of claim 1, wherein the at least three Tx antennas comprises at least four Tx antennas or the at least three Rx antennas comprises at least four Rx antennas.

17. The apparatus of claim 1, wherein a distance between any two Tx antennas of the at least three Tx antennas is less than or equal to 50 millimeter (mm), wherein a distance between any two Rx antennas of the at least three Rx antennas is less than or equal to 50 millimeter (mm).

18. The apparatus of claim 1, wherein the Tx antenna array and the Rx antenna array are configured such that a convolution of the plurality of Tx antennas and the plurality of Rx antennas represents a non-uniform virtual antenna array, the non-uniform virtual antenna array comprising a plurality of virtual antenna clusters, a virtual antenna cluster of the plurality of virtual antenna clusters comprising at least three virtual antennas.

19. The apparatus of claim 18, wherein the plurality of virtual antenna clusters comprises a first virtual antenna cluster, a second virtual antenna cluster adjacent to the first virtual antenna cluster, and a third virtual antenna cluster adjacent to the second virtual antenna cluster, wherein a first virtual-cluster spacing between the first virtual antenna cluster and the second virtual antenna cluster is different from a second virtual-cluster spacing between the second virtual antenna cluster and the third virtual antenna cluster.

20. The apparatus of claim 1 comprising Radio Frequency (RF) circuitry connected to the plurality of Tx antennas and to the plurality of Rx antennas, wherein the RF circuitry is configured to control the plurality of Tx antennas to transmit radar Tx signals, the RF circuitry configured to process radar Rx signals received by the plurality of Rx antennas based on the radar Tx signals.

21. The apparatus of claim 1 comprising Radio Frequency (RF) circuitry connected to the plurality of Tx antennas and to the plurality of Rx antennas, wherein the RF circuitry is configured to process the radar Rx signals according to a Multiple-Input-Multiple-Output (MIMO) antenna scheme based on a convolution of the plurality of Tx antennas and the plurality of Rx antennas.

* * * * *